(12) United States Patent
Thoma et al.

(10) Patent No.: US 12,503,512 B2
(45) Date of Patent: *Dec. 23, 2025

(54) USE OF ANTI-IL-36R ANTIBODIES FOR TREATMENT OF GENERALIZED PUSTULAR PSORIASIS

(71) Applicant: Boehringer Ingelheim International GmbH, Ingelheim am Rhein (DE)

(72) Inventors: Christian Thoma, Biberach an der Riss (DE); Steven John Padula, Wiesbaden (DE); Janine Lamar, Ingelheim am Rhein (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 458 days.

This patent is subject to a terminal disclaimer.

(21) Appl. No.: 17/101,126

(22) Filed: Nov. 23, 2020

(65) Prior Publication Data

US 2021/0087285 A1 Mar. 25, 2021

Related U.S. Application Data

(63) Continuation of application No. 16/296,825, filed on Mar. 8, 2019, now abandoned.

(60) Provisional application No. 62/729,518, filed on Sep. 11, 2018, provisional application No. 62/699,274, filed on Jul. 17, 2018, provisional application No. 62/683,720, filed on Jun. 12, 2018, provisional application No. 62/642,641, filed on Mar. 14, 2018.

(51) Int. Cl.
*C07K 16/28* (2006.01)
*A61P 17/06* (2006.01)
*A61K 39/00* (2006.01)

(52) U.S. Cl.
CPC .......... *C07K 16/2866* (2013.01); *A61P 17/06* (2018.01); *A61K 2039/505* (2013.01); *A61K 2039/54* (2013.01); *C07K 2317/24* (2013.01); *C07K 2317/76* (2013.01); *C07K 2317/92* (2013.01)

(58) Field of Classification Search
None
See application file for complete search history.

(56) References Cited

U.S. PATENT DOCUMENTS

| | | |
|---|---|---|
| 5,595,756 A | 1/1997 | Bally et al. |
| 6,416,973 B1 | 7/2002 | Bakker et al. |
| 6,953,843 B2 | 10/2005 | Bakker et al. |
| 7,332,574 B2 | 2/2008 | Bakker et al. |
| 8,034,771 B2 | 10/2011 | Sims et al. |
| 8,481,021 B2 | 7/2013 | Sims et al. |
| 9,023,995 B2 * | 5/2015 | Brown .................. C07K 16/244 424/158.1 |
| 9,334,320 B2 | 5/2016 | Okun et al. |
| 10,414,821 B2 | 9/2019 | Liu |
| 10,526,410 B2 | 1/2020 | Bowers |
| 11,730,812 B2 | 8/2023 | Denkinger |
| 2004/0110930 A1 | 6/2004 | Reinl et al. |
| 2004/0132085 A1 | 7/2004 | Bakker et al. |
| 2004/0177391 A1 | 9/2004 | Bakker et al. |
| 2005/0084900 A1 | 4/2005 | Bakker et al. |
| 2007/0041905 A1 | 2/2007 | Hoffman et al. |
| 2007/0071675 A1 | 3/2007 | Wu et al. |
| 2008/0171035 A1 | 7/2008 | Bakker et al. |
| 2008/0292623 A1 | 11/2008 | Bakker et al. |
| 2009/0263403 A1 | 10/2009 | Bakker et al. |
| 2010/0129374 A1 | 5/2010 | Bakker et al. |
| 2010/0150945 A1 | 6/2010 | Bigler et al. |
| 2010/0221252 A1 | 9/2010 | Bigler et al. |
| 2011/0110852 A1 | 5/2011 | Miller et al. |
| 2011/0159011 A1 | 6/2011 | Carrier et al. |
| 2012/0121580 A1 | 5/2012 | Bhambhani et al. |
| 2012/0177647 A1 | 7/2012 | Bigler et al. |
| 2012/0244158 A1 | 9/2012 | Brige et al. |
| 2013/0186797 A1 | 7/2013 | Walsh et al. |
| 2013/0236471 A1 * | 9/2013 | Brown .................. C07K 16/244 435/252.31 |
| 2017/0355756 A1 | 12/2017 | Julien et al. |
| 2018/0094065 A1 | 4/2018 | Bowers |
| 2018/0273627 A1 | 9/2018 | Boecher et al. |
| 2019/0028285 A1 | 1/2019 | Cheng |
| 2019/0284273 A1 | 9/2019 | Boecher et al. |
| 2019/0284285 A1 | 9/2019 | Thoma et al. |
| 2020/0015462 A1 | 1/2020 | Murphy |
| 2020/0017592 A1 | 1/2020 | Fairhurst et al. |

(Continued)

FOREIGN PATENT DOCUMENTS

| | | |
|---|---|---|
| CN | 107362351 A | 11/2017 |
| EP | 1003861 A2 | 5/2000 |

(Continued)

OTHER PUBLICATIONS

Ly et al, Psoriasis: Targets and Therapy 2019:9 37-42 37 (Year: 2019).*
Vajdos et al. (J Mol Biol. Jul. 5, 2002;320(2):415-28 (Year: 2002).*
Brown et al. (J Immunol. May 1996;156(9):3285-91 (Year: 1996).*
Waiker et al (J Am Soc Nephrol. Jan. 2012; 23(1): 13-21) (Year: 2012).*
Mayeux (NeuroRx. Apr. 2004;1(2):182-8) (Year: 2004).*
Neuhauser et al, Experimental Dermatology. 2020;29:1088-1096 (Year: 2020).*
Aydin et al (Clinical, Cosmetic and Investigational Dermatology 2020:13 611-625) (Year: 2020).*
Johnston et al (J Allergy Clin Immunol. Jul. 2017 ; 140(1): 109-120) (Year: 2017).*

(Continued)

*Primary Examiner* — Brian Gangle
*Assistant Examiner* — Andrea K McCollum
(74) *Attorney, Agent, or Firm* — Wendy M. Gombert

(57) ABSTRACT

The present invention provides specific dosage regimens for the treatment of generalized pustular psoriasis (GPP) with anti-interleukin-36R antibodies (anti-IL36R antibodies) which dosage regimens surprisingly provide for the rapid and sustained remission of pathological symptoms of GPP including e.g., flares caused by GPP.

9 Claims, 7 Drawing Sheets

Specification includes a Sequence Listing.

(56) References Cited

U.S. PATENT DOCUMENTS

| | | |
|---|---|---|
| 2020/0207862 A1 | 7/2020 | Baum et al. |
| 2020/0402998 A1 | 12/2020 | Cho |
| 2022/0073628 A1 | 3/2022 | Fine et al. |
| 2022/0119538 A1 | 4/2022 | Thoma et al. |
| 2022/0256258 A1 | 8/2022 | Wucherpfennig |
| 2022/0402998 A1 | 12/2022 | Liu et al. |

FOREIGN PATENT DOCUMENTS

| | | | |
|---|---|---|---|
| EP | 1627927 | A2 | 2/2006 |
| EP | 2152750 | A1 | 2/2010 |
| EP | 2176294 | A1 | 4/2010 |
| EP | 2337799 | A2 | 6/2011 |
| JP | 2009521933 | A | 6/2009 |
| JP | 2016531123 | A | 10/2016 |
| JP | 2017114829 | A | 6/2017 |
| JP | 2018512157 | A | 5/2018 |
| JP | 2020512344 | A | 4/2020 |
| KR | 20180098625 | A | 9/2018 |
| WO | 9856418 | A1 | 12/1998 |
| WO | 9906557 | A2 | 2/1999 |
| WO | 9906577 | A2 | 2/1999 |
| WO | 2004091658 | A1 | 10/2004 |
| WO | 2008033333 | A2 | 3/2008 |
| WO | 2008133857 | A1 | 11/2008 |
| WO | 2009006112 | A1 | 1/2009 |
| WO | 2010025369 | A2 | 3/2010 |
| WO | 2013074569 | A1 | 5/2013 |
| WO | 201616842 | A1 | 2/2016 |
| WO | 16168542 | A1 | 10/2016 |
| WO | 2016168542 | A1 | 10/2016 |
| WO | 2017117311 | A1 | 7/2017 |
| WO | 2018183173 | A1 | 10/2018 |
| WO | 2019177883 | A2 | 9/2019 |
| WO | 2019177888 | A1 | 9/2019 |
| WO | 2020136101 | A1 | 7/2020 |
| WO | 2020185479 | A1 | 9/2020 |

OTHER PUBLICATIONS

Aagaard, Lars et al. "RNAi therapeutics: Principles, prospects and challenges" (2007) Advanced Drug Delivery Reviews, vol. 59, 75-86.

Arend, William P. et al. "IL-1, IL-18, and IL-33 families of cytokines" Immunological Reviews (2008) vol. 223, pp. 20-22.

Blumberg, Hal et al. "IL-1RL2 and Its Ligands Contribute to the Cytokine Network in Psoriasis" The Journal of Immunology (2010) vol. 185, pp. 4354-4362.

Blumberg, Hal et al. "Opposing activities of two novel members of the IL-1 ligand family regulate skin inflammation" The Journal of Experimental Medicine (2007) vol. 204, No. 11, pp. 2603-2614.

Born, Teresa et al. "Identification and characterization of two members of a novel class of the interleukin-1 receptor (IL-1R) family. Delineation of a new class of IL-1R-related proteins based on signaling" The Journal of Biological Chemistry (2000), vol. 275, pp. 29946-29954.

Bowie, James U. et al. "Deciphering the Message in Protein Sequences: Tolerance to Amino Acid Substitutions" Science (1990) vol. 247, pp. 1306-1310.

Brown et al., "Tolerance to Single, but Not Multiple, Amino Acid Replacements in Antibody VH CDR2", J. Immunol., 1996, 156, pp. 3285-3291.

Burgess, Wilson H. et al. "Possible Dissociation of the Heparin-binding and Mitogenic Activities of Heparin-binding (Acidic Fibroblast) Growth Factor-1 from its Receptor-binding Activities by Site-directed Mutagenesis of a Single Lysine Residue" Journal of Cell Biology, (1990) vol. 111, pp. 2129-2138.

Chustz, Regina T. et al. "Regulation and Function of the IL-1 Family Cytokine IL-1F9 in Human Bronchial Epithelial Cells" Am J Respir Cell Mol Biol (2011) vol. 45, pp. 145-153.

Clark, James D. et al. "Discovery and Development of Janus Kinase (JAK) Inhibitors for Inflammatory Diseases" (2014) American Chemical Society, 5023-5038.

Clinical Trials "A Study to Evaluate the Efficacy and Safety of ANB019 in Subjects With Palmoplantar Pustulosis (PPP)" NCT03633396, (2019) clinicaltrails.gov, 8 pgs.

Clinical Trials "History of Changes for Study: NCT03135548, Initial Dosing of BI 655130 in Palmoplantar Pustulosis Patients" (2020) clinicaltrials.gov, 5 pgs.

Clinical Trials "History of Changes for Study: NCT03782792, A Study to Test BI 655130 in Patients iwth Flare-up of a Skin Disease called Generalized Pustular Psorasis" (2018) clinicaltrials.gov, 6 pgs.

Creative Diagnostics "Mouse anti-IL1RL2 Monoclonal Antibody" Product Information. Gene ID 8808. mRNA Ref Seq NM_003854. (2004).

Debets, Reno et al. "Two Novel IL-1 Family Members, IL-1d and IL-le Function as an Antagonist and Agonist of NF-kb Activation Through the Orphan IL-1 Receptor-Related Protein 21" The Journal of Immunology (2001) vol. 167, pp. 1440-1446.

Dinarello, Charles A. "Immunological and Inflammatory Functions of the Interleukin-1 Family" The Annual Review of Immunology (2009) vol. 27, pp. 519-550.

Dinarello, Charles et al. "IL-1 family nomenclature" Nature Immunology (2010) vol. 11, pp. 973-974.

Guido, Rafael V.C. et al. "Virtual Screening and Its Integration with Modern Drug Design Technologies" (2008) Current Medicinal Chemistry, vol. 15, 37-46.

International Search Report for PCT/US2012/064933 filed Nov. 14, 2012, mailed Feb. 7, 2013.

International Search Report for PCT/US2019/021296 mailed Feb. 27, 2020.

International Search Report PCT/EP2019/086521 mailed Apr. 6, 2020.

International Search Report PCT/US2018/024296 mailed Jun. 22, 2018.

Johnston, Andrew et al. "IL-1F5, -F6, -F8, and -F9: A Novel IL-1 Family Signaling System that is Active in Psoriasis and Promotes Keratinocyte Antimicrobial Peptide Expression" The Journal of Immunology (2011) vol. 186, pp. 2613-2622.

Lazar, Eliane et al. "Transforming Growth Factor a: Mutation of Aspartic Acid 47 and Leucine 48 Results in Different Biological Activities" Molecular and Cellular Biology (1988) vol. 8, No. 3, pp. 1247-1252.

Lingel, Andreas et al. "Structure of IL-33 and its Interaction with the ST2 and IL-1RAcP Receptors—Insight into Heterotrimeric IL-1 Signaling Complexes" Structure (2009) vol. 17, pp. 1398-1410.

Lovenberg, Timothy W. et al. "Cloning of a cDNA encoding a novel interleukin-1 receptor related protein (IL1R-rp2)" Journal of Neuroimmunology, (1996) vol. 70, pp. 113-122.

Magne, David et al. "The new IL-1 Family Member IL-1F8 stimulates production of inflammatory mediators by synovial fibroblasts and articular chondrocytes" Arthritis Research & Therapy (2006) vol. 8:R80, 11 pgs.

Marrakchi, Slaheddine et al. "Interleukin-36-Receptor Antagonist Deficiency and Generalized Pustular Psoriasis" New England Journal of Medicine (2011) vol. 365 pp. 620-628.

Matsuba et al., "Preparation of Super-High Affinity Rabbit Monoclonal Antibodies Against Estradiol.: Application to Highly Sensitive Estradiol Measurement", TOSOH Research & Technol. Review. 2008, vol. 52, pp. 3-9.

Mckeaugue, Maureen et al. "Challenges and Opportunities for Small Molecule Aptamer Development" (2012) Journal of Nucleic Acids, Article ID: 748913, 20 pgs.

Mcmahan, Catherine J. et al. "A Novel IL-1 receptor, cloned from B cells by mammalian expression, is expressed in many cell types" EMBO Journal (1991) vol. 10, No. 10, pp. 2821-2832.

NCBI Gene databases (IL1RL2 interleukin 1 receptor-like 2 [*Homo sapiens*(human)]; http:www.ncbi.nlm.nib.gov/gene/8808; downloaded May 18, 2014, 8 pgs.

Qin, Jian-Zhong et al. "Role of NF-kB in the Apoptotic-resistant Phenotype of Keratinocytes" (1999) vol. 274, No. 53, 37957-37964.

(56) References Cited

OTHER PUBLICATIONS

Ramadas, Ravisankar A. et al. "IL-36a Exerts Pro-Inflammatory Effects in the Lungs of Mice" PLOS one (2012) vol. 7, Issue 9, e45784, 17 pgs.

Ramadas, Ravisankar A. et al. "Interleukin-1 Family Member 9 Stimulates Chemokine Production and Neutrophil Influx in Mouse Lungs" Am J Respir Cell Mol Biol (2011) vol. 44, pp. 134-145.

Scheibe, Kristina et al. "Inhibiting Interleukin 36 Receptor Signaling Reduces Fibrosis in Mice with Chronic Intestinal Inflammation" (2019) Gastroenterology, vol. 156, No. 4, 1082-1097.

Steidl et al., "In vitro affinity maturation of human GM-CSF antibodies by targeted CDR-diversification", Mol. Immunol, 2008, vol. 46, pp. 135-144.

Su, Zhi et al. "IL-36 receptor antagonistic antibodies inhibit inflammatory responses in preclinical models of psoriasiform dermatitis" (2019) Experimental Dermatology, 28, 113-120.

Tortola, Luigi et al. "Psoriasiform dermatitis is driven by IL-36-mediated DC-keratinocyte crosstalk" The Journal of Clinical Investigation (2012) vol. 122, No. 11, pp. 3965-3976.

Towne, Jennifer E. et al. "Interleukin (IL)-1F6, IL-1F8, and IL-1F9 Signal through IL-1Rrp2 and IL-1RAcP to Activate the Pathway Leading to NF-kB and MAPKs*" The Journal of Biological Chemistry (2004) vol. 279, No. 14, pp. 13677-13688.

Towne, Jennifer E. et al. "Interleukin-36 (IL-36) Ligands Require Processing for Full Agonist (IL-36a, IL-36b, and IL-36g) or Antagonist (IL-36Ra) Activity" The Journal of Biological Chemistry (2011) vol. 286, No. 49, pp. 42594-42602.

Vajdos et al., "Comprehensive Functional Maps of the Antigenbinding Site of an Anti-Erb82 Antibody Obtained with Shotgun Scanning Mutagenesis", J. Mol. Biol., 2002, 320, pp. 415-428.

Warzocha, Krzysztof et al. "Antisense Strategy: Biological Utility and Prospects in the Treatment of Hematological Malignancies" (1997) Leukemia and Lymphoma, vol. 24, 267-281.

Clinical Trials "BI655130 Single Dose in Generalized Pustular Psoriasis" (2018) Identifier: NCT02978690, 6 pgs.

Clinical Trials "This Study Tests How BI 655130 Works in Patients with Active Ulcerative Colitis. The Study also Tests how well BI 655130 is Tolerated and Whether it Helps the Patients" (2020) NCT03100864, 28 pgs.

Russell, Se et al. "IL-36a expression is elevated in ulcerative colitis and promotes colonic inflammation" (2016) Mucosal Immunology, vol. 9, No. 5, 1193-1204.

Ding, Liping et al. "IL-36 cytokines in autoimmunity and inflammatory disease" (2018) Oncotarget, vol. 9, No. 2, 2895-2901.

Nishida, Atsushi et al. "Increased Expression of Interleukin-36, a Member of the Interleukin-1 Cytokine Family, in Inflammatory Bowel Disease" (2016) Inflamm Bowel Dis, vol. 22, No. 2, 303-314.

Andoh, Akira et al. "Increased Expression of Interleukin-36 in the Inflamed Mucosa of Inflammatory Bowel Disease" Abstract 1812, (2015) The American Journal of Gastroenterology, vol. 110, Supplement 1, S770.

Johnston, Andrew et al. "IL-1 and IL-36 are dominant cytokines in generalized pustular psoriasis" (2017) J Allergy Clin Immunol, 109-120.

Tsai, Ya-Chu et al. "Anti-interleukin and interleukin therapies for psoriasis: current evidence and clinical usefulness" (2017) Therapeutic Advances in Musculoskeletal Disease, vol. 9 (11), 277-294.

Body Mass Index Table from www.nhlbi.nih.gov/health/educational/lose_wt/BMI/bmi_tbl.pdf <http://www.nhlbi.nih.gov/health/educational/lose_wt/BMI/bmi_tbl.pdf>, viewed Sep. 16, 2021.

Wong, Chi Heem et al. "Estimation of clinical trial success rates and related parameters" (2019) Biostatistics, 20, 2, 273-286.

Clinical Trials "A Study in Patients with Atopic Eczema to Test How Effective BI 655130 Is and How Well It Is Tolerated" (2021) Last Update Posted, NCT03822832, 11 pgs.

Wang, Wei et al. "Antibody Structure, Instability and Formulation" (2007) Journal of Pharmaceutical Sciences, vol. 96, No. 1, 1-26.

Boehringer Ingelheim "Boehringer Ingelheim R&D pushes to Transcend Disease Boundaries" (2018) Business Wire, 4 pgs.

Lacy, et al. "Correlation between Antibody Affinity and Activity: Understanding the Molecular Basis for a Picomolar to Femtomolar Increase in Affinity" (2009) Abstract, 1621-Pos, Board B465, vol. 96, Issue 3, S1, 317a-318a.

Bachelez, Herve et al. "Inhibition of the Interleukin-36 Pathway for the Treatment of Generalized Pustular Psoriasis" (2019) The New England Journal of Medicine, 380: 10, 981-983.

Satoh T K et al: "Are neutrophilic dermatoses autoinflammatory disorders?" (2018) The British Journal of Dermatology, vol. 178, No. 3, pp. 603-613.

Marzano Angelo V. et al: "Mechanisms of Inflammation in Neutrophil-Mediated Skin Diseases", (2019) Frontiers in Immunology, vol. 18, 2019, p. 1859.

Mrowietz Ulrich et al: "Spesolimab, an Anti-Interleukin-36 Receptor Antibody, in Patients with Palmoplantar Pustulosis: Results of a Phase IIa, Multicenter, Double-Blind, Randomized, Placebo-Controlled Pilot Study", (2021) Dermatology and Therapy, vol. 11, No. 2, 571-585.

International Search Report PCT/US2021/041734 mailed Nov. 11, 2021, 4 pgs.

Clinical Trials, Interleukin-1 receptor-like 2 isoform a precursor, downloaded from https://ncbi.nlm.nlh.gov/protein/NP_003845.2?report+girevhist on Sep. 21, 2022 2022.

Elias, IL-36 in chronic inflammation and fibrosis, JCI, vol. 131, 2021, 14 pages.

Melton, Interleukin-36 Cytokine/Receptor Signaling, Int. J. of Molecular Sci., vol. 21, 2020, 22 pages.

Neufert, Rationale for IL-36 receptor antibodies in ulcertaive colitis, Expert opinion on Biological Therapy, vol. 20, 2020, 5 pages, https://doi.org/10.1080.14712598.2020.1695775.

Scheibe, Inhibiting Interleukin 36 receptor signaling reduces fibrosis in mice with chronic intestinal inflammation, Gastroenterology, vol. 156, 2019, 27 pages.

International Search Report and Written Opinion for PCT.US2022/074888 mailed Nov. 29, 2022.

International Search Report and Written Opinion for PCT/US2022/019743 mailed Oct. 21, 2022.

Baliwag, Cytokines in psoriasis, Cytokine, vol. 73, 2015, 9 pages.

Baum, Generalized Pustular psoriasis and palmoplantar pustulosis both slow upregulation of the IL-36, neutrophil chemokine, and innate pathways that are modulated by spesolimab, and anti-IL-36 receptor antibody treatment, Journal of Investigative Dermatology, Adaptive and Auto-Immunity, www.jidonline.org., vol. 140, 2020, p. S5.

Baum, Treatment with spesolimab, an anti-interleukin-36 receptor antibody, in patients with generalized pustular psoriasis, ESDR 2019 Annual Meeting, Retrieved from Internet: URL:https://www.sciencedirect.com/science/article/pii/S0022202X19322444/pdfft?md5=main.pdf on Jun. 23, 2022, 1 page.

Baum, Pustular psoriasis: molecular pathways and effects of spesolimab in generalized pustular psoriasis, Journal of Allergy and clinical immunology, vol. 149. 2021, p. 1402-1412.

Brenner, Gernalized pustular psoriasis induced by systemic glucocorticosteroids, Bristish Journal of Dermatology, vol. 161, 2009, p. 964-963.

Yuan, Biology of IL-36 Signaling and its role in systemic Inflammatory Diseases, Frontiers in Immunology, vol. 10, 2019, p. 2532.

Zeng, Integrated analysis of gene expression profiles identifies transciption factors potentially involved in psoriasis pathogenesis, J. of Cellular Biochem., vol. 120, 2019, p. 12582-12594.

Tortola, Psoriasiform dermatitis is driven by IL-36-mediated DC-keratinocyte crosstalk, The J. of Clinical Investigation, vol. 122, 2012, p. 3965-3976.

Foster, IL-36 promotes myeloid cell infiltration activation and inflammatory activity in skin, The j. of immunolgy, vol. 192, 2014, p. 6053-6061.

Swindell, 7th International Congress of psoriais: from gene to clinic: The Queen Elizabeth II Conference Centre, London, UK, Dec. 11-13, 2014, British Journal of Dermatology, vol. 171, 2014, 69 pages.

Creative Diagnostics "Mouse anti-IL 1RL2 Monoclonal Antibody" Product Information. Gene ID 8808. mRNA Ref Seq NM_003854. (2004) 1 page.

(56) References Cited

OTHER PUBLICATIONS

Nolan, S. et al. "505 Therapeutic activity of an anti-IL36R blocking antibody in inhibiting atopic dermatitis-like skin inflammation in mice" (2019) Journal of Investigative Dermatology, Society for Investigative Dermatology (SID) 2019, Meeting Abstract Supplement, 2 pgs.
Patrick, Garrett et al. "Epicutaneous *Staphylococcus aureaus* induces IL-36 to enhance IgE production and ensuing allergic disease" (2021) The Journal of Clinical Investigation, 1-15.
Puar, Neha et al. "New treatments in atopic dermatitis" (2020) Annals Allergy Asthma Immunology, 126, 21-21.
International Search Report PCT/US2021/032713 mailed Aug. 30, 2021, 12 pgs.
International Search Report PCT/US2020/021059 mailed on Jun. 23, 2020.
Anonymous Anti-IL36 gamma/IL-1 F9 antibody (OT12F4) (ab156783), Jan. 1, 2019, XP055650144, 6 pgs.
Chang, Byeong S. et al. "Practical Approaches to Protein Formulation Development" (2022) Kluwer Academic/Plemum publishers, 1-25.
Kang, Rapid Formulation Development for Monoclonal Antibodies, BioProcess Chem., vol. 14, 2016, 4 pages.
Li, Spinal Il-36/11-36R participates in the maintenance of chronic inflammatory pain through adtroglial JNK pathway, GLIA, vol. 67, 2019, Retrieved from the internet: URL: https://api.wiley.com/onlinelibrary.tdm/v1articles/10/1002Fglia.23552.
Alvarez, Imiquimod Treatment causes systemic disease in mice resembling generalized pustular psoriasis in an IL-1 and IL-36 Dependent Manner, GLIA, vol. 1, 2016, Retrieved from the Internet, URL:http://downloads.hindawi.com/journals/mi2016/6756138/xml.
Ratnarajah, Spesolimab, a novel treatment for pustular psoriasis, Journal od cutaneous med and surgery, vol. 24, 2020, Retrieved from the internet, URL:http://jouranls.sagepub.com/doi/full-xml/10.1177/1203475419888862.
Ganesan, Generation and functional characterization of anti-human and anti-mouse IL-36R antagonist monoclonal antibodies, MABS, vol. 9, 2017, p. 143-154.
Kazumitsu, The majority of generalized pustular psoriasis without psoriasis vulgaris is caused by deficiency of interleukin-36 receptor antagonist, vol. 133, 2013, p. 514-521.
A study to test how effective and safe different doses of BI 655130 are in patients with a moderate to severe form of the skin disease palmoplantar pustulosis. ClinicalTrials.gov identifier:NCT4015518. Jul. 9, 2019. Accessed May 19, 2023. https://clinicaltrials.gov/ct2/history/NCT04015518?V_5=V(Year2019).
Freitas, Screening and Treatment of Patients with palmoplantar Pustolosis (PPP): A review of current practices and recommendations. Clinical Cosmet. Invest. Dermatol., vol. 13, 2020, p. 561-578.
Edwards, The remarkable flexibility of the human antibody repertoire, J, Mole. Biol., vol. 1, 2003, p. 103-118.
Almagro, Humanization of antibodies, Front Biosci., vol. 13, 2008, p. 1619-33.
Kussie, A single engineered amino acid substitution changes antibody fine specificity, J. Immunol., vol. 1, 1994, p. 146-152.
Anonymous, A study in patients with atopic eczema to test how effective BI655130 is and how well it is tolerated, Retrieved from the internet, http:/clinicaltrials.gov.ct2/show/record/NCT3822832/ retrieved Aug. 16, 2021.
Melton, Interleukin-36 Cytokine/Receptor Signaling, Int. J. of Mol. Sci., vol. 21, 2020, 22 pages.
Scheibe, Inhibiting Interleukin 36 Receptor Signaling reduces Fibrosis in mice with chronic intestinal inflammation, Gastrolenterology, vol. 156, 2019, 27 pages.
Ring, The Follicular skin microbiome in patients with Hidradenitis Suppurativa and healthy controls, JAMA derma., vol. 153, 2017, 20 pages.
Towne, Interleukin (IL)-1F6, IL-1F8, and IL-1F9 signal through IL-1Rrp2 and IL-1RacP to activate the pathway leading to NF-κB and MAPKs*, The J. of Biological Chem, vol. 14, 2004, 12 pages.
Sarkissian, Identification of Biomarkers and critical Eval. of Biomarker validation in Hidradentitis Suppurativa, JAMA Derma., vol. 158, 2022, 27 pages.
Towne, Interleukin-36 (IL 36) ligands require processing for full agonist, J. of Biological Chemistry, vol. 286, 2011, 9 pages.
Gao, Inversa acne a case report and ID of the locus at Chromosome 1p21.2-1q25.3, J. of investigative Derma., vol. 136, 2006, 5 pages.
Dinarello, A clinical Perspective of IL-1B as the gatekeeper of inflammation, Euro. J. of Immunology, vol. 41, 2011, 15 pages.
Webster, The Functional Assessment of Chronic Illness Therapy Measurement system, Bio Med Central, vol. 79, 2003, 7 pages.
Di Caprio Il-36 cytokines are increased in acne, Arch. Dermatol. Res., vol. 10, 2017, 6 pages.
Van Straalen, Contribution of genetics to the susceptibility to hidradenitis suppurativa in a large, cross sectional dutch twin cohort, JAMA derma, vol. 156, 2020, 4 pages.
Navrazhina, Epithelialized tunnels are a source of inflammation in hidradenitis suppurativa, J. Allergy Clin. Immunol., vol. 12, 2020, 12 pages.
Thomi, Increased expression of the interleukin-36 cytokines in lesions of hidradenitis suppurativa, JEADV, vol. 31, 2017, 6 pages.
Jorgensen, Clinical, microbiological, immunological and imaging characteristics of tunnels and fistulas in hidradenitis suppurativa, Experimental Dermatology, vol. 29, 2019, 6 pages.
Revillet, Bacterial pathogens associated with Hidradenitis Suppurativa, France, Emerginv infectious diseases, vol. 20, 2014, 9 pages.
Winthrop, Opportunistic infections and biologic therapies in immune mediated inflammatory diseases, vol. 1, 2015, 12 pages.
Bonnekoh, Spectrum of genetic autoinflammatory diseases presenting with cutaneous symptoms, Acta Derm Venereol., vol. 100, 2020, p. 140-151.
Bai, Studies of mouse models of allergic disease, Chinese Journal of Comparative Medicine, vol. 2, 2020, 7 pages, Abstract only.
Anon, Anaptybio Reports Harp Phase 2 top-line data of imsidolimab in moderate to severe hidradenitis suppurativa, Anaptysbio, 2016, 6 pages.
Weiss, Neutrophilic Dermatoses, Current Dermatology Reports, vol. 11, 2022, 14 pages.
Hunt, The current clinical trial landscape for hidradenitis suppurativa, vol. 13, 2023, 17 pages.
Ferrante, Safety and tolerability of speso in patients with ulcertaive colitis, Exp. Opinion on drug safety, vol. 2, 2023, 12 pages.
Bissonnette, Speso, an anti-interleukin-36 receptor antibody, in patients with moderate ro severe atopic dermatitis, JEADV, vol. 10, 2022, 9 pages.
Guenin, Spesolimab use in treatment of pyoderma gangrenosum, JAAD, vol. 10, 2023, 5 pages.
Alavi, Pyoderma Gangroenosum,Am. J. Clin. Dermatol, vol. 18, 2017, 18 pages.
Mrowietz, Spesolimab, an anti-interleukin-36 receptor antibody, Dermatol. Ther., 2020, 15 pages, published online https://doi/org/10.1007/s13555-021-00504-0.
Bachelez, Trial of Spesolimab for Generalized Pustular Psoriasis, New England Journal of Medicine, vol. 385, 2021, p. 2431-2440.
Clinical Trials, A study in patients with Mild or moderate Ulcerative colitis who take a TNF inhibitor, History of changes for study, NCT103123120, Oct. 15, 2021.
International Report on Patentability for PCT/US2022/019742.
Clinical Trials, A study in patients with atopic eczema to test how effective BI 655130 is and how well it is tolerated, 2019; NCT03822832, 87 pages.
Berke, Atopic Dermatitis, Americam Family Physician, vol. 86, 2012, p. 35-42.
Costanzo, Pustular psoriasis with a focus on generalized pustualr psoriasis, Italian J. of Dermatology and Venereology, vol. 157, 2022, p. 489-496.
Puig, Generalized pustular Psoriasis: a global delphi consensus on clinical course, diagnosis, treatment goals, JEADV, vol. 10, 2022, 16 pages.
Alavi, Speso for hidradenitis supparativia, J. Am. Acad Dermatol, vol. 89, 2023, 1 page.

(56) References Cited

OTHER PUBLICATIONS

Belato, Response to Interleukin-36 in hidradentitis suurativa, British J. of Dermatology, vol. 176, 2018, 1 page.
Gouin, Trangenic Kallikrein 14 mice display major hair shaft defects associated with desmoglein 3 and 4 degradation, abnormal epidermal differentiation, J. Invest Dermatol., vol. 140, 2020, p. 1184-1194.
Speso entryin IUPHAR/BPS Guide to Phamra, www.guideto[harmacology.org/GRAC/ligandDispalyforward?tab=clinical&ligandld=12169; accessed Jan. 26, 2024.
Hessam, Interleukin-26 in hidradentits suppurativa, Brit. J. Dermatol, vol. 178, 2018, p. 591-592.
Malik, Ichthyosis molecular fingerprinting shows profound TH17 skewing and a unique barrier genomic signature, J. Allergy Clin Immunol., vol. 143, 2019, p. 604-618.
Navarini, Neutrophilic dermatoses and autoinflammatory diseases with skin involvement, Smin Immunopathol, vol. 38, 2016, p. 45-56.
Polesie, Secukinumab in the treatment of generalized pustular psoriasis, acta derm veneral, vol. 97, 2017, p. 124-125.
Tsai, Anti-interleukin and interleukin therapies for psoriasis, Ther. Adv. Muscoloskel. Dis. vol. 9, 2017, p. 277-294.
Kimball, Adalimumab for the treatment of moderate to severe hidradentitis Suppurativa, Annals of internal Medicine, vol. 157, 2012, 19 pages.
Wark, The microbiome in Hidradentitis Supparativa, A review, Dermatol., Thera., vol. 11, 2021, 14 pages.
Zouboulis, Hidradenitis Suppurativa, Dermatology, vol. 231, 2015, p. 184-190.
Revillet, Bacterial Pathogens Associated with Hidradenitis Suppurativa, Emerging Infectious Diseases, vol. 20, 2014, 9 pages.
Frew, The effect of subcutaneous brodalumab on clinical disease activity in hidraenitis suppurativa, J. Am. Acad Derma., vol. 5, 2020, 15 pages.
Glatt, Efficacy and Safety of Bimekizumab in Moderate to severe Hidradenitis Suppurativa, vol. 157, 2021, 10 pages.
Li, Construction strategies for developing expression vectors for recombinant monoclonal antibody production in CHO cells, Molecular Biology Reports, vol. 45, 2018, 6 pages.
Byrd, Neutrophil extracellular traps, B cells, and type 1 interferons contribute to immune dysregulation in hidradenitis suppurativa, Science Translational Med., vol. 508, 2021, 13 pages.
Crommelin, Formulation of Biologics including Biopharmaceutical Considerations, Utrect Institute, vol. 10, 2019, 21 pages.
Flood, Biologic Treatment for Hidradenitis Suppurativa, Am. J. of Clinical Derma., vol. 20, 2019, 14 pages.
Phan, Global prevalence of hidradenitis suppurativa and geograhical variation, Biomedical Derma., vol. 10, 2020, 6 pages.
Zouboulis, Development and validation of the International Hidradenitis Suppurativa severity score system, British J. of Derma., vol. 177, 2017, 9 pages.
Revillet, The microbiological landscape of Anaerobic infections in Hidradenitis Suppurativa, Clinical Infectious Diseases, vol. 65, 2017, 10 pages.
Yellen, Measuring fatigue and other anemia related symptoms with the functional assessment of cancer therapy, J. of Pain and Symptom management, vol. 13, 1997, 12 pages.
Kimball, HiSCR a novel clinical endpoint to evaluate therapeutic outcomes in patients with hidradenitis suppurativa, JEADV, vol. 10, 2016, 6 pages.
Harusato, IL-36y signaling controls the induced regulatory T-cell Th9 cell balance via NFkB activation and STAT transcription factors, Mucosal Immunolgoy, vol. 10, 2017, 13 pages.
Marrakechi, Interleukin-36-Receptor Antagonist Deficieny and Generalized Pustular Psoriasis, The N. E. Journal of Medicine, vol. 365, 2011, 9 pages.
Marrakechi, Inhibition of the Interleukin-36 Pathway for the treatment of Generalized Pustular Psoriasis, The New England Journal of Medicine, vol. 380, 2019, 3 pages.
Taylor, A transgenic mouse tat expresses a diversity of human sequence heavy and light chain immunoglobulins, Nucleic Acids Research, vol. 20, 1992, p. 6287-6295.
Rankin, Case report of hidradenitis suppurativa, SAGE Medical Case reports, vol. 9, 2021, 4 pages.
Cella, Validation of the Functional assessment of chronic illness therapy fatigue scale relative to other instumentation in patients with rheumatoid arthritis, J. of Rheumatology, vol. 32, 2015, 9 pages.
Woodworth, Standardizing assessment and reporting of adverse effects in rheumatology clinical trials II, J. of Rheumatology, vol. 34, 2007, 15 pages.
Moltrasio, Hidradenitis Suppurativa, A perspective on genetic factors involved in the disease, Biomedicines, vol. 10, 2022, 14 pages.
Greenland, Estimation of a common effect parameter from a sparse foll up data, Biometrics, vol. 41, 1985, 15 pages.
Anon, Research Letter, British J. of Derma., vol. 173, 2015, 4 pages.
Krueger, Hidradenitis suppurativa, new insights into disease mechanisms, Br. J. Derma., vol. 190, 2023, 14 pages.
Hessam, Interleukin-36 in hidradenitis suppurativa, evidence for a distinctive proinflammatory role and a key factor in the development of an inflammatory loop, B. Journal of Derma., vol. 178, 2018, 1 page.
Scala, Hidradentitis Suppurativa, Where we are and where we are going, Cells, vol. 10, 2021, 19 pages.
Zouboulis, Hidradenitis Suppurativa Acne Inversa: criteria for diagnosis, Dermatology, vol. 231, 2015, 7 pages.
Costanzo, Pustular Psoriasis wih a focus on generalized pustular psoriasis, Italian J. of Dermatology and Venereaology, vol. 10, 2022, 8 pages.
Puig, Generalized Pustular Psoriasis, A global delphi consensus on clinical course, diagnosis, treatment goals and disease managment, vol. 10, 2022, 16 pages.
Burden, Clinical Disease Measures in Generalized Pustular Psoriasis, American Journal of Clinical Dermatology, 2022, vol. 23, Supp. 1, p. 539-550.
UCB announcement, UCB Announcement Positive Phase 3 studies for Bimekizumab in Hidradenitis Suppurativa, last updated Dec. 2022, 1 page.
Robins, Estimation of a common effect parameter from sparse follow-up data, Biometrics, vol. 51, 1985, p. 55-68.
Highet, *Streptococcus milleri* causing treatable infection in perineal hidradenitis suppurativa, British J. of Derma., vol. 103, 1980, p. 375-382.
Zouboulis, Development and validation of the International Hidradenitis Suppurativa severity score system, British J. of Derma., vol. 177, 2017, p. 1401-1409.
Calabrese, Opportunistic infections and biologic therapies in immune-mediated inflammatory diseases, Annals of Rheumatic Diseases, vol. 10, 2015, p. 1-12.
Suzuki, Mutations in the g-Secretase Genes NCSTN, PSENEN, and PSEN1 underlie rare forms of Hendradentitis Suppurativa, Journal of Invetigative Dermatology, vol. 132, 2012, p. 2459-2461.
Burden, The Generalized Pustular Psoriasis Physician Global Assessment score, Research Letters, downloaded from https://academic.oupcom/bjd/article/189/1/138/7131301 by guest on May 6, 2024.
International Search Report and Written Opinion for PCT/US2024/018981 mailed Jul. 17, 2024.
Bai, Treatment of Netherton syndrome with spesolimab, JEADV, 2024, vol. 10, p. 1-2.
Brown, Tolerance to Single, but not Multiple, Amino Acid Replacements in Antibody VH CDR2, J. Immunol., 1996, vol. 9, p. 3285-3291.
Bork, Powers and Pitfalls in Sequence Analysis: The 70% Hurdle, Genome Res., 2000, vol. 10, p. 398-400.
Skolnick, From genes to protein structure and function: novel applications of computational approaches in the genomic era, Tibtech, 2000, vol. 18, 6 pages.
Kulmanov, DeepGO: predicting protein functions from sequence and interaction using a deep ontology-aware classifier, Bioinformatics, 2018, vol. 34, p. 660-668.

(56) References Cited

OTHER PUBLICATIONS

Ma, "Rapid Response to Spesolimab in a patient with severe refractory pyoderma gangenosum", Clin. Exp. Dermatol., 2024, vol. 49, p. 82-84.
ClinicalTrials.gov., "A study to test Whether BI 655130 (Spesolimab) prevents Flare-ups in patients with generalized Pustular Psoriasis", NCT04399837, Dec. 14, 2023, 15 pages.
WHO Drug Information, International Nonproprietary Names for Pharmaceutical Substances (INN), 2019, vol. 33, No. 1, p. 1-4.
Walpole, The weight of nations: an estimation of adult human Biomass, BVMC Public Health, 2012, vol. 12, p. 1-6.
Bachelez, Trial of Spesolimab for Generalized Pustular Psoriasis, The New England Journal Of Medicine, vol. 385, 2021, No. 26, p. 2431-2440.
Fukaura, Targeting IL-36 in Inflammatory Skin Diseases, BioDrugs, 2023, vol. 37, p. 279-293.
Anaptysbio Reports Harp Phase 2 Top-line Data of Imsidolimab in Moderate-to-severe hidradenitis suppurativa, AnatysBio Reports, Inc., Aug. 31, 2022, p. 1-5.
Khan, Adjustable Locks and Flexible keys, The Journal of immunology, vol. 192, 2014, pp. 5398-5405.
Poosarla, Computational de novo Design of antibodies binding to a peptide with high affinity, Biotechnol. Bioeng., vol. 114, 2017, pp. 1331-1342.
Goel, Plasticity within the antigen-Combining Site may manifest as molecular minicry in the humoral immune response, The Journal of immunology, vol. 173, 2004, pp. 7358-7367.
Vattekatte, Discrete analysis of camelid variable domains, PeerJ, DOI: 10.7717/peerj.8408, eCollection 2020, 28 pages.
Uchiyama, Liquid Formulation for antibody drugs, Biochemica Acta, vol. 1844, No. 11, 2014, pp. 2041-2052.
Daugherty, Formulation and delivery issues for monoclonal Antibody therapeutics, Current trends in Monocl. Antib. Devel. and Manufact., Chapter 8, 2010, pp. 103-129.
Whitaker, A formulation Development Approach to Identify and Select Stable Ultra High Concetration Monoclonal Antibody Formulations with Reduced Viscosities, J. of Pharm. Sci., vol. 106, No. 11, 2017, pp. 3230-3241.

\* cited by examiner

USE OF ANTI-IL-36R ANTIBODIES FOR TREATMENT OF GENERALIZED PUSTULAR PSORIASIS

RELATED APPLICATIONS

This application is a continuation of U.S. application Ser. No. 16/296,825 (filed Mar. 8, 2019) which claims priority of U.S. Provisional Patent Application Nos. 62/642,641 (filed Mar. 14, 2018), 62/683,720 (filed Jun. 12, 2018), 62/699,274 (filed Jul. 17, 2018) and 62/729,518 (filed Sep. 11, 2018), the entire content of each of which is hereby incorporated herein by reference as though fully set forth herein.

SEQUENCE LISTING

The instant application contains a Sequence Listing which has been submitted in ASCII format via EFS-Web and is hereby incorporated by reference in its entirety. Said ASCII copy, created on Nov. 20, 2020, is named 09-0683-US-5-2020-11-23-SL.txt and is 146,030 bytes in size.

TECHNICAL FIELD OF THE INVENTION

The present invention relates to methods and compositions for treatment of generalized pustular psoriasis (GPP). More specifically, the invention relates to administration of an interleukin-36 receptor (IL-36R) antibody to a subject with GPP.

BACKGROUND

GPP is a severe skin disease characterized by the repeated occurrence of acute flares caused by systemic inflammation affecting the skin and internal organs. The classic presentation of acute GPP was first described as a recurrent pustular form of psoriasis by von Zumbusch in 1909. While GPP and plaque psoriasis can occur at the same time in an individual patient, GPP is distinct from plaque psoriasis in clinical presentation, pathophysiology, histopathology, response to therapies, epidemiology and genetics.

Therefore, it is very critical to differentiate GPP from plaque or erythrodermic psoriasis with secondary pustulation. The clinical presentation of GPP is quite different from psoriasis vulgaris (PV) in its' episodic nature, often with normal appearing skin between very acute and severe disease flares. GPP is clinically characterized by the preponderance of pustules as the primary lesion on an erythematous base rather than red plaques covered with silvery scales representing the primary lesion of typical plaque psoriasis. In addition, the histopathological hallmarks of GPP are distinct spongiform pustules of Kogoj located in the sub-corneal portion of the epidermis. GPP may be associated with systemic symptoms (fever, increased CRP and neutrophilia) and severe extra-cutaneous organ manifestations (liver, kidney failure, CV shock). While patients with GPP may have pre-existing or co-existing PV, it is possible to clinically distinguish patients with primary plaque disease (PV) who have a secondary pustular component from patients who have primary pustular disease (GPP) with a concomitant plaque component, based on the sequence of manifestations (primary lesion pustule rather than plaque) and the localization of a GPP pustule on an erythematous base rather than a PsO plaque.

As descriptions for GPP are discordant among standard dermatology textbooks, the European Rare And Severe Psoriasis Expert Network (ERASPEN) has defined consensus criteria that include as key diagnosis criteria for acute GPP the presence of primary, sterile, macroscopically visible pustules on non-acral skin (excluding cases where pustulation is restricted to psoriatic plaques), with or without systemic inflammation, with or without plaque-type psoriasis, either relapsing (>1 episode) or persistent (>3 months).

Chronic GPP describes the state in between disease flares that may be characterized by the complete absence of symptoms or the persistence of residual skin symptoms such as erythema and scaling and minor pustulation.

Current treatment options for controlling acute GPP and subcutaneous of response are limited and do not provide sustained efficacy. No treatments are currently approved for GPP in the US and EU, though retinoids, cyclosporine or methotrexate are being recommended. Although these treatments are described to be "remarkably effective or effective" in 70-84% of patients (J Am Acad Dermatol. 2012; 67(2): 279-88) these data are based on a retrospective cohort study from Japan without clearly defined endpoints (Japanese Journal of Dermatology. 2010; 120(4):815-39). Furthermore, these treatments cannot be used long-term due to side effects and contraindications (retinoids: teratogenicity, hair loss; cyclosporine: excessive hair growth, renal toxicity; MTX: liver toxicity).

Biologics (mostly TNF inhibitors, occasionally IL-1 or IL-17 inhibitors) are increasingly used to treat more severe, extensive or treatment resistant patients with GPP, based on small published case series. However, these drugs are also associated with limitations in efficacy (incomplete and delayed responses are frequent) and safety as well as contraindications (infusion reactions, tuberculosis, cardiovascular disease).

Thus, a need exists in the art for novel targeted therapies for the treatment and/or prevention of GPP.

SUMMARY OF THE INVENTION

The present invention addresses the above need by providing biotherapeutics, in particular antibodies, which bind to IL-36R and provide therapeutic or prophylactic therapy for acute and/or chronic GPP and the associated signs and symptoms such as GPP flares.

In a first aspect, the present invention relates to a method of treating generalized pustular psoriasis (GPP) in a patient, said method including administering or having administered to the patient a therapeutically effective amount of an anti-IL-36R antibody.

In a second aspect, the present invention relates to a method of treating moderate to severe GPP in a patient, including administering or having administered to the patient a therapeutically effective amount of an anti-IL-36R antibody.

In a third aspect, the present invention relates to a method of reducing or alleviating signs and symptoms of an acute phase flare-up of GPP in a patient, said method including administering or having administered to the patient a therapeutically effective amount of an anti-IL-36R antibody.

In a forth aspect, the present invention relates to a method of reducing the severity and duration of GPP flares, said method comprising including administering or having administered to the patient a therapeutically effective amount of an anti-IL-36R antibody.

In a fifth aspect, the present invention relates to a method of treating a skin disorder associated with acute GPP, said method including administering or having administered to the patient a therapeutically effective amount of an anti-IL-36R antibody.

In one embodiment related to any of aspects first to fifth, the anti-IL-36R antibody includes: a) a light chain variable region comprising the amino acid sequence of SEQ ID NO: 26 (L-CDR1); the amino acid sequence of SEQ ID NO: 35, 102, 103, 104, 105 106 or 140 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

In one embodiment related to any of aspects first to fifth, the anti-IL-36R antibody includes:

I. a) a light chain variable region comprising the amino acid sequence of SEQ ID NO: 26 (L-CDR1); the amino acid sequence of SEQ ID NO: 102 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

II. a) a light chain variable region comprising the amino acid sequence of SEQ ID NO: 26 (L-CDR1); the amino acid sequence of SEQ ID NO: 103 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

III. a) a light chain variable region comprising the amino acid sequence of SEQ ID NO: 26 (L-CDR1); the amino acid sequence of SEQ ID NO: 104 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

IV. a) a light chain variable region comprising the amino acid sequence of SEQ ID NO: 26 (L-CDR1); the amino acid sequence of SEQ ID NO: 105 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

V. a) a light chain variable region comprising the amino acid sequence of SEQ ID NO: 26 (L-CDR1); the amino acid sequence of SEQ ID NO: 106 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

VI. a) a light chain variable region comprising the amino acid sequence of SEQ ID NO: 26 (L-CDR1); the amino acid sequence of SEQ ID NO: 140 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

In one embodiment related to any of aspects first to fifth, the anti-IL-36R antibody includes:

(i) a light chain variable region comprising the amino acid sequence of SEQ ID NO: 77; and a heavy chain variable region comprising the amino acid sequence of SEQ ID NO: 87; or (ii) a light chain variable region comprising the amino acid sequence of SEQ ID NO: 77; and a heavy chain variable region comprising the amino acid sequence of SEQ ID NO: 88; or (iii) a light chain variable region comprising the amino acid sequence of SEQ ID NO: 77; and a heavy chain variable region comprising the amino acid sequence of SEQ ID NO: 89; or (iv) a light chain variable region comprising the amino acid sequence of SEQ ID NO: 80; and a heavy chain variable region comprising the amino acid sequence of SEQ ID NO: 87; or (v) a light chain variable region comprising the amino acid sequence of SEQ ID NO: 80; and a heavy chain variable region comprising the amino acid sequence of SEQ ID NO: 88; or (vi) a light chain variable region comprising the amino acid sequence of SEQ ID NO: 80; and a heavy chain variable region comprising the amino acid sequence of SEQ ID NO: 89; or (vii) a light chain variable region comprising the amino acid sequence of SEQ ID NO: 85; and a heavy chain variable region comprising the amino acid sequence of SEQ ID NO: 100; or (viii) a light chain variable region comprising the amino acid sequence of SEQ ID NO: 85; and a heavy chain variable region comprising the amino acid sequence of SEQ ID NO:101; or (ix) a light chain variable region comprising the amino acid sequence of SEQ ID NO: 86; and a heavy chain variable region comprising the amino acid sequence of SEQ ID NO: 100; or (x) a light chain variable region comprising the amino acid sequence of SEQ ID NO: 86; and a heavy chain variable region comprising the amino acid sequence of SEQ ID NO:101.

In one embodiment related to any of aspects first to fifth, the anti-IL-36R antibody includes:

i. alight chain comprising the amino acid sequence of SEQ ID NO: 115; and a heavy chain comprising the amino acid sequence of SEQ ID NO: 125; or ii. alight chain comprising the amino acid sequence of SEQ ID NO: 115; and a heavy chain comprising the amino acid sequence of SEQ ID NO: 126; or iii. alight chain comprising the amino acid sequence of SEQ ID NO: 115; and a heavy chain comprising the amino acid sequence of SEQ ID NO: 127; or iv. alight chain comprising the amino acid sequence of SEQ ID NO: 118; and a heavy chain comprising the amino acid sequence of SEQ ID NO: 125; or v. alight chain comprising the amino acid sequence of SEQ ID NO: 118; and a heavy chain comprising the amino acid sequence of SEQ ID NO: 126; or vi. alight chain comprising the amino acid sequence of SEQ ID NO: 118; and a heavy chain comprising the amino acid sequence of SEQ ID NO: 127; or vii. alight chain comprising the amino acid sequence of SEQ ID NO: 123; and a heavy chain comprising the amino acid sequence of SEQ ID NO: 138; or viii. a light chain comprising the amino acid sequence of SEQ ID NO: 123; and a heavy chain comprising the amino acid sequence of SEQ ID NO: 139; or ix. a light chain comprising the amino acid sequence of SEQ ID NO: 124; and a heavy chain comprising the amino acid sequence of SEQ ID NO: 138.

In one embodiment related to any of aspects first to fifth, the anti-IL-36R antibody is administered in one or more intravenous dose(s). In a related embodiment, each of the one or more intravenous dose(s) includes 210 mg, 300 mg, 350 mg, 450 mg, 600 mg, 700 mg, 750 mg, 800 mg, 900 mg of said anti-IL-36R antibody.

In another embodiment related to any of aspects first to fifth, the anti-IL-36R antibody is administered in one intravenous dose. In another embodiment related to any of the above aspects, the anti-IL-36R is administered in one intravenous dose of about 10 mg per kilogram of body weight of the patient. In another embodiment related to any of the above aspects, the anti-IL-36R antibody is administered in one intravenous dose of 210 mg. In another embodiment related to any of the above aspects, the anti-IL-36R antibody is administered in one intravenous dose of 300 mg. In another embodiment related to any of the above aspects, the anti-IL-36R antibody is administered in one intravenous dose of 350 mg. In another embodiment related to any of the above aspects, the anti-IL-36R antibody is administered in one intravenous dose of 450 mg. In another embodiment related to any of the above aspects, the anti-IL-36R antibody is administered in one intravenous dose of 600 mg. In another embodiment related to any of the above aspects, the anti-IL-36R antibody is administered in one intravenous dose of 700 mg. In another embodiment related to any of the above aspects, the anti-IL-36R antibody is administered in one intravenous dose of 750 mg. In another embodiment related to any of the above aspects, the anti-IL-36R antibody is administered in one intravenous dose of 800 mg. In another embodiment related to any of the above aspects, the anti-IL-36R antibody is administered in one intravenous dose of 850 mg. In another embodiment related to any of the above aspects, the anti-IL-36R antibody is administered in one intravenous dose of 900 mg.

In another embodiment related to any of aspects first to fifth, 1, 2 or 3 intravenous dose(s) is/are administered. In another embodiment related to any of the above aspects, 2 or 3 intravenous doses are administered at 2, 4, 6, 8, 10 or 12 weeks intervals.

In another embodiment related to any of the above embodiments or aspects first to fifth, the administration results in one or more of the following efficacy endpoints:
(a) Generalized Pustular Psoriasis Global Assessment (GPPGA) score of 0 or 1 at Week 1;
(b) GPPGA pustulation subscore of 0 indicating no visible pustules at Week 1;
(c) Psoriasis Area and Severity Index for Generalized Pustular Psoriasis (GPPASI) 75 at Week 4;
(d) Change from baseline in Pain Visual Analog Scale (VAS) score at Week 4;
(e) Change from baseline in Psoriasis Symptom Scale (PSS) score at Week 4;
(f) Change from baseline in Functional Assessment of Chronic Illness Therapy (FACIT) Fatigue score at Week 4;
(g) GPPGA 0 or 1 at Week 4;
(h) GPPGA pustulation subscore of 0 indicating no visible pustules at Week 4;
(i) GPPASI 50 at Week 1 and 4; or
(j) Change in GPPASI pustule, erythema or scaling severity subscore from baseline at Week 1 and 4.

In another embodiment related to the above embodiment, proportion of patients with a response to the administration is statistically significantly higher as compared to patients on placebo for one or more of end points (a)-(j).

In a sixth aspect, the present invention relates to a method of preventing the recurrence of GPP flares in a patient treated with one or more intravenous dose(s) of the anti-IL-36R antibody according to any of aspects first to fifth or the above embodiments, said method including administering to the patient a prophylactically effective amount of the anti-IL-36R antibody in one or more subcutaneous doses.

In a seventh aspect, the present invention relates to a method of achieving a Generalized Pustular Psoriasis Global Assessment (GPPGA) score of 0 in a patient treated with one or more intravenous dose(s) of the anti-IL-36R antibody according to any of aspects first to fifth or the above embodiments, said method including administering to the patient an effective amount of the anti-IL-36R antibody in one or more subcutaneous doses.

In an eight aspect, the present invention relates to a method of achieving a complete resolution of GPP symptoms in a patient treated with one or more intravenous dose(s) of the anti-IL-36R antibody according to any of aspects first to fifth or the above embodiments, said method comprising administering to the patient an effective amount of the anti-IL-36R antibody in one or more subcutaneous doses; wherein the GPP symptoms comprise postule, erythema, or scaling and the complete resolution comprises a GPPGA score of 0.

In one embodiment related to any of aspects sixth to eight, each of the one or more subcutaneous doses includes 150 mg, 225 mg, 300 mg, 450 mg or 600 mg of said anti-IL-36R antibody.

In one embodiment related to any of aspects sixth to eight or the related embodiment(s), 1, 2, 3 or more subcutaneous doses are administered to the patient and wherein a first subcutaneous dose is administered after the last intravenous dose.

In one embodiment related to any of aspects sixth to eight or the related embodiment(s), the first subcutaneous dose is administered 2 to 8 weeks, 4 to 6 weeks, 2 weeks, 4 weeks, 6 weeks or 8 weeks, after the last intravenous dose is administered and the second subcutaneous dose is administered 4, 6, 8, 10 or 12 weeks after said first subcutaneous dose is administered.

In one embodiment related to any of aspects sixth to eight or the related embodiment(s), at least 10%, 20%, 30%, 40%, 50%, 60%, 70% or 80% of the patients remain in clinical remission as measured by a GPPGA score of 0 or 1 at Week 12, 24, 36, 48, 60 or 72 of the treatment.

In one embodiment related to any of aspects sixth to eight or the related embodiment(s), at least 10%, 20%, 30%, 40%, 50%, 60%, 70% or 80% of the patients remain in clinical remission as measured by a change in GPPASI from baseline at Week 12, 24, 36, 48, 60 or 72 of the treatment.

In one embodiment related to any of aspects sixth to eight or the related embodiment(s), at least 10%, 20%, 30%, 40%, 50%, 60%, 70% or 80% of the patients remain in clinical remission as measured by a change in GPPASI pustule, erythema or scaling severity subscore from baseline at Week 12, 24, 36, 48, 60 or 72 of the treatment. In a related embodiment, proportion of patients with a response to the administration is statistically significantly higher as compared to patients on placebo for any of the end points recited.

In a ninth aspect, the present invention relates to a method of treating GPP in a patient, including administering to the patient a therapeutically effective amount of one or more intravenous dose(s) of the anti-IL-36R antibody, according to aspects first to fifth and their related embodiments, followed by one or more subcutaneous dose(s) of the anti-IL-36R antibody.

In one embodiment relating to aspect ninth, 1 or 2 or 3 intravenous dose(s) of the anti-IL-36R antibody is/are followed by 1 or 2 or 3 subcutaneous dose(s) of the anti-IL-36R antibody.

In one embodiment relating to aspect ninth, 1 intravenous dose of the anti-IL-36R antibody is followed by 1 or 2 or 3 subcutaneous doss(s) of the anti-IL-36R antibody.

In one embodiment relating to aspect ninth, 2 intravenous doses of the anti-IL-36R antibody are followed by 1 or 2 or 3 subcutaneous doss(s) of the anti-IL-36R antibody.

In one embodiment relating to aspect ninth, 3 intravenous doses of the anti-IL-36R antibody are followed by 1 or 2 or 3 subcutaneous doss(s) of the anti-IL-36R antibody.

In one embodiment relating to aspect ninth and its related embodiment, each of the one or more intravenous dose(s) includes 210 mg, 300 mg, 350 mg, 450 mg, 600 mg, 700 mg, 750 mg, 800 mg, 850 mg or 900 mg of the anti-IL-36R antibody and each of the one or more subcutaneous dose(s) includes 150 mg, 225 mg, 300 mg, 450 mg, or 600 mg of the anti-IL-36R antibody. In a related embodiment, the intravenous doses are administered at 2, 4, 6, 8, 10 or 12 weeks intervals, the subcutaneous doses are administered at 4, 6, 8, 10 or 12 weeks intervals, and the first subcutaneous dose is administered 2 to 8 weeks, 4 to 6 weeks, 2 weeks, 4 weeks, 6 weeks or 8 weeks after the last intravenous dose is administered.

In an embodiment relating to any of the above aspects, the intravenous dose(s) may be followed by one or more subcutaneous dose(s).

In an embodiment relating to any of the above aspects, the anti-IL-36R antibody or an antigen binding fragment thereof (disclosed herein) is present in a stable pharmaceutical formulation (as described in co-pending U.S. provisional application No. 62/815,405, filed Mar. 8, 2019, the entire content of which is hereby incorporated herein by reference in its entirety) for administration to a mammal or patient according to any one of the aspects of the present invention.

In one embodiment, the method of treatment according to any of the aspects described herein, includes administering to the mammal or patient a therapeutic amount of a stable pharmaceutical formulation comprising from about 20 mg/mL to about 150 mg/mL of an anti-IL-36R antibody (disclosed herein), about 20 mM to about 80 mM of a pharmaceutically acceptable buffer (e.g., acetate buffer), about 100 mM to about 250 mM of a pharmaceutically acceptable tonicifying agent (e.g., sucrose), about 0 mM to about 80 mM of a pharmaceutically acceptable stabilizing agent (e.g., arginine) or a pharmaceutically acceptable salt thereof, about 0 to about 150 mM of a pharmaceutically acceptable salt (e.g., sodium chloride), and a pharmaceutically acceptable surfactant (e.g., polysorbate 20) in an amount about 0 g/L to about 1.5 g/L, wherein the generalized pustular psoriasis (GPP) in the patient is treated, or the moderate to severe GPP in the patient is treated, or the signs and symptoms of an acute phase flare-up of GPP in the patient is reduced or alleviated, or the severity and duration of GPP flares in the patient is reduced, or the skin disorder associated with acute GPP in the patient is treated, or the GPP flares in a patient is prevented or inhibited, or the Generalized Pustular Psoriasis Global Assessment (GPPGA) score of 0 in the patient is achieved, or the complete resolution of GPP symptoms in the patient is achieved, In a related embodiment, the stable pharmaceutical formulation is an aqueous pharmaceutical formulation. In a related embodiment, the pH of the aqueous pharmaceutical formulation is about 5 to about 7. In a related embodiment, the pharmaceutical formulation is for an intravenous administration to the mammal or patient. In a related embodiment, the pharmaceutical formulation is for a subcutaneous administration to the mammal or patient. In a related embodiment, the pharmaceutical formulation for an intravenous administration comprises an anti-IL-36R antibody in an amount of about 60 mg/mL. In a related embodiment, the pharmaceutical formulation for a subcutaneous administration comprises an anti-IL-36R antibody in an amount of about 150 mg/mL.

In a tenth aspect, the present invention relates to a method of treating GPP in a patient, including
(a) obtaining a biological sample from said patient, wherein the biological sample is obtained from source including lesional skin or whole blood;
(b) determining the gene express profile of one or more of genes;
(c) administering to the patient an effective amount of the anti-IL-36R antibody according to any embodiments relating to aspects first to fifth.

In one embodiment relating to aspect tenth, the one or more of genes are IL12B, IL1B, IL6, CXCL1, IL23A, TNF, IL17C, IL24 or IL1B in lesional skin, and IL1B, S100A9, S100A12, S100A8, MMP25, MMP9 or CD177 in whole blood.

Additional features and advantages of the present invention will be set forth in the description below, and in part will be apparent from the description, or may be learned by practice of the subject technology. It is to be understood that both the foregoing general description and the following detailed description are exemplary and explanatory and are intended to provide further explanation of the present invention as claimed.

BRIEF DESCRIPTION OF THE DRAWINGS

The accompanying drawings, which are included to provide further understanding of the present invention and are incorporated in and constitute a part of this specification, illustrate aspects of the subject technology and together with the description serve to explain the principles of the present invention.

DETAILED DESCRIPTION OF THE INVENTION

Figure 1:
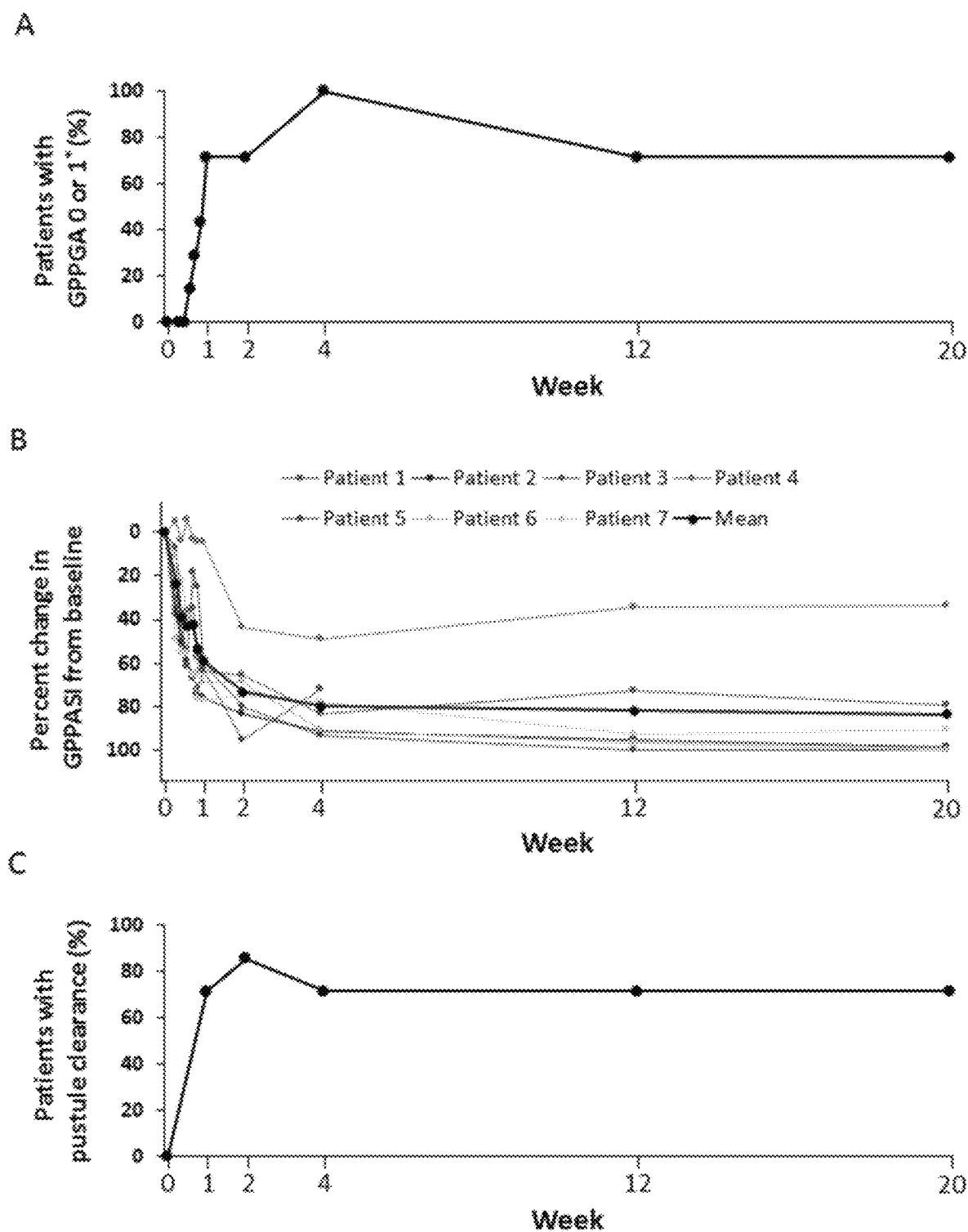
FIG. 1 shows changes in clinical responses with an anti-IL-36R antibody of the present invention treatment through Week 20; Panel A shows the percentage of patients in whom a Generalized Pustular Psoriasis Physician Global Assessment (GPPGA) score of 0 (clear) or 1 (almost clear) was achieved; Panel B shows the percent change from baseline in Generalized Pustular Psoriasis Area and Severity Index (GPPASI); and Panel C shows the percentage of patients in whom pustule clearance (based upon the GPPASI pustule component severity score) was achieved. Analysis includes all patients with at least one available post-baseline value. One patient received methotrexate post Week 4 for treatment of "pain" and therefore data for Weeks 12 and 20 have been excluded (set to non-response for GPPGA and pustule clearance). By Week 1, two of the three patients with an IL36RN mutation achieved GPPGA 0 or 1; by Week 4, all three patients achieved GPPGA 0 or 1. * At Week 2, GPPGA score for one patient was missing.

In the following detailed description, numerous specific details are set forth to provide a full understanding of the present invention. It will be apparent, however, to one ordinarily skilled in the art that the subject technology may be practiced without some of these specific details. In other instances, well-known structures and techniques have not been shown in detail so as not to obscure the present invention.

A phrase such as "an aspect" does not imply that such aspect is essential to the present invention or that such aspect applies to all configurations of the subject technology. A disclosure relating to an aspect may apply to all configurations, or one or more configurations. An aspect may provide one or more examples of the disclosure.

A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure.

The inventors have surprisingly discovered inter alia that the interleukin-36 pathway inhibition with a single dose of a humanized anti-interleukin-36R (anti-IL-36R) monoclonal antibody of the present invention resulted in the rapid and sustained remission of clinical symptoms in patients with acute generalized pustular psoriasis and that no recurrence of GPP flares were observed in 20 weeks after the single dose administration.

The invention therefore relates to compositions and methods for treating and/or prophylaxis of GPP and its signs and symptoms. More specifically, the invention relates to compositions and methods for treating and/or prophylaxis of moderate to severe GPP, acute GPP, chronic GPP, and/or GPP flares in a mammal with an anti-IL36R antibody or an antigen-binding fragment thereof of the present invention. The compositions and methods include administering to the mammal a therapeutically effective amount of an anti-IL-36R antibody or an antigen-binding fragment thereof, wherein the anti-IL-36R antibody is administered in one intravenous dose. In an embodiment, the anti-IL-36R antibody is administered in one or more intravenous doses which is/are optionally followed by one or more subcutaneous doses.

Without wishing to be bound by this theory it is believed that anti-IL-36R antibodies or antigen-binding fragments thereof bind to human anti-IL-36R and thus interfere with the binding of IL-36 agonists, and in doing so block at least partially the signaling cascade from the IL-36R to inflammatory mediators. The anti-IL36R antibodies of the present invention are disclosed in U.S. Pat. No. 9,023,995 or WO2013/074569, the entire content of each of which is incorporated herein by reference.

Acute GPP flares of varying severity occur in most patients and may be idiopathic or triggered by external stimuli, such as infection, corticosteroid use or withdrawal, stress or pregnancy. Moderate or severe GPP flares cause significant morbidity and mortality due to tender, painful skin lesions, extreme fatigue, high fever, peripheral blood neutrophilia and acute phase response and sepsis. The acute phase is associated with a mean duration of hospitalization of 10 days (range 3-44 days). The observed mortality rate of 7% reported in a retrospective study with 102 GPP cases seen in a tertiary hospital in Johor, Malaysia is likely an underestimate as not all GPP patients were included in the study. Mortality rates are also likely underestimated due to lack of identifying the cause of death as GPP and are largely driven by infectious complications and extra-cutaneous organ manifestations such as renal, hepatic, respiratory and cardiac failure. After responding to treatment or spontaneous flare cessation, it is estimated that up to 50% of patients may suffer from chronic GPP characterized by persistent erythema and scaling that may also include joint symptoms.

Based on the limitations described above, current therapeutic options are not suitable for life-long treatment and do not provide sustained responses in most patients. Therefore, there is a high need to develop (i) a highly effective treatment with rapid onset of action for patients presenting with an acute GPP flare; and (ii) to develop an effective treatment of chronic GPP, which reliably prevents the occurrence of flares and is safe and tolerable for lifelong treatment.

The classic presentation of GPP flares as described by von Zumbusch is strongly correlated with polymorphisms in the IL36-R signaling pathway. Individuals with loss-of-function mutations of the IL36RN gene which encodes an endogenous IL36R antagonist (IL-36RN) have dramatically higher incidence of GPP, indicating that uncontrolled upregulation of IL36 signaling due to defective IL36RN antagonism leads to the inflammatory episodes observed in GPP. Genetic human studies have demonstrated the occurrence of GPP clusters in families with a loss of function mutation in IL36RN, which results in uncontrolled IL36R signaling. Mutations in other genes linked to the IL36 pathway such as CARD14 also lead to GPP. A recently published gene expression study indicates sustained activation of IL-1 and IL-36 in GPP, inducing neutrophil chemokine expression, infiltration, and pustule formation, suggesting that the IL-1/IL-36 inflammatory axis is a potent driver of disease pathology in GPP. Moreover, a recent meta-analysis investigated 233 published GPP cases. They found that 49 (21.0%) of 233 cases carried recessive IL36RN alleles. Those 49 recessive IL36RN alleles defined a GPP phenotype characterized by early onset and high risk of systemic inflammation.

IL36R is a cell surface receptor involved in inflammatory responses in skin and gut. It is a novel member of the IL1R family that forms a heterodimeric complex with the IL1R accessory protein. The heterodimeric IL36R system with stimulating (IL36α, IL36β, IL36γ) and inhibitory ligands (IL36Ra) shares a number of structural and functional similarities to other members of the IL1/IL1R family, such as IL1, IL18 and IL33 (R17-3602). All IL1 family members (IL1α, IL1β, IL18, IL36α, IL36β, IL36γ, and IL38) signal through a unique, cognate receptor protein which, upon ligand binding, recruits the common IL1RacP subunit and activates NFkB and MAP kinase pathways in receptor-positive cell types. In human skin tissues, IL36R is expressed in keratinocytes, dermal fibroblasts and infiltrating myeloid cells. IL36R activation in skin tissue drives the production of inflammatory mediators (e.g. CCL20, MIP-1p, TNF-α, IL12, IL17, IL23, TGF-β) and modulates the expression of tissue remodeling genes (e.g. MMPs, TGF-β). Therefore, the link between GPP and mutations in the IL36RN is somewhat analogous to the well-established neonatal onset of sterile multifocal osteomyelitis, periostitis, and pustulosis caused by absence of interleukin-1-receptor antagonist. In this case, absence of the receptor antagonist allows unopposed action of interleukin-1, resulting in life-threatening systemic inflammation with skin and bone involvement. These clinical features responded to empirical treatment with the recombinant interleukin-1-receptor antagonist anakinra.

I. Definitions

The term "about" shall generally mean an acceptable degree of error or variation for the quantity measured given the nature or precision of the measurements. Typical, exemplary degrees of error or variation are within 5% or within 3% or within 1% of a given value or range of values. For example, the expression of "about 100" includes 105 and 95 or 103 and 97 or 101 and 99, and all values in between (e.g., 95.1, 95.2, etc. for range of 95-105; or 97.1, 97.2, etc. for the range of 97-103; 99.1, 99.2, etc. for the range of 99-101). Numerical quantities given herein are approximates unless stated otherwise, meaning that the term "about" can be inferred when not expressly stated.

A "pharmaceutical formulation" or "formulation" refers to the process but also the product of a process in which an active drug or agent is combined with chemical substances to produce a final medicinal or drug product, the final formulation therefore refers to medicinal products such as liquids, powders or compositions. Therefore, in one embodiment, a pharmaceutical formulation is a pharmaceutical composition.

A "pharmaceutical composition" refers in this context to a liquid or powder preparation which is in such form as to permit the biological activity of the active ingredient(s) to be unequivocally effective, and which contains no additional components which are significantly toxic to the subjects to which the composition would be administered. Such compositions are sterile. A "powder" refers to a freeze-dried or lyophilized or a spray-dried pharmaceutical composition for parenteral use. The powder is reconstituted or dissolved typically in water. Lyophilisation is a low temperature dehydration process which involves freezing the product, lowering pressure, then removing the ice by sublimation. Freeze drying results in a high quality product because of the low temperature used in processing. For a well-developed lyophilized formulation, the shape and appearance of the product is maintained over time and the quality of the rehydrated product is excellent. Spray drying is another method of producing a dry powder from a liquid or slurry by rapidly drying with a hot gas and with the goal of achieving a consistent particle size distribution.

As used herein, the terms "intravenous dose", "subcutaneous dose" refer to the temporal sequence of administration of the anti-IL-36R antibody. Thus, the "intravenous dose" is the dose which is administered at the beginning of the treatment regimen (also referred to as the "baseline dose"); it may also be referred to as an "initial dose" or "induction dose." The "subcutaneous dose" is the dose which is administered after the intravenous dose, which may also be referred to as a "subsequent dose" or "maintenance dose." The intravenous, subcutaneous doses may all contain the same amount of anti-IL-36R antibody or an antigen binding fragment thereof, but generally may differ from one another in terms of the amount of the antibody administered or the frequency of administration. In an embodiment, the intravenous dose is equal or larger than the subcutaneous dose. An "intravenous dose" which may be interchangeably referred to as an "initial dose" or "induction dose" can be a single dose or, alternatively, a set of doses. The subcutaneous dose which may also be referred to as a "subsequent dose" or "maintenance dose" can be a single dose or, alternatively, a set of doses for administration.

In certain embodiments, the amount of the anti-IL-36R antibody contained in the induction/initial/intravenous and maintenance/subsequent/subcutaneous doses varies from one another during the course of treatment. In certain embodiments, the one or more initial/induction/intravenous doses each comprise a first amount of the antibody or antigen-binding fragment thereof and the one or more maintenance/subsequent/subcutaneous doses each comprise a second amount of the antibody or antigen-binding fragment thereof. In some embodiments, the first amount of antibody or fragment thereof is 1.5×, 2×, 2.5×, 3×, 3.5×, 4×, or 5× the second or subsequent amount of the antibody or antigen-binding fragment thereof. In certain embodiments, one or more (e.g., 1, 2, 3, 4, or 5 or more) initial doses are administered at the beginning of the treatment regimen as "loading doses" or "leading doses" followed by subsequent doses that are administered on a less frequent basis (e.g., "maintenance doses"). In one embodiment, the intravenous dose, the induction dose or the initial dose is about 210 mg, 300 mg, 350 mg, 450 mg, 600 mg, 700 mg, 750 mg, 800 mg, 850 mg or 900 mg of the anti-IL-36R antibody. In one embodiment, the subcutaneous dose, the maintenance dose or the subsequent dose is about 150, 225 mg or 300 mg. In another embodiment, the subcutaneous dose or maintenance or subsequent dose is administered at least two weeks following the intravenous, induction or initial dose.

As used herein "buffer" refers to a buffered solution that resists changes in pH by the action of its acid-base conjugate components. The "pH" herein refers to the acidity or basicity of the composition at room temperature. Standard methods to measure the pH of a composition are known to the skilled in the art. Typically, measuring pH consists of calibrating the instrument, placing the electrodes in a well-mixed sample, and then reading the pH directly from the pH meter. The exemplary buffers of the present invention include acetate, citrate, histidine, succinate, phosphate and Tris.

As used herein, the term "tonicifying agent" or "tonicity agent" or "tonicifyer" refers to substances providing an osmotic pressure equivalent to that of serum in the body including salts (e.g. sodium chloride, potassium chloride, magnesium chloride) or sugars (e.g. sucrose, trehalose, sorbitol, magnesium sulfate ($MgSO_4$), glycerol, mannitol or dextrose). In addition, sugars present in the solution act as a cryoprotectant for the protein which allows the drug substance to be frozen without damage. This permits shipment in the frozen form and long-term storage of the drug substance prior to the filling of drug product. The exemplary tonicifying agents of the present invention include sodium chloride, potassium chloride, magnesium chloride (salts) and/or sucrose, trehalose, sorbitol, magnesium sulfate ($MgSO_4$), glycerol, mannitol or dextrose (sugars).

As used herein, the term "stabilizer" or "stabilizing agent" refers to substances contributing to the stability of the active ingredient in a pharmaceutical formulation. The exemplary stabilizing agents of the present invention include arginine, histidine, glycine, cysteine, proline, methionine, lysine, or pharmaceutically acceptable salts thereof.

As used herein, the term "surfactant" refers to substances which tend to reduce the surface tension of a liquid in which they are dissolved. The exemplary surfactants of the present invention include poloxamer 188, polysorbate 20, polysorbate 40, polysorbate 60 or polysorbate 80.

The terms, "antibody", "anti-IL-36R antibody", "humanized anti-IL-36R antibody", "humanized anti-IL-36R epitope antibody", and "variant humanized anti-IL-36R epitope antibody" specifically encompass monoclonal antibodies (including full length monoclonal antibodies), polyclonal antibodies, multispecific antibodies (e.g., bispecific antibodies), antibodies with minor modifications such as N- and/or C-terminal truncation, and antibody fragments such as variable domains and other portions of antibodies that exhibit a desired biological activity, e.g., IL-36R binding.

The term "monoclonal antibody" (mAb) refers to an antibody that is highly specific, being directed against a single antigenic determinant, an "epitope". Therefore, the modifier "monoclonal" is indicative of antibodies directed to the identical epitope and is not to be construed as requiring production of the antibody by any particular method. It should be understood that monoclonal antibodies can be made by any technique or methodology known in the art; including e.g., the hybridoma method (Kohler et al., 1975, Nature 256:495), or recombinant DNA methods known in the art (see, e.g., U.S. Pat. No. 4,816,567), or methods of isolation of monoclonal recombinantly produced using phage antibody libraries, using techniques described in Clackson et al., 1991, Nature 352: 624-628, and Marks et al., 1991, J. Mol. Biol. 222: 581-597.

The term "monomer" refers to a homogenous form of an antibody. For example, for a full-length antibody, monomer means a monomeric antibody having two identical heavy chains and two identical light chains.

Chimeric antibodies consist of the heavy and light chain variable regions of an antibody from one species (e.g., a non-human mammal such as a mouse) and the heavy and light chain constant regions of another species (e.g., human) antibody and can be obtained by linking the DNA sequences encoding the variable regions of the antibody from the first species (e.g., mouse) to the DNA sequences for the constant regions of the antibody from the second (e.g. human) species and transforming a host with an expression vector containing the linked sequences to allow it to produce a chimeric antibody. Alternatively, the chimeric antibody also could be one in which one or more regions or domains of the heavy and/or light chain is identical with, homologous to, or a variant of the corresponding sequence in a monoclonal antibody from another immunoglobulin class or isotype, or from a consensus or germline sequence. Chimeric antibodies can include fragments of such antibodies, provided that the antibody fragment exhibits the desired biological activity of its parent antibody, for example binding to the same epitope (see, e.g., U.S. Pat. No. 4,816,567; and Morrison et al., 1984, Proc. Natl. Acad. Sci. USA 81: 6851-6855).

The terms, "antibody fragment", "anti-IL-36R antibody fragment", "anti-IL-36R epitope antibody fragment", "humanized anti-IL-36R antibody fragment", "humanized anti-IL-36R epitope antibody fragment", "variant humanized anti-IL-36R epitope antibody fragment" refer to a portion of a full length anti-IL-36R antibody, in which a variable region or a functional capability is retained, for example, specific IL-36R epitope binding. Examples of antibody fragments include, but are not limited to, a Fab, Fab', F(ab')$_2$, Fd, Fv, scFv and scFv-Fc fragment, a diabody, a linear antibody, a single-chain antibody, a minibody, a diabody formed from antibody fragments, and multispecific antibodies formed from antibody fragments.

The term "intravenous infusion" refers to introduction of an agent into the vein of an animal or human patient over a period of time greater than approximately 15 minutes, generally between approximately 30 to 90 minutes.

The term "intravenous bolus" or "intravenous push" refers to drug administration into a vein of an animal or human such that the body receives the drug in approximately 15 minutes or less, generally 5 minutes or less.

The term "subcutaneous administration" refers to introduction of an agent under the skin of an animal or human patient, preferable within a pocket between the skin and underlying tissue, by relatively slow, sustained delivery from a drug receptacle. Pinching or drawing the skin up and away from underlying tissue may create the pocket.

The term "subcutaneous infusion" refers to introduction of a drug under the skin of an animal or human patient, preferably within a pocket between the skin and underlying tissue, by relatively slow, sustained delivery from a drug receptacle for a period of time including, but not limited to, 30 minutes or less, or 90 minutes or less. Optionally, the infusion may be made by subcutaneous implantation of a drug delivery pump implanted under the skin of the animal or human patient, wherein the pump delivers a predetermined amount of drug for a predetermined period of time, such as 30 minutes, 90 minutes, or a time period spanning the length of the treatment regimen.

The term "subcutaneous bolus" refers to drug administration beneath the skin of an animal or human patient, where bolus drug delivery is less than approximately 15 minutes; in another aspect, less than 5 minutes, and in still another aspect, less than 60 seconds. In yet even another aspect, administration is within a pocket between the skin and underlying tissue, where the pocket may be created by pinching or drawing the skin up and away from underlying tissue.

The term "mammal" for purposes of treatment refers to any animal classified as a mammal, including humans, domesticated and farm animals, and zoo, sports, or pet animals, such as dogs, horses, cats, cows, and the like. Preferably, the mammal is human.

The terms "treatment" and "therapy" and the like, as used herein, are meant to include therapeutic as well as prophylactic, or suppressive measures for a disease or disorder leading to any clinically desirable or beneficial effect, including but not limited to alleviation or relief of one or more symptoms, regression, slowing or cessation of progression of the disease or disorder. Thus, for example, the term treatment includes the administration of an agent prior to or following the onset of a symptom of a disease or disorder thereby preventing or removing one or more signs of the disease or disorder. As another example, the term includes the administration of an agent after clinical manifestation of the disease to combat the symptoms of the disease. Further, administration of an agent after onset and after clinical symptoms have developed where administration affects clinical parameters of the disease or disorder, such as the degree of tissue injury or the amount or extent of metastasis, whether or not the treatment leads to amelioration of the disease, comprises "treatment" or "therapy" as used herein. Moreover, as long as the compositions of the invention either alone or in combination with another therapeutic agent alleviate or ameliorate at least one symptom of a disorder being treated as compared to that symptom in the absence of use of the humanized anti-IL-36R antibody composition, the result should be considered an effective treatment of the underlying disorder regardless of whether all the symptoms of the disorder are alleviated or not.

The term "therapeutically effective amount" is used to refer to an amount of an active agent that relieves or ameliorates one or more of the symptoms of the disorder being treated. In another aspect, the therapeutically effective amount refers to a target serum concentration that has been shown to be effective in, for example, slowing disease progression. Efficacy can be measured in conventional ways, depending on the condition to be treated.

The term "prophylactically effective amount" is used to refer to an amount effective, at dosages and for periods of time necessary, to achieve the desired prophylactic result. Typically, a prophylactic dose is used in subjects prior to the onset of a GPP flare and/or prior to the onset of symptoms of GPP such as to prevent or inhibit the occurrence of acute flares. In an embodiment, a subcutaneous dose as contemplated herein is a prophylactic dose that is used in a patient with acute GPP, after the intravenous dose, to prevent a possible recurrence of the GPP flares in the patient.

The term "package insert" is used to refer to instructions customarily included in commercial packages of therapeutic products, that contain information about the indications, usage, administration, contraindications and/or warnings concerning the use of such therapeutic products.

II. Antibodies

The anti-IL36R antibodies of the present invention are disclosed in U.S. Pat. No. 9,023,995 or WO2013/074569, the entire content of each of which is incorporated herein by reference.

In one aspect, described and disclosed herein are anti-IL-36R antibodies, in particular humanized anti-IL-36R antibodies, and compositions and articles of manufacture comprising one or more anti-IL-36R antibody, in particular one or more humanized anti-IL-36R antibody of the present invention. Also described are binding agents that include an antigen-binding fragment of an anti-IL-36 antibody, in particular a humanized anti-IL-36R antibody.

Mode of Action an anti-IL-36R antibody of the present invention is a humanized antagonistic monoclonal IgG1 antibody that blocks human IL36R signaling. Binding of an anti-IL-36R antibody of the present invention to IL36R is anticipated to prevent the subsequent activation of IL36R by cognate ligands (IL36 α, β and γ) and downstream activation of pro-inflammatory and pro-fibrotic pathways with the aim to reduce epithelial cell/fibroblast/immune cell-mediated inflammation and interrupt the inflammatory response that drives pathogenic cytokine production in generalized pustular psoriasis (GPP). As provided herein, an anti-IL-36R antibody of the present invention has been tested and proved to be effective in treating patients with acute Generalized Pustular Psoriasis (GPP), a severe inflammatory skin disease driven by uncontrolled IL36 activity.

IL-36R is also known as IL-1RL2 and IL-1Rrp2. It has been reported that agonistic IL-36 ligands (α, β, or γ) initiate the signaling cascade by engaging the IL-36 receptor which then forms a heterodimer with the IL-1 receptor accessory protein (IL-1 RAcP). IL-36 antagonist ligands (IL-36RA/IL1F5, IL-38/ILF10) inhibit the signaling cascade.

Variable regions and CDRs of representative antibodies of the present invention are disclosed below:

Anti-IL-36R Mouse Antibody Sequences

Variable regions and CDRs of representative mouse lead antibodies of the present invention (mouse leads) are shown below:

Light Chain Variable Region (VK) Amino Acid Sequences

```
>33D10612vK Protein (antibody 33D10)
                                            (SEQ ID NO: 1)
QIVLTQSPAIMSASLGERVTMTCTASSSVSSSYLHWYQKKPGSSPKLWVY

STSNLASGVPVRFSGSGSGTSYSLTISSMEAEDAATYYCHQHHRSPVTFG

SGTKLEMK

>172C8B12 vK protein (antibody 172C8)
                                            (SEQ ID NO: 2)
DIQMTQSPASQSASLGESVTFTCLASQTIGTWLAWYQQRPGKSPQLLIYA

ATSLADGVPSRFSGSGSGTQFSFNIRSLQAEDFASYYCQQVYTTPLTFGG

GTKLEIK

>67E7E8 vK protein (antibody 67E7)
                                            (SEQ ID NO: 3)
DIQMTQSPASQSASLGESVTFTCLASQTIGTWLGWYQQKPGKSPQLLIYR

STTLADGVPSRFSGSGSGTKFSFKISSLQAADFASYYCQQLYSAPYTFGG

GTKLEIR

>78C8D1 vK Protein (antibody 78C8)
                                            (SEQ ID NO: 4)
DVLLTQTPLSLPVSLGDQASISCRSSQNIVHSNGNTYLQWYLQKPGQSPK

LLIYKVSNRFSGVPDRFSGSGSGTDFTLKISRVEAEDLGVYYCFQGSHVP

FTFGAGTKLELK
```

>81A1D1 vK Protein (antibody 81A1)
(SEQ ID NO: 5)
DIQMTQTTSSLSASLGDRVTISCRASQDIYKYLNWYQQKPDGTLKLLIYY

TSGLHSGVPSRFSGSGSGTDFSLTISNLEPEDIATYFCQQDSKFPWTFGG

DTKLEIK

>81B4E11 vK Protein (antibody 81B4)
(SEQ ID NO: 6)
QIVLTQSPAIMSASLGERVTMTCTASSSVSSSYFHWYQQKPGSSPKLWIY

RTSNLASGVPGRFSGSGSGTSYSLTISSMEAEDAATYYCHQFHRSPLTFG

AGTKLELK

>73C5C10 vK protein (antibody 73C5)
(SEQ ID NO: 7)
DIVMTQSQKFLSTSVGVRVSVTCKASQDVGTNVLWYQQKIGQSPKPLIYS

ASYRHSGVPDRFTGSGSGTDFTLIISNVQSEDLAEYFCQQYSRYPLTFGP

GTKLELK

>73F6F8 vK protein (antibody 73F6)
(SEQ ID NO: 8)
DIVMTQSQKFLSTSVGVRVSVTCKASQDVGTNVLWYQQKIGQSPKALIYS

ASYRHSGVPDRFTGSGSGTDFTLIITNVQSEDLAEYFCQQYSRYPLTFGP

GTKLELK

>76E10E8 vK protein (antibody 76E10)
(SEQ ID NO: 9)
DIVMTQSQKFMSATVGGRVNITCKASQNVGRAVAWYQQKPGQSPKLLTHS

ASNRYTGVPDRFTGSGSGTDFTLTITNMQSEDLADYFCQQYSSYPLTFGA

GTKLDLK

>89A12B8 vK protein (antibody 89A12)
(SEQ ID NO: 10)
DIQMTQSPASQSASLGESVTFSCLASQTIGTWLGWYQQKPGKSPQLLIYR

ATSLADGVPSRFSGSGSGTNFSFKISSLQAEDLASYYCQQLYSGPYTFGG

GTKLEIR

Heavy Chain Variable Region (VH) Amino Acid Sequences

>33D10B12vH Protein (antibody 33D10)
(SEQ ID NO: 11)
QVQLQQSGTELLKPGASVKLSCKASGNTVTSYWMHWVKQRPGQGLEWIGE

ILPSTGRTNYNENFKGKAMLTVDKSSSTAYMQLSSLASEDSAVYYCTIVY

FGNPWFAYWGQGTLVTVSA

>172C8B12 vH protein (antibody 172C8)
(SEQ ID NO: 12)
EVQLQQSGPELVKPGASVKLSCKASGYTFTDNYMNWVRQSHGKSLEWIGR

VNPSNGDTKYNQNFKGKATLTVDKSLSTAYMQLNGLTSEDSAVYYCGRTK

NFYSSYSYDDAMDYWGQGTSVTVSS

>67E7E8 vH protein (antibody 67E7)
(SEQ ID NO: 13)
EVQLQQSGAEFVRPGASVKFSCTASGFNIKDDYIHWVRQRPEQGLEWVGR

IDPANGNTKYAPKFQDKATITADTSSNTAYLQLSSLTSEDTAVYYCAKSF

PNNYYSYDDAFAYWGQGTLVTVSA

>78C8D1 vH Protein (antibody 78C8)
(SEQ ID NO: 14)
QVQLKESGPVLVAPSQSLSITCTVSGFSLTKFGVHWIRQTPGKGLEWLGV

IWAGGPTNYNSALMSRLTISKDISQSQVFLRIDSLQTDDTAMYYCAKQIY

YSTLVDYWGQGTSVTVSS

>81A1D1 vH Protein (antibody 81A1)
(SEQ ID NO: 15)
QVQLKESGPGLVAPSQSLFITCTVSGFSLSSYEINWVRQVPGKGLEWLGV

IWTGITTNYNSALISRLSISKDNSKSLVFLKMNSLQTDDTAIYYCARGTG

TGFYYAMDYWGQGTSVTVSS

>81B4E11 vH Protein (antibody 81B4)
(SEQ ID NO: 16)
QVQLQQPGADFVRPGASMRLSCKASGYSFTSSWIHWVKQRPGQGLEWIGE

INPGNVRTNYNENFRNKATLTVDKSSTTAYMQLRSLTSADSAVYYCTVVF

YGEPYFPYWGQGTLVTVSA

>73C5C10 vH Protein (antibody 73C5)
(SEQ ID NO: 17)
QVQLKESGPGLVAPSQSLSITCTVSGFSLTNYAVHWVRQFPGKGLEWLGV

IWSDGSTDFNAPFKSRLSINKDNSKSQVFFKMNSLQIDDTAIYYCARKGG

YSGSWFAYWGQGTLVTVSA

>73F6F8 vH protein (antibody 73F6)
(SEQ ID NO: 18)
QVQLKESGPGLVAPSQSLSITCTVSGFSLTNYAVHWVRQFPGKGLEWLGV

IWSDGSTDYNAPFKSRLSINKDNSKSQVFFKMNSLQTDDTAIYYCARKGG

YSGSWFAYWGQGTLVTVSA

>76E10E8 vH protein (antibody 76E10)
(SEQ ID NO: 19)
QVQLKESGPVLVAPSQSLSITCTVSGFSLTNYGVHWVRQPPGKGLEWLGV

IWPVGSTNYNSALMSRLSIHKDNSKSQVFLRMNSLQTDDTAIYYCAKMDW

DDFFDYWGQGTTLTVSS

>89A12B8 vH Protein (antibody 89A12)
(SEQ ID NO: 20)
EVQLQQSGAELVRPGASVRLSCTASGFNIKDDYIHWVRQRPKQGLEWLGR

IDPANGNTKYDPRFQDKATITADTSSNTAYLHLSSLTSEDTAVYYCAKSF

PDNYYSYDDAFAYWGQGTLVTVSA

Light Chain CDR-1 (L-CDR1) Amino Acid Sequences

>33D10G1 L-CDR1
(SEQ ID NO: 21)
TASSSVSSSYLH

>172C8B12 L-CDR1
(SEQ ID NO: 22)
LASQTIGTWLA

>67E7E8 L-CDR1
(SEQ ID NO: 23)
LASQTIGTWLG

>78C8D1 L-CDR1
(SEQ ID NO: 24)
RSSQNIVHSNGNTYLQ

>81A1D1 L-CDR1
(SEQ ID NO: 25)
RASQDIYKYLN

```
>81B4E11 L-CDR1
                                (SEQ ID NO: 26)
TASSSVSSSYFH

>73C5C10 L-CDR1
                                (SEQ ID NO: 27)
KASQDVGTNVL

>73F6F8 L-CDR1
                                (SEQ ID NO: 27)
KASQDVGTNVL

>76E10E8 L-CDR1
                                (SEQ ID NO: 28)
KASQNVGRAVA

>89A12B8 L-CDR1
                                (SEQ ID NO: 29)
LASQTIGTWLG
```

Light Chain CDR-2 (L-CDR2) Amino Acid Sequences

```
>33D10B12 L-CDR2
                                (SEQ ID NO: 30)
STSNLAS

>172C8B12 L-CDR2
                                (SEQ ID NO: 31)
AATSLAD

>67E7E8 L-CDR2
                                (SEQ ID NO: 32)
RSTTLAD

>78C8D1 L-CDR2
                                (SEQ ID NO: 33)
KVSNRFS

>81A1D1 L-CDR2
                                (SEQ ID NO: 34)
YTSGLHS

>81B4E11 L-CDR2
                                (SEQ ID NO: 35)
RTSNLAS

>73C5C10 L-CDR2
                                (SEQ ID NO: 36)
SASYRHS

>73F6F8 L-CDR2
                                (SEQ ID NO: 36)
SASYRHS

>76E10E8 L-CDR2
                                (SEQ ID NO: 37)
SASNRYT

>89A12B8 L-CDR2
                                (SEQ ID NO: 38)
RATSLAD
```

Light Chain CDR-3 (L-CDR3) Amino Acid Sequences

```
>33D10B12 L-CDR3
                                (SEQ ID NO: 39)
HQHHRSPVT

>172C8B12 L-CDR3
                                (SEQ ID NO: 40)
QQVYTTPLT

>67E7E8 L-CDR3
                                (SEQ ID NO: 41)
QQLYSAPYT

>78C8D1 L-CDR3
                                (SEQ ID NO: 42)
FQGSHVPFT

>81A1D1 L-CDR3
                                (SEQ ID NO: 43)
QQDSKFPWT

>81B4E11 L-CDR3
                                (SEQ ID NO: 44)
HQFHRSPLT

>73C5C10 L-CDR3
                                (SEQ ID NO: 45)
QQYSRYPLT

>73F6F8 L-CDR3
                                (SEQ ID NO: 45)
QQYSRYPLT

>76E10E8 L-CDR3
                                (SEQ ID NO: 46)
QQYSSYPLT

>89A12B8 L-CDR3
                                (SEQ ID NO: 47)
QQLYSGPYT
```

Heavy Chain CDR-1 (H-CDR1) Amino Acid Sequences

```
>33D10B12 H-CDR1
                                (SEQ ID NO: 48)
GNTVTSYWMH

>172C8B12 H-CDR1
                                (SEQ ID NO: 49)
GYTFTDNYMN

>67E7E8 H-CDR1
                                (SEQ ID NO: 50)
GFNIKDDYIH

>78C8D1 H-CDR1
                                (SEQ ID NO: 51)
GFSLTKFGVH

>81A1D1 H-CDR1
                                (SEQ ID NO: 52)
GFSLSSYEIN

>81B4E11 H-CDR1
                                (SEQ ID NO: 53)
GYSFTSSWIH

>73C5C10 H-CDR1
                                (SEQ ID NO: 54)
GFSLTNYAVH

>73F6F8 H-CDR1
                                (SEQ ID NO: 54)
GFSLTNYAVH

>76E10E8 H-CDR1
                                (SEQ ID NO: 55)
GFSLTNYGVH

>89A12B8 H-CDR1
                                (SEQ ID NO: 56)
GFNIKDDYIH
```

Heavy Chain CDR-2 (H-CDR2) Amino Acid Sequences

```
>33D10B12 H-CDR2
                                (SEQ ID NO: 57)
EILPSTGRTNYNENFKG
```

-continued

>172C8B12 H-CDR2
RVNPSNGDTKYNQNFKG (SEQ ID NO: 58)

>67E7E8 H-CDR2
RIDPANGNTKYAPKFQD (SEQ ID NO: 59)

>78C8D1 H-CDR2
VIWAGGPTNYNSALMS (SEQ ID NO: 60)

>81A1D1 H-CDR2
VIWTGITTNYNSALIS (SEQ ID NO: 61)

>81B4E11 H-CDR2
EINPGNVRTNYNENF (SEQ ID NO: 62)

>73C5C10 H-CDR2
VIWSDGSTDFNAPFKS (SEQ ID NO: 63)

>73F6F8 H-CDR2
VIWSDGSTDYNAPFKS (SEQ ID NO: 64)

>76E10E8 H-CDR2
VIWPVGSTNYNSALMS (SEQ ID NO: 65)

>89A12B8 H-CDR2
RIDPANGNTKYDPRFQD (SEQ ID NO: 66)

Heavy Chain CDR-3 (H-CDR3) Amino Acid Sequences

>33D10B12 H-CDR3
VYFGNPWFAY (SEQ ID NO: 67)

>172C8B12 H-CDR3
TKNFYSSYSYDDAMDY (SEQ ID NO: 68)

>67E7E8 H-CDR3
SFPNNYYSYDDAFAY (SEQ ID NO: 69)

>78C8D1 H-CDR3
QIYYSTLVDY (SEQ ID NO: 70)

>81A1D1 H-CDR3
GTGTGFYYAMDY (SEQ ID NO: 71)

>81B4E11 H-CDR3
VFYGEPYFPY (SEQ ID NO: 72)

>73C5C10 H-CDR3
KGGYSGSWFAY (SEQ ID NO: 73)

>73F6F8 H-CDR3
KGGYSGSWFAY (SEQ ID NO: 73)

>76E10E8 H-CDR3
MDWDDFFDY (SEQ ID NO: 74)

>89A12B8 H-CDR3
SFPDNYYSYDDAFAY (SEQ ID NO: 75)

Anti-IL-36R Mouse CDR Sequences

A Summary of the CDR Sequences of the Lead Mouse Antibodies is Shown Below:

| Antibody | H-CDR Sequences | L-CDR Sequences |
|---|---|---|
| 33D10 | GNTVTSYWMH (H-CDR1) SEQ ID No: 48<br>EILPSTGRTNYNENFKG (H-CDR2) SEQ ID No: 57<br>VYFGNPWFAY (H-CDR3) SEQ ID No: 67 | TASSSVSSSYLH (L-CDR1) SEQ ID No: 21<br>STSNLAS (L-CDR2) SEQ ID No: 30<br>HQHHRSPVT (L-CDR3) SEQ ID No: 39 |
| 172C8 | GYTFTDNYMN (H-CDR1) SEQ ID No: 49<br>RVNPSNGDTKYNQNFKG (H-CDR2) SEQ ID No: 58<br>TKNFYSSYSYDDAMDY (H-CDR3) SEQ ID No: 68 | LASQTIGTWLA (L-CDR1) SEQ ID No: 22<br>AATSLAD (L-CDR2) SEQ ID No: 31<br>QQVYTTPLT (L-CDR3) SEQ ID No: 40 |
| 67E7 | GFNIKDDYIH (H-CDR1) SEQ ID No: 50<br>RIDPANGNTKYAPKFQD (H-CDR2) SEQ ID No: 59<br>SFPNNYYSYDDAFAY (H-CDR3) SEQ ID No: 69 | LASQTIGTWLG (L-CDR1) SEQ ID No: 23<br>RSTTLAD (L-CDR2) SEQ ID No: 32<br>QQLYSAPYT (L-CDR3) SEQ ID No: 41 |
| 78C8 | GFSLTKFGVH (H-CDR1) SEQ ID No: 51<br>VIWAGGPTNYNSALMS (H-CDR2) SEQ ID No: 60<br>QIYYSTLVDY (H-CDR3) SEQ ID No: 70 | RSSQNIVHSNGNTYLQ (L-CDR1) SEQ ID No: 24<br>KVSNRFS (L-CDR2) SEQ ID No: 33<br>FQGSHVPFT (L-CDR3) SEQ ID No: 42 |
| 81A1 | GFSLSSYEIN (H-CDR1) SEQ ID No: 52<br>VIWTGITTNYNSALIS (H-CDR2) SEQ ID No: 61<br>GTGTGFYYAMDY (H-CDR3) SEQ ID No: 71 | RASQDIYKYLN (L-CDR1) SEQ ID No: 25<br>YTSGLHS (L-CDR2) SEQ ID No: 34<br>QQDSKFPWT (L-CDR3) SEQ ID No: 43 |
| 81B4 | GYSFTSSWIH (H-CDR1) SEQ ID No: 53<br>EINPGNVRTNYNENF (H-CDR2) SEQ ID No: 62<br>VFYGEPYFPY (H-CDR3) SEQ ID No: 72 | TASSSVSSSYFH (L-CDR1) SEQ ID No: 26<br>RTSNLAS (L-CDR2) SEQ ID No: 35<br>HQFHRSPLT (L-CDR3) SEQ ID No: 44 |
| 73C5 | GFSLTNYAVH (H-CDR1) SEQ ID No: 54<br>VIWSDGSTDFNAPFKS (H-CDR2) SEQ ID No: 63<br>KGGYSGSWFAY (H-CDR3) SEQ ID No: 73 | KASQDVGTNVL (L-CDR1) SEQ ID No: 27<br>SASYRHS (L-CDR2) SEQ ID No: 36<br>QQYSRYPLT (L-CDR3) SEQ ID No: 45 |
| 73F6 | GFSLTNYAVH (H-CDR1) SEQ ID No: 54<br>VIWSDGSTDYNAPFKS (H-CDR2) SEQ ID No: 64<br>KGGYSGSWFAY (H-CDR3) SEQ ID No: 73 | KASQDVGTNVL (L-CDR1) SEQ ID No: 27<br>SASYRHS (L-CDR2) SEQ ID No: 36<br>QQYSRYPLT (L-CDR3) SEQ ID No: 45 |
| 76E10 | GFSLTNYGVH (H-CDR1) SEQ ID No: 55<br>VIWPVGSTNYNSALMS (H-CDR2) SEQ ID No: 65<br>MDWDDFFDY (H-CDR3) SEQ ID No: 74 | KASQNVGRAVA (L-CDR1) SEQ ID No: 28<br>SASNRYT (L-CDR2) SEQ ID No: 37<br>QQYSSYPLT (L-CDR3) SEQ ID No: 46 |
| 89A12 | GFNIKDDYIH (H-CDR1) SEQ ID No: 56<br>RIDPANGNTKYDPRFQD (H-CDR2) SEQ ID No: 66<br>SFPDNYYSYDDAFAY (H-CDR3) SEQ ID No: 75 | LASQTIGTWLG (L-CDR1) SEQ ID No: 29<br>RATSLAD (L-CDR2) SEQ ID No: 38<br>QQLYSGPYT (L-CDR3) SEQ ID No: 47 |

Anti-IL-36R Humanized Antibody Sequences

Human framework sequences were selected for the mouse leads based on the framework homology, CDR structure, conserved canonical residues, conserved interface packing residues and other parameters to produce humanized variable regions (see Example 5).

Representative humanized variable regions derived from antibodies 81B4 and 7305 are shown below.

Light Chain Variable Region (VK) Amino Acid Sequences

>81B4vK32_3 vK protein
(SEQ ID NO: 76)
EIVLTQSPGTLSLSPGERATMSCTASSSVSSSYFHWYQQKPGQAPRLLIY
RTSTLASGIPDRFSGSGSGTDFTLTISRLEPEDAATYYCHQFHRSPLTFG
QGTKLEIK >81B4vK32_105 vK protein
(SEQ ID NO: 77)
EIVLTQSPGTLSLSPGERATMSCTASSSVSSSYFHWYQQKPGQAPRLLIY
RTSILASGVPDRFSGSGSGTDFTLTISRLEPEDFATYYCHQFHRSPLTFG
QGTKLEIK >81B4vK32_116 vK protein
(SEQ ID NO: 78)
EIVLTQSPGTLSLSPGERATMSCTASSSVSSSYFHWYQQKPGQAPRLWIY
RTSRLASGVPDRFSGSGSGTDFTLTISRLEPEDAATYYCHQFHRSPLTFG
QGTKLEIK >81B4vK32_127 vK protein
(SEQ ID NO: 79)
EIVLTQSPGTLSLSPGERATMTCTASSSVSSSYFHWYQQKPGQAPRLLIY
RTSRLASGVPDRFSGSGSGTDFTLTISRLEPEDFAVYYCHQFHRSPLTFG
QGTKLEIK >81B4vK32_138 vK protein
(SEQ ID NO: 80)
QIVLTQSPGTLSLSPGERATMTCTASSSVSSSYFHWYQQKPGQAPRLWIY
RTSRLASGVPDRFSGSGSGTDFTLTISRLEPEDAATYYCHQFHRSPLTFG
AGTKLEIK >81B4vK32_140 vK protein
(SEQ ID NO: 81)
QIVLTQSPGTLSLSPGERVTMSCTASSSVSSSYFHWYQQKPGQAPRLLIY
RTSQLASGIPDRFSGSGSGTDFTLTISRLEPEDAATYYCHQFHRSPLTFG
QGTKLEIK >81B4vK32_141 vK protein
(SEQ ID NO: 82)
QIVLTQSPGTLSLSPGERATMTCTASSSVSSSYFHWYQQKPGQAPRLLIY
RTSKLASGVPDRFSGSGSGTDFTLTISRLEPEDFATYYCHQFHRSPLTFG
QGTKLEIK >81B4vK32_147 vK protein
(SEQ ID NO: 83)
EIVLTQSPGTLSLSPGERATMSCTASSSVSSSYFHWYQQKPGQAPRLLIY
RTSHLASGIPGRFSGSGSGTDFTLTISRLEPEDAAVYYCHQFHRSPLTFG
QGTKLEIK >73C5vK39_2 vK protein
(SEQ ID NO: 84)
EIVMTQSPATLSVSPGVRATLSCKASQDVGTNVLWYQQKPGQAPRPLIYS
ASYRHSGIPDRFSGSGSGTEFTLTISSLQSEDFAEYFCQQYSRYPLTFGQ
GTKLEIK >73C5vK39_7 vK protein
(SEQ ID NO: 85)
EIVMTQSPATLSVSPGVRATLSCKASQDVGTNVLWYQQKPGQAPRPLIYS
ASYRHSGIPDRFSGSGSGTEFTLTISSLQSEDFAVYYCQQYSRYPLTFGQ
GTKLEIK >73C5vK39_15 vK protein
(SEQ ID NO: 86)
EIVMTQSPATLSVSPGVRATLSCKASQDVGTNVLWYQQKPGQAPRPLIYS
ASYRHSGIPARFSGSGSGTEFTLTISSLQSEDFAEYYCQQYSRYPLTFGQ
GTKLEIK Heavy Chain Variable Region VH Amino Acid Sequences >81B4vH33_49 vH Protein
(SEQ ID NO: 87)
QVQLVQSGAEVKKPGASVKVSCKASGYSFTSSWIHWVRQAPGQGLEWIGE
INPGNVRTNYNENFRNKATMTVDTSISTAYMELSRLRSDDTAVYYCAVVF
YGEPYFPYWGQGTLVTVSS >81B4vH33_85T vH Protein
(SEQ ID NO: 88)
QVQLVQSGAEVKKPGASVKVSCKASGYSFTSSWIHWVRQRPGQGLEWIGE
INPGNVRTNYNENFRNRVTMTVDTSISTAYMELSRLRSDDTAVYYCTVVF
YGEPYFPYWGQGTLVTVSS >81B4vH33_90 vH Protein
(SEQ ID NO: 89)
QVQLVQSGAEVKKPGASVKVSCKASGYSFTSSWIHWVKQAPGQGLEWMGE
INPGNVRTNYNENFRNKVTMTVDTSISTAYMELSRLRSDDTAVYYCTVVF
YGEPYFPYWGQGTLVTVSS >81B4vH33_93 vH Protein
(SEQ ID NO: 90)
QVQLVQSGAEVKKPGASVKVSCKASGYSFTSSWIHWVRQRPGQGLEWMGE
INPGNVRTNYNENFRNRATLTRDTSISTAYMELSRLRSDDTAVYYCAVVF
YGEPYFPYWGQGTLVTVSS >81B4vH50_22 vH Protein
(SEQ ID NO: 91)
QVQLVQSGAEVKKPGASVKVSCKASGYSFTSSWIHWVRQRPGQGLEWMGE
ILPGVVRTNYNENFRNKVTMTVDTSISTAYMELSRLRSDDTAVYYCTVVF
YGEPYFPYWGQGTLVTVSS >81B4vH50_30 vH Protein
(SEQ ID NO: 92)
QVQLVQSGAEVKKPGASVKVSCKASGYSFTSSWIHWVRQRPGQGLEWIGE
INPGAVRTNYNENFRNRVTMTVDTSISTAYMELSRLRSDDTAVYYCTVVF
YGEPYFPYWGQGTLVTVSS >81B4vH51_13 vH Protein
(SEQ ID NO: 93)
QVQLVQSGAEVKKPGASVKVSCKASGYSFTSSWIHWVRQAPGQGLEWIGE
INPGLVRTNYNENFRNKVTMTVDTSISTAYMELSRLRSDDTAVYYCAVVF
YGEPYFPYWGQGTLVTVSS -continued \>81B4vH51_15 vH Protein
(SEQ ID NO: 94)
QVQLVQSGAEVKKPGASVKVSCKASGYSFTSSWIHWVRQAPGQGLEWIGE

INPGAVRTNYNENFRNKVTMTVDTSISTAYMELSRLRSDDTAVYYCAVVF

YGEPYFPYWGQGTLVTVSS

\>81B4vH52_83 vH Protein
(SEQ ID NO: 95)
QVQLVQSGAEVKKPGASVKVSCKASGYSFTSSWIHWVRQAPGQGLEWIGE

INPGSVRTNYNENFRNKATMTVDTSISTAYMELSRLRSDDTAVYYCAVVF

YGEPYFPYWGQGTLVTVSS

\>73C5vH46_4 vH Protein
(SEQ ID NO: 96)
QVQLQESGPGLVKPSETLSITCTVSGFSLTDYAVHWIRQPPGKGLEWIGV

IWSDGSTDYNAPFKSRVTINKDTSKSQVSFKMSSVQAADTAVYYCARKGG

YSGSWFAYWGQGTLVTVSS

\>73C5vH46_19 vH Protein
(SEQ ID NO: 97)
QVQLQESGPGLVKPSETLSITCTVSGFSLTDYAVHWIRQPPGKGLEWIGV

IWSDGSTDYNAPFKSRVTISKDTSKNQVSLKMNSLTTDDTAVYYCARKGG

YSGSWFAYWGQGTLVTVSS

\>73C5vH46_40 vH Protein
(SEQ ID NO: 98)
QVQLQESGPGLVKPSETLSITCTVSGFSLTDYAVHWIRQPPGKGLEWIGV

IWSDGSTDYNAPFKSRVTISKDNSKSQVSLKMNSVTVADTAVYYCARKGG

YSGSWFAYWGQGTLVTVSS

\>73C5vH47_65 vH Protein
(SEQ ID NO: 99)
QVQLQESGPGLVKPSETLSITCTVSGFSLTDYAVHWVRQPPGKGLEWIGV

IWSDGSTDYNAPFKSRVTISKDTSKNQVSFKLSSVTVDDTAVYYCARKGG

YSGSWFAYWGQGTLVTVSS

\>73C5vH47_77 vH Protein
(SEQ ID NO: 100)
QVQLQESGPGLVAPSETLSLTCTVSGFSLTDYAVHWIRQFPGKGLEWIGV

IWSDGSTDFNAPFKSRVTISKDTSKNQVSFKLSSVTTDDTAVYYCARKGG

YSGSWFAYWGQGTLVTVSS

\>73C5vH58_91 vH Protein
(SEQ ID NO: 101)
QVQLQESGPGLVKPSETLSITCTVSGFSLTDYAVHWIRQPPGKGLEWIGV

IWSDGSTDYNAPFKSRVTISKDNSKSQVSFKMSSVTADDTAVYYCARKGG

YSGSWFAYWGQGTLVTVSS

The CDR sequences from the humanized variable regions derived from antibodies 81B4 and 7305 shown above are depicted below.

L-CDR1 Amino Acid Sequences

\>81B4vK32_3 L-CDR1
(SEQ ID NO: 26)
TASSSVSSSYFH

\>81B4vK32_105 L-CDR1
(SEQ ID NO: 26)
TASSSVSSSYFH

\>81B4vK32_116 L-CDR1
(SEQ ID NO: 26)
TASSSVSSSYFH

\>81B4vK32_127 L-CDR1
(SEQ ID NO: 26)
TASSSVSSSYFH

\>81B4vK32_138 L-CDR1
(SEQ ID NO: 26)
TASSSVSSSYFH

\>81B4vK32_140 L-CDR1
(SEQ ID NO: 26)
TASSSVSSSYFH

\>81B4vK32_141 L-CD R1
(SEQ ID NO: 26)
TASSSVSSSYFH

\>81B4vK32_147 L-CDR1
(SEQ ID NO: 26)
TASSSVSSSYFH

\>73C5vK39_2 L-CDR1
(SEQ ID NO: 27)
KASQDVGTNVL

\>73C5vK39_7 L-CDR1
(SEQ ID NO: 27)
KASQDVGTNVL

\>73C5vK39_15 L-CDR1
(SEQ ID NO: 27)
KASQDVGTNVL

L-CDR2 Amino Acid Sequences

\>81B4vK32_3 L-CDR2
(SEQ ID 102)
RTSTLAS

\>81B4vK32_105 L-CDR2
(SEQ ID 103)
RTSILAS

\>81B4vK32_116 L-CDR2
(SEQ ID 104)
RTSRLAS

\>81B4vK32_127 L-CDR2
(SEQ ID 104)
RTSRLAS

\>81B4vK32_138 L-CDR2
(SEQ ID 104)
RTSRLAS

\>81B4vK32_140 L-CDR2
(SEQ ID 105)
RTSQLAS

\>81B4vK32_141 L-CDR2
(SEQ ID 106)
RTSKLAS

\>81B4vK32_147 L-CDR2
(SEQ ID 140)
RTSHLAS

\>73C5vK39_2 L-CDR2
(SEQ ID NO: 36)
SASYRHS

\>73C5vK39_7 L-CDR2
(SEQ ID NO: 36)
SASYRHS

-continued

>73C5vK39_15 L-CDR2 (SEQ ID NO: 36)
SASYRHS

L-CDR3 Amino Acid Sequences

>81B4vK32_3 L-CDR3 (SEQ ID NO: 44)
HQFHRSPLT

>81B4vK32_105 L-CDR3 (SEQ ID NO: 44)
HQFHRSPLT

>81B4vK32_116 L-CDR3 (SEQ ID NO: 44)
HQFHRSPLT

>81B4vK32_127 L-CDR3 (SEQ ID NO: 44)
HQFHRSPLT

>81B4vK32_138 L-CDR3 (SEQ ID NO: 44)
HQFHRSPLT

>81B4vK32_140 L-CDR3 (SEQ ID NO: 44)
HQFHRSPLT

>81B4vK32_141 L-CDR3 (SEQ ID NO: 44)
HQFHRSPLT

>81B4vK32_147 L-CDR3 (SEQ ID NO: 44)
HQFHRSPLT

>73C5vK39_2 L-CDR3 (SEQ ID NO: 45)
QQYSRYPLT

>73C5vK39_7 L-CDR3 (SEQ ID NO: 45)
QQYSRYPLT

>73C5vK39_15 L-CDR3 (SEQ ID NO: 45)
QQYSRYPLT

H-CDR1 Amino Acid Sequences

>81B4vH33_49 H-CDR1 (SEQ ID NO: 53)
GYSFTSSWIH

>81B4vH33_85T H-CDR1 (SEQ ID NO: 53)
GYSFTSSWIH

>81B4vH33_90 H-CDR1 (SEQ ID NO: 53)
GYSFTSSWIH

>81B4vH33_93 H-CDR1 (SEQ ID NO: 53)
GYSFTSSWIH

>81B4vH50_22 H-CDR1 (SEQ ID NO: 53)
GYSFTSSWIH

>81B4vH50_30 H-CDR1 (SEQ ID NO: 53)
GYSFTSSWIH

>81B4vH51_13 H-CDR1 (SEQ ID NO: 53)
GYSFTSSWIH

>81B4vH51_15 H-CDR1 (SEQ ID NO: 53)
GYSFTSSWIH

>81B4vH52_83 H-CDR1 (SEQ ID NO: 53)
GYSFTSSWIH

>73C5vH46_4 H-CDR1 (SEQ ID NO: 107)
GFSLTDYAVH

>73C5vH46_19 H-CDR1 (SEQ ID NO: 107)
GFSLTDYAVH

>73C5vH46_40 H-CDR1 (SEQ ID NO: 107)
GFSLTDYAVH

>73C5vH47_65 H-CDR1 (SEQ ID NO: 107)
GFSLTDYAVH

>73C5vH47_77 H-CDR1 (SEQ ID NO: 107)
GFSLTDYAVH

>73C5vH58_91 H-CDR1 (SEQ ID NO: 107)
GFSLTDYAVH

H-CDR2 Amino Acid Sequences

>81B4vH33_49 H-CDR2 (SEQ ID NO: 62)
EINPGNVRTNYNENF

>81B4vH33_85T H-CDR2 (SEQ ID NO: 62)
EINPGNVRTNYNENF

>81B4vH33_90 H-CDR2 (SEQ ID NO: 62)
EINPGNVRTNYNENF

>81B4vH33_93 H-CDR2 (SEQ ID NO: 62)
EINPGNVRTNYNENF

>81B4vH50_22 H-CDR2 (SEQ ID NO: 108)
EILPGVVRTNYNENF

>81B4vH50_30 H-CDR2 (SEQ ID NO: 109)
EINPGAVRTNYNENF

>81B4vH51_13 H-CDR2 (SEQ ID NO: 110)
EINPGLVRTNYNENF

>81B4vH51_15 H-CDR2 (SEQ ID NO: 109)
EINPGAVRTNYNENF

>81B4vH52_83 H-CDR2 (SEQ ID NO: 111)
EINPGSVRTNYNENF

>73C5vH46_4 H-CDR2 (SEQ ID NO: 64)
VIWSDGSTDYNAPFKS

```
>73C5vH46_19 H-CDR2
VIWSDGSTDYNAPFKS                        (SEQ ID NO: 64)

>73C5vH46_40 H-CDR2
VIWSDGSTDYNAPFKS                        (SEQ ID NO: 64)

>73C5vH47_65 H-CDR2
VIWSDGSTDYNAPFKS                        (SEQ ID NO: 64)

>73C5vH47_77 H-CDR2
VIWSDGSTDFNAPFKS                        (SEQ ID NO: 63)

>73C5vH58_91 H-CDR2
VIWSDGSTDYNAPFKS                        (SEQ ID NO: 64)
```

H-CDR3 Amino Acid Sequences

```
>81B4vH33_49 H-CDR3
VFYGEPYFPY                              (SEQ ID NO: 72)

>81B4vH33_85T H-CDR3
VFYGEPYFPY                              (SEQ ID NO: 72)

>81B4vH33_90 H-CDR3
VFYGEPYFPY                              (SEQ ID NO: 72)

>81B4vH33_93 H-CDR3
VFYGEPYFPY                              (SEQ ID NO: 72)

>81B4vH50_22 H-CDR3
VFYGEPYFPY                              (SEQ ID NO: 72)

>81B4vH50_30 H-CDR3
VFYGEPYFPY                              (SEQ ID NO: 72)

>81B4vH51_13 H-CDR3
VFYGEPYFPY                              (SEQ ID NO: 72)

>81B4vH51_15 H-CDR3
VFYGEPYFPY                              (SEQ ID NO: 72)

>81B4vH52_83 H-CDR3
VFYGEPYFPY                              (SEQ ID NO: 72)

>73C5vH46_4 H-CDR3
KGGYSGSWFAY                             (SEQ ID NO: 73)

>73C5vH46_19 H-CDR3
KGGYSGSWFAY                             (SEQ ID NO: 73)

>73C5vH46_40 H-CDR3
KGGYSGSWFAY                             (SEQ ID NO: 73)

>73C5vH47_65 H-CDR3
KGGYSGSWFAY                             (SEQ ID NO: 73)

>73C5vH47_77 H-CDR3
KGGYSGSWFAY                             (SEQ ID NO: 73)

>73C5vH58_91 H-CDR3
KGGYSGSWFAY                             (SEQ ID NO: 73)
```

In one aspect, a variable region of the present invention is linked to a constant region. For example, a variable region of the present invention is linked to a constant region shown below to form a heavy chain or a light chain of an antibody.
Heavy Chain Constant Region Linked Downstream of a Humanized Variable Heavy Region:

```
                                        (SEQ ID NO: 112)
ASTKGPSVFPLAPSSKSTSGGTAALGCLVKDYFPEPVTVSWNSGALTSGV
HTFPAVLQSSGLYSLSSVVTVPSSSLGTQTYICNVNHKPSNTKVDKRVEP
KSCDKTHTCPPCPAPEAAGGPSVFLFPPKPKDTLMISRTPEVTCVVVDVS
HEDPEVKFNWYVDGVEVHNAKTKPREEQYNSTYRVVSVLTVLHQDWLNGK
EYKCKVSNKALPAPIEKTISKAKGQPREPQVYTLPPSREEMTKNQVSLTC
LVKGFYPSDIAVEWESNGQPENNYKTTPPVLDSDGSFFLYSKLTVDKSRW
QQGNVFSCSVMHEALHNHYTQKSLSLSPGK
```

Light Chain Constant Region Linked Downstream of a Humanized Variable Light Region:

```
                                        (SEQ ID NO: 113)
RTVAAPSVFIFPPSDEQLKSGTASVVCLLNNFYPREAKVQWKVDNALQSG
NSQESVTEQDSKDSTYSLSSTLTLSKADYEKHKVYACEVTHQGLSSPVTK
SFNRGEC
```

Representative light chain and heavy chain sequences of the present invention are shown below (humanized variable regions derived from antibodies 81B4 and 7305 linked to constant regions).
Light Chain Amino Acid Sequences

```
>81B4vK32_3 Light Chain
                                        (SEQ ID NO: 114)
EIVLTQSPGTLSLSPGERATMSCTASSSVSSSYFHWYQQKPGQAPRLLIY
RTSTLASGIPDRFSGSGSGTDFTLTISRLEPEDAATYYCHQFHRSPLTFG
QGTKLEIKRTVAAPSVFIFPPSDEQLKSGTASVVCLLNNFYPREAKVQWK
VDNALQSGNSQESVTEQDSKDSTYSLSSTLTLSKADYEKHKVYACEVTHQ
GLSSPVTKSFNRGEC >81B4vK32_105 Light Chain
                                        (SEQ ID NO: 115)
EIVLTQSPGTLSLSPGERATMSCTASSSVSSSYFHWYQQKPGQAPRLLIY
RTSILASGVPDRFSGSGSGTDFTLTISRLEPEDFATYYCHQFHRSPLTFG
QGTKLEIKRTVAAPSVFIFPPSDEQLKSGTASVVCLLNNFYPREAKVQWK
VDNALQSGNSQESVTEQDSKDSTYSLSSTLTLSKADYEKHKVYACEVTHQ
GLSSPVTKSFNRGEC >81B4vK32_116 Light Chain
                                        (SEQ ID NO: 116)
EIVLTQSPGTLSLSPGERATMSCTASSSVSSSYFHWYQQKPGQAPRLWIY
RTSRLASGVPDRFSGSGSGTDFTLTISRLEPEDAATYYCHQFHRSPLTFG
QGTKLEIKRTVAAPSVFIFPPSDEQLKSGTASVVCLLNNFYPREAKVQWK
```

-continued
VDNALQSGNSQESVTEQDSKDSTYSLSSTLTLSKADYEKHKVYACEVTHQ

GLSSPVTKSFNRGEC

>81B4vK32_127 Light Chain
(SEQ ID NO: 117)
EIVLTQSPGTLSLSPGERATMTCTASSSVSSSYFHWYQQKPGQAPRLLIY

RTSRLASGVPDRFSGSGSGTDFTLTISRLEPEDFAVYYCHQFHRSPLTFG

QGTKLEIKRTVAAPSVFIFPPSDEQLKSGTASVVCLLNNFYPREAKVQWK

VDNALQSGNSQESVTEQDSKDSTYSLSSTLTLSKADYEKHKVYACEVTHQ

GLSSPVTKSFNRGEC

>81B4vK32_138 Light Chain
(SEQ ID NO: 118)
QIVLTQSPGTLSLSPGERATMTCTASSSVSSSYFHWYQQKPGQAPRLWIY

RTSRLASGVPDRFSGSGSGTDFTLTISRLEPEDAATYYCHQFHRSPLTFG

AGTKLEIKRTVAAPSVFIFPPSDEQLKSGTASVVCLLNNFYPREAKVQWK

VDNALQSGNSQESVTEQDSKDSTYSLSSTLTLSKADYEKHKVYACEVTHQ

GLSSPVTKSFNRGEC

>81B4vK32_140 Light Chain
(SEQ ID NO: 119)
QIVLTQSPGTLSLSPGERVTMSCTASSSVSSSYFHWYQQKPGQAPRLLIY

RTSQLASGIPDRFSGSGSGTDFTLTISRLEPEDAATYYCHQFHRSPLTFG

QGTKLEIKRTVAAPSVFIFPPSDEQLKSGTASVVCLLNNFYPREAKVQWK

VDNALQSGNSQESVTEQDSKDSTYSLSSTLTLSKADYEKHKVYACEVTHQ

GLSSPVTKSFNRGEC

>81B4vK32_141 Light Chain
(SEQ ID NO: 120)
QIVLTQSPGTLSLSPGERATMTCTASSSVSSSYFHWYQQKPGQAPRLLIY

RTSKLASGVPDRFSGSGSGTDFTLTISRLEPEDFATYYCHQFHRSPLTFG

QGTKLEIKRTVAAPSVFIFPPSDEQLKSGTASVVCLLNNFYPREAKVQWK

VDNALQSGNSQESVTEQDSKDSTYSLSSTLTLSKADYEKHKVYACEVTHQ

GLSSPVTKSFNRGEC

>81B4vK32_147 Light Chain
(SEQ ID NO: 121)
EIVLTQSPGTLSLSPGERATMSCTASSSVSSSYFHWYQQKPGQAPRLLIY

RTSHLASGIPGRFSGSGSGTDFTLTISRLEPEDAAVYYCHQFHRSPLTFG

QGTKLEIKRTVAAPSVFIFPPSDEQLKSGTASVVCLLNNFYPREAKVQWK

VDNALQSGNSQESVTEQDSKDSTYSLSSTLTLSKADYEKHKVYACEVTHQ

GLSSPVTKSFNRGEC

>73C5vK39_2 Light Chain
(SEQ ID NO: 122)
EIVMTQSPATLSVSPGVRATLSCKASQDVGTNVLWYQQKPGQAPRPLIYS

ASYRHSGIPDRFSGSGSGTEFTLTISSLQSEDFAEYFCQQYSRYPLTFGQ

GTKLEIKRTVAAPSVFIFPPSDEQLKSGTASVVCLLNNFYPREAKVQWKV

DNALQSGNSQESVTEQDSKDSTYSLSSTLTLSKADYEKHKVYACEVTHQG

LSSPVTKSFNRGEC

>73C5vK39_7 Light Chain
(SEQ ID NO: 123)
EIVMTQSPATLSVSPGVRATLSCKASQDVGTNVLWYQQKPGQAPRPLIYS

ASYRHSGIPDRFSGSGSGTEFTLTISSLQSEDFAVYYCQQYSRYPLTFGQ

-continued
GTKLEIKRTVAAPSVFIFPPSDEQLKSGTASVVCLLNNFYPREAKVQWKV

DNALQSGNSQESVTEQDSKDSTYSLSSTLTLSKADYEKHKVYACEVTHQG

LSSPVTKSFNRGEC

>73C5vK39_15 Light Chain
(SEQ ID NO: 124)
EIVMTQSPATLSVSPGVRATLSCKASQDVGTNVLWYQQKPGQAPRPLIYS

ASYRHSGIPARFSGSGSGTEFTLTISSLQSEDFAEYYCQQYSRYPLTFGQ

GTKLEIKRTVAAPSVFIFPPSDEQLKSGTASVVCLLNNFYPREAKVQWKV

DNALQSGNSQESVTEQDSKDSTYSLSSTLTLSKADYEKHKVYACEVTHQG

LSSPVTKSFNRGEC

Heavy Chain Amino Acid Sequences

>81B4vH33_49 Heavy Chain
(SEQ ID NO: 125)
QVQLVQSGAEVKKPGASVKVSCKASGYSFTSSWIHWVRQAPGQGLEWIGE

INPGNVRTNYNENFRNKATMTVDTSISTAYMELSRLRSDDTAVYYCAVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH33_85T Heavy Chain
(SEQ ID NO: 126)
QVQLVQSGAEVKKPGASVKVSCKASGYSFTSSWIHWVRQRPGQGLEWIGE

INPGNVRTNYNENFRNRVTMTVDTSISTAYMELSRLRSDDTAVYYCTVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH33_90 Heavy Chain
(SEQ ID NO: 127)
QVQLVQSGAEVKKPGASVKVSCKASGYSFTSSWIHWVKQAPGQGLEWMGE

INPGNVRTNYNENFRNKVTMTVDTSISTAYMELSRLRSDDTAVYYCTVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH33_93 Heavy Chain
(SEQ ID NO: 128)
QVQLVQSGAEVKKPGASVKVSCKASGYSFTSSWIHWVRQRPGQGLEWMGE

INPGNVRTNYNENFRNRATLTRDTSISTAYMELSRLRSDDTAVYYCAVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH50_22 Heavy Chain
(SEQ ID NO: 129)
QVQLVQSGAEVKKPGASVKVSCKASGYSFTSSWIHWVRQRPGQGLEWMGE

ILPGVVRTNYNENFRNKVTMTVDTSISTAYMELSRLRSDDTAVYYCTVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH50_30 Heavy Chain
(SEQ ID NO: 130)
QVQLVQSGAEVKKPGASVKVSCKASGYSFTSSWIHWVRQRPGQGLEWIGE

INPGAVRTNYNENFRNRVTMTVDTSISTAYMELSRLRSDDTAVYYCTVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH51_13 Heavy Chain
(SEQ ID NO: 131)
QVQLVQSGAEVKKPGASVKVSCKASGYSFTSSWIHWVRQAPGQGLEWIGE

INPGLVRTNYNENFRNKVTMTVDTSISTAYMELSRLRSDDTAVYYCAVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH51_15 Heavy Chain
(SEQ ID NO: 132)
QVQLVQSGAEVKKPGASVKVSCKASGYSFTSSWIHWVRQAPGQGLEWIGE

INPGAVRTNYNENFRNKVTMTVDTSISTAYMELSRLRSDDTAVYYCAVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>81B4vH52_83 Heavy Chain
(SEQ ID NO: 133)
QVQLVQSGAEVKKPGASVKVSCKASGYSFTSSWIHWVRQAPGQGLEWIGE

INPGSVRTNYNENFRNKATMTVDTSISTAYMELSRLRSDDTAVYYCAVVF

YGEPYFPYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>73C5vH46_4 Heavy Chain
(SEQ ID NO: 134)
QVQLQESGPGLVKPSETLSITCTVSGFSLTDYAVHWIRQPPGKGLEWIGV

IWSDGSTDYNAPFKSRVTINKDTSKSQVSFKMSSVQAADTAVYYCARKGG

YSGSWFAYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>73C5vH46_19 Heavy Chain
(SEQ ID NO: 135)
QVQLQESGPGLVKPSETLSITCTVSGFSLTDYAVHWIRQPPGKGLEWIGV

IWSDGSTDYNAPFKSRVTISKDTSKNQVSLKMNSLTTDDTAVYYCARKGG

YSGSWFAYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

-continued

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>73C5vH46_40 Heavy Chain
(SEQ ID NO: 136)
QVQLQESGPGLVKPSETLSITCTVSGFSLTDYAVHWIRQPPGKGLEWIGV

IWSDGSTDYNAPFKSRVTISKDNSKSQVSLKMNSVTVADTAVYYCARKGG

YSGSWFAYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>73C5vH47_65 Heavy Chain
(SEQ ID NO: 137)
QVQLQESGPGLVKPSETLSITCTVSGFSLTDYAVHWVRQPPGKGLEWIGV

IWSDGSTDYNAPFKSRVTISKDTSKNQVSFKLSSVTVDDTAVYYCARKGG

YSGSWFAYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>73C5vH47_77 Heavy Chain
(SEQ ID NO: 138)
QVQLQESGPGLVAPSETLSLTCTVSGFSLTDYAVHWIRQFPGKGLEWIGV

IWSDGSTDFNAPFKSRVTISKDTSKNQVSFKLSSVTTDDTAVYYCARKGG

YSGSWFAYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

>73C5vH58_91 Heavy Chain
(SEQ ID NO: 139)
QVQLQESGPGLVKPSETLSITCTVSGFSLTDYAVHWIRQPPGKGLEWIGV

IWSDGSTDYNAPFKSRVTISKDNSKSQVSFKMSSVTADDTAVYYCARKGG

YSGSWFAYWGQGTLVTVSSASTKGPSVFPLAPSSKSTSGGTAALGCLVKD

YFPEPVTVSWNSGALTSGVHTFPAVLQSSGLYSLSSVVTVPSSSLGTQTY

ICNVNHKPSNTKVDKRVEPKSCDKTHTCPPCPAPEAAGGPSVFLFPPKPK

-continued

DTLMISRTPEVTCVVVDVSHEDPEVKFNWYVDGVEVHNAKTKPREEQYNS

TYRVVSVLTVLHQDWLNGKEYKCKVSNKALPAPIEKTISKAKGQPREPQV

YTLPPSREEMTKNQVSLTCLVKGFYPSDIAVEWESNGQPENNYKTTPPVL

DSDGSFFLYSKLTVDKSRWQQGNVFSCSVMHEALHNHYTQKSLSLSPGK

The CDRs listed above are defined using the Chothia numbering system (A-Lazikani et al., (1997) JMB 273, 927-948).

In one aspect, an antibody of the present invention comprises 3 light chain CDRs and 3 heavy chain CDRs, for example as set forth above.

In one aspect, an antibody of the present invention comprises a light chain and a heavy chain variable region as set forth above. In one aspect, a light chain variable region of the invention is fused to a light chain constant region, for example a kappa or lambda constant region. In one aspect, a heavy chain variable region of the invention is fused to a heavy chain constant region, for example IgA, IgD, IgE, IgG or IgM, in particular, $IgG_1$, $IgG_2$, $IgG_3$ or $IgG_4$.

The present invention provides an anti-IL-36R antibody comprising a light chain comprising the amino acid sequence of SEQ ID NO: 115; and a heavy chain comprising the amino acid sequence of SEQ ID NO: 125 (Antibody B1).

The present invention provides an anti-IL-36R antibody comprising a light chain comprising the amino acid sequence of SEQ ID NO: 115; and a heavy chain comprising the amino acid sequence of SEQ ID NO: 126 (Antibody B2).

The present invention provides an anti-IL-36R antibody comprising a light chain comprising the amino acid sequence of SEQ ID NO: 115; and a heavy chain comprising the amino acid sequence of SEQ ID NO: 127 (Antibody B3).

The present invention provides an anti-IL-36R antibody comprising a light chain comprising the amino acid sequence of SEQ ID NO: 118; and a heavy chain comprising the amino acid sequence of SEQ ID NO: 125 (Antibody B4).

The present invention provides an anti-IL-36R antibody comprising a light chain comprising the amino acid sequence of SEQ ID NO: 118; and a heavy chain comprising the amino acid sequence of SEQ ID NO: 126 (Antibody B5).

The present invention provides an anti-IL-36R antibody comprising a light chain comprising the amino acid sequence of SEQ ID NO: 118; and a heavy chain comprising the amino acid sequence of SEQ ID NO: 127 Antibody B6).

The present invention provides an anti-IL-36R antibody comprising a light chain comprising the amino acid sequence of SEQ ID NO: 123; and a heavy chain comprising the amino acid sequence of SEQ ID NO: 138 (Antibody C3).

The present invention provides an anti-IL-36R antibody comprising a light chain comprising the amino acid sequence of SEQ ID NO: 123; and a heavy chain comprising the amino acid sequence of SEQ ID NO: 139 (Antibody C2).

The present invention provides an anti-IL-36R antibody comprising a light chain comprising the amino acid sequence of SEQ ID NO: 124; and a heavy chain comprising the amino acid sequence of SEQ ID NO: 138 (Antibody C1)

Representative antibodies of the present invention are shown below.

TABLE B

| Antibody | Light Chain Sequences | Heavy Chain Sequences |
|---|---|---|
| B1 | EIVLTQSPGTLSLSPGERATMSCTASSSVSSS YFHWYQQKPGQAPRLLIYRTSILASGVPDRFS GSGSGTDFTLTISRLEPEDFATYYCHQFHRSP LTFGQGTKLEIKRTVAAPSVFIFPPSDEQLKS GTASVVCLLNNFYPREAKVQWKVDNALQSGNS QESVTEQDSKDSTYSLSSTLTLSKADYEKHKV YACEVTHQGLSSPVTKSFNRGEC (SEQ ID NO: 115) | QVQLVQSGAEVKKPGASVKVSCKASGYSFTSSW IHWVRQAPGQGLEWIGEINPGNVRTNYNENFRN KATMTVDTSISTAYMELSRLRSDDTAVYYCAVV FYGEPYFPYWGQGTLVTVSSASTKGPSVFPLAP SSKSTSGGTAALGCLVKDYFPEPVTVSWNSGAL TSGVHTFPAVLQSSGLYSLSSVVTVPSSSLGTQ TYICNVNHKPSNTKVDKRVEPKSCDKTHTCPPC PAPEAAGGPSVFLFPPKPKDTLMISRTPEVTCV VVDVSHEDPEVKFNWYVDGVEVHNAKTKPREEQ YNSTYRVVSVLTVLHQDWLNGKEYKCKVSNKAL PAPIEKTISKAKGQPREPQVYTLPPSREEMTKN QVSLTCLVKGFYPSDIAVEWESNGQPENNYKTT PPVLDSDGSFFLYSKLTVDKSRWQQGNVFSCSV MHEALHNHYTQKSLSLSPGK (SEQ ID NO: 125) |
| B2 | EIVLTQSPGTLSLSPGERATMSCTASSSVSSS YFHWYQQKPGQAPRLLIYRTSILASGVPDRFS GSGSGTDFTLTISRLEPEDFATYYCHQFHRSP LTFGQGTKLEIKRTVAAPSVFIFPPSDEQLKS GTASVVCLLNNFYPREAKVQWKVDNALQSGNS QESVTEQDSKDSTYSLSSTLTLSKADYEKHKV YACEVTHQGLSSPVTKSFNRGEC (SEQ ID NO: 115) | QVQLVQSGAEVKKPGASVKVSCKASGYSFTSSW IHWVRQRTGQGLEWIGEINPGNVRTNYNENFRN RVTMTVDTSISTAYMELSRLRSDDTAVYYCTVV FYGEPYFPYWGQGTLVTVSSASTKGPSVFPLAP SSKSTSGGTAALGCLVKDYFPEPVTVSWNSGAL TSGVHTFPAVLQSSGLYSLSSVVTVPSSSLGTQ TYICNVNHKPSNTKVDKRVEPKSCDKTHTCPPC PAPEAAGGPSVFLFPPKPKDTLMISRTPEVTCV VVDVSHEDPEVKFNWYVDGVEVHNAKTKPREEQ YNSTYRVVSVLTVLHQDWLNGKEYKCKVSNKAL PAPIEKTISKAKGQPREPQVYTLPPSREEMTKN QVSLTCLVKGFYPSDIAVEWESNGQPENNYKTT PPVLDSDGSFFLYSKLTVDKSRWQQGNVFSCSV MHEALHNHYTQKSLSLSPGK (SEQ ID NO: 126) |
| B3 | EIVLTQSPGTLSLSPGERATMSCTASSSVSSS YFHWYQQKPGQAPRLLIYRTSILASGVPDRFS GSGSGTDFTLTISRLEPEDFATYYCHQFHRSP LTFGQGTKLEIKRTVAAPSVFIFPPSDEQLKS GTASVVCLLNNFYPREAKVQWKVDNALQSGNS QESVTEQDSKDSTYSLSSTLTLSKADYEKHKV YACEVTHQGLSSPVTKSFNRGEC (SEQ ID NO: 115) | QVQLVQSGAEVKKPGASVKVSCKASGYSFTSSW IHWVKQAPGQGLEWMGEINPGNVRTNYNENFRN KVTMTVDTSISTAYMELSRLRSDDTAVYYCTVV FYGEPYFPYWGQGTLVTVSSASTKGPSVFPLAP SSKSTSGGTAALGCLVKDYFPEPVTVSWNSGAL TSGVHTFPAVLQSSGLYSLSSVVTVPSSSLGTQ TYICNVNHKPSNTKVDKRVEPKSCDKTHTCPPC PAPEAAGGPSVFLFPPKPKDTLMISRTPEVTCV VVDVSHEDPEVKFNWYVDGVEVHNAKTKPREEQ YNSTRYVVSVLTVLHQDWLNGKEYKCKVSNKAL PAPIEKTISKAKGQPREPQVYTLPPSREEMTKN QVSLTCLVKGFYPSDIAVEWESNGQPENNYKTT PPVLDSDGSFFLYSKLTVDKSRWQQGNVFSCSV MHEALHNHYTQKSLSLSPGK (SEQ ID NO: 127) |
| B4 | QIVTLQSPGTLSLSPGERATMTCTASSSVSSS YFHWYQQKPGQAPRLWIYRTSRLASGVPDRFS GSGSGTDFTLTISRLEPEDAATYYCHQFHRSP LTFGAGTKLEIKRTVAAPSVFIFPPSDEQLKS GTASVVCLLNNFYPREAKVQWKVDNALQSGNS QESVTEQDSKDSTYSLSSTLTLSKADYEKHKV YAVEVTHQGLSSPVTKSFNRGEC (SEQ ID NO: 118) | QVQLVQSGAEVKKPGASVKVSCKASGYSFTSSW IHWVRQAPGQGLEWIGEINPGNVRTNYNENFRN KATMTVDTSISTAYMELSRLRSDDTAVYYCAV VFYGEPYFPYWGQGTLVTVSSASTKGPSVFPLA PSSKSTSGGTAALGCLVKDYFPEPVTVSWNSGA LTSGVHTFPAVLQSSGLYSLSSVVTVPSSSLGT QTYICNVNHKPSNTKVDKRVEPKSCDKTHTCPP CPAPEAAGGPSVFLFPPKPKDTLMISRTPEVTC VVVDVSHEDPEVKFNWYVDGVEVHNAKTKPREE QYNSTYRVVSVLTVLHQDWLNGKEYKCKCSNKA LPAPIEKTISKAKGQPREPQVYTLPPSREEMTK NQVSLTCLVKGFYPSDIAVEWESNGQPENNYKT TPPVLDSDGSFFLYSKLTVDKSRWQQGNVFSCS VMHEALHNHYTQKSLSLSPGK (SEQ ID NO: 125) |
| B5 | QIVTLQSPGTLSLSPGERATMTCTASSSVSSS YFHWYQQKPGQAPRLWIYRTSRLASGVPDRFS GSGSGTDFTLTISRLEPEDAATYYCHQFHRSP LTFGAGTKLEIKRTVAAPSVFIFPPSDEQLKS GTASVVCLLNNFYPREAKVQWKVDNALQSGNS QESVTEQDSKDSTYSLSSTLTLSKADYEKHKV YAVEVTHQGLSSPVTKSFNRGEC (SEQ ID NO: 118) | QVQLVQSGAEVKKPGASVKVSCKASGYSFTSSW IHWVRQRTGQGLEWIGEINPGNVRTNYNENFRN RVTMTVDTSISTAYMELSRLRSDDTAVYYCTVV FYGEPYFPYWGQGTLVTVSSASTKGPSVFPLAP SSKSTSGGTAALGCLVKDYFPEPVTVSWNSGAL TSGVHTFPAVLQSSGLYSLSSVVTVPSSSLGTQ TYICNVNHKPSNTKVDKRVEPKSCDKTHTCPPC PAPEAAGGPSVFLFPPKPKDTLMISRTPEVTCV VVDVSHEDPEVKFNWYVDGVEVHNAKTKPREEQ YNSTYRVVSVLTVLHQDWLNGKEYKCKVSNKAL PAPIEKTISKAKGQPREPQVYTLPPSREEMTKN QVSLTCLVKGFYPSDIAVEWESNGQPENNYKTT |

TABLE B-continued

| Antibody | Light Chain Sequences | Heavy Chain Sequences |
| --- | --- | --- |
| | | PPVLDSDGSFFLYSKLTVDKSRWQQGNVFSCSV MHEALHNHYTQKSLSLSPGK (SEQ ID NO: 126) |
| B6 | QIVTLQSPGTLSLSPGERATMTCTASSSVSSS YFHWYQQKPGQAPRLWIYRTSRLASGVPDRFS GSGSGTDFTLTISRLEPEDAATYYCHQFHRSP LTFGAGTKLEIKRTVAAPSVFIFPPSDEQLKS GTASVVCLLNNFYPREAKVQWKVDNALQSGNS QESVTEQDSKDSTYSLSSTLTLSKADYEKHKV YAVEVTHQGLSSPVTKSFNRGEC (SEQ ID NO: 118) | QVQLVQSGAEVKKPGASVKVSCKASGYSFTSSW IHWVKQAPGQGLEWMGEINPGNVRTNYNENFRN KVTMTVDTSISTAYMELSRLRSDDTAVYYCTVV FYGEPYFPYWGQGTLVTVSSASTKGPSVFPLAP SSKSTSGGTAALGCLVKDYFPEPVTVSWNSGAL TSGVHTFPAVLQSSGLYSLSSVVTVPSSSLGTQ TYICNVNHKPSNTKVDKRVEPKSCDKTHTCPPC PAPEAAGGPSVFLFPPKPKDTLMISRTPEVTCV VVDVSHEDPEVKFNWYVDGVEVHNAKTKPREEQ YNSTRYVVSVLTVLHQDWLNGKEYKCKVSNKAL PAPIEKTISKAKGQPREPQVYTLPPSREEMTKN QVSLTCLVKGFYPSDIAVEWESNGQPENNYKTT PPVLDSDGSFFLYSKLTVDKSRWQQGNVFSCSV MHEALHNHYTQKSLSLSPGK (SEQ ID NO: 127) |

TABLE C

| Antibody | Light Chain Sequences | Heavy Chain Sequences |
| --- | --- | --- |
| C1 | EIVMTQSPATLSVSPGVRATLSCKASQDVG TNVLWYQQKPGQAPRPLIYSASYRHSGIPA RFSGSGSGTEFTLTISSLQSEDFAEVYYCQ QYSRYPLTFGQGTKLEIKRTVAAPSVFIFP PSDEQLKSGTASVVCLLNNFYPREAKVQWK VDNALQSGNSQESVTEQDSKDSTYSLSSTL TLSKADYEKHKVYACEVTHQGLSSPVTKSF NRGEC (SEQ ID NO: 124) | QVQLQESGPGLVAPSETLSLTCTVSGFSLTDY AVHWIRQFPGKGLEWIGVIWSDGSTDFNAPFK SRVTISKDTSKNQVSFKLSSVTTDDTAVYYCA RKGGYSGSWFAYWGQGTLVTVSSASTKGPSVF PLAPSSKSTSGGTAALGCLVKDYFPEPVTVSW NSGALTSGVHTFPAVLQSSGLYSLSSVVTVPS SSLGTQTYICNVNHKPSNTKVDKRVEPKSCDK THTCPPCPAPEAAGGPSVFLFPPKPKDTLMIS RTPEVTCVVVDVSHEDPEVKFNWYVDGVEVHN AKTKPREEQYNSTYRVVSVLTVLHQDWLNGKY KCKVSNKALPAPIEKTISKAKGQPREPQVYTL PPSREEMTKNQVSLTCLVKGFYPSDIAVEWES NGQPENNYKTTPPVLDSDGSFFLYSKLTVDKS RWQQGNVFSCSVMHEALHNHYTQKSLSLSGPK (SEQ ID NO: 138) |
| C2 | EIVMTQSPATLSVSPGVRATLSCKASQDVG TNVLWYQQKPGQAPRPLIYSASYRHSGIPD RFSGSGSGTEFTLTISSLQSEDFAVYYCQ YSRYPLTFGQGTKLEIKRTVAAPSVFIFPP SDEQLKSGTASVVCLLNNFYPREAKVQWKV DNALQSGNSQESVTEQDSKDSTYSLSSTLT LSKADYEKHKVYACEVTHQGLSSPVTKSFN RGEC (SEQ ID NO: 123) | QVQLQESGPGLVKPSETLSITCTVSGFSLTDY AVHWIRQPPGKGLEWIGVIWSDGSTDYNAPFK SRVTISKDNSKSQVSFKMSSVTADDTAVYYCA RGGYSGSWFAYWGQGTLVTVSSASTKGPSVFP LAPSSKSTSGGTAALGCLVKDYFPEPVTVSWN SGALTSGVHTFPAVLQSSGLYSLSSVVTVPSS SLGTQTYICNVNHKPSNTKVDKRVEPKSCDKT HTCPPCPAPEAAGGPSVFLFPPKPKDTLMISR TPEVTCVVVDVSHEDPEVKFNWYVDGVEVHNA KTKPREEQYNSTYRVVSVLTVLHQDWLNGKEY KCKVSNKALPAPIEKTISKAKGQPREPQVYTL PPSREEMTKNQVSLTCLVKGFYPSDIAVEWES NGQPENNYKTTPPVLDSDGSFFLYSKLTVDKS RWQQGNVFSCSVMHEALHNHYTQKSLSLSPGK (SEQ ID NO: 139) |
| C3 | EIVMTQSPATLSVSPGVRATLSCKASQDVG TNVLWYQQKPGQAPRPLIYSASYRHSGPRD RFSGSGSGTEFTLTISSLQSEDFAVYYCQQ YSRYPLTFGQGTKLEIKRTVAAPSVFIFPP SDEQLKSGTASVVCLLNNFYPREAKVQWKV DNAKQSGNSQESVTEQDSKDSTYSLSSTLT LSKADYEKHKVYACEVTHQGLSSPVTKSFN RGEC (SEQ ID NO: 123) | QVQLQESGPGLVAPSETLSLTCTVSGFSLTDY AVHWIRQFPGKGLEWIGVIWSDGSTDFNAPFK SRVTISKDTSKNQVSFKLSSVTTDDTAVYYCA RKGGYSGSWFAYWGQGTLVTVSSASTKGPSVF PLAPSSKSTSGGTAALGCLVKDYFPEPVTVSW NSGALTSGVHTFPAVLQSSGLYSLSSVVTVPS SSLGTQTYICNVNHKPSNTKVDKRVEPKSCDK THTCPPCPAPEAAGGPSVFLFPPKPKDTLMIS RTPEVTCVVVDVSHEDPEVKFNWYVDGVEVHN AKTKPREEQYNSTYRVVSVLTVLHQDWLNGKE YKCKVSNKALPAPIEKTISKAKGQPREPQVYT LPPSREEMTKNQVSLTCLVKGFYPSDIAVEWE SNGQPENNYKTTPPVLDSDGSFFLYSKLTVDK SRWQQGNVFSCSVMHEALHNHYTQKSLSLSPG K (SEQ ID NO: 138) |

In some aspects, the humanized antibody displays blocking activity, whereby it decreases the binding of IL-36 ligand to IL-36 receptor by at least 45%, by at least 50%, by at least 55%, by at least 60%, by at least 65%, by at least 70%, by at least 75%, by at least 80%, by at least 85%, by at least 90%, or by at least 95%. The ability of an antibody to block binding of IL-36 ligand to the IL-36 receptor can be measured using competitive binding assays known in the art. Alternatively, the blocking activity of an antibody can be measured by assessing the biological effects of IL-36, such as the production of IL-8, IL-6, and GM-CSF to determine if signaling mediated by the IL-36 receptor is inhibited.

In a further aspect, the present invention provides a humanized anti-IL-36R antibody having favorable biophysical properties. In one aspect, a humanized anti-IL-36R antibody of the present invention is present in at least 90% monomer form, or in at least 92% monomer form, or in at least 95% monomer form in a buffer. In a further aspect, a humanized anti-IL-36R antibody of the present invention remains in at least 90% monomer form, or in at least 92% monomer form, or in at least 95% monomer form in a buffer for one month or for four months.

In one aspect, a humanized antibody of the present invention is Antibody B1, Antibody B2, Antibody B3, Antibody B4, Antibody B5, Antibody B6, Antibody C1, Antibody C2, or Antibody C3. Accordingly, in one embodiment, a humanized antibody of the present invention comprises the light chain sequence of SEQ ID NO:115 and the heavy chain sequence of SEQ ID NO:125 (Antibody B1). In another embodiment, a humanized antibody of the present invention comprises the light chain sequence of SEQ ID NO:115 and the heavy chain sequence of SEQ ID NO:126 (Antibody B2). In another embodiment, a humanized antibody of the present invention comprises the light chain sequence of SEQ ID NO:115 and the heavy chain sequence of SEQ ID NO:127 (Antibody B3). In another embodiment, a humanized antibody of the present invention comprises the light chain sequence of SEQ ID NO:118 and the heavy chain sequence of SEQ ID NO:125 (Antibody B4). In another embodiment, a humanized antibody of the present invention comprises the light chain sequence of SEQ ID NO:118 and the heavy chain sequence of SEQ ID NO:126 (Antibody B5). In another embodiment, a humanized antibody of the present invention comprises the light chain sequence of SEQ ID NO:118 and the heavy chain sequence of SEQ ID NO:127 (Antibody B6). In another embodiment, a humanized antibody of the present invention comprises the light chain sequence of SEQ ID NO:124 and the heavy chain sequence of SEQ ID NO:138 (Antibody C1). In another embodiment, a humanized antibody of the present invention comprises the light chain sequence of SEQ ID NO:123 and the heavy chain sequence of SEQ ID NO:139 (Antibody C2). In another embodiment, a humanized antibody of the present invention comprises the light chain sequence of SEQ ID NO:123 and the heavy chain sequence of SEQ ID NO:138 (Antibody C3).

In a further embodiment, a humanized antibody of the present invention consists of the light chain sequence of SEQ ID NO:115 and the heavy chain sequence of SEQ ID NO:125 (Antibody B1). In another embodiment, a humanized antibody of the present invention consists of the light chain sequence of SEQ ID NO:115 and the heavy chain sequence of SEQ ID NO:126 (Antibody B2). In another embodiment, a humanized antibody of the present invention consists of the light chain sequence of SEQ ID NO:115 and the heavy chain sequence of SEQ ID NO:127 (Antibody B3). In another embodiment, a humanized antibody of the present invention consists of the light chain sequence of SEQ ID NO:118 and the heavy chain sequence of SEQ ID NO:125 (Antibody B4). In another embodiment, a humanized antibody of the present invention consists of the light chain sequence of SEQ ID NO:118 and the heavy chain sequence of SEQ ID NO:126 (Antibody B5). In another embodiment, a humanized antibody of the present invention consists of the light chain sequence of SEQ ID NO:118 and the heavy chain sequence of SEQ ID NO:127 (Antibody B6). In another embodiment, a humanized antibody of the present invention consists of the light chain sequence of SEQ ID NO:124 and the heavy chain sequence of SEQ ID NO:138 (Antibody C1). In another embodiment, a humanized antibody of the present invention consists of the light chain sequence of SEQ ID NO:123 and the heavy chain sequence of SEQ ID NO:139 (Antibody C2). In another embodiment, a humanized antibody of the present invention consists of the light chain sequence of SEQ ID NO:123 and the heavy chain sequence of SEQ ID NO:138 (Antibody C3).

In some embodiments, the humanized anti-IL-36R antibodies, including antigen-binding fragments thereof, such as heavy and light chain variable regions, comprise an amino acid sequence of the residues derived from Antibody B1, Antibody B2, Antibody B3, Antibody B4, Antibody B5, Antibody B6, Antibody C1, Antibody C2, or Antibody C3.

In a further embodiment, the present invention provides an anti-IL-36R antibody or antigen-binding fragment thereof that competitively binds to human anti-IL-36R with an antibody of the present invention, for example Antibody B1, Antibody B2, Antibody B3, Antibody B4, Antibody B5, Antibody B6, Antibody C1, Antibody C2 or Antibody C3 described herein. The ability of an antibody or antigen-binding fragment to competitively bind to IL-36R can be measured using competitive binding assays known in the art.

The humanized anti-IL-36R antibodies optionally include specific amino acid substitutions in the consensus or germline framework regions. The specific substitution of amino acid residues in these framework positions can improve various aspects of antibody performance including binding affinity and/or stability, over that demonstrated in humanized antibodies formed by "direct swap" of CDRs or HVLs into the human germline framework regions.

In some embodiments, the present invention describes other monoclonal antibodies with a light chain variable region having the amino acid sequence set forth in any one of SEQ ID NO:1-10. In some embodiments, the present invention describes other monoclonal antibodies with a heavy chain variable region having the amino acid sequence set forth in any one of SEQ ID NO:11-20. Placing such CDRs into FRs of the human consensus heavy and light chain variable domains will yield useful humanized antibodies of the present invention.

In particular, the present invention provides monoclonal antibodies with the combinations of light chain variable and heavy chain variable regions of SEQ ID NO:1/11, 2/12, 3/13, 4/14, 5/15, 6/16, 7/17, 8/18, 9/19, 10/20. Such variable regions can be combined with human constant regions.

In some embodiments, the present invention describes other humanized antibodies with light chain variable region sequences having the amino acid sequence set forth in any one of SEQ ID NO:76-86. In some embodiments, the present invention describes other humanized antibodies with heavy chain variable region sequences having the amino acid sequence set forth in any one of SEQ ID NO:87-101. In particular, the present invention provides monoclonal antibodies with the combinations of light chain variable and heavy chain variable regions of SEQ ID NO: 77/89, 80/88, 80/89, 77/87, 77/88, 80/87, 86/100, 85/101, 85/100. Such variable regions can be combined with human constant regions.

In a further embodiment, the present invention relates to an anti-IL-36R antibody or antigen-binding fragment thereof comprising a humanized light chain variable domain comprising the CDRs of SEQ ID NO:77 and framework regions having an amino acid sequence at least 90% identical, at least 93% identical or at least 95% identical to the amino acid sequence of the framework regions of the variable domain light chain amino acid sequence of SEQ ID NO:77 and a humanized heavy chain variable domain comprising the CDRs of SEQ ID NO:89 and framework regions having an amino acid sequence at least 90% identical, at least 93% identical or at least 95% identical to the amino acid sequence of the framework regions of the variable domain heavy chain amino acid sequence of SEQ ID NO:89. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:80 and framework regions having an amino acid sequence at least 90% identical, at least 93% identical or at least 95% identical to the amino acid sequence of the framework regions of the variable domain light chain amino acid sequence of SEQ ID NO:80 and a humanized heavy chain variable domain comprising the CDRs of SEQ ID NO:88 and framework regions having an amino acid sequence at least 90% identical, at least 93% identical or at least 95% identical to the amino acid sequence of the framework regions of the variable domain heavy chain amino acid sequence of SEQ ID NO:88. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:80 and framework regions having an amino acid sequence at least 90% identical, at least 93% identical or at least 95% identical to the amino acid sequence of the framework regions of the variable domain light chain amino acid sequence of SEQ ID NO:80 and a humanized heavy chain variable domain comprising the CDRs of SEQ ID NO:89 and framework regions having an amino acid sequence at least 90% identical, at least 93% identical or at least 95% identical to the amino acid sequence of the framework regions of the variable domain heavy chain amino acid sequence of SEQ ID NO:89. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:77 and framework regions having an amino acid sequence at least 90% identical, at least 93% identical or at least 95% identical to the amino acid sequence of the framework regions of the variable domain light chain amino acid sequence of SEQ ID NO:77 and a humanized heavy chain variable domain comprising the CDRs of SEQ ID NO:87 and framework regions having an amino acid sequence at least 90% identical, at least 93% identical or at least 95% identical to the amino acid sequence of the framework regions of the variable domain heavy chain amino acid sequence of SEQ ID NO:87. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:77 and framework regions having an amino acid sequence at least 90% identical, at least 93% identical or at least 95% identical to the amino acid sequence of the framework regions of the variable domain light chain amino acid sequence of SEQ ID NO:77 and a humanized heavy chain variable domain comprising the CDRs of SEQ ID NO:88 and framework regions having an amino acid sequence at least 90% identical, at least 93% identical or at least 95% identical to the amino acid sequence of the framework regions of the variable domain heavy chain amino acid sequence of SEQ ID NO:88. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:80 and framework regions having an amino acid sequence at least 90% identical, at least 93% identical or at least 95% identical to the amino acid sequence of the framework regions of the variable domain light chain amino acid sequence of SEQ ID NO:80 and a humanized heavy chain variable domain comprising the CDRs of SEQ ID NO:87 and framework regions having an amino acid sequence at least 90% identical, at least 93% identical or at least 95% identical to the amino acid sequence of the framework regions of the variable domain heavy chain amino acid sequence of SEQ ID NO:87. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:86 and framework regions having an amino acid sequence at least 90% identical, at least 93% identical or at least 95% identical to the amino acid sequence of the framework regions of the variable domain light chain amino acid sequence of SEQ ID NO:86 and a humanized heavy chain variable domain comprising the CDRs of SEQ ID NO:100 and framework regions having an amino acid sequence at least 90% identical, at least 93% identical or at least 95% identical to the amino acid sequence of the framework regions of the variable domain heavy chain amino acid sequence of SEQ ID NO:100. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:85 and framework regions having an amino acid sequence at least 90% identical, at least 93% identical or at least 95% identical to the amino acid sequence of the framework regions of the variable domain light chain amino acid sequence of SEQ ID NO:85 and a humanized heavy chain variable domain comprising the CDRs of SEQ ID NO:101 and framework regions having an amino acid sequence at least 90% identical, at least 93% identical or at least 95% identical to the amino acid sequence of the framework regions of the variable domain heavy chain amino acid sequence of SEQ ID NO:101. In one embodiment, the anti-IL-36R antibody is a humanized monoclonal antibody.

In a further embodiment, the present invention relates to an anti-IL-36R antibody or antigen-binding fragment thereof comprising a humanized light chain variable domain comprising the CDRs of SEQ ID NO:85 and framework regions having an amino acid sequence at least 90% identical, at least 93% identical or at least 95% identical to the amino acid sequence of the framework regions of the variable domain light chain amino acid sequence of SEQ ID NO:85 and a humanized heavy chain variable domain comprising the CDRs of SEQ ID NO:100 and framework regions having an amino acid sequence at least 90% identical, at least 93% identical or at least 95% identical to the amino acid sequence of the framework regions of the variable domain heavy chain amino acid sequence of SEQ ID NO:100. In one embodiment, the anti-IL-36R antibody is a humanized monoclonal antibody.

In some specific embodiments, the humanized anti-IL-36R antibodies disclosed herein comprise at least a heavy or a light chain variable domain comprising the CDRs or HVLs of the murine monoclonal antibodies or humanized antibodies as disclosed herein and the FRs of the human germline heavy and light chain variable domains.

In one further aspect, the present invention provides an anti-IL-36R antibody or antigen-binding fragment thereof comprising a light chain CDR1 (L-CDR1) sequence of any one of SEQ ID NO:21-29; a light chain CDR2 (L-CDR2) sequence of any one of SEQ ID NO:30-38; a light chain CDR3 (L-CDR3) sequence of any one of SEQ ID NO:39-47; a heavy chain CDR1 (H-CDR1) sequence of any one of SEQ ID NO:48-56; a heavy chain CDR2 (H-CDR2) sequence of any one of SEQ ID NO:57-66; and a heavy chain CDR3 (H-CDR3) sequence of any one of SEQ ID NO:67-75. In one aspect, the anti-IL-36R antibody or antigen-binding fragment thereof comprises a light chain variable region comprising a L-CDR1 listed above, a L-CDR2 listed above and a L-CDR3 listed above, and a heavy chain variable region comprising a H-CDR1 listed above, a H-CDR2 listed above and a H-CDR3 listed above.

In a further aspect, the present invention provides an anti-IL-36R antibody or antigen-binding fragment thereof comprising:
a) a L-CDR1, a L-CDR2, a L-CDR3, a H-CDR1, a H-CDR2 and a H-CDR3 sequence of SEQ ID NO:21, 30, 39, 48, 57 and 67, respectively; or
b) a L-CDR1, a L-CDR2, a L-CDR3, a H-CDR1, a H-CDR2 and a H-CDR3 sequence of SEQ ID NO:22, 31, 40, 49, 58 and 68, respectively; or
c) a L-CDR1, a L-CDR2, a L-CDR3, a H-CDR1, a H-CDR2 and a H-CDR3 sequence of SEQ ID NO:23, 32, 41, 50, 59 and 69, respectively; or
d) a L-CDR1, a L-CDR2, a L-CDR3, a H-CDR1, a H-CDR2 and a H-CDR3 sequence of SEQ ID NO:24, 33, 42, 51, 60 and 70, respectively; or
e) a L-CDR1, a L-CDR2, a L-CDR3, a H-CDR1, a H-CDR2 and a H-CDR3 sequence of SEQ ID NO:25, 34, 43, 52, 61 and 71, respectively; or
f) a L-CDR1, a L-CDR2, a L-CDR3, a H-CDR1, a H-CDR2 and a H-CDR3 sequence of SEQ ID NO:26, 35, 44, 53, 62 and 72, respectively; or
g) a L-CDR1, a L-CDR2, a L-CDR3, a H-CDR1, a H-CDR2 and a H-CDR3 sequence of SEQ ID NO:27, 36, 45, 54, 63 and 73, respectively; or
h) a L-CDR1, a L-CDR2, a L-CDR3, a H-CDR1, a H-CDR2 and a H-CDR3 sequence of SEQ ID NO:27, 36, 45, 54, 64 and 74, respectively; or
i) a L-CDR1, a L-CDR2, a L-CDR3, a H-CDR1, a H-CDR2 and a H-CDR3 sequence of SEQ ID NO:27, 36, 45, 54, 64 and 73, respectively; or
j) a L-CDR1, a L-CDR2, a L-CDR3, a H-CDR1, a H-CDR2 and a H-CDR3 sequence of SEQ ID NO:28, 37, 46, 55, 65 and 74, respectively; or
k) a L-CDR1, a L-CDR2, a L-CDR3, a H-CDR1, a H-CDR2 and a H-CDR3 sequence of SEQ ID NO:29, 38, 47, 56, 66 and 75, respectively.

In a further aspect, the present invention provides an anti-IL-36R antibody or antigen-binding fragment thereof comprising:
a) a L-CDR1, a L-CDR2, a L-CDR3, a H-CDR1, a H-CDR2 and a H-CDR3 sequence of SEQ ID NO:26, 103, 44, 53, 62 and 72, respectively; or
b) a L-CDR1, a L-CDR2, a L-CDR3, a H-CDR1, a H-CDR2 and a H-CDR3 sequence of SEQ ID NO:26, 104, 44, 53, 62 and 72, respectively; or
c) a L-CDR1, a L-CDR2, a L-CDR3, a H-CDR1, a H-CDR2 and a H-CDR3 sequence of SEQ ID NO:27, 36, 45, 107, 63 and 73, respectively; or
d) a L-CDR1, a L-CDR2, a L-CDR3, a H-CDR1, a H-CDR2 and a H-CDR3 sequence of SEQ ID NO:27, 36, 45, 107, 64 or 73, respectively.

In one aspect, the anti-IL-36R antibody or antigen-binding fragment thereof comprises a light chain variable region comprising a L-CDR1, L-CDR2 and L-CDR3 combination listed above, and a heavy chain variable region comprising a H-CDR1, H-CDR2 and H-CDR3 combination listed above.

In specific embodiments, it is contemplated that chimeric antibodies with switched CDR regions (i.e., for example switching one or two CDRs of one of the mouse antibodies or humanized antibody derived therefrom with the analogous CDR from another mouse antibody or humanized antibody derived therefrom) between these exemplary immunoglobulins may yield useful antibodies.

In certain embodiments, the humanized anti-IL-36R antibody is an antibody fragment. Various antibody fragments have been generally discussed above and there are techniques that have been developed for the production of antibody fragments. Fragments can be derived via proteolytic digestion of intact antibodies (see, e.g., Morimoto et al., 1992, Journal of Biochemical and Biophysical Methods 24:107-117; and Brennan et al., 1985, Science 229:81). Alternatively, the fragments can be produced directly in recombinant host cells. For example, Fab'-SH fragments can be directly recovered from E. coli and chemically coupled to form F(ab')$_2$ fragments (see, e.g., Carter et al., 1992, Bio/Technology 10:163-167). By another approach, F(ab')$_2$ fragments can be isolated directly from recombinant host cell culture. Other techniques for the production of antibody fragments will be apparent to the skilled practitioner. Accordingly, in one aspect, the present invention provides antibody fragments comprising the CDRs described herein, in particular one of the combinations of L-CDR1, L-CDR2, L-CDR3, H-CDR1, H-CDR2 and H-CDR3 described herein. In a further aspect, the present invention provides antibody fragments comprising the variable regions described herein, for example one of the combinations of light chain variable regions and heavy chain variable regions described herein.

Certain embodiments include an F(ab')₂ fragment of a humanized anti-IL-36R antibody comprise a light chain sequence of any of SEQ ID NO: 115 or 118 in combination with a heavy chain sequence of SEQ ID NO: 125, 126 or 127. Such embodiments can include an intact antibody comprising such an F(ab')₂.

Certain embodiments include an F(ab')₂ fragment of a humanized anti-IL-36R antibody comprise a light chain sequence of any of SEQ ID NO: 123 or 124 in combination with a heavy chain sequence of SEQ ID NO: 138 or 139. Such embodiments can include an intact antibody comprising such an F(ab')₂.

In some embodiments, the antibody or antibody fragment includes a constant region that mediates effector function. The constant region can provide antibody-dependent cellular cytotoxicity (ADCC), antibody-dependent cellular phagocytosis (ADCP) and/or complement-dependent cytotoxicity (CDC) responses against an anti-IL-36R expressing target cell. The effector domain(s) can be, for example, an Fc region of an Ig molecule.

The effector domain of an antibody can be from any suitable vertebrate animal species and isotypes. The isotypes from different animal species differ in the abilities to mediate effector functions. For example, the ability of human immunoglobulin to mediate CDC and ADCC/ADCP is generally in the order of IgM≈IgG₁≈IgG₃>IgG₂>IgG₄ and IgG₁≈IgG₃>IgG₂/IgM/IgG₄, respectively. Murine immunoglobulins mediate CDC and ADCC/ADCP generally in the order of murine IgM≈IgG₃>>IgG₂ᵦ>IgG₂ₐ>>IgG₁ and IgG₂ᵦ>IgG₂ₐ>IgG₁>>IgG₃, respectively. In another example, murine IgG₂ₐ mediates ADCC while both murine IgG₂ₐ and IgM mediate CDC.

III. Pharmaceutical Doses and Administration

Anti-IL-36R antibodies of the present invention are typically administered to a patient as a pharmaceutical composition in which the antagonist is admixed with a pharmaceutically acceptable carrier or excipient, see, e. g., Remington's Pharmaceutical Sciences and US. Pharmacopeia: National Formulary, Mack Publishing Company, Easton, Pa. (1984). The pharmaceutical composition may be formulated in any manner suitable for the intended route of administration. Examples of pharmaceutical formulations include lyophilized powders, slurries, aqueous solutions, suspensions and sustained release formulations (see, e. g., Hardman et al. (2001) Goodman and Gilman's The Pharmacological Basis of Therapeutics, McGraw-Hill, New York, N. Y.; Gennaro (2000) Remington: The Science and Practice of Pharmacy, Lippincott, Williams, and Wilkins, New York, N. Y.; Avis et al. (eds.) (1993) Pharmaceutical Dosage Forms: Parenteral Medications, Marcel Dekker, NY; Lieberman et al. (eds.) (1990) Pharmaceutical Dosage Forms: Tablets, Marcel Dekker, NY; Lieberman et al. (eds.) (1990) Pharmaceutical Dosage Forms: Disperse Systems, Marcel Dekker, NY; Weiner and Kotkoskie (2000) Excipient Toxicity and Safety, Marcel Dekker, Inc., New York, N. Y.). Suitable routes of administration include intravenous injection (including intraarterial injection) and subcutaneous injection.

In a first aspect, the present invention relates to a method of treating generalized pustular psoriasis (GPP) in a patient, said method including administering or having administered to the patient a therapeutically effective amount of an anti-IL-36R antibody.

In a second aspect, the present invention relates to a method of treating moderate to severe GPP in a patient, including administering or having administered to the patient a therapeutically effective amount of an anti-IL-36R antibody.

In a third aspect, the present invention relates to a method of reducing or alleviating signs and symptoms of an acute phase flare-up of GPP in a patient, said method including administering or having administered to the patient a therapeutically effective amount of an anti-IL-36R antibody.

In a forth aspect, the present invention relates to a method of reducing the severity and duration of GPP flares, said method comprising including administering or having administered to the patient a therapeutically effective amount of an anti-IL-36R antibody.

In a fifth aspect, the present invention relates to a method of treating a skin disorder associated with acute GPP, said method including administering or having administered to the patient a therapeutically effective amount of an anti-IL-36R antibody.

In one embodiment related to any of aspects first to fifth, the anti-IL-36R antibody includes: a) a light chain variable region comprising the amino acid sequence of SEQ ID NO: 26 (L-CDR1); the amino acid sequence of SEQ ID NO: 35, 102, 103, 104, 105 106 or 140 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

In one embodiment related to any of aspects first to fifth, the anti-IL-36R antibody includes:

I. a) a light chain variable region comprising the amino acid sequence of SEQ ID NO: 26 (L-CDR1); the amino acid sequence of SEQ ID NO: 102 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

II. a) a light chain variable region comprising the amino acid sequence of SEQ ID NO: 26 (L-CDR1); the amino acid sequence of SEQ ID NO: 103 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

III. a) a light chain variable region comprising the amino acid sequence of SEQ ID NO: 26 (L-CDR1); the amino acid sequence of SEQ ID NO: 104 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

IV. a) a light chain variable region comprising the amino acid sequence of SEQ ID NO: 26 (L-CDR1); the amino acid sequence of SEQ ID NO: 105 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

V. a) a light chain variable region comprising the amino acid sequence of SEQ ID NO: 26 (L-CDR1); the amino acid sequence of SEQ ID NO: 106 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

VI. a) a light chain variable region comprising the amino acid sequence of SEQ ID NO: 26 (L-CDR1); the amino acid sequence of SEQ ID NO: 140 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

In one embodiment related to any of aspects first to fifth, the anti-IL-36R antibody includes:
(i) a light chain variable region comprising the amino acid sequence of SEQ ID NO: 77; and a heavy chain variable region comprising the amino acid sequence of SEQ ID NO: 87; or
(ii) a light chain variable region comprising the amino acid sequence of SEQ ID NO: 77; and a heavy chain variable region comprising the amino acid sequence of SEQ ID NO: 88; or
(iii) a light chain variable region comprising the amino acid sequence of SEQ ID NO: 77; and a heavy chain variable region comprising the amino acid sequence of SEQ ID NO: 89; or
(iv) a light chain variable region comprising the amino acid sequence of SEQ ID NO: 80; and a heavy chain variable region comprising the amino acid sequence of SEQ ID NO: 87; or
(v) a light chain variable region comprising the amino acid sequence of SEQ ID NO: 80; and a heavy chain variable region comprising the amino acid sequence of SEQ ID NO: 88; or
(vi) a light chain variable region comprising the amino acid sequence of SEQ ID NO: 80; and a heavy chain variable region comprising the amino acid sequence of SEQ ID NO: 89; or
(vii) a light chain variable region comprising the amino acid sequence of SEQ ID NO: 85; and a heavy chain variable region comprising the amino acid sequence of SEQ ID NO: 100; or
(viii) a light chain variable region comprising the amino acid sequence of SEQ ID NO: 85; and a heavy chain variable region comprising the amino acid sequence of SEQ ID NO:101; or
(ix) a light chain variable region comprising the amino acid sequence of SEQ ID NO: 86; and a heavy chain variable region comprising the amino acid sequence of SEQ ID NO: 100; or
(x) a light chain variable region comprising the amino acid sequence of SEQ ID NO: 86; and a heavy chain variable region comprising the amino acid sequence of SEQ ID NO:101.

In one embodiment related to any of aspects first to fifth, the anti-IL-36R antibody includes:
i. a light chain comprising the amino acid sequence of SEQ ID NO: 115; and a heavy chain comprising the amino acid sequence of SEQ ID NO: 125; or
ii. a light chain comprising the amino acid sequence of SEQ ID NO: 115; and a heavy chain comprising the amino acid sequence of SEQ ID NO: 126; or
iii. a light chain comprising the amino acid sequence of SEQ ID NO: 115; and a heavy chain comprising the amino acid sequence of SEQ ID NO: 127; or
iv. a light chain comprising the amino acid sequence of SEQ ID NO: 118; and a heavy chain comprising the amino acid sequence of SEQ ID NO: 125; or
v. a light chain comprising the amino acid sequence of SEQ ID NO: 118; and a heavy chain comprising the amino acid sequence of SEQ ID NO: 126; or
vi. a light chain comprising the amino acid sequence of SEQ ID NO: 118; and a heavy chain comprising the amino acid sequence of SEQ ID NO: 127; or
vii. a light chain comprising the amino acid sequence of SEQ ID NO: 123; and a heavy chain comprising the amino acid sequence of SEQ ID NO: 138; or
viii. a light chain comprising the amino acid sequence of SEQ ID NO: 123; and a heavy chain comprising the amino acid sequence of SEQ ID NO: 139; or
ix. a light chain comprising the amino acid sequence of SEQ ID NO: 124; and a heavy chain comprising the amino acid sequence of SEQ ID NO: 138.

In one embodiment related to any of aspects first to fifth, the anti-IL-36R antibody is administered in one or more intravenous dose(s). In a related embodiment, each of the one or more intravenous dose(s) includes 210 mg, 300 mg, 350 mg, 450 mg, 600 mg, 700 mg, 750 mg, 800 mg, 900 mg of said anti-IL-36R antibody.

In another embodiment related to any of aspects first to fifth, the anti-IL-36R antibody is administered in one intravenous dose. In another embodiment related to any of the above aspects, the anti-IL-36R is administered in one intravenous dose of about 10 mg per kilogram of body weight of the patient. In another embodiment related to any of the above aspects, the anti-IL-36R antibody is administered in one intravenous dose of 210 mg. In another embodiment related to any of the above aspects, the anti-IL-36R antibody is administered in one intravenous dose of 300 mg. In another embodiment related to any of the above aspects, the anti-IL-36R antibody is administered in one intravenous dose of 350 mg. In another embodiment related to any of the above aspects, the anti-IL-36R antibody is administered in one intravenous dose of 450 mg. In another embodiment related to any of the above aspects, the anti-IL-36R antibody is administered in one intravenous dose of 600 mg. In another embodiment related to any of the above aspects, the anti-IL-36R antibody is administered in one intravenous dose of 700 mg. In another embodiment related to any of the above aspects, the anti-IL-36R antibody is administered in one intravenous dose of 750 mg. In another embodiment related to any of the above aspects, the anti-IL-36R antibody is administered in one intravenous dose of 800 mg. In another embodiment related to any of the above aspects, the anti-IL-36R antibody is administered in one intravenous dose of 850 mg. In another embodiment related to any of the above aspects, the anti-IL-36R antibody is administered in one intravenous dose of 900 mg.

Representative examples of doses and dose regimens according to the present invention are disclosed in Table 1. Although, doses 900 mg and 750 mg have been exemplified, similar dose regimens equally apply to doses 210 mg, 300 mg, 350 mg, 450 mg, 600 mg, 700 mg and 800 mg.

TABLE 1

Doses and Dose Regimens

| Intravenous dose (mg) | Frequency of intravenous doses | Frequency of intravenous administration | Optional Subcutaneous dose (mg) | Frequency of subcutaneous doses | Frequency of subcutaneous administration |
|---|---|---|---|---|---|
| 900 | 1 | Single | 150 | 0 | — |
| 900 | 1 | Single | 150 | 1 | — |
| 900 | 1 | Single | 150 | 2 | At 4, 6, 8, 10 or 12 weeks intervals |
| 900 | 1 | Single | 150 | 3 | At 4, 6, 8, 10 or 12 weeks intervals |
| 900 | 1 | Single | 225 | 0 | — |
| 900 | 1 | Single | 225 | 1 | — |
| 900 | 1 | Single | 225 | 2 | At 4, 6, 8, 10 or 12 weeks intervals |
| 900 | 1 | Single | 225 | 3 | At 4, 6, 8, 10 or 12 weeks intervals |
| 900 | 1 | Single | 300 | 0 | — |
| 900 | 1 | Single | 300 | 1 | — |
| 900 | 1 | Single | 300 | 2 | At 4, 6, 8, 10 or 12 weeks intervals |
| 900 | 1 | Single | 300 | 3 | At 4, 6, 8, 10 or 12 weeks intervals |
| 900 | 2 | At 2, 4, 6, 8, 10 or 12 weeks intervals | 150 | 0 | |
| 900 | 2 | At 2, 4, 6, 8, 10 or 12 weeks intervals | 150 | 1 | — |
| 900 | 2 | At 2, 4, 6, 8, 10 or 12 weeks intervals | 150 | 2 | At 4, 6, 8, 10 or 12 weeks intervals |
| 900 | 2 | At 2, 4, 6, 8, 10 or 12 weeks intervals | 150 | 3 | At 4, 6, 8, 10 or 12 weeks intervals |
| 900 | 2 | At 2, 4, 6, 8, 10 or 12 weeks intervals | 225 | 0 | — |
| 900 | 2 | At 2, 4, 6, 8, 10 or 12 weeks intervals | 225 | 1 | — |
| 900 | 2 | At 2, 4, 6, 8, 10 or 12 weeks intervals | 225 | 2 | At 4, 6, 8, 10 or 12 weeks intervals |
| 900 | 2 | At 2, 4, 6, 8, 10 or 12 weeks intervals | 225 | 3 | At 4, 6, 8, 10 or 12 weeks intervals |
| 900 | 2 | At 2, 4, 6, 8, 10 or 12 weeks intervals | 300 | 0 | — |
| 900 | 2 | At 2, 4, 6, 8, 10 or 12 weeks intervals | 300 | 1 | — |
| 900 | 2 | At 2, 4, 6, 8, 10 or 12 weeks intervals | 300 | 2 | At 4, 6, 8, 10 or 12 weeks intervals |
| 900 | 2 | At 2, 4, 6, 8, 10 or 12 weeks intervals | 300 | 3 | At 4, 6, 8, 10 or 12 weeks intervals |
| 900 | 3 | At 2, 4, 6, 8, 10 or 12 weeks intervals | 150 | 0 | — |
| 900 | 3 | At 2, 4, 6, 8, 10 or 12 weeks intervals | 150 | 1 | — |
| 900 | 3 | At 2, 4, 6, 8, 10 or 12 weeks intervals | 150 | 2 | At 4, 6, 8, 10 or 12 weeks intervals |
| 900 | 3 | At 2, 4, 6, 8, 10 or 12 weeks intervals | 150 | 3 | At 4, 6, 8, 10 or 12 weeks intervals |
| 900 | 3 | At 2, 4, 6, 8, 10 or 12 weeks intervals | 225 | 0 | — |
| 900 | 3 | At 2, 4, 6, 8, 10 or 12 weeks intervals | 225 | 1 | — |
| 900 | 3 | At 2, 4, 6, 8, 10 or 12 weeks intervals | 225 | 2 | At 4, 6, 8, 10 or 12 weeks intervals |
| 900 | 3 | At 2, 4, 6, 8, 10 or 12 weeks intervals | 225 | 3 | At 4, 6, 8, 10 or 12 weeks intervals |
| 900 | 3 | At 2, 4, 6, 8, 10 or 12 weeks intervals | 300 | 0 | — |
| 900 | 3 | At 2, 4, 6, 8, 10 or 12 weeks intervals | 300 | 1 | — |
| 900 | 3 | At 2, 4, 6, 8, 10 or 12 weeks intervals | 300 | 2 | At 4, 6, 8, 10 or 12 weeks intervals |
| 900 | 3 | At 2, 4, 6, 8, 10 or 12 weeks intervals | 300 | 3 | At 4, 6, 8, 10 or 12 weeks intervals |
| 750 | 1 | Single | 150 | 0 | — |
| 750 | 1 | Single | 150 | 1 | — |
| 750 | 1 | Single | 150 | 2 | At 4, 6, 8, 10 or 12 weeks intervals |
| 750 | 1 | Single | 150 | 3 | At 4, 6, 8, 10 or 12 weeks intervals |

TABLE 1-continued

Doses and Dose Regimens

| Intravenous dose (mg) | Frequency of intravenous doses | Frequency of intravenous administration | Optional Subcutaneous dose (mg) | Frequency of subcutaneous doses | Frequency of subcutaneous administration |
|---|---|---|---|---|---|
| 750 | 1 | Single | 225 | 0 | — |
| 750 | 1 | Single | 225 | 1 | — |
| 750 | 1 | Single | 225 | 2 | At 4, 6, 8, 10 or 12 weeks intervals |
| 750 | 1 | Single | 225 | 3 | At 4, 6, 8, 10 or 12 weeks intervals |
| 750 | 1 | Single | 300 | 0 | — |
| 750 | 1 | Single | 300 | 1 | — |
| 750 | 1 | Single | 300 | 2 | At 4, 6, 8, 10 or 12 weeks intervals |
| 750 | 1 | Single | 300 | 3 | At 4, 6, 8, 10 or 12 weeks intervals |
| 750 | 2 | At 2, 4, 6, 8, 10 or 12 weeks intervals | 150 | 0 | — |
| 750 | 2 | At 2, 4, 6, 8, 10 or 12 weeks intervals | 150 | 1 | — |
| 750 | 2 | At 2, 4, 6, 8, 10 or 12 weeks intervals | 150 | 2 | At 4, 6, 8, 10 or 12 weeks intervals |
| 750 | 2 | At 2, 4, 6, 8, 10 or 12 weeks intervals | 150 | 3 | At 4, 6, 8, 10 or 12 weeks intervals |
| 750 | 2 | At 2, 4, 6, 8, 10 or 12 weeks intervals | 225 | 0 | — |
| 750 | 2 | At 2, 4, 6, 8, 10 or 12 weeks intervals | 225 | 1 | — |
| 750 | 2 | At 2, 4, 6, 8, 10 or 12 weeks intervals | 225 | 2 | At 4, 6, 8, 10 or 12 weeks intervals |
| 750 | 2 | At 2, 4, 6, 8, 10 or 12 weeks intervals | 225 | 3 | At 4, 6, 8, 10 or 12 weeks intervals |
| 750 | 2 | At 2, 4, 6, 8, 10 or 12 weeks intervals | 300 | 0 | — |
| 750 | 2 | At 2, 4, 6, 8, 10 or 12 weeks intervals | 300 | 1 | — |
| 750 | 2 | At 2, 4, 6, 8, 10 or 12 weeks intervals | 300 | 2 | At 4, 6, 8, 10 or 12 weeks intervals |
| 750 | 2 | At 2, 4, 6, 8, 10 or 12 weeks intervals | 300 | 3 | At 4, 6, 8, 10 or 12 weeks intervals |
| 750 | 3 | At 2, 4, 6, 8, 10 or 12 weeks intervals | 150 | 0 | — |
| 750 | 3 | At 2, 4, 6, 8, 10 or 12 weeks intervals | 150 | 1 | — |
| 750 | 3 | At 2, 4, 6, 8, 10 or 12 weeks intervals | 150 | 2 | At 4, 6, 8, 10 or 12 weeks intervals |
| 750 | 3 | At 2, 4, 6, 8, 10 or 12 weeks intervals | 150 | 3 | At 4, 6, 8, 10 or 12 weeks intervals |
| 750 | 3 | At 2, 4, 6, 8, 10 or 12 weeks intervals | 225 | 0 | — |
| 750 | 3 | At 2, 4, 6, 8, 10 or 12 weeks intervals | 225 | 1 | — |
| 750 | 3 | At 2, 4, 6, 8, 10 or 12 weeks intervals | 225 | 2 | At 4, 6, 8, 10 or 12 weeks intervals |
| 750 | 3 | At 2, 4, 6, 8, 10 or 12 weeks intervals | 225 | 3 | At 4, 6, 8, 10 or 12 weeks intervals |
| 750 | 3 | At 2, 4, 6, 8, 10 or 12 weeks intervals | 300 | 0 | — |
| 750 | 3 | At 2, 4, 6, 8, 10 or 12 weeks intervals | 300 | 1 | — |
| 750 | 3 | At 2, 4, 6, 8, 10 or 12 weeks intervals | 300 | 2 | At 4, 6, 8, 10 or 12 weeks intervals |
| 750 | 3 | At 2, 4, 6, 8, 10 or 12 weeks intervals | 300 | 3 | At 4, 6, 8, 10 or 12 weeks intervals |

In one embodiment, 1, 2 or 3 intravenous dose(s) is/are administered to the patient in a dose regimen listed in Table 1.

In an embodiment relating to any of the above aspects, the mammal or the patient is evaluated for improved Clinical Remission as defined by: (a) Generalized Pustular Psoriasis Global Assessment (GPPGA) score of 0 or 1 at Week 1; (b) GPPGA pustulation subscore of 0 indicating no visible pustules at Week 1; (c) Psoriasis Area and Severity Index for Generalized Pustular Psoriasis (GPPASI) 75 at Week 4; (d) Change from baseline in Pain Visual Analog Scale (VAS) score at Week 4; (e) Change from baseline in Psoriasis Symptom Scale (PSS) score at Week 4; (f) Change from baseline in Functional Assessment of Chronic Illness Therapy (FACIT) Fatigue score at Week 4; (g) GPPGA 0 or 1 at Week 4; (h) GPPGA pustulation subscore of 0 indicating no visible pustules at Week 4; (i) GPPASI 50 at Week 1 and 4; or (j) Change in GPPASI pustule, erythema or scaling severity subscore from baseline at Week 1 and 4. In a related embodiment, proportion of patients with a response to the administration is statistically significantly higher as compared to patients on placebo for any of the end points recited.

In one embodiment, the present invention relates to a method of treating generalized pustular psoriasis (GPP), a method of treating moderate to severe GPP, a method of reducing or alleviating signs and symptoms of an acute phase flare-up of GPP, a method of reducing the severity and duration of GPP flares, or a method of treating a skin disorder associated with acute GPP in a patient, said method(s) including administering or having administered to the patient a therapeutically effective amount of an anti-IL-36R antibody of the present invention in one or more intravenous dose(s) of 210 mg, 300 mg, 350 mg, 450 mg, 600 mg, 700 mg, 750 mg, 800 mg or 900 mg each, wherein more than one intravenous doses are administered at 2, 4, 6, 8, 10 or 12 weeks intervals.

In one embodiment, the present invention relates to a method of treating generalized pustular psoriasis (GPP), a method of treating moderate to severe GPP, a method of reducing or alleviating signs and symptoms of an acute phase flare-up of GPP, a method of reducing the severity and duration of GPP flares, or a method of treating a skin disorder associated with acute GPP in a patient, said method(s) including administering or having administered to the patient a therapeutically effective amount of an anti-IL-36R antibody of the present invention in one intravenous dose of 900 mg.

the present invention relates to a method of treating generalized pustular psoriasis (GPP), a method of treating moderate to severe GPP, a method of reducing or alleviating signs and symptoms of an acute phase flare-up of GPP, a method of reducing the severity and duration of GPP flares, or a method of treating a skin disorder associated with acute GPP in a patient, said method(s) including administering or having administered to the patient a therapeutically effective amount of an anti-IL-36R antibody of the present invention in 1, 2 or 3 intravenous dose(s) of 210 mg, 300 mg, 350 mg, 450 mg, 600 mg, 700 mg, 750 mg, 800 mg or 900 mg each, wherein 2 or 3 intravenous doses are administered at 2, 4, 6, 8, 10 or 12 weeks intervals.

In a sixth aspect, the present invention relates to a method of preventing the recurrence of GPP flares in a patient treated with one or more intravenous dose(s) of the anti-IL-36R antibody according to any of aspects first to fifth or the above embodiments, said method including administering to the patient a prophylactically effective amount of the anti-IL-36R antibody in one or more subcutaneous doses.

In a seventh aspect, the present invention relates to a method of achieving a Generalized Pustular Psoriasis Global Assessment (GPPGA) score of 0 in a patient treated with one or more intravenous dose(s) of the anti-IL-36R antibody according to any of aspects first to fifth or the above embodiments, said method including administering to the patient an effective amount of the anti-IL-36R antibody in one or more subcutaneous doses.

In an eight aspect, the present invention relates to a method of achieving a complete resolution of GPP symptoms in a patient treated with one or more intravenous dose(s) of the anti-IL-36R antibody according to any of aspects first to fifth or the above embodiments, said method comprising administering to the patient an effective amount of the anti-IL-36R antibody in one or more subcutaneous doses; wherein the GPP symptoms comprise postule, erythema, or scaling and the complete resolution comprises a GPPGA score of 0.

In one embodiment related to any of aspects sixth to eight, each of the one or more subcutaneous doses includes 150 mg, 225 mg, 300 mg, 450 mg or 600 mg of said anti-IL-36R antibody.

In one embodiment related to any of aspects sixth to eight or the related embodiment(s), 1, 2, 3 or more subcutaneous doses are administered to the patient and wherein a first subcutaneous dose is administered after the last intravenous dose.

In one embodiment related to any of aspects sixth to eight or the related embodiment(s), the first subcutaneous dose is administered 2 to 8 weeks, 4 to 6 weeks, 2 weeks, 4 weeks, 6 weeks or 8 weeks, after the last intravenous dose is administered and the second subcutaneous dose is administered 4, 6, 8, 10 or 12 weeks after said first subcutaneous dose is administered.

In one embodiment, the present invention relates to a method of preventing the recurrence of GPP flares in a patient treated with one or more intravenous dose(s) of the anti-IL-36R antibody of the present invention, said method including administering to the patient a prophylactically effective amount of the anti-IL-36R antibody in one or more subcutaneous doses of 225 mg, 300 mg, 450 mg or 600 mg each of said anti-IL-36R antibody, wherein more than one subcutaneous doses are administered at 4, 6, 8 10 or 12 weeks intervals.

In one embodiment, the present invention relates to a method of achieving a Generalized Pustular Psoriasis Global Assessment (GPPGA) score of 0 or a method of achieving a complete resolution of GPP symptoms in a patient treated with one or more intravenous dose(s) of the anti-IL-36R antibody of the present invention, said method including administering to the patient an effective amount of the anti-IL-36R antibody in one or more subcutaneous doses of 225 mg, 300 mg, 450 mg or 600 mg each of said anti-IL-36R antibody, wherein more than one subcutaneous doses are administered at 4, 6, 8 10 or 12 weeks intervals, and wherein the GPP symptoms comprise postule, erythema, or scaling and the complete resolution comprises a GPPGA score of 0.

In one embodiment, the present invention relates to a method of achieving a Generalized Pustular Psoriasis Global Assessment (GPPGA) score of 0 or a method of achieving a complete resolution of GPP symptoms in a patient treated with one or more intravenous dose(s) of the anti-IL-36R antibody of the present invention, said method including administering to the patient an effective amount of the anti-IL-36R antibody in 1, 2, 3 subcutaneous doses of 225 mg, 300 mg, 450 mg or 600 mg each of the anti-IL-36R antibody, wherein 2 or 3 subcutaneous doses are administered at 4, 6, 8 10 or 12 weeks intervals, and wherein the GPP symptoms comprise postule, erythema, or scaling and the complete resolution comprises a GPPGA score of 0.

In one embodiment related to any of aspects sixth to eight or the related embodiment(s), at least 10%, 20%, 30%, 40%, 50%, 60%, 70% or 80% of the patients remain in clinical remission as measured by a GPPGA score of 0 or 1 at Week 12, 24, 36, 48, 60 or 72 of the treatment.

In one embodiment related to any of aspects sixth to eight or the related embodiment(s), at least 10%, 20%, 30%, 40%, 50%, 60%, 70% or 80% of the patients remain in clinical remission as measured by a change in GPPASI from baseline at Week 12, 24, 36, 48, 60 or 72 of the treatment.

In one embodiment related to any of aspects sixth to eight or the related embodiment(s), at least 10%, 20%, 30%, 40%, 50%, 60%, 70% or 80% of the patients remain in clinical remission as measured by a change in GPPASI pustule, erythema or scaling severity subscore from baseline at Week 12, 24, 36, 48, 60 or 72 of the treatment. In a related embodiment, proportion of patients with a response to the administration is statistically significantly higher as compared to patients on placebo for any of the end points recited.

In an embodiment related to any of aspects sixth to eight, at least 10%, 20%, 30%, 40%, 50%, 60%, 70% or 80% of the patients remain in clinical remission as measured by a GPPGA score of 0 or 1 at Week 12, 24, 36, 48, 60 or 72 of the treatment. In an embodiment related to any of aspects sixth to eight, at least 10%, 20%, 30%, 40%, 50%, 60%, 70% or 80% of the patients remain in clinical remission as measured by a change in GPPASI from baseline at Week 12, 24, 36, 48, 60 or 72 of the treatment. In an embodiment related to any of aspects sixth to eight, at least 10%, 20%, 30%, 40%, 50%, 60%, 70% or 80% of the patients remain in clinical remission as measured by a change in GPPASI pustule, erythema or scaling severity subscore from baseline at Week 12, 24, 36, 48, 60 or 72 of the treatment. In a related embodiment, proportion of patients with a response to the administration is statistically significantly higher as compared to patients on placebo for any of the end points recited.

In an embodiment related to any of aspects sixth to eight, at least 10%, 20%, 30%, 40%, 50%, 60%, 70% or 80% of the patients remain in clinical remission as measured by a GPPGA score of 0 or 1 at Week 12, 24, 36, 48, 60 or 72 of the treatment. In a related embodiment, the improved effects are maintained at higher percentage with an anti-IL-36R antibody of the present invention than with placebo. In a related embodiment, at least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 of the treatment with an anti-IL-36R antibody of the present invention than with placebo.

In an embodiment related to any of aspects sixth to eight, at least 10%, 20%, 30%, 40%, 50%, 60%, 70% or 80% of the patients remain in clinical remission as measured by a change in GPPASI from baseline at Week 12, 24, 36, 48, 60 or 72 of the treatment. In a related embodiment, the improved effects are maintained at higher percentage with an anti-IL-36R antibody of the present invention than with placebo. In a related embodiment, at least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 of the treatment with an anti-IL-36R antibody of the present invention than with placebo.

In an embodiment related to any of aspects sixth to eight, at least 10%, 20%, 30%, 40%, 50%, 60%, 70% or 80% of the patients remain in clinical remission as measured by a change in GPPASI pustule, erythema or scaling severity subscore from baseline at Week 12, 24, 36, 48, 60 or 72 of the treatment. In a related embodiment, the improved effects are maintained at higher percentage with an anti-IL-36R antibody of the present invention than with placebo. In a related embodiment, at least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 of the treatment with an anti-IL-36R antibody of the present invention than with placebo.

In a ninth aspect, the present invention relates to a method of treating GPP in a patient, including administering to the patient a therapeutically effective amount of one or more intravenous dose(s) of the anti-IL-36R antibody, according to aspects first to fifth and their related embodiments, followed by one or more subcutaneous dose(s) of the anti-IL-36R antibody.

In one embodiment relating to aspect ninth, 1 or 2 or 3 intravenous dose(s) of the anti-IL-36R antibody is/are followed by 1 or 2 or 3 subcutaneous doss(s) of the anti-IL-36R antibody.

In one embodiment relating to aspect ninth, 1 intravenous dose of the anti-IL-36R antibody is followed by 1 or 2 or 3 subcutaneous doss(s) of the anti-IL-36R antibody.

In one embodiment relating to aspect ninth, 2 intravenous doses of the anti-IL-36R antibody are followed by 1 or 2 or 3 subcutaneous doss(s) of the anti-IL-36R antibody.

In one embodiment relating to aspect ninth, 3 intravenous doses of the anti-IL-36R antibody are followed by 1 or 2 or 3 subcutaneous doss(s) of the anti-IL-36R antibody.

In one embodiment relating to aspect ninth and its related embodiment, each of the one or more intravenous dose(s) includes 210 mg, 300 mg, 350 mg, 450 mg, 600 mg, 700 mg, 750 mg, 800 mg, 850 mg or 900 mg of the anti-IL-36R antibody and each of the one or more subcutaneous dose(s) includes 150 mg, 225 mg, 300 mg, 450 mg, or 600 mg of the anti-IL-36R antibody. In a related embodiment, the intravenous doses are administered at 2, 4, 6, 8, 10 or 12 weeks intervals, the subcutaneous doses are administered at 4, 6, 8, 10 or 12 weeks intervals, and the first subcutaneous dose is administered 2 to 8 weeks, 4 to 6 weeks, 2 weeks, 4 weeks, 6 weeks or 8 weeks after the last intravenous dose is administered.

In an embodiment relating to any of the above aspects, the intravenous dose(s) may be followed by one or more subcutaneous dose(s).

In an embodiment relating to any of the above aspects, the anti-IL-36R antibody or an antigen binding fragment thereof (disclosed herein) is present in a stable pharmaceutical formulation (as described in co-pending U.S. provisional application No. 62/815,405, filed Mar. 8, 2019, the entire content of which is hereby incorporated herein by reference in its entirety) for administration to a mammal or patient according to any one of the aspects of the present invention.

In another embodiment, the formulation comprises a therapeutic amount of an anti-IL-36R antibody (disclosed herein) and
   i) a pharmaceutically acceptable buffer; or
   ii) a pharmaceutically acceptable tonicifying agent; or
   iii) a pharmaceutically acceptable stabilizing agent; or
   iv) a pharmaceutically acceptable salt; or
   v) a pharmaceutically acceptable surfactant; or
   vi) a pharmaceutically acceptable buffer and a pharmaceutically acceptable tonicifying agent; or vii) a pharmaceutically acceptable buffer, a pharmaceutically acceptable tonicifying agent and a pharmaceutically acceptable stabilizing agent; or viii) a pharmaceutically acceptable buffer, a pharmaceutically acceptable tonicifying agent, a pharmaceutically acceptable stabilizing agent and a pharmaceutically acceptable salt; or ix) a pharmaceutically acceptable buffer, a pharmaceutically acceptable tonicifying agent, a pharmaceutically acceptable stabilizing agent, a pharmaceutically acceptable salt and a pharmaceutically acceptable surfactant;

each in pharmaceutically acceptable quantities and at a pharmaceutically acceptable pH.

In another embodiment, the anti-IL-36R antibody or antigen binding fragment thereof is present in the formulation at a concentration of about 15 mg/mL, about 20 mg/mL, about 25 mg/mL, about 30 mg/mL, about 60 mg/mL, about 75 mg/mL, about 80 mg/mL, about 100 mg/mL or about 150 mg/mL. In another related embodiment, the pharmaceutically acceptable buffer is present in the formulation at a concentration within the range from about 20 mM to about 80 mM, or at a concentration of about 20 mM, about 25 mM, about 35 mM, about 40 mM, about 45 mM, about 50 mM, about 60 mM. In another related embodiment, the pharmaceutically acceptable tonicifying agent is present in the formulation at a concentration within the range from about 100 mM to about 250 mM, or at a concentration of about 100 mM, about 120 mM, about 150 mM, about 180 mM, about 200 mM. In another related embodiment, the pharmaceutically acceptable stabilizing agent is present in the formulation at a concentration within the range from about 0 mM to about 80 mM, or at a concentration of about 25 mM or about 50 mM. In another related embodiment, the pharmaceutically acceptable salt is present in the formulation at a concentration of within the range from about 0 to about 150 mM, or at a concentration of about 3 mM, 5 mM, 10 mM, 25 mM or 50 mM. In another related embodiment, the pharmaceutically acceptable surfactant is present in the formulation at a concentration within the range from about 0 g/L to about 1.5 g/L, or at a concentration of about 0.1 g/L, 0.2 g/L, 0.4 g/L, 0.5 g/L or 1 g/L. In an embodiment related to the first aspect, the formulation is characterized by a pH within the range from about 5 to about 8. In another related embodiment, the pH is about 5, about 5.5, about 6, about 6.5, about 7, about 7.5 or about 8.

In another embodiment, the buffer comprises histidine, phosphate, succinate, citrate, acetate or TRIS; the tonicifying agent is one or more sugar and/or polyol including sucrose, trehalose, sorbitol, magnesium sulfate (MgSO4), glycerol, mannitol or dextrose; the stabilizer comprises an amino acid including arginine, histidine, glycine, cysteine, proline, methionine, lysine, aspartate, glutamate or pharmaceutically acceptable salts thereof; the salt comprises sodium chloride (NaCl), magnesium chloride (MgCl2), potassium chloride (KCl), lithium chloride (LiCl), calcium chloride (CaCl2), boric acid salts or zinc chloride (ZnCl2); and the surfactant comprises poloxamer 188, polysorbate 20, polysorbate 40, polysorbate 60 or polysorbate 80.

In one embodiment, the method of treatment according to any of the aspects described herein, includes administering to the mammal or patient a therapeutic amount of a stable pharmaceutical formulation comprising from about 20 mg/mL to about 150 mg/mL of an anti-IL-36R antibody, about 20 mM to about 80 mM of a pharmaceutically acceptable buffer (e.g., acetate buffer), about 100 mM to about 250 mM of a pharmaceutically acceptable tonicifying agent (e.g., sucrose), about 0 mM to about 80 mM of a pharmaceutically acceptable stabilizing agent (e.g., arginine) or a pharmaceutically acceptable salt thereof, about 0 to about 150 mM of a pharmaceutically acceptable salt (e.g., sodium chloride), and a pharmaceutically acceptable surfactant (e.g., polysorbate 20) in an amount about 0 g/L to about 1.5 g/L, wherein the generalized pustular psoriasis (GPP) in the patient is treated, or the moderate to severe GPP in the patient is treated, or the signs and symptoms of an acute phase flare-up of GPP in the patient is reduced or alleviated, or the severity and duration of GPP flares in the patient is reduced, or the skin disorder associated with acute GPP in the patient is treated, or the GPP flares in a patient is prevented or inhibited, or the Generalized Pustular Psoriasis Global Assessment (GPPGA) score of 0 in the patient is achieved, or the complete resolution of GPP symptoms in the patient is achieved. In a related embodiment, the stable pharmaceutical formulation is an aqueous pharmaceutical formulation. In a related embodiment, the pH of the aqueous pharmaceutical formulation is about 5 to about 7. In a related embodiment, the pharmaceutical formulation is for an intravenous administration to the mammal or patient. In a related embodiment, the pharmaceutical formulation is for a subcutaneous administration to the mammal or patient. In a related embodiment, the pharmaceutical formulation for the intravenous administration comprises an anti-IL-36R antibody in an amount of about 60 mg/mL. In a related embodiment, the pharmaceutical formulation for a subcutaneous administration comprises an anti-IL-36R antibody in an amount of about 150 mg/mL. In a related embodiment, the anti-IL-36R antibody comprising: (i) a light chain including an amino acid sequence set forth as SEQ ID NO:118 and a heavy chain including an amino acid sequence set forth as SEQ ID NO:125; or (ii) a light chain including an amino acid sequence set forth as SEQ ID NO:118 and a heavy chain including an amino acid sequence set forth as SEQ ID NO:126; or (iii) a light chain including an amino acid sequence set forth as SEQ ID NO:118 and a heavy chain including an amino acid sequence set forth as SEQ ID NO:127. In a related embodiment, the anti-IL-36R antibody comprising: a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89.

In one embodiment, the method of treatment according to any of the preceding aspects, comprises administering to the mammal or patient a therapeutic amount of a stable pharmaceutical formulation selected from the group consisting of:

I. formulation including about 20 mg/mL to about 150 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0;
II. formulation including about 20 mg/mL to about 150 mg/mL of the anti-IL-36R antibody, about 45 mM acetate, about 150 mM sucrose, about 25 mM L-Arginine, about 0.4 g/L Polysorbate 20, with a pH of about 5.5;
III. formulation including about 20 mg/mL to about 150 mg/mL of the anti-IL-36R antibody, about 45 mM acetate, about 180 mM sucrose, about 25 mM Glycine, about 0.4 g/L Polysorbate 80, with a pH of about 5.5;
IV. formulation including about 20 mg/mL to about 150 mg/mL of the anti-IL-36R antibody, about 25 mM citrate, about 150 mM trehalose, about 25 mM methionine, about 0.2 g/L Polysorbate 20, with a pH of about 6.0;
V. formulation including about 20 mg/mL to about 150 mg/mL of the anti-IL-36R antibody, about 25 mM histidine, about 180 mM sucrose, about 20 mM mannitol, about 0.2 g/L Polysorbate 20, with a pH of about 6.5;
VI. formulation including about 20 mg/mL to about 150 mg/mL of the anti-IL-36R antibody, about 25 mM citrate, about 200 mM sucrose, about 0.4 g/L Polysorbate 80, with a pH of about 6.5;
VII. formulation including about 20 mg/mL to about 150 mg/mL of the anti-IL-36R antibody, about 45 mM acetate, about 150 mM sucrose, about 25 mM L-Arginine, about 0.4 g/L Polysorbate 20, with a pH of about 5.5;
VIII. formulation including about 20 mg/mL to about 150 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0;
IX. formulation including about 20 mg/mL to about 150 mg/mL of the anti-IL-36R antibody, about 25 mM acetate, about 100 mM mannitol, about 50 mM NaCl, about 0.2 g/L Polysorbate 20, with a pH of about 5.5;
X. formulation including about 20 mg/mL to about 150 mg/mL of the anti-IL-36R antibody, about 20 mM succinate, about 220 mM sucrose, about 0.1 g/L Polysorbate 80, with a pH of about 6.0; and
XI. formulation including about 20 mg/mL to about 150 mg/mL of the anti-IL-36R antibody, about 25 mM citrate, about 0.4 g/L Polysorbate 20, with a pH of about 6.5, wherein the generalized pustular psoriasis (GPP) in the patient is treated, or the moderate to severe GPP in the patient is treated, or the signs and symptoms of an acute phase flare-up of GPP in the patient is reduced or alleviated, or the severity and duration of GPP flares in the patient is reduced, or the skin disorder associated with acute GPP in the patient is treated, or the GPP flares in a patient is prevented or inhibited, or the Generalized Pustular Psoriasis Global Assessment (GPPGA) score of 0 in the patient is achieved, or the complete resolution of GPP symptoms in the patient is achieved. In a related embodiment, the stable pharmaceutical formulation is an aqueous pharmaceutical formulation. In a related embodiment, the pharmaceutical formulation is for an intravenous administration to the mammal or patient. In a related embodiment, the pharmaceutical formulation is for a subcutaneous administration to the mammal or patient. In a related embodiment, the pharmaceutical formulation for an intravenous administration comprises an anti-IL-36R antibody in an amount of about 60 mg/mL. In a related embodiment, the pharmaceutical formulation for a subcutaneous administration comprises an anti-IL-36R antibody in an amount of about 150 mg/mL. In a related embodiment, the anti-IL-36R antibody comprising: (i) a light chain including an amino acid sequence set forth as SEQ ID NO:118 and a heavy chain including an amino acid sequence set forth as SEQ ID NO:125; or (ii) a light chain including an amino acid sequence set forth as SEQ ID NO:118 and a heavy chain including an amino acid sequence set forth as SEQ ID NO:126; or (iii) a light chain including an amino acid sequence set forth as SEQ ID NO:118 and a heavy chain including an amino acid sequence set forth as SEQ ID NO:127. In a related embodiment, the anti-IL-36R antibody comprising: a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89.

In one embodiment, the method of treatment according to any of the preceding aspects, comprises administering to the mammal or patient a therapeutic amount of a stable pharmaceutical formulation selected from the group consisting of consisting of:
I. formulation including about 20 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0;
II. formulation including about 60 mg/mL of the anti-IL-36R antibody, about 45 mM acetate, about 150 mM sucrose, about 25 mM L-Arginine, about 0.4 g/L Polysorbate 20, with a pH of about 5.5;
III. formulation including about 20 mg/mL of the anti-IL-36R antibody, about 45 mM acetate, about 180 mM sucrose, about 25 mM Glycine, about 0.4 g/L Polysorbate 80, with a pH of about 5.5;
IV. formulation including about 150 mg/mL of the anti-IL-36R antibody, about 25 mM citrate, about 150 mM trehalose, about 25 mM methionine, about 0.2 g/L Polysorbate 20, with a pH of about 6.0;
V. formulation including about 150 mg/mL of the anti-IL-36R antibody, about 25 mM histidine, about 180 mM sucrose, about 20 mM mannitol, about 0.2 g/L Polysorbate 20, with a pH of about 6.5;
VI. formulation including about 20 mg/mL of the anti-IL-36R antibody, about 25 mM citrate, about 200 mM sucrose, about 0.4 g/L Polysorbate 80, with a pH of about 6.5;
VII. formulation including about 150 mg/mL of the anti-IL-36R antibody, about 45 mM acetate, about 150 mM sucrose, about 25 mM L-Arginine, about 0.4 g/L Polysorbate 20, with a pH of about 5.5;
VIII. formulation including about 15 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0;

IX. formulation including about 80 mg/mL of the anti-IL-36R antibody, about 25 mM acetate, about 100 mM mannitol, about 50 mM NaCl, about 0.2 g/L Polysorbate 20, with a pH of about 5.5;

X. formulation including about 100 mg/mL of the anti-IL-36R antibody, about 20 mM succinate, about 220 mM sucrose, about 0.1 g/L Polysorbate 80, with a pH of about 6.0; and XI. formulation including about 60 mg/mL of the anti-IL-36R antibody, about 25 mM citrate, about 0.4 g/L Polysorbate 20, with a pH of about 6.5, wherein the generalized pustular psoriasis (GPP) in the patient is treated, or the moderate to severe GPP in the patient is treated, or the signs and symptoms of an acute phase flare-up of GPP in the patient is reduced or alleviated, or the severity and duration of GPP flares in the patient is reduced, or the skin disorder associated with acute GPP in the patient is treated, or the GPP flares in a patient is prevented or inhibited, or a Generalized Pustular Psoriasis Global Assessment (GPPGA) score of 0 in the patient is achieved, or the complete resolution of GPP symptoms in the patient is achieved. In a related embodiment, the stable pharmaceutical formulation is an aqueous pharmaceutical formulation. In a related embodiment, the pharmaceutical formulation is for an intravenous administration to the mammal or patient. In a related embodiment, the pharmaceutical formulation is for a subcutaneous administration to the mammal or patient. In a related embodiment, the pharmaceutical formulation for an intravenous administration comprises an anti-IL-36R antibody in an amount of about 60 mg/mL. In a related embodiment, the pharmaceutical formulation for a subcutaneous administration comprises an anti-IL-36R antibody in an amount of about 150 mg/mL. In a related embodiment, the anti-IL-36R antibody comprising: (i) a light chain including an amino acid sequence set forth as SEQ ID NO:118 and a heavy chain including an amino acid sequence set forth as SEQ ID NO:125; or (ii) a light chain including an amino acid sequence set forth as SEQ ID NO:118 and a heavy chain including an amino acid sequence set forth as SEQ ID NO:126; or (iii) a light chain including an amino acid sequence set forth as SEQ ID NO:118 and a heavy chain including an amino acid sequence set forth as SEQ ID NO:127. In a related embodiment, the anti-IL-36R antibody comprising: a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89. In a tenth aspect, the present invention relates to a method of treating GPP in a patient, including (a) obtaining a biological sample from said patient, wherein the biological sample is obtained from source including lesional skin or whole blood;

(b) determining the gene express profile of one or more of genes;

(c) administering to the patient an effective amount of the anti-IL-36R antibody according to any embodiments relating to aspects first to fifth.

In one embodiment relating to aspect tenth, the one or more of genes are IL12B, IL1B, IL6, CXCL1, IL23A, TNF, IL17C, IL24 or IL1B in lesional skin, and IL1B, S100A9, S100A12, S100A8, MMP25, MMP9 or CD177 in whole blood.

In an embodiment relating to any of the above aspects, the anti-IL-36R antibody includes: a) a light chain variable region comprising the amino acid sequence of SEQ ID NO: 26 (L-CDR1); the amino acid sequence of SEQ ID NO: 35, 102, 103, 104, 105 106 or 140 (L-CDR2); the amino acid sequence of SEQ ID NO: 44 (L-CDR3); and b) a heavy chain variable region comprising the amino acid sequence of SEQ ID NO: 53 (H-CDR1); the amino acid sequence of SEQ ID NO: 62, 108, 109, 110 or 111 (H-CDR2); the amino acid sequence of SEQ ID NO: 72 (H-CDR3).

In an embodiment relating to any of the above aspects, the anti-IL36R antibody is an anti-IL-36R antibody of the present invention. In one embodiment, the anti-IL36R antibody is disclosed in U.S. Pat. No. 9,023,995 or WO2013/074569. In an embodiment relating to any of the above aspects, the improved effects (including the remission or improved symptoms) last for 4, 5, 6, 7, 8, 9, 10, 11, 12, 13, 14, 15, 16, 17, 18, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, or 52 weeks following the administration of a single dose of an anti-IL-36R antibody of the present invention.

Pharmaceutical Compositions and Administration Thereof

The antibodies of the present invention can be administered either alone or in combination with other agents. Examples of antibodies for use in such pharmaceutical compositions are those that comprise an antibody or antibody fragment having the light chain variable region amino acid sequence of any of SEQ ID NO: 1-10. Examples of antibodies for use in such pharmaceutical compositions are also those that comprise a humanized antibody or antibody fragment having the heavy chain variable region amino acid sequence of any of SEQ ID NO: 11-20.

Further examples of antibodies for use in such pharmaceutical compositions are also those that comprise a humanized antibody or antibody fragment having the light chain variable region amino acid sequence of any of SEQ ID NO:76-86. Preferred antibodies for use in such pharmaceutical compositions are also those that comprise a humanized antibody or antibody fragment having the heavy chain variable region amino acid sequence of any of SEQ ID NO:87-101.

Further examples of antibodies for use in such pharmaceutical compositions are also those that comprise a humanized antibody or antibody fragment having the light chain variable region and heavy chain variable region of any of SEQ ID NO: 77 and 89, SEQ ID NO: 80 and 88, SEQ ID NO: 80 and 89, SEQ ID NO: 77 and 87, SEQ ID NO: 77 and 88, SEQ ID NO: 80 and 87, SEQ ID NO: 86 and 100, SEQ ID NO: 85 and 101, or SEQ ID NO: 85 and 10.

Further examples of antibodies for use in such pharmaceutical compositions are also those that comprise a humanized antibody having the light chain region amino acid sequence of any of SEQ ID NO:115, 118, 123 or 124.

Preferred antibodies for use in such pharmaceutical compositions are also those that comprise humanized antibody having the heavy chain variable region amino acid sequence of any of SEQ ID NO:125, 126, 127, 138 or 139.

Further examples of antibodies for use in such pharmaceutical compositions are also those that comprise Antibody B1, Antibody B2, Antibody B3, Antibody B4, Antibody B5, Antibody B6, Antibody C1, Antibody C2 or Antibody C3.

Various delivery systems are known and can be used to administer the IL-36R binding agent. Methods of introduction include but are not limited to intradermal, intramuscular, intraperitoneal, intravenous, subcutaneous, intranasal, epidural, and oral routes. The IL-36R binding agent can be administered, for example by infusion, bolus or injection, and can be administered together with other biologically active agents such as chemotherapeutic agents. Administration can be systemic or local. In preferred embodiments, the administration is by subcutaneous injection. Formulations for such injections may be prepared in for example prefilled syringes that may be administered once every other week.

In one aspect, the invention provides an article of manufacture comprising a subcutaneous administration device, which delivers to a patient a fixed dose of an antibody of the present invention. In some embodiments, the subcutaneous administration device is a pre-filled syringe, an autoinjector, or a large volume infusion device. For example, MyDose™ product from Roche, a single use infusion device that enables the subcutaneous administration of large quantities of liquid medication, may be used as the administration device. Numerous reusable pen and autoinjector delivery devices have applications in the subcutaneous delivery of a pharmaceutical composition of the present invention. Examples include, but are not limited to AUTOPEN™ (Owen Mumford, Inc., Woodstock, UK), DISETRONIC™ pen (Disetronic Medical Systems, Bergdorf, Switzerland), HUMALOG MIX 75/25™ pen, HUMALOG™ pen, HUMALIN 70/30™ pen (Eli Lilly and Co., Indianapolis, Ind.), NOVOPEN™ I, II and III (Novo Nordisk, Copenhagen, Denmark), NOVOPEN JUNIOR™ (Novo Nordisk, Copenhagen, Denmark), BD™ pen (Becton Dickinson, Franklin Lakes, N.J.), OPTIPEN™, OPTIPEN PRO™, OPTIPEN STARLET™, and OPTICLIK™ (Sanofi-Aventis, Frankfurt, Germany), to name only a few. Examples of disposable pen delivery devices having applications in subcutaneous delivery of a pharmaceutical composition of the present invention include, but are not limited to the SOLOSTAR™ pen (Sanofi-Aventis), the FLEXPEN™ (Novo Nordisk), and the KWIKPEN™ (Eli Lilly), the SURECLICK™ Autoinjector (Amgen, Thousand Oaks, Calif.), the PENLET™ (Haselmeier, Stuttgart, Germany), the EPIPEN (Dey, L.P.), and the HUMIRA™ Pen (Abbott Labs, Abbott Park Ill.), YPSOMATE™ YPSOMATE 2.25™, VAIROJECT™ (Ypsomed AG, Burgdorf, Switzerland) to name only a few. Additional information relating to example delivery devices that could be used with an antibody of the present invention may be found, for example, in CH705992A2, WO2009/040602, WO2016/169748, WO2016/179713.

In specific embodiments, the IL-36R binding agent composition is administered by injection, by means of a catheter, by means of a suppository, or by means of an implant, the implant being of a porous, non-porous, or gelatinous material, including a membrane, such as a sialastic membrane, or a fiber. Typically, when administering the composition, materials to which the anti-IL-36R antibody or agent does not absorb are used.

In other embodiments, the anti-IL-36R antibody or agent is delivered in a controlled release system. In one embodiment, a pump may be used (see, e.g., Langer, 1990, Science 249:1527-1533; Sefton, 1989, CRC Crit. Ref. Biomed. Eng. 14:201; Buchwald et al., 1980, Surgery 88:507; Saudek et al., 1989, N. Engl. J. Med. 321:574). In another embodiment, polymeric materials can be used. (See, e.g., Medical Applications of Controlled Release (Langer and Wise eds., CRC Press, Boca Raton, Fla., 1974); Controlled Drug Bioavailability, Drug Product Design and Performance (Smolen and Ball eds., Wiley, New York, 1984); Ranger and Peppas, 1983, Macromol. Sci. Rev. Macromol. Chem. 23:61. See also Levy et al., 1985, Science 228:190; During et al., 1989, Ann. Neurol. 25:351; Howard et al., 1989, J. Neurosurg. 71:105.) Other controlled release systems are discussed, for example, in Langer, supra.

An IL-36R binding agent (e.g., an anti-IL-36R antibody) can be administered as pharmaceutical compositions comprising a therapeutically effective amount of the binding agent and one or more pharmaceutically compatible ingredients.

In one embodiment, the anti-IL-36R antibody or an antigen binding fragment thereof (disclosed herein) is present in a pharmaceutical formulation (as described in co-pending U.S. provisional application No. 62/815,405, filed Mar. 8, 2019, the entire content of which is hereby incorporated herein by reference in its entirety) suitable for administration to a mammal or patient according to any one of the aspects described herein. Various examples to this embodiment are described as numbered clauses (1, 2, 3, etc.) below for convenience. These are provided as examples and do not limit the subject technology. It is noted that any of the dependent clauses may be combined in any combination, and placed into a respective independent clause, e.g., clause 1. The other clauses can be presented in a similar manner.

1. A pharmaceutical formulation including:
    a. An anti-IL-36R antibody or an antigen binding fragment thereof, as disclosed herein, present at a concentration within the range from about 0.5 mg/mL to about 220 mg/mL; and
    b. A pharmaceutically acceptable buffer present at a concentration within the range from about 20 mM to about 80 mM;
    wherein the formulation is characterized by a pH within the range from about 5 to about 8 when in aqueous form.
2. The formulation of clause 1, wherein the formulation is in liquid or powder form.
3. The formulation of clause 1, wherein the anti-IL-36R antibody is present at a concentration of within the range from about 10 mg/mL to about 200 mg/mL.
4. The formulation of clause 1, wherein the anti-IL-36R antibody is present at a concentration of about 20 mg/mL.
5. The formulation of clause 1, wherein the anti-IL-36R antibody is present at a concentration of about 60 mg/mL.
6. The formulation of clause 1, wherein the anti-IL-36R antibody is present at a concentration of about 150 mg/mL.
7. The formulation of clause 1, wherein the buffer comprises histidine, phosphate, succinate, citrate, acetate or TRIS.
8. The formulation of clause 1, wherein the buffer comprises citrate or acetate.
9. The formulation of clause 1, wherein the buffer comprises histidine.
10. The formulation of clause 1, wherein the buffer comprises acetate.

11. The formulation of clause 1, wherein the formulation further comprises a pharmaceutically acceptable tonicifying agent present at a concentration within the range from about 100 mM to about 250 mM.
12. The formulation of clause 11, wherein the tonicifying agent is one or more sugar and/or polyol.
13. The formulation of clause 11, wherein the tonicifying agent is one or more sugar and/or polyol including sucrose, trehalose, sorbitol, magnesium sulfate ($MgSO_4$), glycerol, mannitol or dextrose.
14. The formulation of clause 11, wherein the tonicifying agent comprises sucrose or trehalose.
15. The formulation of clause 11, wherein the tonicifying agent comprises sucrose.
16. The formulation of clause 11, wherein the tonicifying agent comprises trehalose.
17. The formulation of clause 1, wherein the formulation further comprises a pharmaceutically acceptable stabilizer present at a concentration within the range from about 0 mM to about 80 mM.
18. The formulation of clause 17, wherein the stabilizer comprises an amino acid including arginine, histidine, glycine, cysteine, proline, methionine, lysine, aspartate, glutamate or pharmaceutically acceptable salts thereof.
19. The formulation of clause 17, wherein the stabilizer comprises L-arginine or pharmaceutically acceptable salts thereof.
20. The formulation of clause 1, wherein the formulation further comprises a pharmaceutically acceptable salt present at a concentration of within the range from about 0 to about 150 mM.
21. The formulation of clause 20, wherein the salt comprises sodium chloride (NaCl), magnesium chloride ($MgCl_2$), potassium chloride (KCl), lithium chloride (LiCl), calcium chloride ($CaCl_2$)), boric acid salts or zinc chloride ($ZnCl_2$).
22. The formulation of clause 20, wherein the salt comprises sodium chloride (NaCl).
23. The formulation of clause 1, wherein the formulation further comprises a pharmaceutically acceptable surfactant present at a concentration within the range from about 0 g/L to about 1.5 g/L.
24. The formulation of clause 23, wherein the surfactant comprises poloxamer 188, polysorbate 20, polysorbate 40, polysorbate 60 or polysorbate 80.
25. The formulation of clause 23, wherein the surfactant comprises polysorbate 20, polysorbate 40, polysorbate 60 or polysorbate 80.
26. The formulation of clause 23, wherein the surfactant comprises polysorbate 20.
27. The formulation of clause 23, wherein the surfactant comprises polysorbate 80.
28. A pharmaceutical formulation including:
   a. an anti-IL-36R antibody or an antigen binding fragment thereof, as disclosed herein, present at a concentration within the range from about 10 mg/mL to about 200 mg/mL;
   b. an acetate and/or histidine buffer present at a concentration within the range from about 20 mM to about 80 mM;
   c. sucrose and-/-or trehalose present at a concentration within the range from about 100 mM to about 250 mM;
   d. L-arginine and-/-or pharmaceutically acceptable salts thereof present at a concentration within the range from about 0 mM to about 80 mM;
   e. sodium chloride (NaCl) present at a concentration of within the range from about 0 to about 150 mM; and
   f. polysorbate 20 and/or polysorbate 80 present at a concentration within the range from about 0 g/L to about 1.5 g/L;
   wherein the formulation is characterized by a pH within the range from about 5 to about 7 when in aqueous form.
29. A pharmaceutical formulation including:
   a. an anti-IL-36R antibody or an antigen binding fragment thereof, as disclosed herein, present at a concentration of about 20 mg/mL;
   b. an citrate buffer present at a concentration at a concentration of about 25 mM;
   c. sucrose and/or trehalose present at a concentration of about 200 mM;
   d. polysorbate 80 present at a concentration of about 0.4 g/L;
   wherein the formulation is characterized by a pH within the range from about 6 to about 7 when in aqueous form.
30. A pharmaceutical formulation including:
   a. an anti-IL-36R antibody or an antigen binding fragment thereof, as disclosed herein, present at a concentration of about 60 mg/mL;
   b. an acetate buffer present at a concentration at a concentration of about 45 mM;
   c. sucrose and/or trehalose present at a concentration of about 150 mM;
   d. L-arginine or pharmaceutically acceptable salts thereof present at a concentration of about 25 mM; and
   e. polysorbate 20 present at a concentration of about 0.4 g/L;
   wherein the formulation is characterized by a pH within the range from about 5 to about 6 when in aqueous form.
31. A pharmaceutical formulation including:
   a. an anti-IL-36R antibody or an antigen binding fragment thereof, as disclosed herein, present at a concentration of about 150 mg/mL;
   b. an acetate buffer present at a concentration at a concentration of about 45 mM;
   c. sucrose or trehalose present at a concentration of about 150 mM;
   d. L-arginine or pharmaceutically acceptable salts thereof present at a concentration of about 25 mM; and
   e. polysorbate 20 present at a concentration of about 0.4 g/L;
   wherein the formulation is characterized by a pH within the range from about 5 to about 6 when in aqueous form.
32. The pharmaceutical formulation of any one of clauses 1-31, wherein the formulation is characterized by an osmolality within the range from about 210 mOsmol/kg to about 390 mOsm/kg.
33. The pharmaceutical formulation of any one of clauses 1-32, wherein less than about 5% of the antibody is present in an aggregate form in the formulation.
34. The pharmaceutical formulation of any one of clauses 1-33, wherein the formulation is sterile.
35. The pharmaceutical formulation of any one of clauses 1-34, wherein the formulation is stable upon freezing and thawing.

36. The pharmaceutical formulation of any of clauses 1-35, wherein the formulation comprises water or is reconstituted with water.
37. The pharmaceutical formulation of any of clauses 1-36, wherein the formulation has a pH of between about 5 to about 6 in liquid form or when reconstituted with water.
38. The pharmaceutical formulation of any of clauses 1-37, wherein the formulation has a pH of about 6 in liquid or when reconstituted with water.
39. The pharmaceutical formulation of any of clauses 1-37, wherein the formulation has at least one feature selected from the group consisting of:
    (i) Increased shelf life
    (ii) better temperature stability,
    (iii) decreased formation of aggregates,
    (iv) better chemical stability,
    (v) decreased viscosity, and
    as compared to a reference formulation.
40. The pharmaceutical formulation of any of clauses 1-37, wherein the formulation having at least one feature selected from the group consisting of:
    (a) decreased percentage of aggregates as measured by High Performance Size Exclusion Chromatography (HP-SEC),
    (b) higher percentage of monomers as measured by HP-SEC,
    (c) higher percentage of main peak (less degradation of charge variants) measured by CEX,
    (d) lower percentage of subvisual particles such as ≥10 μm and ≥25 μm, and
    (e) lower turbidity value in Formazin Nephelometry Units (FNU), after storage at about 40° C. as compared to the reference formulation.
41. A pharmaceutical formulation including:
    an anti-IL-36R antibody or antigen-binding fragment thereof, including:
        i. a light chain including an amino acid sequence set forth as SEQ ID NO:118 and a heavy chain including an amino acid sequence set forth as SEQ ID NO:125; or
        ii. a light chain including an amino acid sequence set forth as SEQ ID NO:118 and a heavy chain including an amino acid sequence set forth as SEQ ID NO:126; or
        iii. a light chain including an amino acid sequence set forth as SEQ ID NO:118 and a heavy chain including an amino acid sequence set forth as SEQ ID NO:127;
        wherein the formulation is selected from the group consisting of:
        I. formulation including about 20 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0;
        II. formulation including about 60 mg/mL of the anti-IL-36R antibody, about 45 mM acetate, about 150 mM sucrose, about 25 mM L-Arginine, about 0.4 g/L Polysorbate 20, with a pH of about 5.5;
        III. formulation including about 20 mg/mL of the anti-IL-36R antibody, about 45 mM acetate, about 180 mM sucrose, about 25 mM Glycine, about 0.4 g/L Polysorbate 80, with a pH of about 5.5;
        IV. formulation including about 150 mg/mL of the anti-IL-36R antibody, about 25 mM citrate, about 150 mM trehalose, about 25 mM methionine, about 0.2 g/L Polysorbate 20, with a pH of about 6.0;
        V. formulation including about 150 mg/mL of the anti-IL-36R antibody, about 25 mM histidine, about 180 mM sucrose, about 20 mM mannitol, about 0.2 g/L Polysorbate 20, with a pH of about 6.5;
        VI. formulation including about 20 mg/mL of the anti-IL-36R antibody, about 25 mM citrate, about 200 mM sucrose, about 0.4 g/L Polysorbate 80, with a pH of about 6.5;
        VII. formulation including about 150 mg/mL of the anti-IL-36R antibody, about 45 mM acetate, about 150 mM sucrose, about 25 mM L-Arginine, about 0.4 g/L Polysorbate 20, with a pH of about 5.5;
        VIII. formulation including about 15 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0;
        IX. formulation including about 80 mg/mL of the anti-IL-36R antibody, about 25 mM acetate, about 100 mM mannitol, about 50 mM NaCl, about 0.2 g/L Polysorbate 20, with a pH of about 5.5;
        X. formulation including about 100 mg/mL of the anti-IL-36R antibody, about 20 mM succinate, about 220 mM sucrose, about 0.1 g/L Polysorbate 80, with a pH of about 6.0; and
        XI. formulation including about 60 mg/mL of the anti-IL-36R antibody, about 25 mM citrate, about 0.4 g/L Polysorbate 20, with a pH of about 6.5.
42. A pharmaceutical formulation including:
    an anti-IL-36R antibody or antigen-binding fragment thereof, including:
        i. a light chain including an amino acid sequence set forth as SEQ ID NO:118 and a heavy chain including an amino acid sequence set forth as SEQ ID NO:125; or
        ii. a light chain including an amino acid sequence set forth as SEQ ID NO:118 and a heavy chain including an amino acid sequence set forth as SEQ ID NO:126; or
        iii. a light chain including an amino acid sequence set forth as SEQ ID NO:118 and a heavy chain including an amino acid sequence set forth as SEQ ID NO:127;
        wherein the formulation includes about 20 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0.
43. A pharmaceutical formulation including:
    an anti-IL-36R antibody or antigen-binding fragment thereof, including:
        i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 60 mg/mL of the anti-IL-36R antibody, about 45 mM acetate, about 150 mM sucrose, about 25 mM L-Arginine, about 0.4 g/L Polysorbate 20, with a pH of about 5.5.

44. A pharmaceutical formulation including:

an anti-IL-36R antibody or antigen-binding fragment thereof, including:

i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 20 mg/mL of the anti-IL-36R antibody, about 45 mM acetate, about 180 mM sucrose, about 25 mM Glycine, about 0.4 g/L Polysorbate 80, with a pH of about 5.5.

45. A pharmaceutical formulation including:

an anti-IL-36R antibody or antigen-binding fragment thereof, including:

i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 150 mg/mL of the anti-IL-36R antibody, about 25 mM citrate, about 150 mM trehalose, about 25 mM methionine, about 0.2 g/L Polysorbate 20, with a pH of about 6.0.

46. A pharmaceutical formulation including:

an anti-IL-36R antibody or antigen-binding fragment thereof, including:

i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 150 mg/mL of the anti-IL-36R antibody, about 25 mM histidine, about 180 mM sucrose, about 20 mM mannitol, about 0.2 g/L Polysorbate 20, with a pH of about 6.5.

47. A pharmaceutical formulation including:

an anti-IL-36R antibody or antigen-binding fragment thereof, including:

i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 20 mg/mL of the anti-IL-36R antibody, about 25 mM citrate, about 200 mM sucrose, about 0.4 g/L Polysorbate 80, with a pH of about 6.5.

48. A pharmaceutical formulation including:

an anti-IL-36R antibody or antigen-binding fragment thereof, including:

i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 150 mg/mL of the anti-IL-36R antibody, about 45 mM acetate, about 150 mM sucrose, about 25 mM L-Arginine, about 0.4 g/L Polysorbate 20, with a pH of about 5.5.

49. A pharmaceutical formulation including:

an anti-IL-36R antibody or antigen-binding fragment thereof, including:

i. a light chain including an amino acid sequence set forth as SEQ ID NO:118 and a heavy chain including an amino acid sequence set forth as SEQ ID NO:125; or ii. a light chain including an amino acid sequence set forth as SEQ ID NO:118 and a heavy chain including an amino acid sequence set forth as SEQ ID NO:126; or iii. a light chain including an amino acid sequence set forth as SEQ ID NO:118 and a heavy chain including an amino acid sequence set forth as SEQ ID NO:127;

wherein the formulation includes about 15 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0.
50. A pharmaceutical formulation including:
   an anti-IL-36R antibody or antigen-binding fragment thereof, including:
   i. a light chain including an amino acid sequence set forth as SEQ ID NO:118 and a heavy chain including an amino acid sequence set forth as SEQ ID NO:125; or
   ii. a light chain including an amino acid sequence set forth as SEQ ID NO:118 and a heavy chain including an amino acid sequence set forth as SEQ ID NO:126; or
   iii. a light chain including an amino acid sequence set forth as SEQ ID NO:118 and a heavy chain including an amino acid sequence set forth as SEQ ID NO:127;
      wherein the formulation includes about 80 mg/mL of the anti-IL-36R antibody, about 25 mM acetate, about 100 mM mannitol, about 50 mM NaCl, about 0.2 g/L Polysorbate 20, with a pH of about 5.5.
51. A pharmaceutical formulation including:
   an anti-IL-36R antibody or antigen-binding fragment thereof, including:
   i. a light chain including an amino acid sequence set forth as SEQ ID NO:118 and a heavy chain including an amino acid sequence set forth as SEQ ID NO:125; or
   ii. a light chain including an amino acid sequence set forth as SEQ ID NO:118 and a heavy chain including an amino acid sequence set forth as SEQ ID NO:126; or
   iii. a light chain including an amino acid sequence set forth as SEQ ID NO:118 and a heavy chain including an amino acid sequence set forth as SEQ ID NO:127;
      wherein the formulation includes about 100 mg/mL of the anti-IL-36R antibody, about 20 mM succinate, about 220 mM sucrose, about 0.1 g/L Polysorbate 80, with a pH of about 6.0.
52. A pharmaceutical formulation including:
   an anti-IL-36R antibody or antigen-binding fragment thereof, including:
   i. a light chain including an amino acid sequence set forth as SEQ ID NO:118 and a heavy chain including an amino acid sequence set forth as SEQ ID NO:125; or
   ii. a light chain including an amino acid sequence set forth as SEQ ID NO:118 and a heavy chain including an amino acid sequence set forth as SEQ ID NO:126; or
   iii. a light chain including an amino acid sequence set forth as SEQ ID NO:118 and a heavy chain including an amino acid sequence set forth as SEQ ID NO:127;
      wherein the formulation includes about 60 mg/mL of the anti-IL-36R antibody, about 25 mM citrate, about 0.4 g/L Polysorbate 20, with a pH of about 6.5.
53. A pharmaceutical formulation including:
   an anti-IL-36R antibody or antigen-binding fragment thereof, including:
   a light chain variable region comprising the amino acid sequence of SEQ ID NO: 77; and a heavy chain variable region comprising the amino acid sequence of SEQ ID NO: 87; or
   a light chain variable region comprising the amino acid sequence of SEQ ID NO: 77; and a heavy chain variable region comprising the amino acid sequence of SEQ ID NO: 88; or
   a light chain variable region comprising the amino acid sequence of SEQ ID NO: 77; and a heavy chain variable region comprising the amino acid sequence of SEQ ID NO: 89; or
   a light chain variable region comprising the amino acid sequence of SEQ ID NO: 80; and a heavy chain variable region comprising the amino acid sequence of SEQ ID NO: 87; or
   a light chain variable region comprising the amino acid sequence of SEQ ID NO: 80; and a heavy chain variable region comprising the amino acid sequence of SEQ ID NO: 88; or
   a light chain variable region comprising the amino acid sequence of SEQ ID NO: 80; and a heavy chain variable region comprising the amino acid sequence of SEQ ID NO: 89;
   wherein the formulation includes: about 20 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0.
54. A pharmaceutical formulation including:
   an anti-IL-36R antibody or antigen-binding fragment thereof, including:
   a light chain variable region comprising the amino acid sequence of SEQ ID NO: 77; and a heavy chain variable region comprising the amino acid sequence of SEQ ID NO: 87; or
   a light chain variable region comprising the amino acid sequence of SEQ ID NO: 77; and a heavy chain variable region comprising the amino acid sequence of SEQ ID NO: 88; or
   a light chain variable region comprising the amino acid sequence of SEQ ID NO: 77; and a heavy chain variable region comprising the amino acid sequence of SEQ ID NO: 89; or
   a light chain variable region comprising the amino acid sequence of SEQ ID NO: 80; and a heavy chain variable region comprising the amino acid sequence of SEQ ID NO: 87; or
   a light chain variable region comprising the amino acid sequence of SEQ ID NO: 80; and a heavy chain variable region comprising the amino acid sequence of SEQ ID NO: 88; or
   a light chain variable region comprising the amino acid sequence of SEQ ID NO: 80; and a heavy chain variable region comprising the amino acid sequence of SEQ ID NO: 89;
   wherein the formulation includes: about 60 mg/mL of the anti-IL-36R antibody, about 45 mM acetate, about 150 mM sucrose, about 25 mM L-Arginine, about 0.4 g/L Polysorbate 20, with a pH of about 5.5.
55. A pharmaceutical formulation including:
   an anti-IL-36R antibody or antigen-binding fragment thereof, including:
   a light chain variable region comprising the amino acid sequence of SEQ ID NO: 77; and a heavy chain variable region comprising the amino acid sequence of SEQ ID NO: 87; or
   a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 20 mg/mL of the anti-IL-36R antibody, about 45 mM acetate, about 180 mM sucrose, about 25 mM Glycine, about 0.4 g/L Polysorbate 80, with a pH of about 5.5.

56. A pharmaceutical formulation including:
an anti-IL-36R antibody or antigen-binding fragment thereof, including:
a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 150 mg/mL of the anti-IL-36R antibody, about 25 mM citrate, about 150 mM trehalose, about 25 mM methionine, about 0.2 g/L Polysorbate 20, with a pH of about 6.0.

57. A pharmaceutical formulation including:
an anti-IL-36R antibody or antigen-binding fragment thereof, including:
a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 150 mg/mL of the anti-IL-36R antibody, about 25 mM histidine, about 180 mM sucrose, about 20 mM mannitol, about 0.2 g/L Polysorbate 20, with a pH of about 6.5.

58. A pharmaceutical formulation including:
an anti-IL-36R antibody or antigen-binding fragment thereof, including:
a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 20 mg/mL of the anti-IL-36R antibody, about 25 mM citrate, about 200 mM sucrose, about 0.4 g/L Polysorbate 80, with a pH of about 6.5.

59. A pharmaceutical formulation including:
an anti-IL-36R antibody or antigen-binding fragment thereof, including:
a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 150 mg/mL of the anti-IL-36R antibody, about 45 mM acetate, about 150 mM sucrose, about 25 mM L-Arginine, about 0.4 g/L Polysorbate 20, with a pH of about 5.5.

60. A pharmaceutical formulation including:

an anti-IL-36R antibody or antigen-binding fragment thereof, including:

a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 15 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0.

61. A pharmaceutical formulation including:

an anti-IL-36R antibody or antigen-binding fragment thereof, including:

a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 80 mg/mL of the anti-IL-36R antibody, about 25 mM acetate, about 100 mM mannitol, about 50 mM NaCl, about 0.2 g/L Polysorbate 20, with a pH of about 5.5.

62. A pharmaceutical formulation including:

an anti-IL-36R antibody or antigen-binding fragment thereof, including:

a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 100 mg/mL of the anti-IL-36R antibody, about 20 mM succinate, about 220 mM sucrose, about 0.1 g/L Polysorbate 80, with a pH of about 6.0.

63. A pharmaceutical formulation including:

an anti-IL-36R antibody or antigen-binding fragment thereof, including:

a light chain variable region comprising the amino acid sequence of SEQ ID NO: 77; and a heavy chain variable region comprising the amino acid sequence of SEQ ID NO: 87; or a light chain variable region comprising the amino acid sequence of SEQ ID NO: 77; and a heavy chain variable region comprising the amino acid sequence of SEQ ID NO: 88; or a light chain variable region comprising the amino acid sequence of SEQ ID NO: 77; and a heavy chain variable region comprising the amino acid sequence of SEQ ID NO: 89; or a light chain variable region comprising the amino acid sequence of SEQ ID NO: 80; and a heavy chain variable region comprising the amino acid sequence of SEQ ID NO: 87; or a light chain variable region comprising the amino acid sequence of SEQ ID NO: 80; and a heavy chain variable region comprising the amino acid sequence of SEQ ID NO: 88; or a light chain variable region comprising the amino acid sequence of SEQ ID NO: 80; and a heavy chain variable region comprising the amino acid sequence of SEQ ID NO: 89;

wherein the formulation includes: about 60 mg/mL of the anti-IL-36R antibody, about 25 mM citrate, about 0.4 g/L Polysorbate 20, with a pH of about 6.5.

64. A pharmaceutical formulation including:
an anti-IL-36R antibody or antigen-binding fragment thereof, including:
i. a light chain including an amino acid sequence set forth as SEQ ID NO:118 and a heavy chain including an amino acid sequence set forth as SEQ ID NO:125; or
ii. a light chain including an amino acid sequence set forth as SEQ ID NO:118 and a heavy chain including an amino acid sequence set forth as SEQ ID NO:126; or
iii. a light chain including an amino acid sequence set forth as SEQ ID NO:118 and a heavy chain including an amino acid sequence set forth as SEQ ID NO:127;
wherein the formulation is selected from the group consisting of:
I. formulation including about 20 mg/mL to about 150 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0;
II. formulation including about 20 mg/mL to about 150 mg/mL of the anti-IL-36R antibody, about 45 mM acetate, about 150 mM sucrose, about 25 mM L-Arginine, about 0.4 g/L Polysorbate 20, with a pH of about 5.5;
III. formulation including about 20 mg/mL to about 150 mg/mL of the anti-IL-36R antibody, about 45 mM acetate, about 180 mM sucrose, about 25 mM Glycine, about 0.4 g/L Polysorbate 80, with a pH of about 5.5;
IV. formulation including about 20 mg/mL to about 150 mg/mL of the anti-IL-36R antibody, about 25 mM citrate, about 150 mM trehalose, about 25 mM methionine, about 0.2 g/L Polysorbate 20, with a pH of about 6.0;
V. formulation including about 20 mg/mL to about 150 mg/mL of the anti-IL-36R antibody, about 25 mM histidine, about 180 mM sucrose, about 20 mM mannitol, about 0.2 g/L Polysorbate 20, with a pH of about 6.5;
VI. formulation including about 20 mg/mL to about 150 mg/mL of the anti-IL-36R antibody, about 25 mM citrate, about 200 mM sucrose, about 0.4 g/L Polysorbate 80, with a pH of about 6.5;
VII. formulation including about 20 mg/mL to about 150 mg/mL of the anti-IL-36R antibody, about 45 mM acetate, about 150 mM sucrose, about 25 mM L-Arginine, about 0.4 g/L Polysorbate 20, with a pH of about 5.5;
VIII. formulation including about 20 mg/mL to about 150 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0;
IX. formulation including about 20 mg/mL to about 150 mg/mL of the anti-IL-36R antibody, about 25 mM acetate, about 100 mM mannitol, about 50 mM NaCl, about 0.2 g/L Polysorbate 20, with a pH of about 5.5;

X. formulation including about 20 mg/mL to about 150 mg/mL of the anti-IL-36R antibody, about 20 mM succinate, about 220 mM sucrose, about 0.1 g/L Polysorbate 80, with a pH of about 6.0; and
XI. formulation including about 20 mg/mL to about 150 mg/mL of the anti-IL-36R antibody, about 25 mM citrate, about 0.4 g/L Polysorbate 20, with a pH of about 6.5.

65. A pharmaceutical formulation including:
an anti-IL-36R antibody or antigen-binding fragment thereof, including:
a light chain variable region comprising the amino acid sequence of SEQ ID NO: 77; and a heavy chain variable region comprising the amino acid sequence of SEQ ID NO: 87; or
a light chain variable region comprising the amino acid sequence of SEQ ID NO: 77; and a heavy chain variable region comprising the amino acid sequence of SEQ ID NO: 88; or
a light chain variable region comprising the amino acid sequence of SEQ ID NO: 77; and a heavy chain variable region comprising the amino acid sequence of SEQ ID NO: 89; or
a light chain variable region comprising the amino acid sequence of SEQ ID NO: 80; and a heavy chain variable region comprising the amino acid sequence of SEQ ID NO: 87; or
a light chain variable region comprising the amino acid sequence of SEQ ID NO: 80; and a heavy chain variable region comprising the amino acid sequence of SEQ ID NO: 88; or
a light chain variable region comprising the amino acid sequence of SEQ ID NO: 80; and a heavy chain variable region comprising the amino acid sequence of SEQ ID NO: 89;
wherein the formulation is selected from the group consisting of:
I. formulation including about 20 mg/mL to about 150 mg/mL of the anti-IL-36R antibody, about 40 mM histidine, about 120 mM sucrose, about 50 mM L-Arginine, about 5 mM NaCl and about 1.0 g/L Polysorbate 20, with a pH of about 6.0;
II. formulation including about 20 mg/mL to about 150 mg/mL of the anti-IL-36R antibody, about 45 mM acetate, about 150 mM sucrose, about 25 mM L-Arginine, about 0.4 g/L Polysorbate 20, with a pH of about 5.5;
III. formulation including about 20 mg/mL to about 150 mg/mL of the anti-IL-36R antibody, about 45 mM acetate, about 180 mM sucrose, about 25 mM Glycine, about 0.4 g/L Polysorbate 80, with a pH of about 5.5;
IV. formulation including about 20 mg/mL to about 150 mg/mL of the anti-IL-36R antibody, about 25 mM citrate, about 150 mM trehalose, about 25 mM methionine, about 0.2 g/L Polysorbate 20, with a pH of about 6.0;
V. formulation including about 20 mg/mL to about 150 mg/mL of the anti-IL-36R antibody, about 25 mM histidine, about 180 mM sucrose, about 20 mM mannitol, about 0.2 g/L Polysorbate 20, with a pH of about 6.5;
VI. formulation including about 20 mg/mL to about 150 mg/mL of the anti-IL-36R antibody, about 25 mM citrate, about 200 mM sucrose, about 0.4 g/L Polysorbate 80, with a pH of about 6.5;

VII. formulation including about 20 mg/mL to about 150 mg/mL of the anti-IL-36R antibody, about 45 mM acetate, about 150 mM sucrose, about 25 mM L-Arginine, about 0.4 g/L Polysorbate 20, with a pH of about 5.5;

VIII. formulation including about 20 mg/mL to about 150 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0;

IX. formulation including about 20 mg/mL to about 150 mg/mL of the anti-IL-36R antibody, about 25 mM acetate, about 100 mM mannitol, about 50 mM NaCl, about 0.2 g/L Polysorbate 20, with a pH of about 5.5;

X. formulation including about 20 mg/mL to about 150 mg/mL of the anti-IL-36R antibody, about 20 mM succinate, about 220 mM sucrose, about 0.1 g/L Polysorbate 80, with a pH of about 6.0; and XI. formulation including about 20 mg/mL to about 150 mg/mL of the anti-IL-36R antibody, about 25 mM citrate, about 0.4 g/L Polysorbate 20, with a pH of about 6.5.

66. A pharmaceutical product including a vial or syringe including the pharmaceutical formulation according to any of the preceding clauses for use in any one of the aspects of the present invention.

67. The pharmaceutical product according to clause 66 further including a pre-assembled injection device.

68. The pharmaceutical product of clause 67 wherein the pre-assembled injection device is an autoinjector or a syringe with or without a needle safety device.

69. A pre-assembled injection device including a pharmaceutical formulation according to any of the preceding clauses for use in any one of the aspects of the present invention.

70. The pre-assembled injection device according to clause 69, wherein said device is an autoinjector or a syringe with or without a needle safety device.

71. The pre-assembled injection device according to clause 69, wherein said formulation is suitable for intravenous, subcutaneous or intramuscular administration.

72. The pre-assembled injection device according to clause 70, wherein the autoinjector or the syringe with or without needle safety device includes a pharmaceutical formulation including:

an anti-IL-36R antibody or antigen-binding fragment thereof, including:
  i. a light chain including an amino acid sequence set forth as SEQ ID NO:118 and a heavy chain including an amino acid sequence set forth as SEQ ID NO:125; or
  ii. a light chain including an amino acid sequence set forth as SEQ ID NO:118 and a heavy chain including an amino acid sequence set forth as SEQ ID NO:126; or
  a light chain including an amino acid sequence set forth as SEQ ID NO:118 and a heavy chain including an amino acid sequence set forth as SEQ ID NO:127; wherein the formulation is selected from the group consisting of:
    I. formulation including about 20 mg/ml of the anti-IL-36R antibody, about 40 mM histidine, about 120 mM sucrose, about 50 mM L-Arginine, about 5 mM NaCl and about 1.0 g/L Polysorbate 20, with a pH of about 6.0;
    II. formulation including about 60 mg/mL of the anti-IL-36R antibody, about 45 mM acetate, about 150 mM sucrose, about 25 mM L-Arginine, about 0.4 g/L Polysorbate 20, with a pH of about 5.5;
    III. formulation including about 20 mg/mL of the anti-IL-36R antibody, about 45 mM acetate, about 180 mM sucrose, about 25 mM Glycine, about 0.4 g/L Polysorbate 80, with a pH of about 5.5;
    IV. formulation including about 150 mg/mL of the anti-IL-36R antibody, about 25 mM citrate, about 150 mM trehalose, about 25 mM methionine, about 0.2 g/L Polysorbate 20, with a pH of about 6.0;
    V. formulation including about 150 mg/mL of the anti-IL-36R antibody, about 25 mM histidine, about 180 mM sucrose, about 20 mM mannitol, about 0.2 g/L Polysorbate 20, with a pH of about 6.5;
    VI. formulation including about 20 mg/mL of the anti-IL-36R antibody, about 25 mM citrate, about 200 mM sucrose, about 0.4 g/L Polysorbate 80, with a pH of about 6.5;
    VII. formulation including about 150 mg/mL of the anti-IL-36R antibody, about 45 mM acetate, about 150 mM sucrose, about 25 mM L-Arginine, about 0.4 g/L Polysorbate 20, with a pH of about 5.5;
    VIII. formulation including about 15 mg/mL of the anti-IL-36R antibody, about 35 mM histidine, about 180 mM trehalose, about 25 mM L-Arginine, about 3 mM NaCl, about 0.4 g/L Polysorbate 80, with a pH of about 6.0;
    IX. formulation including about 80 mg/mL of the anti-IL-36R antibody, about 25 mM acetate, about 100 mM mannitol, about 50 mM NaCl, about 0.2 g/L Polysorbate 20, with a pH of about 5.5;
    X. formulation including about 100 mg/mL of the anti-IL-36R antibody, about 20 mM succinate, about 220 mM sucrose, about 0.1 g/L Polysorbate 80, with a pH of about 6.0; and
    XI. formulation including about 60 mg/mL of the anti-IL-36R antibody, about 25 mM citrate, about 0.4 g/L Polysorbate 20, with a pH of about 6.5.

73. The pre-assembled injection device according to clause 70, wherein the autoinjector or the syringe with a needle safety device includes:
  a. about 300 mg of the antibody in about 2 mL formulation volume; or
  b. about 225 mg of the antibody in about 1.5 mL formulation volume; or
  c. about 150 mg of the antibody in about 1 mL formulation volume; or
  d. about 75 mg of the antibody in about 0.5 mL formulation volume; or
  e. about 60 mg of the antibody in about 0.4 mL formulation volume.

74. The vial according to clause 66, wherein the vial includes:
  a. about 1200 mg of the antibody in about 20 mL formulation volume; or
  b. about 900 mg of the antibody in about 15 mL formulation volume; or c. about 600 mg of the antibody in about 10 mL formulation volume; or
d. about 300 mg of the antibody in about 150 mL formulation volume; or
e. about 1500 mg of the antibody in about 2.5 mL formulation volume.

75. A pharmaceutical product, including: a vial including about 100 mg to 1500 mg of an anti-IL-36R antibody in powder form; instructions for reconstitution of the anti-IL-36R antibody; and instructions for preparing the reconstituted antibody for infusion, wherein the anti-IL-36R antibody comprises a light chain including an amino acid sequence set forth as SEQ ID NO:118 and a heavy chain including an amino acid sequence set forth as any one of SEQ ID Nos:125, 126 or 127; and the reconstitution instructions require reconstitution with water for injection to an extractable volume from 1 to 50 mL.

Further, the pharmaceutical composition can be provided as a pharmaceutical kit comprising (a) a container containing a IL-36R binding agent (e.g., an anti-IL-36R antibody) in lyophilized form and (b) a second container containing a pharmaceutically acceptable diluent (e.g., sterile water) for injection. The pharmaceutically acceptable diluent can be used for reconstitution or dilution of the lyophilized anti-IL-36R antibody or agent. Optionally associated with such container(s) can be a notice in the form prescribed by a governmental agency regulating the manufacture, use or sale of pharmaceuticals or biological products, which notice reflects approval by the agency of manufacture, use or sale for human administration.

Such combination therapy administration can have an additive or synergistic effect on disease parameters (e.g., severity of a symptom, the number of symptoms, or frequency of relapse).

With respect to therapeutic regimens for combinatorial administration, in a specific embodiment, an anti-IL-36R antibody or IL-36R binding agent is administered concurrently with a therapeutic agent. In another specific embodiment, the therapeutic agent is administered prior or subsequent to administration of the anti-IL-36R antibody or IL-36R binding agent, by at least an hour and up to several months, for example at least an hour, five hours, 12 hours, a day, a week, a month, or three months, prior or subsequent to administration of the anti-IL-36R antibody or IL-36R binding agent.

The invention is further described in the following examples, which are not intended to limit the scope of the invention.

EXAMPLES

Example 1: IL-36 Receptor Inhibition for Treatment of Generalized Pustular Psoriasis An antibody of the present invention, i.e., an anti-IL-36R antibody of the present invention (disclosed herein and also in U.S. Pat. No. 9,023,995), is a humanized antagonistic monoclonal IgG1 antibody that blocks human IL36R signaling. Binding of an anti-IL-36R antibody of the present invention to IL36R is anticipated to prevent the subsequent activation of IL36R by cognate ligands (IL36 α, β and γ) and downstream activation of proinflammatory and pro-fibrotic pathways with the aim to reduce epithelial cell/fibroblast/immune cell-mediated inflammation and interrupt the inflammatory response that drives pathogenic cytokine production in generalized pustular psoriasis (GPP).

Preclinical profiles of an anti-IL-36R antibody of the present invention and clinical data from healthy volunteer trials suggest that an anti-IL-36R antibody of the present invention is safe, tolerable and may address an unmet medical need in GPP patients.

BACKGROUND

Mutations in IL36RN are strongly implicated in the pathogenesis of generalized pustular psoriasis. The efficacy and safety of an anti-IL-36R antibody of the present invention, a humanized monoclonal antibody inhibiting interleukin-36R signaling, was assessed in this single dose, open-label, proof-of-concept, phase I study in patients with acute generalized pustular psoriasis.

Methods

Seven patients, three of whom were IL36RN mutation-positive, received a single intravenous dose of 10 mg/kg an anti-IL-36R antibody of the present invention, and were monitored for 20 weeks. The primary endpoint was safety; efficacy endpoints included the proportion of patients with a Generalized Pustular Psoriasis Physician Global Assessment (GPPGA) score of 0 (clear) or 1 (almost clear), and percent change from baseline in Generalized Pustular Psoriasis Area and Severity Index (GPPASI) score at Week 2.

Results

An anti-IL-36R antibody of the present invention was well tolerated with no drug-related serious adverse events or safety signals. At Week 1, GPPGA score of 0 or 1 was achieved in five patients, and in all patients by Week 4. Within 48 hours, pustules were cleared in three patients, and in six patients by Week 2. A major improvement in GPPASI was observed in all patients with a mean (SD) percent change from baseline of 73.2% (16.2) at Week 2; by Week 4, this was further reduced to 82.0%. Efficacy was generally maintained up to 20 weeks.

CONCLUSIONS

Interleukin-36 pathway inhibition with a single dose of an anti-IL-36R antibody of the present invention resulted in the rapid and sustained remission of clinical symptoms in patients with acute generalized pustular psoriasis. Alternatively, a single dose of an anti-IL-36R antibody of the present invention resulted in the rapid and sustained remission of clinical symptoms, with no adverse safety signals in patients with acute generalized pustular psoriasis, regardless of IL36RN mutation status.

Introduction

Generalized pustular psoriasis is a rare, severe multisystemic disease first described by von Zumbusch in 1909, characterized by intermittent acute flares consisting of a disseminated erythematous and pustular skin rash associated with general symptoms including fever, and often extracutaneous organ involvement; in some cases, life-threatening complications may occur. Biologically, high C-reactive protein (CRP) serum levels and leukocytosis with neutrophilia are the most common features, together with liver test abnormalities. Epidemiological studies report prevalence as low as 1.76/million, highlighting the rarity of the disease.

Therapeutic intervention in generalized pustular psoriasis is a major challenge with no treatments currently approved in the US or Europe. A wide range of anti-psoriatic strategies have been proposed based on the psoriasis vulgaris model, with the efficacy of apheresis, and inhibitors of tumor necrosis factor, interleukin-17 and interleukin-23 reported in open-label trials and case reports forming the basis of approval for generalized pustular psoriasis in Japan. However, apheresis is restricted to specialized centers, while the contribution of these key inflammatory cytokines in psoriasis vulgaris, to the pathogenesis of generalized pustular psoriasis remains unclear.

Recently, major advances in our understanding of the mechanisms underlying pustular psoriasis have been gained from genetic studies that identified loss-of-function homozygous or compound heterozygous IL36RN gene mutations in some patients with generalized pustular psoriasis. These mutations severely alter the function of the IL36RN product, the interleukin-36 receptor antagonist (interleukin-36Ra), resulting in the dysregulation of the proinflammatory interleukin-36 (IL-36α, IL-36P and IL-36γ) pathway, and lead to generalized pustular psoriasis according to a monogenic model. While these mutations have been found in other pustular psoriasis subtypes, they have not been detected in patients with plaque psoriasis alone, unveiling the autoinflammatory nature of pustular psoriasis and establishing generalized pustular psoriasis as a distinct entity from plaque psoriasis.

These immunogenetic insights established the rationale to therapeutically target interleukin-36R in generalized pustular psoriasis. The results of this first study conducted in a human disease with an anti-IL-36R antibody of the present invention, a human monoclonal antibody targeted against the interleukin-36R, assessing the safety and efficacy in patients with an acute flare of generalized pustular psoriasis are reported. To our knowledge, this is the first study to assess treatment in patients with acute generalized pustular psoriasis.

Methods
Study Design

This 20-week, multicenter, single-arm, open-label, phase I, proof-of-concept trial enrolled patients from five sites (France, Malaysia, Republic of Korea, Taiwan, and Tunisia). Eligible patients received a single intravenous (IV) dose of 10 mg/kg an anti-IL-36R antibody of the present invention and were monitored for 20 weeks.

Patients

Patients aged 18-75 years were eligible if they had a known and documented history of generalized pustular psoriasis, regardless of IL36RN mutation status, with previous evidence of fever, and/or asthenia, and/or myalgia, and/or elevated CRP, and/or leukocytosis with neutrophilia, presenting with an acute flare involving 10% or more of their body surface area (BSA) with erythema and the presence of pustules, and a Generalized Pustular Psoriasis Physician Global Assessment (GPPGA) score of 3 or higher (clinician assessment of GPP severity based on a modified PGA [see Supplementary Appendix]; scores range from 0 [clear skin] to 4 [severe disease]) at the time of treatment. Patients could continue to receive subcutaneous treatment with retinoids and/or methotrexate.

Patients were excluded if they had an immediate life-threatening generalized pustular psoriasis flare or acute generalized exanthematous pustulosis (see Table 2 for the full inclusion/exclusion criteria). Patients providing consent were enrolled in the trial in the absence of a flare. Screening (visit 1) was initiated several days or weeks before a patient was admitted for treatment for a flare of generalized pustular psoriasis (visit 2). For patients satisfying the inclusion/exclusion criteria, treatment with BI 655130 was initiated the day after visit 2 (visit 3).

TABLE 2

Inclusion/Exclusion Criteria

Inclusion Criteria
Patients will only be included into the trial if they meet the following criteria:

1. Male or female patients, aged 18-75 years at screening
2. A known and documented history of generalized pustular psoriasis (GPP) regardless of the IL36RN mutation status, with previous evidence of fever, and/or asthenia, and/or myalgia, and/or elevated C-reactive protein, and/or leukocytosis with peripheral blood neutrophilia (above ULN)
3. Presenting with a flare of GPP with at least 10% of body surface area with erythema and pustules
4. A GPPGA score of at least moderate severity
5. GPP patients receiving subcutaneous treatment with retinoids and/or methotrexate for at least 4 weeks or GPP patients not receiving any subcutaneous therapy, at the screening visit
6. Signed and dated written informed consent prior to admission to the study in accordance with good clinical practice and local legislation
7. Women of childbearing potential* must be ready and able to use highly effective methods of birth control per ICH M3 that result in a low failure rate of less than 1% per year when used consistently and correctly. A list of contraception methods meeting these criteria is provided in the patient information. Male patients must be ready and able to use condoms. Birth control method must be continued up to 20 weeks after an anti-IL-36R antibody of the present invention administration.
   * A woman is considered of childbearing potential, i.e. fertile, following menarche, and until becoming postmenopausal unless permanently sterile. Permanent sterilization methods include hysterectomy, bilateral salpingectomy, and bilateral oophorectomy. Tubal ligation is NOT a method of permanent sterilization. A postmenopausal state is defined as no menses for 12 months without an alternative medical cause.

Exclusion Criteria
Patients will not be allowed to participate if any of the following general criteria apply:

1. Women who are pregnant, nursing, or who plan to become pregnant while in the trial. Women who stop nursing before the study drug administration do not need to be prevented from participating. They should refrain from breastfeeding up to 20 weeks after the study drug administration
2. Immediate life-threatening flare of GPP or requiring intensive care treatment, according to the investigator's judgement. Life-threatening complications mainly include, but are not limited to, cardiovascular/cytokine driven shock and pulmonary distress
3. Identified, ongoing serious/severe infection
4. Acute generalized exanthematous pustulosis TABLE 2-continued Inclusion/Exclusion Criteria 5. Patient's clinical presentation being considered due to the differential diagnosis of toxic epidermal necrosis or Stevens-Johnson syndrome
6. Currently involved in or intending to participate in another investigational study during the course of this trial
7. Previous enrolment in this trial
8. Use of any restricted medication as specified in Table 3, or any drug considered likely to interfere with the safe conduct of the study
9. Patients with dose escalation of their subcutaneous therapy with methotrexate and/or retinoids within the 4 weeks preceding the screening visit
10. Background therapy with cyclosporine within the last 30 days preceding the screening visit
11. Previous exposure to an interleukin-36R inhibitor
12. Severe, progressive, or uncontrolled renal, hepatic, hematological, endocrine, pulmonary, cardiac, neurologic, cerebral, or psychiatric disease, or signs and symptoms thereof, as judged by the investigator. Patients with a less than 3-fold ULN increase in aspartate aminotransferase and/or alanine aminotransferase and/or alkaline phosphatase and/or with a less than 2-fold ULN increase in total bilirubin at infusion day may be included, provided that no cause of liver damage other than GPP has been identified
13. Known chronic or relevant acute infections including active tuberculosis (TB), HIV or viral hepatitis; QuantiFERON ® TB test will be performed at screening. If the result is positive, patients may participate in the study if further work-up (according to local practice/guidelines) establishes conclusively that the patient has no evidence of active TB. If the presence of latent TB is established, then treatment should have been initiated and maintained according to local country guidelines
14. Patients with a transplanted organ (with the exception of a corneal transplant >12 weeks prior to the screening visit) or those who have ever received stem cell therapy (e.g. Prochymal ®)
15. Known history of lymphoproliferative disease, including lymphoma, or signs and symptoms suggestive of possible lymphoproliferative disease, such as lymphadenopathy and/or splenomegaly
16. Any documented active or suspected malignancy or history of malignancy within 5 years prior to second screening visit, except appropriately treated basal or squamous cell carcinoma of the skin or in situ carcinoma of uterine cervix
17. Evidence of a current or previous disease, medical condition (including chronic alcohol or drug abuse) other than GPP, surgical procedure (i.e. organ transplant), medical examination finding (including vital signs and electrocardiogram), or laboratory value at the second screening visit outside of the reference range, that in the opinion of the investigator, is clinically significant and would make the study participant unreliable to adhere to the protocol or to complete the trial, compromise the safety of the patient, or compromise the quality of the data
18. History of allergy/hypersensitivity to a systemically administered biologic agent or its excipients
19. Patient's refusal to be hospitalized for 4 days following the infusion

TABLE 3

| Restricted Medications | |
|---|---|
| Medication or Class of Medications | Restriction Duration (Through End of Trial Visit*) |
| Natalizumab, efalizumab, or agents that deplete B or T cells (e.g. rituximab, alemtuzumab, or visilizumab), briakinumab, secukinumab, ustekinumab, guselkumab, tildrakizumab | 6 months prior to screening (visit 2) |
| IL-36R inhibitors | Not allowed either before nor during trial participation |
| Brodalumab, ixekizumab | 4 months prior to screening (visit 2) |
| Adalimumab, infliximab, investigational products for psoriasis (non-biologics) | 12 weeks prior to screening (visit 2) |
| Etanercept, live virus vaccinations | 6 weeks prior to screening (visit 2) |
| Any investigational device or product (excludes psoriasis products), other systemic immunomodulating treatments except background therapy with methotrexate (e.g. cyclosporine A, corticosteroids†, cyclophosphamide), tofacitinib, apremilast, other systemic psoriasis treatments except background therapy with retinoids (e.g. fumarates, any other drug known to possibly benefit psoriasis), photochemotherapy (e.g. PUVA). | 30 days prior to screening (visit 2) |
| Phototherapy (e.g. UVA, UVB), topical treatment for psoriasis or any other skin condition (e.g. corticosteroids‡, vitamin D analogues, vitamin A analogues, pimecrolimus, retinoids, salicylvaseline, salicylic acid, lactic acid, tacrolimus, tar, urea, anthralin, α-hydroxy, fruit acids) | 14 days prior to screening (visit 2) |
| Anakinra | 7 days prior to screening (visit 2) |

*In case of worsening of the flare, the use of a rescue medication is left at the discretion of the investigator; in case of any other acute setting after Day 28, the use of a restricted medication is permitted.
†There is no restriction on corticosteroids with only a topical effect (e.g. inhaled corticosteroids to treat asthma or corticosteroids drops administered in the eye or ear).
‡Exception: Topical steroids of US class 6 (mild, such as desonide) or US class 7 (least potent, such as hydrocortisone) for use on the face, axilla, and/or genitalia with a restriction of use within 24 hours prior to trial visit in which GPPASI is assessed.
GPPASI = Generalized Pustular Psoriasis Area and Severity Index.

All patients underwent genotyping for mutations in IL36RN, CARD14, and AP1S3.

Genotyping

To identify mutations in IL36RN, CARD14 and AP1S3, targeted re-sequencing was performed using Illumina MiSeq with Nextera Rapid Capture Custom Enrichment Kit (Illumina Inc., San Diego, Calif.). The sequences were aligned and mapped against human genome version 19 by MiSeq Reporter (Illumina Inc., San Diego, Calif.). A mutation was considered potentially pathogenic if there were correlations with published functional data or risk associations to generalized pustular psoriasis, or if the mutation was a non-synonymous substitution, or located in a known gene regulatory element (e.g. start codon).

Efficacy and Safety Assessments

The primary endpoint was the safety and tolerability of an anti-IL-36R antibody of the present invention. Safety assessments included adverse events (coded with the use of the *Medical Dictionary for Drug Regulatory Activities*, version 20.1), serious adverse events, laboratory assessments, vital signs, injection site reactions, and immunogenicity over the duration of the trial. Immunogenicity assessments are described in the Supplementary Appendix. Secondary endpoints at Week 2 included percent change from baseline in Generalized Pustular Psoriasis Area and Severity Index (GPPASI; a modified composite index based on PASI, (J Dermatolog Treat 2003;14:158-65) whereby the induration component has been substituted with a pustules component; scores range from 0 to72, higher scores represent greater disease severity), proportion of patients with GPPGA of 0 (clear) or 1 (almost clear), change from baseline in Functional Assessment of Chronic Illness Therapy-Fatigue (FACIT-F; instrument, based on 13 questions, for monitoring fatigue and its effects on patients; scores range from 0 to 52, lower scores represent greater fatigue) scale, (J Pain Symptom Manage 1997; 13:63-74) and change from baseline in patients assessment of pain on a visual analog scale (Pain-VAS). See Table 4 for the demographics and disease characteristics of the patients at baseline.

TABLE 4

Demographics and Disease Characteristics at Baseline

| Patient | Age (yrs) | Sex (M/F) | Race* | Country | Body weight (kg) | BMI (kg/m$^2$) | Time from initial diagnosis (years) | Presence of gene mutations (+/−) | | |
|---|---|---|---|---|---|---|---|---|---|---|
| | | | | | | | | IL36RN † | CARD14 ‡ | AP1S3 |
| 2100103 | 47 | M | White | Tunisia | 52.0 | 19.1 | 46.9 | + | − | − |
| 2100104 | 31 | M | White | Tunisia | 82.0 | 25.9 | 5.0 | + | − | − |
| 3301001 | 26 | F | N/A | France | 70.4 | 26.5 | 19.9 | − | − | − |
| 6001003 | 34 | F | Asian | Malyasia | 67.9 | 29.8 | 9.7 | − | − | − |
| 6001004 | 52 | F | Asian | Malaysia | 57.6 | 23.7 | 4.0 | − | − | − |
| 8201002 | 22 | M | Asian | Republic of Korea | 56.9 | 18.2 | 0.1 | − | − | − |
| 8801001 | 58 | F | Asian | Taiwan | 52.8 | 20.1 | 29.3 | + | + | − |
| Total (N = 7) | 38.6 (13.8) | M = 3 F = 4 | White = 2 Asian = 4 N/A = 1 | NA | 62.8 (11.0) | 23.3 (4.3) | 16.4 (16.8) | 3 (42.9%) | 1 (14.3%) | 0 |

| Patient | Time from current flare to an anti-IL-36R antibody of the present invention dose (days) | GPPGA (0-4) § | GPPASI (0-72) ¶ | Pustule severity score (0-4) ** | CRP (mg/l) | FACIT-F†† | Pain-VAS | PSS‡‡ | Prior systemic therapies |
|---|---|---|---|---|---|---|---|---|---|
| 2100103 | 1 | 3 | 22.2 | 1.8 | 237.0 | 28 | 95 | 10 | RET |
| 2100104 | 1 | 3 | 52.5 | 2.3 | 276.6 | 12 | 90 | 12 | RET |
| 3301001 | 18 | 3 | 20.3 | 1.5 | 4.0 | 46 | 60 | 8 | CYSP |
| 6001003 | 2 | 3 | 26.2 | 3.0 | 152.9 | 18 | 80 | 13 | CYSP, MTX, RET |
| 6001004 | 14 | 3 | 21.0 | 2.8 | 82.8 | 40 | 80 | 12 | MTX |
| 8201002 | 0 | 3 | 33.4 | 1.8 | N/A | 32 | 70 | 9 | CYSP |
| 8801001 | 1 | 3 | 16.7 | 2.8 | 0.80 | 46 | 30 | 4 | RET |
| Total (N = 7) | 5.3 (7.4) | 3 (0) | 27.5 (12.3) | 2.3 (0.6) | 69.4 (57.0) | 31.7 (13.3) | 72.1 (22.0) | 9.71 (3.1) | CYSP = 3 (42.9) MTX = 2 (28.6) RET = 4 (57.1) |

Values are mean (standard deviation) unless stated otherwise.
*Race was self-reported by the patient. Race was not reported for patient 3301001.
† Homozygous missense variant rs387906914 (patients 1 and 2), and intronic mutation variant rs148755083 (patient 7).
‡ Heterozygous variant rs117360605 (patient 7).
§ Generalized Pustular Psoriasis Physician Global Assessment (GPPGA) is a clinician assessment of overall GPP severity based on a modified PGA; scores range from 0 (clear skin) to 4 (severe disease).
¶ Generalized Pustular Psoriasis Area and Severity Index (GPPASI) is a modified composite index for patients with GPP, based on the established PASI, whereby the induration component has been substituted with a pustules component; scores range from 0 to 72, and higher scores represent greater disease severity.
** Pustule severity is based on the GPPASI component subscore and ranges from 0 to 4; higher scores represent greater severity.
††Functional Assessment of Chronic Illness Therapy-Fatigue (FACIT-F) scores range from 0 to 52; lower scores represent greater fatigue.
‡‡Psoriasis Symptom Scale (PSS) scores range from 0 to 16, with higher scores representing greater severity of symptoms (psoriasis pain, redness, itching, and burning).
CI = confidence interval;
CRP = C-reactive protein;
N/A = not available;
NA = not applicable;
SD = standard deviation;
VAS = Visual Analogue Scale.

Other pre-specified efficacy endpoints included change and percent change from baseline in pustule severity (based on the GPPASI component), change and percent change from baseline in GPPASI, proportion of patients with GPPGA score of 0 or 1, proportion of patients with clearance of edema, change from baseline in pustular BSA, change and percent change from baseline in erythema severity (based on GPPASI component); change from baseline in FACIT-F and Pain-VAS at Weeks 1 and 4; change from baseline in Psoriasis Symptom Scale (PSS; a four item patient reported outcome instrument assessing psoriasis pain, redness, itching, and burning. Symptom severity is assessed using a 5-point Likert-type scale ranging from 0 (none) to 4 (very severe) and a total score is calculated by adding all subscore) score, (J Patient-Rep Outcomes 2017; 1:4) proportion of patients with PSS total score of 0, and improvement in Clinical Global Impression (observer-rated scale measuring global illness improvement, based on a 7-point scale, scores range from 1 [very much improved] to 7 [very much worse]) (Jpn J Dermatol 2010; 120:815-39) (at Weeks 1, 2, and 4. Efficacy endpoints that were not pre-specified included the proportion of patients achieving 50, 75, and 90 percent improvement in GPPASI over time and percent change from baseline in scaling severity (GPPASI component).

Photographic documentation of skin lesions was performed at baseline, and post-treatment. Biochemical, cellular, and pharmacogenomic biomarkers were evaluated in skin and whole blood (see below for biomarker methodologies). Skin biopsies were performed at baseline and Week 1 (an additional optional biopsy was performed at Week 2).

Generalized Pustular Psoriasis Physician Global Assessment (GPPGA)

GPPGA relies on the clinical assessment of the patient's skin presentation. It is a modified PGA, a physician's assessment of psoriatic lesions, which has been adapted to the evaluation of patients with generalized pustular psoriasis. (J Dermatolog Treat 2015; 26(1):23-31) The investigator (or qualified site personnel) scores the erythema, pustules, and scaling of all psoriatic lesions from 0-4. Each component is graded separately, the average is calculated, and the final GPPGA is determined from this composite score. A lower score then indicates a lesser severity, with 0 being clear and 1 being almost clear. To receive a score of 0 or 1, the patient should be afebrile, in addition to the skin presentation requirements.

Generalized Pustular Psoriasis Area and Severity Index (GPPASI)

The GPPASI is an adaptation of the PASI, an established measure of severity and area of psoriatic lesions in patients with psoriasis, for patients with generalized pustular psoriasis. (Dermatologica 1978; 157(4):238-44) Similar adaptions have been used for palmoplantar psoriasis. (J Eur Acad Dermatol Venereol 2009; 23(4):415-9) In the GPPASI, the induration component has been substituted by a pustules component. It is a tool which provides a numeric scoring for patient's overall generalized pustular psoriasis disease state, ranging from 0 to 72. It is a linear combination of percent of surface area of skin (body region area score) that is affected and the severity (scored on a five-point scale, ranging from 0 [least severe] to 4 [most severe] (See Table 5)) of erythema, pustules, and scaling (desquamation) over four body regions (head, upper limb, trunk, and lower limb).

TABLE 5

Generalized Pustular Psoriasis Area and Severity Index

| Score | Erythema | Pustules | Scaling |
|---|---|---|---|
| 0 | Normal or post-inflammatory hyper-pigmentation | No visible pustules | No scaling or crusting |
| 1 | Faint, diffuse pink or slight red | Low density occasional small discrete pustules (noncoalescent) | Superficial focal scaling or crusting restricted to periphery of lesions |
| 2 | Light red | Moderate density grouped discrete small pustules (noncoalescent) | Predominantly fine scaling or crusting |
| 3 | Bright red | High density pustules with some coalescence | Moderate scaling or crusting covering most or all lesions |
| 4 | Deep fiery red | Very high density pustules with pustular lakes | Severe scaling or crusting covering most or all lesions |

Individual score per body region = body region factor (head = 0.1, upper limb = 0.2, trunk = 0.3, lower limb = 0.4) × body region area score × sum of component severity scores in body region
Total GPPASI score = sum of individual score from all body regions Immunogenicity Assessments Plasma samples from all patients for anti-drug antibody assessment were taken at pre-dose and on days 7, 14, 21, 28, 84 and 140 post-dose. The samples were analyzed for anti-an anti-IL-36R antibody of the present invention antibodies using a validated Meso Scale Discovery® (MSD) drug bridging electrochemiluminescent (ECL) method with acid dissociation at QPS, LLC, Newark, Del., USA. Anti-drug antibody plasma samples and controls were first diluted in 0.3M acetic acid before neutralization with 1.5M tris base and master mix, which included biotin-labeled drug and sulfo-tag-labeled drug, prior to transfer and incubation on a blocked MSD streptavidin plate. In the presence of tripropylamine-containing read buffer, sulfo-tag produces an ECL signal that is triggered when voltage is applied using the MSD Sector Imager 600s. The resulting chemiluminescence is measured in relative light units which is proportional to the amount of anti-drug antibody present in the plasma samples. The immunogenicity of an anti-IL-36R antibody of the present invention was assessed using a three-tiered approach.

All anti-drug antibody samples were first analyzed in the anti-drug antibody screening assay. A sample was considered positive for anti-an anti-IL-36R antibody of the present invention antibodies if its response in the screening assay was greater than or equal to the screening plate-specific cut point, and if it was confirmed positive in the confirmatory assay (ECL response inhibited by addition of excess an anti-IL-36R antibody of the present invention above the confirmatory cutpoint). Samples that were confirmed positive for anti-an anti-IL-36R antibody of the present invention antibodies were further characterized in the titration assay. Titers were determined by analysis of 2-fold serial dilutions of a sample. The reported titer was the highest dilution that produced a mean ECL value greater than or equal to the plate specific titration cutpoint.

The anti-drug antibody assay validation demonstrated that the sensitivity of the screening assay in GPP plasma was 2.5 ng/mL using an anti-an anti-IL-36R antibody of the present invention rabbit polyclonal antibody positive control. In addition, 100 and 250 ng/mL levels of the positive control were detected in the presence of at least 2000 µg/mL an anti-IL-36R antibody of the present invention. None of the ADA samples had an anti-IL-36R antibody of the present invention levels greater than 2000 μg/mL. The assay performance data indicated that the method was reliable for screening, confirmation, and determination of titers of anti- an anti-IL-36R antibody of the present invention antibodies in plasma samples from patients in this study.

Biomarker Assessments

Assessment of CRP levels (non-high sensitive) and absolute neutrophil count were conducted using standard methodologies by local laboratories. Samples for assessments were collected at baseline before treatment initiation and on days 7, 14, and 28.

Pharmacogenomics Biomarker Assessments

Global transcriptome-wide sequencing of RNA from lesion and non-lesional skin biopsy samples and whole blood from all patients was achieved using the Illumina Hi-Seq 3000 (Illumina Inc., San Diego, Calif.). Data were normalized by TMM using the edgeR package; log 2 fold changes and corresponding FDR-adjusted p-values were analyzed using the limma package (Bioconductor, US). (Genome Biol 2010; 11(3):R25; Nucleic Acids Res 2015; 43(7):e47) Briefly, data were voom-transformed and correlations between paired measurements per patient were estimated by the duplicate Correlation function. A linear model was fitted using the lmFit-function and moderated t-statistics were computed for lesional versus non-lesional and pre- versus post-treatment with an anti-IL-36R antibody of the present invention. (Nucleic Acids Res 2015; 43(15):e97; Genome Biol 2014; 15(2):R29) Adjusted P-values of <0.05 were considered significant.

Statistical Analyses

This trial, due to its small sample size and the absence of a comparator, did not test any statistical hypotheses. Endpoints are described in their entirety and are evaluated by descriptive statistical methods. Safety analyses included all treated patients (full analysis set; FAS); efficacy analyses were conducted with patients who had a baseline and at least one post-baseline measurement available for either GPPASI or GPPGA; and biomarker analyses were conducted with all treated patients who had provided at least one observation for at least one biomarker matrix. Non-response imputation was used for binary efficacy endpoints following use of rescue medication; for continuous endpoints, only observations collected prior to use of rescue medication were summarized. One patient received rescue treatment during study hence data subsequent to this use (post-Week 4) are handled as described.

Results

Patients

Of 16 patients screened, seven patients (three men and four women, aged between 22 and 58 years) at five study sites, who experienced a moderate to severe acute flare, received a single IV dose of 10 mg/kg an anti-IL-36R antibody of the present invention between February and August. Baseline demographic data and disease characteristics are reported in Table 3. Two patients carried a homozygous loss of function IL36RN mutation (rs387906914/ p.Leu27Pro) known to cause generalized pustular psoriasis and one patient carried potentially generalized pustular psoriasis-causing mutations, including a homozygous IL36RN mutation (rs148755083) and a heterozygous CARD14 mutation (rs117360605/p.Arg275His). The mean (SD) time from initial diagnosis for all patients was 16.4 (16.8) years. All patients presented with a flare of moderate severity, characterized by a GPPGA of 3 and a pustule subscore of 2-4 (moderate to very high density). The mean (SD) time interval between the onset of the current flare and an anti-IL-36R antibody of the present invention infusion was 5.3 (7.4) days (range: 0-18 days). All patients had previously received prior systemic treatments for generalized pustular psoriasis and were stopped prior to receiving an anti-IL-36R antibody of the present invention; cyclosporine was discontinued 30 days prior to an anti-IL-36R antibody of the present invention administration. All patients completed the trial up to Week 20, however, there were two protocol violations: One patient (patient 8201002) did not satisfy the inclusion criterion for having a known prior history of generalized pustular psoriasis, but did satisfy other inclusion criteria, and a second patient (patient 6001004) received methotrexate at Week 4 for treatment of "pain". Both patients were included in the FAS, however, only efficacy data up to Week 4 is included for patient 6001004.

Safety

Through 20 weeks, four patients (57.1%) were deemed to have had a drug-related adverse events (Table 6); all were graded as mild or moderate. No severe or serious adverse events were reported. Laboratory parameters were normal in most patients, two patients (28.6%) had low hemoglobin; two patients (14.3%) had elevated eosinophils, one patient had elevated creatine kinase, two patients had elevated triglycerides, and one patient had low glucose, following treatment with an anti-IL-36R antibody of the present invention. Three patients (42.9%) had positive anti-drug antibodies at Week 2, sustained through Week 20 with maximum titer at Week 12 for two of the patients; no pre-existing anti-drug antibodies were detected.

TABLE 6

Adverse Events through Week 20*

| Adverse Event, n (%) | 10 mg/kg an anti-IL-36R antibody of the present invention (N = 7) |
|---|---|
| Any adverse event | 7 (100) |
| Severe adverse event | 0 |
| Drug-related adverse event | 4 (57.1) |
| Eosinophilia | 2 (28.6) |
| Vomiting | 1 (14.3) |
| Chills | 1 (14.3) |
| Pain† | 1 (14.3) |
| Upper respiratory tract infection | 2 (28.6) |
| Urinary tract infection | 1 (14.3) |
| Infusion related reaction | 1 (14.3) |
| Arthralgia | 1 (14.3) |
| Adverse event leading to discontinuation of trial drug | 0 |
| Serious drug-related adverse event | 0 |

*Adverse events were coded with the use of the *Medical Dictionary for Drug Regulatory Activities*, version 20.1. The intensity of adverse events were categorized as mild, moderate, or severe by investigators.
†Patient reported pain at sites of previous lesions, located on both shins.

Efficacy

Clinical Endpoints

A GPPGA score of 0 or 1 was achieved in five patients (71.4%) as early as Week 1 after a single dose of an anti-IL-36R antibody of the present invention, and in all patients by Week 4 (FIG. 1A).

Figure 2:
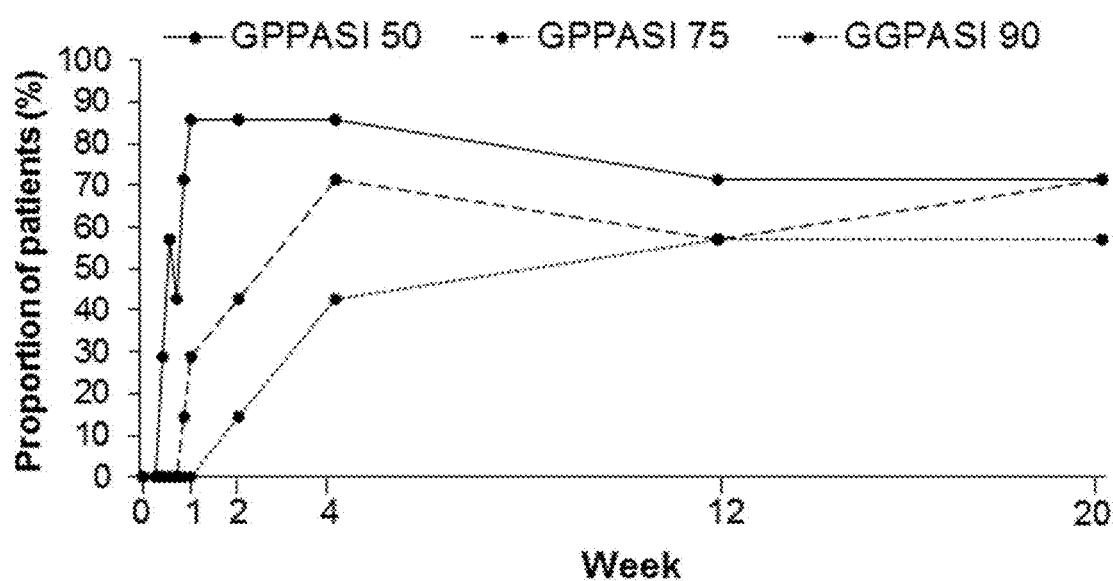
FIG. 2 shows GPPASI 50/75/90 response rates through Week 20. In this figure, the proportion of patients who achieved a decrease of more than 50%, 75%, or 90% in the Generalized Pustular Psoriasis Area and Severity Index (GPPASI 50, 75, or 90) is shown over time. Analysis includes all patients with at least one available post-baseline value. One patient received methotrexate post Week 4 for treatment of "pain" and therefore data for Weeks 12 and 20 have are set to non-response.
Figure 3:
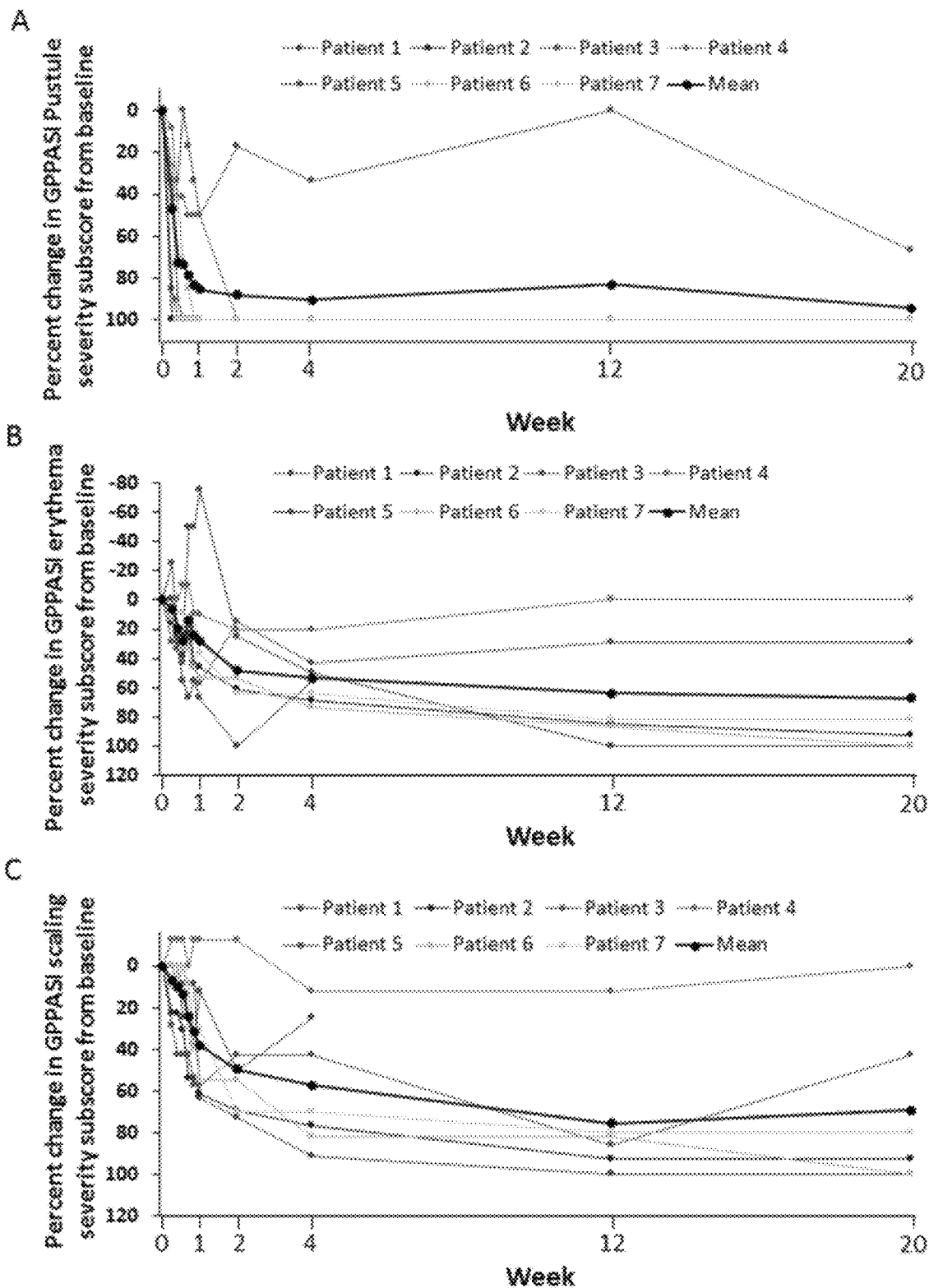
FIG. 3 shows GPPASI subscores through Week 20. In this figure, individual and mean percent change in Generalized Pustular Psoriasis Area and Severity Index (GPPASI) severity subscores for Pustules (panel A), erythema (panel B), and scaling (panel C) are shown. Analysis includes all patients with at least one available post-baseline value. One patient received methotrexate post Week 4 for treatment of "pain" and therefore data for Weeks 12 and 20 have been excluded.

A major improvement in GPPASI was observed in all patients very early with a mean (SD) percent change from baseline of 73.2% (16.2) at Week 2 (FIG. 1B); by Week 4, this was further reduced to 79.8%, and was maintained to Week 20 (83.6%). Within 48 hours of treatment, pustules were completely cleared in three patients (42.9%); pustules were cleared in five patients (71.4%) by Week 1, and in six patients (85.7%) by Week 2 (FIG. 1C). By Week 1, 85.7% of patients had achieved a GPPASI 50, by Week 4, 71.4% of patients had achieved a GPPASI 75, and by Week 12, 57.1% of patients had achieved a GPPASI 90 (FIG. 2). The mean GPPASI erythema subscore was reduced from baseline by 27.8%, 48.3%, and 53.5% at Weeks 1, 2, and 4, respectively. Similarly, the mean GPPASI scaling subscore was reduced from baseline by 38.1%, 49.6%, and 57.1% at Weeks 1, 2, and 4 respectively (FIG. 3).

Patient-Reported Outcomes

Figure 4:
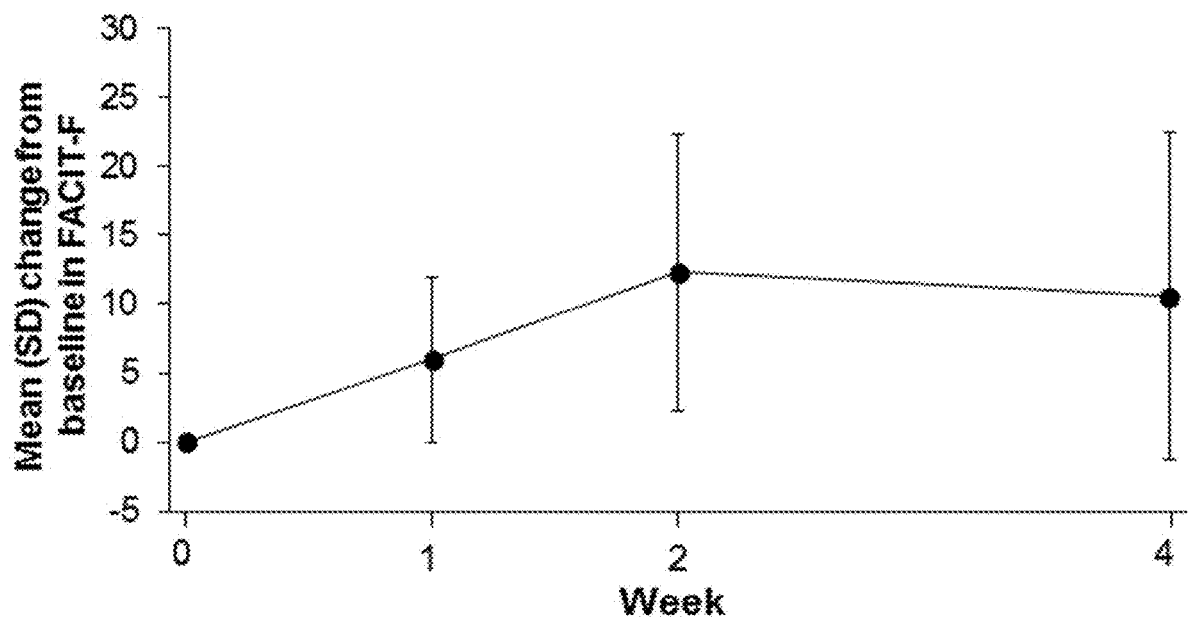
FIG. 4 shows change from baseline in FACIT-F through Week 4. Mean (SD) change from baseline in FACIT-F score over time is shown. Analysis includes all patients with at least one available post-baseline value. FACIT-F=Functional Assessment of Chronic Illness Therapy-Fatigue; SD=Standard deviation.
Figure 5:
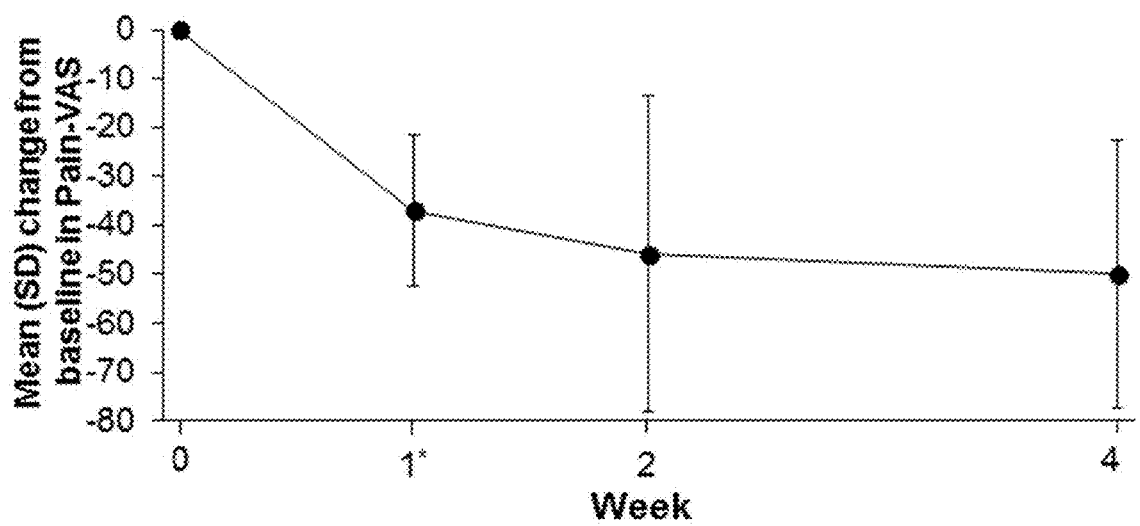
FIG. 5 shows change from baseline in Pain-VAS through Week 4. Mean (SD) change from baseline in Pain-VAS over time is shown. Analysis includes all patients with at least one available post-baseline value. SD=Standard deviation; VAS=Visual analogue scale. *N=6.
Figure 6:
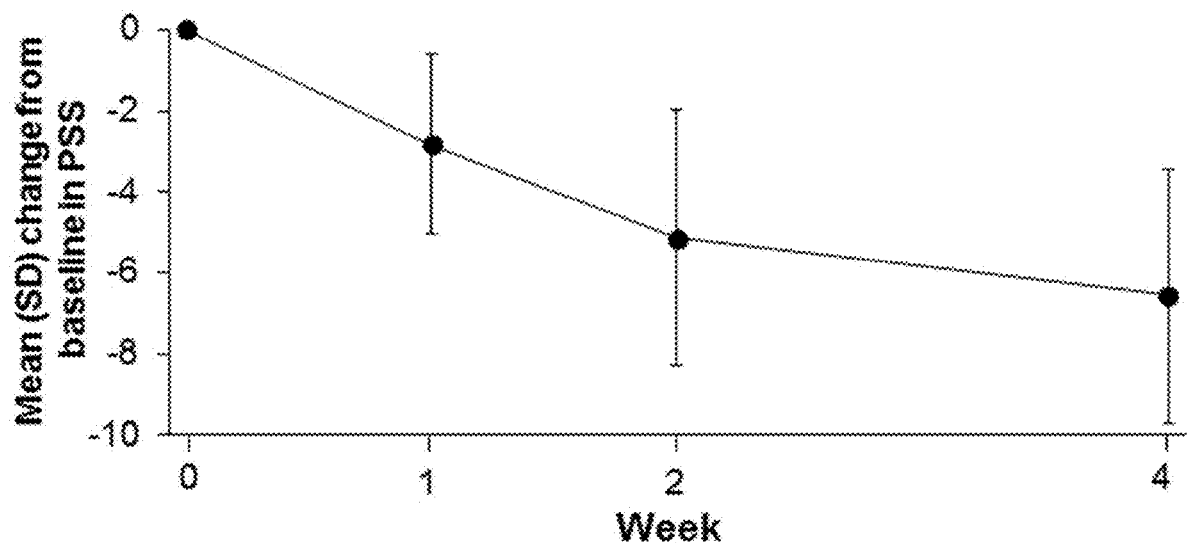
FIG. 6 shows change from baseline in PSS through Week 4. Mean (SD) change from baseline in PSS over time is shown. Analysis includes all patients with at least one available post-baseline value. PSS=Psoriasis symptom scale; SD=Standard deviation.

The mean (SD) improvement in FACIT-F from baseline to Week 2 was 12.3 (10.1) and was maintained to Week 4 (FIG. 4). For Pain-VAS, the mean (SD) change from baseline to Week 2 was −45.9 (32.3) and was maintained to Week 4 (FIG. 5). Similarly, there was a mean (SD) change from baseline of −5.14 (3.18) in PSS at Week 2 that was also maintained to Week 4 (FIG. 6).

Biomarker Analyses

Figure 7:
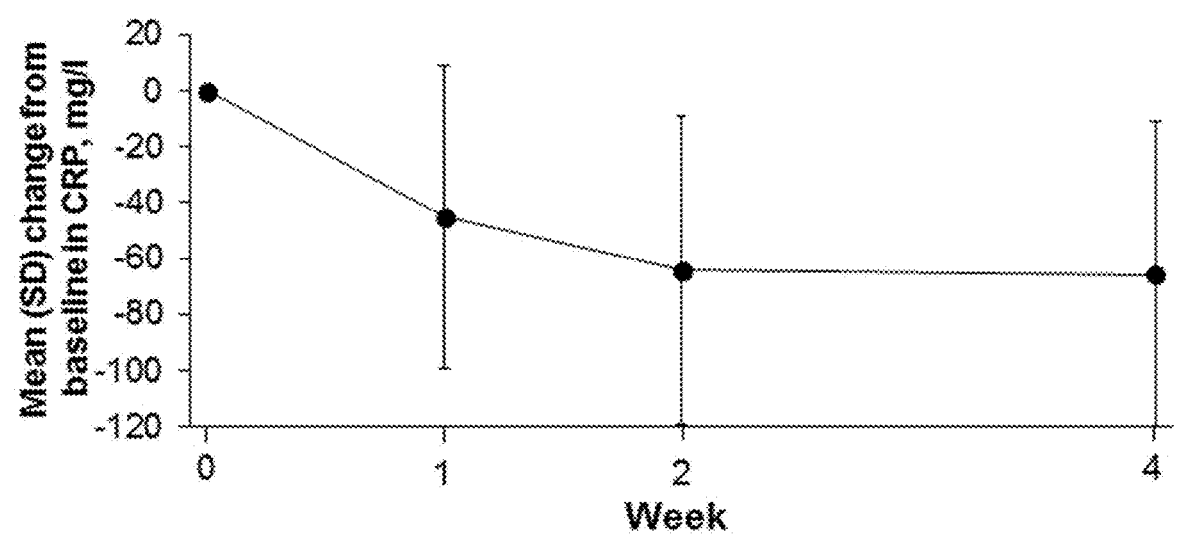
FIG. 7 shows change from baseline in CRP through Week 4. Mean (SD) change from baseline in in CRP over time is shown. CRP=C-reactive protein; SD=Standard deviation.
Figure 8:
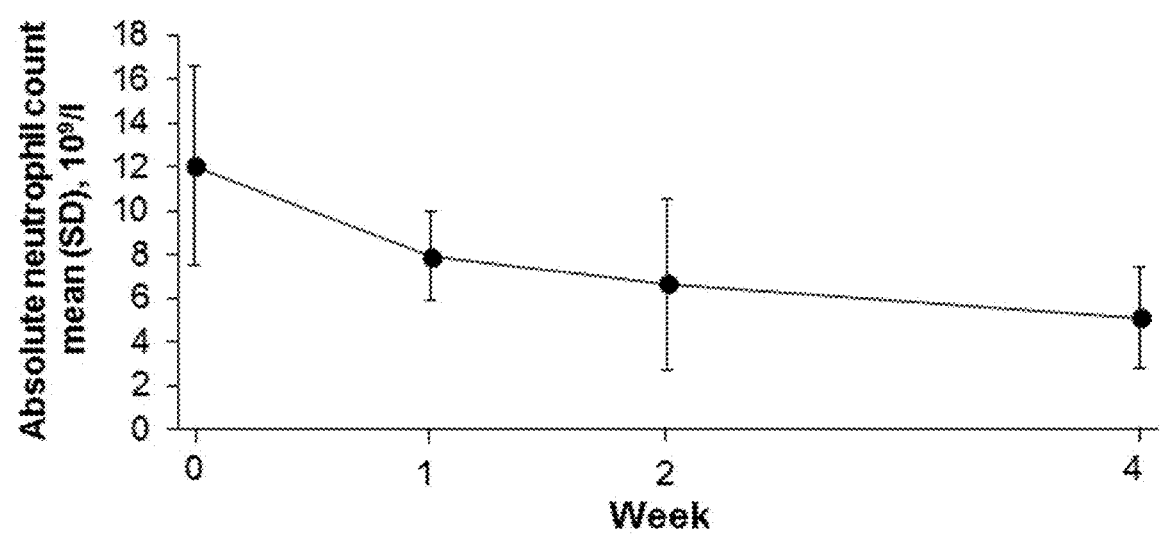
FIG. 8 shows absolute neutrophil count through Week 4. Absolute neutrophil count over time is shown. Analysis includes all patients with at least one available post-baseline value. SD=Standard deviation.

A rapid reduction in CRP approaching normalization was observed with a mean (SD) change in CRP from baseline to Week 2 of −64.2 (55.1) mg/dl that was maintained to Week 4 (FIG. 7). Absolute neutrophil count was reduced rapidly by Week 2 and was maintained to Week 4 (FIG. 8).

Global transcriptome analysis of lesional and non-lesional skin biopsies samples found 3276 genes to be differentially expressed (1885 elevated; 1391 decreased) at baseline between lesional and non-lesional skin biopsies (adjusted P≤0.05, fold-change ≥2). After seven days of treatment with an anti-IL-36R antibody of the present invention, expression of 1444 genes in lesional skin was strongly up or down-regulated, reaching near non-lesional skin levels; genes differentially expressed were associated with innate (e.g. IL6, TNF, and CXCL1) and Th1/Th17 mediated inflammation (e.g. IL1B, IL128, and IL23A) and with proinflammatory processes of keratinocyte activation (e.g. IL17C and IL24) (Table 7).

TABLE 7

Gene Expression Profile in Lesional versus Non-Lesional Skin and Pre and Post-Treatment with an anti-IL-36R antibody of the present invention

| Gene | Description | Lesional Versus Non-Lesional Skin at Baseline (Log2FC) | Lesional skin Pre Versus post an anti-IL-36R antibody of the present invention treatment at Week 1 (Log2FC) |
|---|---|---|---|
| IL36A | Interleukin 36 alpha | 6.5042** | −1.98 |
| IL36B | Interleukin 36 beta | 1.3974 | 0.0258 |
| IL36G | Interleukin 36 gamma | 3.7135** | −0.9053 |
| IL12B | Interleukin 12B | 5.5762** | −3.4247* |
| IL1B | Interleukin 1 beta | 4.4361** | −2.2585* |
| IL6 | Interleukin 6 | 3.9185* | −3.6732* |
| CXCL1 | Chemokine (C-X-C motif) ligand 1 | 5.4683*** | −2.6705* |
| CXCL8 | Interleukin 8 | 4.8027** | −1.1786 |
| IL23A | Interleukin 23A | 4.5025** | −2.8952* |
| TNF | Tumor necrosis factor | 1.7834*** | −1.5952* |
| IL17C | Interleukin 17C | 5.6359** | −3.6090* |
| IL24 | Interleukin 24 | 8.0150* | −4.3571* |

Adjusted P-values:
*P < 0.05,
**P < 0.01,
***P < 0.001.
Data was normalized by TMM using the edgeR package. The limma package was utilized to derive log 2 fold changes and corresponding false discovery rate adjusted P-values. TMM = Trimmed mean of M-values.

In all patients, IL-36α, IL-36γ and IL-8 were strongly increased in lesional skin biopsies; after seven days of treatment with an anti-IL-36R antibody of the present invention, the expression of IL-36α and IL-36γ was strongly reduced in four patients, while IL-8 was strongly reduced in three patients (fold change ≥2). RNA expression from whole blood detected differentially expressed genes (adjusted P:0.05, fold-change 2) after 7, 14 and 28 days (364, 476 and 568 genes, respectively). Genes of proinflammatory mediators involved in neutrophil activation, such as IL1B, CD177, S100A8/9, S100A12, MMP9, and MMP25 were among those most strongly downregulated (Table 8).

TABLE 8

Gene Expression Profile in Whole Blood Pre- and Post-Treatment with an anti-IL-36R antibody of the present invention

| | | Whole blood Differential expression from baseline following an anti-IL-36R antibody of the present invention treatment (Log2FC) | | | |
|---|---|---|---|---|---|
| Gene | Description | Day 1 | Week 1 | Week 2 | Week 4 |
| IL1B | Interleukin 1 beta | −0.0569 | −0.8180* | −0.9891** | −1.1283** |
| S100A9 | S100 calcium binding protein A9 | −0.3686 | −0.9398 | −1.2238* | −1.5496** |
| S100A12 | S100 calcium binding protein A12 | −0.5480 | −1.3200* | −1.8570** | −2.1336*** |
| S100A8 | S100 calcium binding protein A8 | −0.5096 | −1.0197 | −1.3282* | −1.6132** |
| MMP25 | Matrix metallo-peptidase 25 | −0.2015 | −0.5665 | −1.0276** | −0.8226* |
| MMP9 | Matrix metallo-peptidase 9 | −0.2247 | −0.5728 | −1.5403* | −1.6919** |

TABLE 8-continued

Gene Expression Profile in Whole Blood Pre- and Post-Treatment
with an anti-IL-36R antibody of the present invention

| Gene | Description | Whole blood Differential expression from baseline following an anti-IL-36R antibody of the present invention treatment (Log2FC) | | | |
|---|---|---|---|---|---|
| | | Day 1 | Week 1 | Week 2 | Week 4 |
| CD177 | CD177 molecule | −0.4945 | −2.6019 | −4.6062* | −4.7470** |

Adjusted P-values:
*P < 0.05,
**P < 0.01,
***P < 0.001.
Data was normalized by TMM using the edgeR package. The limma package was utilized to derive log 2 fold changes and corresponding false discovery rate adjusted P-values. TMM = Trimmed mean of M-values.

DISCUSSION

This first-in-human disease study investigating the safety and efficacy of an anti-IL-36R antibody of the present invention, an anti-interleukin-36R human monoclonal antibody, studied patients with generalized pustular psoriasis due to the significant disease burden, high unmet need, and the robust evidence for the contribution of interleukin-36 dysregulation to skin and systemic inflammation in this syndrome. Indeed, the absence or impairment of interleukin-36Ra due to IL36RN mutations causes generalized pustular psoriasis, although the prevalence of such mutations varies across different cohorts, ranging from 5% to 70%, leading to the identification of a new autoinflammatory syndrome called DITRA (Deficiency of Interleukin-36 Receptor Antagonist). The relevance of the interleukin-36R inhibiting strategy in generalized pustular psoriasis has been reinforced by a genetically-engineered mouse model of DITRA, and by advanced knowledge of the structure and function of the human interleukin-36R that has enabled the production of an anti-IL-36R antibody of the present invention, which inhibits the inflammatory effects of interleukin-36. Results from this proof-of-concept study demonstrate rapid resolution of systemic inflammation and efficacy, with five of seven patients clear or almost clear one week after an anti-IL-36R antibody of the present invention infusion, and all patients achieving this status by Week 4. The assessment of efficacy at these early time points was designed specifically to avoid wrongly attributing the drug intervention (in this single-arm study) with the spontaneously self-remitting course of generalized pustular psoriasis flares which usually occurs over a few weeks to months—a disease characteristic which limits the impact of many therapeutic studies in generalized pustular psoriasis with later timed efficacy end points. (Br J Dermatol 1968; 80:771-93) Likewise, advocated successful treatments with a wide range of targeted biologics such as inhibitors of tumor necrosis factor, interleukin-17 and interleukin-23, should be considered with caution. (J Dermatol 2016; 43:1011-7; Arch Dermatol 2012; 148:1423-5; Ann Intern Med 2010; 153:66-7) This early, striking response pattern of both skin and systemic components suggest that interleukin-36R inhibition with a single dose of an anti-IL-36R antibody of the present invention leads to a rapid and sustained shutdown of the inflammatory cascade in generalized pustular psoriasis. These early responses were also reflected in rapid improvements in patient-reported outcomes (FACIT-F, Pain-VAS, and PSS). Another key observation is the similar efficacy observed in patients with and without IL36RN mutations, supporting the recent hypothesis that interleukin-36 cytokines are engaged in skin inflammation not only across pustular psoriasis subtypes with different genetic backgrounds, but also potentially in psoriasis vulgaris lesions. The rapid improvement in clinical endpoints were reflected by a rapid improvement in the gene expression profile of lesional skin to near normal skin levels within seven days, underlining the central role of the interleukin-36 pathway in this disease. The differentially expressed genes in whole blood up to 28 days support the durable and long lasting clinical effect of a single dose of an anti-IL-36R antibody of the present invention.

Regarding tolerance, no clear treatment-emergent safety signal was identified, adding to previous safety data in 124 healthy volunteers (unpublished data) and are consistent with the recent characterization of individuals with/L36R knockout mutations, resulting in the complete absence of the interleukin-36R but without any evidence of an increased risk of superinfection, nor of a significant impact on the innate and adaptive immune responses. (Sci Transl Med 2017; 9)

Given the low number of patients in the trial, no clear association between immunogenicity with a change in either safety or efficacy was detected.

Taking into consideration the limitations associated with a proof-of-concept study in a rare disease (a small open-label study of short duration), these results of interleukin-36R inhibition with a single dose of an anti-IL-36R antibody of the present invention provide promising perspectives for the treatment of generalized pustular psoriasis. Larger randomized controlled trials to confirm these findings are ongoing. The results of the current study also provide additional support to the hypothesis that inhibiting the interleukin-36 pathway may be beneficial in pustular psoriasis beyond patients with IL36RN mutations.

In conclusion, inhibition of the interleukin-36 pathway following a single dose of an anti-IL-36R antibody of the present invention, resulted in the rapid and sustained remission of clinical symptoms, with no adverse safety signals in patients with acute generalized pustular psoriasis.

Example 2: Multi-Center, Double-Blind, Randomized, Placebo-Controlled, Phase II Study to Evaluate Efficacy, Safety and Tolerability of an Anti-IL-36R Antibody of the Present Invention in Patients with Generalized Pustular Psoriasis (GPP) Presenting with an Acute Flare of Moderate to Severe Intensity Current treatment options for controlling acute GPP, complete resolution of symptoms and prevention of reoccurrence of flares are limited and do not provide sustained efficacy. No treatments are currently approved for GPP in the US and EU, though a combination of retinoids, cyclosporine or methotrexate has been recommended as primary options for controlling worsening of chronic GPP. However, long-term use of these treatments is limited due to side effects and contraindications (retinoids: teratogenicity, hair loss; cyclosporine: excessive hair growth, renal toxicity; MTX: liver toxicity). Side effects, such as hair loss, excessive hair growth and teratogenicity particularly limit the use of these treatments in women. Biologics (mostly TNF inhibitors, occasionally IL-1 or IL-17 inhibitors) are increasingly used to treat more severe, extensive or treatment resistant patients with GPP, based on small published case series. However, these drugs are also associated with limitations in efficacy (incomplete and delayed responses are frequent) and safety (risk of infections and infusion reactions).

Based on the limitations described above, current therapeutic options are not suitable for life-long treatment and do not provide sustained responses in most patients. Therefore, to address the high unmet needs in GPP there is a critical need to develop (i) a highly effective treatment with rapid onset of action for patients presenting with an acute GPP flare; and (ii) to develop an effective treatment that also reliably reduces the occurrence of flares and leads to complete resolution of manifestations such as widespread erythema and scaling, and is safe and tolerable for lifelong treatment. In addition, a search of the current literature did not yield any published studies focusing on moderate to severe GPP flares. Thus, our PoC approach and subsequent development plan further addresses the need for GPP treatment options.

The strong genetic link between the IL36 signaling pathway and GPP and experimental data identifying IL-36 as the dominant cytokine driving GPP suggest that inhibition of IL36R signaling with the humanized anti-IL36R antibody an anti-IL-36R antibody of the present invention might be beneficial in treatment of GPP—similar to the strong responses seen in IL1R antagonist deficient patients with sterile multifocal osteomyelitis after treatment with Anakinra. In addition, a recent characterization of individuals with homozygous IL36R KO mutations revealed that normal immune function was broadly preserved suggesting that IL36 signaling pathway inhibition does not compromise host defenses.

Based on this rationale, an open-label, single arm study trial has been conducted to investigate proof-of-concept of a single dose of an anti-IL-36R antibody of the present invention in patients with GPP. In total, seven patients have been treated with a single IV administration of 10 mg/kg of an anti-IL-36R antibody of the present invention.

As described above, inhibiting IL36R activity results in a rapid and sustained improvement in GPP clinical skin and systemic symptoms. In the patients studied, an anti-IL-36R antibody of the present invention was well tolerated. Through 20 weeks of the trial duration, only adverse events of mild or moderate intensity were reported. In addition, no severe or serious adverse events were reported.

Based on these results, the objective of this subsequent GPP trial is to evaluate efficacy, safety, and tolerability of an anti-IL-36R antibody of the present invention compared to placebo in patients with GPP presenting with an acute flare of moderate to severe intensity.

In order to be able to address future scientific questions, patients will be asked to voluntarily donate biospecimens for banking. If the patient agrees, banked samples may be used for future biomarker research and drug development projects, e.g. to identify patients that are more likely to benefit from a treatment or experience an adverse event (AE), or to gain a mechanistic or genetic understanding of drug effects and thereby better match patients with therapies.

Trial Objectives and Endpoints

Main objectives

To evaluate efficacy, safety, and tolerability of an anti-IL-36R antibody of the present invention in patients with Generalized Pustular Psoriasis (GPP) presenting with an acute flare of moderate to severe intensity.

Clinical Trial Protocol Synopsis

| | |
|---|---|
| Number of patients entered: | At least 27 |
| Number of patients on each treatment: | 18 patients on an anti-IL-36R antibody of the present invention and 9 patients on placebo |
| Diagnosis: | Patients with Generalized Pustular Psoriasis (GPP) presenting with an acute flare of moderate to severe intensity. |
| Main in- and exclusion criteria | Main inclusion criteria: Patients will be enrolled (screened) into the trial, if they meet the following criteria: 1a) Patients with GPPGA of 0 or 1 and a known and documented history of GPP per European Rare And Severe Psoriasis Expert Network (ERASPEN) criteria regardless of IL36RN mutation status, with previous evidence of fever, and/or asthenia, and/ormyalgia, and/or elevated C-reactive protein, and/or leukocytosis with peripheral blood neutrophilia. OR 1 b) Patients with an acute flare of moderate to severe intensity meeting the (ERASPEN) criteria of GPP with a known and documented history of GPP (per ERASPEN criteria) regardless ofIL36RN mutation status, with previous evidence of fever, and/orasthenia, and/or myalgia, and/or elevated C-reactive protein, and/or leucocytosis with peripheral blood neutrophilia. OR 1c) Patients with first episode of an acute GPP flare of moderate to severe intensity with evidence of fever, and/or asthenia, and/ormyalgia, and/or elevated C-reactive protein, and/or leukocytosis with peripheral blood neutrophilia (above ULN). For these patients the diagnosis will be confirmed retrospectively by a central external expert/committee. Patients may or may not be receiving background treatment with retinoids and/or methotrexate and/or cyclosporine. Patients must discontinue retinoids/methotrexate/cyclosporine prior to receiving the first dose of an anti-IL-36R antibody of the present invention/placebo. |

|  |  |
|---|---|
|  | Male or female patients, aged 18 to 75 years at screening. Signed and dated written informed consent prior to admission to the study in accordance with ICH-GCP and local legislation prior to start of any screening procedures. Women of childbearing potential and men able to father a child must be ready and able to use highly effective methods of birth control per ICH M3 (R2) that result in a low failure rate of less than 1% per year when used consistently and correctly. Note: A woman is considered of childbearing potential, i.e. fertile, following menarche and until becoming postmenopausal unless permanently sterile. Permanent sterilisation methods include hysterectomy, bilateral salpingectomy and bilateral oophorectomy. Tubal ligation is not a method of permanent sterilization. A postmenopausal state is defined as no menses for12 months without an alternative medical cause. Main Exclusion Criteria: Patients with SAPHO (Synovitis-acne-pustulosis-hyperostosis-osteitis) syndrome. Patients with primary erythrodermic psoriasis vulgaris. Patients with primary plaque psoriasis vulgaris without presence of pustules or with pustules that are restricted to psoriatic plaques. Drug-triggered Acute Generalized Exanthematous Pustulosis (AGEP). Immediate life-threatening flare of GPP or requiring intensive care treatment, according to the investigator's judgement. Life-threatening complications mainly include, but are not limited to, cardiovascular/cytokine driven shock, pulmonary distress syndrome, or renal failure.[TMM to send TCM threshold] Severe, progressive, or uncontrolled hepatic disease, defined as >3-fold Upper Limit of Normal (ULN) elevation in AST or ALT or alkaline phosphatase, or >2-fold ULN elevation in total bilirubin. Patients with dose escalation of their subcutaneous therapy with cyclosporine and/or methotrexate and/or retinoids within the 2 weeks prior to receiving the first dose of an anti-IL-36R antibody of the present invention/placebo. The initiation of systemic agents such as cyclosporine and/orretinoids and/or methotrexate 2 weeks prior to receiving the first dose of an anti-IL-36R antibody of the present invention/placebo. Treatment (Visit 2) will be initiated immediately in patients: Who meet the inclusion criteria above Who are presenting with an acute GPP flare of moderate to severe intensity, defined by emergence of: a) Generalized Pustular Psoriasis Physician Global Assessment(GPPGA) score of at least 3 (moderate), and b) presence of fresh pustules (new appearance or worsening of pustules), and c) GPPGA pustulation sub score of at least 2 (mild), and d) at least 5% of Body Surface Area (BSA) covered with erythema and the presence of pustules And who do not meet any of the exclusion criteria above. |
| dose: | 900 mg, single dose |
| mode of administration: | i.v. |
| Comparator products: | Placebo comparator |
| dose: | Not applicable |
| mode of administration: | i.v. |
| Duration of treatment: | Single dose |
| Endpoints | Primary Endpoints: The co-Primary Endpoints of the study are: A Generalized Pustular Psoriasis Physician Global Assessment(GPPGA) score of 0 or 1 at Week 1. A GPPGA pustulation subscore of 0 indicating no visible pustules at Week 1. Secondary Endpoints: Secondary Endpoints of the study at week 4 which are included in the statistical testing strategy in a hierarchical manner subsequent to performance of the tests on the co-primary endpoints are: A Psoriasis Area and Severity Index for Generalized Pustular Psoriasis (GPPASI) 75 at Week 4. Change from baseline in Pain Visual Analog Scale (VAS) score at Week 4. Change from baseline in Psoriasis Symptom Scale (PSS) score at Week 4. Change from baseline in Functional Assessment of Chronic Illness Therapy (FACIT) Fatigue score at Week 4. |

Secondary endpoints of the study which are not included in the statistical testing hierarchy are:
A GPPGA 0 or 1 at Week 4.
A GPPGA pustulation subscore of 0 indicating no visible pustules at Week 4.
A GPPASI 50 at Week 1, and 4.
The percent reduction in GPPASI from baseline at Week 1, and 4.
The following safety endpoint is also defined:
The occurrence of Treatment Emergent Adverse Events (TEAEs).

Figure 9:
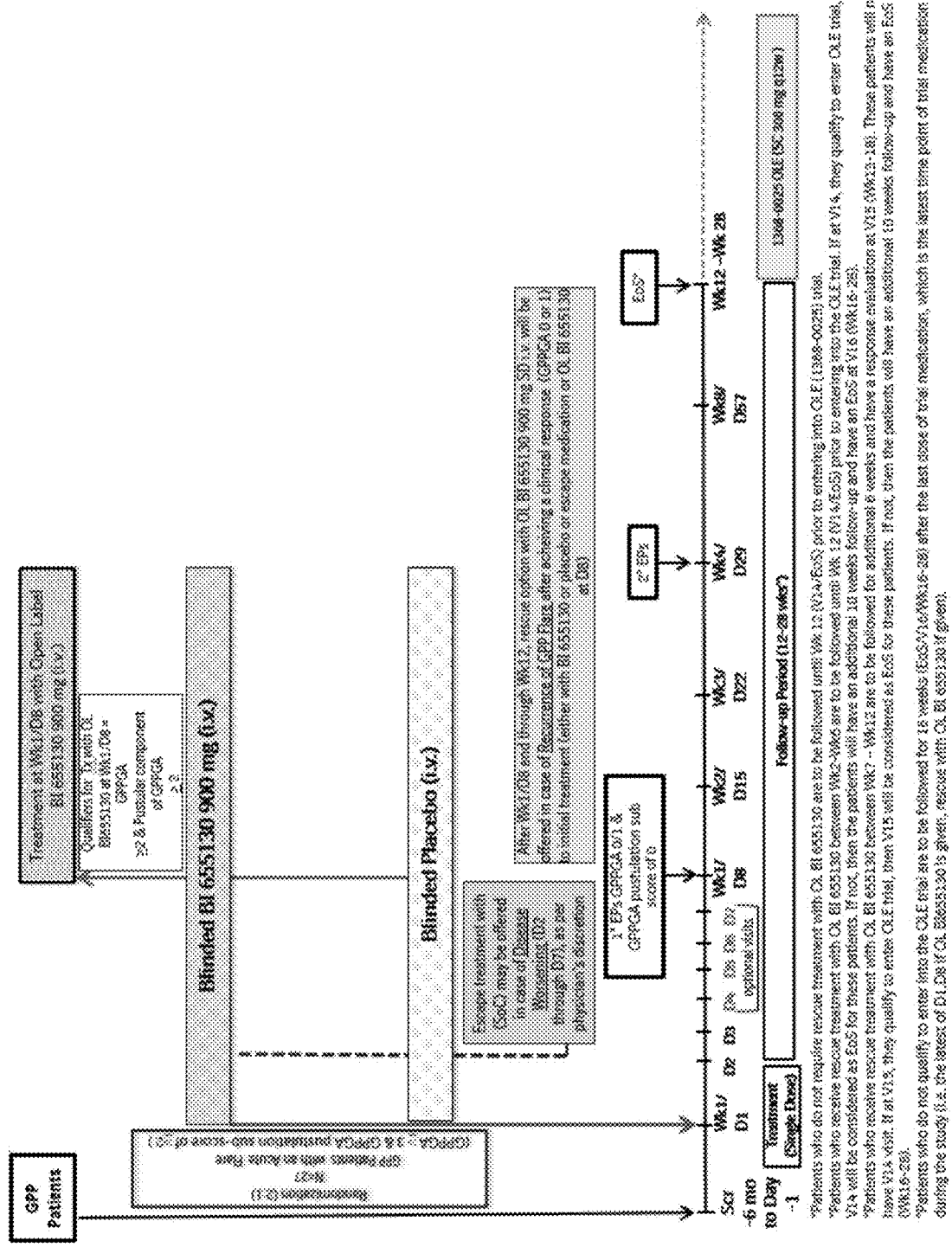
FIG. 9 shows the study design as discussed in Example 2.

This study will be a single-dose, placebo-controlled study of patients with acute GPP flares of moderate to severe intensity receiving 900 mg an anti-IL-36R antibody of the present invention and then followed for an additional 12 weeks. Patients who satisfy the inc/exc criteria of subsequent open-label extension trial will receive an option to continue receiving treatment for GPP with s.c. dosing. See FIG. 9 for additional details on the trial design.

Example 3: Treating Patients with Acute GPP Flares

In this example, an anti-IL36R antibody (e.g., an anti-IL-36R antibody of the present invention) is used to treat patients with acute GPP flares. Initially, each patient has one or more inclusion criteria listed in Example 2. A single 900 mg dose i.v. of an anti-IL36R antibody of the present invention (in solution for infusion at 60 mg/mL) is administered to each patient.

Following the administration of the anti-IL-36R antibody (e.g., an anti-IL-36R antibody of the present invention), safety and efficacy assessments reveal the followings: At least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the patients achieve clinical remission as defined by (a) Generalized Pustular Psoriasis Global Assessment (GPPGA) score of 0 or 1 at Week 1; (b) GPPGA pustulation subscore of 0 indicating no visible pustules at Week 1; (c) Psoriasis Area and Severity Index for Generalized Pustular Psoriasis (GPPASI) 75 at Week 4; (d) Change from baseline in Pain Visual Analog Scale (VAS) score at Week 4; (e) Change from baseline in Psoriasis Symptom Scale (PSS) score at Week 4; (f) Change from baseline in Functional Assessment of Chronic Illness Therapy (FACIT) Fatigue score at Week 4; (g) GPPGA 0 or 1 at Week 4; (h) GPPGA pustulation subscore of 0 indicating no visible pustules at Week 4; (i) GPPASI 50 at Week 1 and 4; or (j) Change in GPPASI pustule, erythema or scaling severity subscore from baseline at Week 1 and 4 of the treatment. The proportion of patients with a response to the administration is statistically significantly higher as compared to patients on placebo for one or more of end points (a)-(j).

Example 4: Preventing Flares from Recurring in GPP Patients

In this example, a single 900 mg dose i.v. of an anti-IL36R antibody of the present invention (in solution for infusion at 60 mg/mL) is used to treat patients with acute GPP flares. Subsequent to the i.v. dose, as shown in Table 1, additional subcutaneous doses of the anti-IL36R antibody are administered to prevent the GPP flares from recurring.

Following the administration of the last dose of the anti-IL-36R antibody (e.g., an anti-IL-36R antibody of the present invention), at least 10%, 20%, 30%, 40%, 50%, 60%, 70% or 80% of the patients remain in clinical remission as measured by a GPPGA score of 0 or 1 at Week 12, 24, 36, 48, 60 or 72. The improved effects are maintained at higher percentage with an anti-IL-36R antibody of the present invention than with placebo. At least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 after the last dose of the anti-IL-36R is administered, as compared to placebo.

Following the administration of the last dose of the anti-IL-36R antibody (e.g., an anti-IL-36R antibody of the present invention), at least 10%, 20%, 30%, 40%, 50%, 60%, 70% or 80% of the patients remain in clinical remission as measured by a change in GPPASI from baseline at Week 12, 24, 36, 48, 60 or 72. The improved effects are maintained at higher percentage with an anti-IL-36R antibody of the present invention than with placebo. At least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 after the last dose of the anti-IL-36R is administered, as compared to placebo.

Following the administration of the last dose of the anti-IL-36R antibody (e.g., an anti-IL-36R antibody of the present invention), at least 10%, 20%, 30%, 40%, 50%, 60%, 70% or 80% of the patients remain in clinical remission as measured by a change in GPPASI pustule, erythema or scaling severity subscore from baseline at Week 12, 24, 36, 48, 60 or 72. The improved effects are maintained at higher percentage with an anti-IL-36R antibody of the present invention than with placebo. At least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 after the last dose of the anti-IL-36R is administered, as compared to placebo.

Example 5: Achieving Complete Resolution of GPP Symptoms in GPP Patients

In this example, a single 900 mg dose i.v. of an anti-IL36R antibody of the present invention (in solution for infusion at 60 mg/mL) is used to treat patients with acute GPP flares. Subsequent to the i.v. dose, as shown in Table 1, additional subcutaneous doses of the anti-IL36R antibody are administered to achieve complete resolution of GPP symptoms in the patients.

Following the administration of the last dose of the anti-IL-36R antibody (e.g., an anti-IL-36R antibody of the present invention), at least 10%, 20%, 30%, 40%, 50%, 60%, 70% or 80% of the patients complete resolution of GPP symptoms as measured by a GPPGA score of 0 at Week 12, 24, 36, 48, 60 or 72. The improved effects are maintained at higher percentage with an anti-IL-36R antibody of the present invention than with placebo. At least 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% of the mammals or patients maintain improved effects at Week 12, 24, 36, 48, 60 or 72 after the last dose of the anti-IL-36R is administered, as compared to placebo.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

All patents and/or publications including journal articles cited in this disclosure are expressly incorporated herein by reference.

The invention claimed is:

1. A method of reducing or alleviating-symptoms of an acute phase flare-up of GPP in a patient, said symptoms including one or more of pustules, erythema, or scaling, said method comprising intravenously administering to the patient one intravenous dose of an anti-interleukin-36 receptor (anti-IL-36R) antibody, wherein said intravenous dose comprises 900 mg of said anti-IL-36R antibody, and further wherein said anti-IL-36R antibody comprises:
   (i) a light chain variable region comprising the amino acid sequence of SEQ ID NO: 77; and a heavy chain variable region comprising the amino acid sequence of SEQ ID NO: 87; or
   (ii) a light chain variable region comprising the amino acid sequence of SEQ ID NO: 77; and a heavy chain variable region comprising the amino acid sequence of SEQ ID NO: 88; or
   (iii) a light chain variable region comprising the amino acid sequence of SEQ ID NO: 77; and a heavy chain variable region comprising the amino acid sequence of SEQ ID NO: 89; or
   (iv) a light chain variable region comprising the amino acid sequence of SEQ ID NO: 80; and a heavy chain variable region comprising the amino acid sequence of SEQ ID NO: 87; or
   (v) a light chain variable region comprising the amino acid sequence of SEQ ID NO: 80; and a heavy chain variable region comprising the amino acid sequence of SEQ ID NO: 88; or
   (vi) a light chain variable region comprising the amino acid sequence of SEQ ID NO: 80; and a heavy chain variable region comprising the amino acid sequence of SEQ ID NO: 89; or
   (vii) a light chain variable region comprising the amino acid sequence of SEQ ID NO: 85; and a heavy chain variable region comprising the amino acid sequence of SEQ ID NO: 100; or
   (viii) a light chain variable region comprising the amino acid sequence of SEQ ID NO: 85; and a heavy chain variable region comprising the amino acid sequence of SEQ ID NO: 101; or
   (ix) a light chain variable region comprising the amino acid sequence of SEQ ID NO: 86; and a heavy chain variable region comprising the amino acid sequence of SEQ ID NO: 100; or
   (x) a light chain variable region comprising the amino acid sequence of SEQ ID NO: 86; and a heavy chain variable region comprising the amino acid sequence of SEQ ID NO: 101; or
   (xi) a light chain comprising the amino acid sequence of SEQ ID NO: 115; and a heavy chain comprising the amino acid sequence of SEQ ID NO: 125; or
   (xii) a light chain comprising the amino acid sequence of SEQ ID NO: 115; and a heavy chain comprising the amino acid sequence of SEQ ID NO: 126; or
   (xiii) a light chain comprising the amino acid sequence of SEQ ID NO:115; and a heavy chain comprising the amino acid sequence of SEQ ID NO: 127; or
   (xiv) a light chain comprising the amino acid sequence of SEQ ID NO: 118; and a heavy chain comprising the amino acid sequence of SEQ ID NO: 125; or
   (xv) a light chain comprising the amino acid sequence of SEQ ID NO: 118; and a heavy chain comprising the amino acid sequence of SEQ ID NO: 126; or
   (xvi) a light chain comprising the amino acid sequence of SEQ ID NO: 118; and a heavy chain comprising the amino acid sequence of SEQ ID NO: 127; or
   (xvii) a light chain comprising the amino acid sequence of SEQ ID NO: 123; and a heavy chain comprising the amino acid sequence of SEQ ID NO: 138; or
   (xviii) a light chain comprising the amino acid sequence of SEQ ID NO: 123; and a heavy chain comprising the amino acid sequence of SEQ ID NO: 139; or
   (xix) a light chain comprising the amino acid sequence of SEQ ID NO: 124; and a heavy chain comprising the amino acid sequence of SEQ ID NO: 138.

2. The method of claim 1, wherein said treatment reduces the severity and duration of the generalized pustular psoriasis (GPP) acute phase flare-up.

3. The method according to claim 1, wherein the anti-IL-36R antibody comprises
   (i) a light chain variable region comprising the amino acid sequence of SEQ ID NO: 80, and a heavy chain variable region comprising the amino acid sequence of SEQ ID NO: 89; and/or
   (ii) a light chain comprising the amino acid sequence of SEQ ID NO: 118, and a heavy chain comprising the amino acid sequence of SEQ ID NO: 125, 126 or 127.

4. The method according to claim 2, wherein the anti-IL-36R antibody comprises
   (i) a light chain variable region comprising the amino acid sequence of SEQ ID NO: 80, and a heavy chain variable region comprising the amino acid sequence of SEQ ID NO: 89; or
   (ii) a light chain comprising the amino acid sequence of SEQ ID NO: 118, and a heavy chain comprising the amino acid sequence of SEQ ID NO: 125, 126 or 127.

5. The method of claim 1, further comprising:
   (a) obtaining at least one biological sample from said patient with GPP acute phase flare-up, wherein at least one biological sample is obtained from lesional skin or whole blood before and at least one of said biological samples is obtained after intravenous administration of the anti-IL-36R antibody; and
   (b) determining the gene expression profile of one or more genes in said biological sample, in order to detect whether one or more genes are upregulated or down-regulated after anti-IL-36R antibody treatment.

6. The method of claim 5, wherein the expression of one or more of interleukin 12 beta subunit (IL-12B), interleukin 6 (IL6), chemokine (C-X-C motif) ligand 1 (CXCL1), interleukin 23 alpha subunit (IL23A), tumor necrosis factor (TNF), interleukin 17C (IL17C), interleukin 24 (IL24), and interleukin 1 beta (IL1B) is detected in one or more lesional skin biologic samples before and after intravenous administration of the anti-IL-36R antibody, and the expression of one or more of IL1B, S100 calcium binding protein A9 (S100A9), S100 calcium binding protein A12 (S100A12), S100 calcium binding protein A8 (S100A8), Matrix metallopeptidase 25 (MMP25), Matrix metallopeptidase 9 (MMP9) or CD177 molecule (CD177) is detected in one or more whole blood biologic samples before and after intravenous administration of the anti-IL-36R antibody.

7. The method of claim 6, wherein the anti-IL-36R antibody is one which comprises
  (i) a light chain variable region comprising the amino acid sequence of SEQ ID NO: 80, and a heavy chain variable region comprising the amino acid sequence of SEQ ID NO: 89; or
  (ii) a light chain comprising the amino acid sequence of SEQ ID NO: 118 and a heavy chain comprising the amino acid sequence of SEQ ID NO: 125, 126 or 127.

8. The method of claim 1, wherein treatment with a single intravenous dosage of the anti-IL-36R antibody results in one or more of the following in the treated patient:
  (a) Generalized Pustular Psoriasis Global Assessment (GPPGA) total score of 0 or 1 at Day 8 (D8) after intravenous administration of the anti-IL-36R antibody; or
  (b) a GPPGA pustulation subscore of 0 indicating no visible pustules at D8 after intravenous administration of the anti-IL-36R antibody; or
  (c) a Psoriasis Area and Severity Index for Generalized Pustular Psoriasis (GPPASI) of 75 at Day 29 (D29) after intravenous administration of the anti-IL-36R antibody; or
  (d) a percentage change from a first baseline Pain Visual Analog Scale (VAS) score calculated before intravenous administration of the anti-IL-36R antibody as compared to a second Pain Visual Analog Scale (VAS) score calculated at D29 after intravenous administration of the anti-IL-36R antibody; or
  (e) a percentage change from a first baseline Psoriasis Symptom Scale (PSS) score calculated before intravenous administration of the anti-IL-36R antibody as compared to a second Psoriasis Symptom Scale (PSS) score calculated at D29 after intravenous administration of the anti-IL-36R antibody; or
  (f) a percentage change from a first baseline Functional Assessment of Chronic Illness Therapy (FACIT) Fatigue score calculated before intravenous administration of the anti-IL-36R antibody as compared to a second Functional Assessment of Chronic Illness Therapy (FACIT) Fatigue score calculated at D29 after intravenous administration of the anti-IL-36R antibody; or
  (g) a GPPGA pustulation subscore of 0 or 1 at D29 after intravenous administration of the anti-IL-36R antibody; or
  (h) a GPPGA pustulation subscore of 0 indicating no visible pustules at D29 after intravenous administration of the anti-IL-36R antibody; or
  (i) a GPPASI score of 50 at D8 and D29 after intravenous administration of the anti-IL-36R antibody; or
  (j) a percentage change in GPPASI pustule, erythema or scaling severity subscore from a first baseline subscore calculated before intravenous administration of the anti-IL36R antibody as compared to a second GPPASI pustule, erythema or scaling severity subscore taken at D8 and D29 after intravenous administration of the anti-IL-36R antibody.

9. The method of claim 2, wherein treatment with a single intravenous dosage of the anti-IL-36R antibody results in one or more of the following in the treated patient:
  (a) Generalized Pustular Psoriasis Global Assessment (GPPGA) total score of 0 or 1 at Day 8 (D8) after intravenous administration of the anti-IL-36R antibody; or
  (b) a GPPGA pustulation subscore of 0 indicating no visible pustules at D8 after intravenous administration of the anti-IL-36R antibody; or
  (c) a Psoriasis Area and Severity Index for Generalized Pustular Psoriasis (GPPASI) of 75 at Day 29 (D29) after intravenous administration of the anti-IL-36R antibody; or
  (d) a percentage change from a first baseline Pain Visual Analog Scale (VAS) score calculated before intravenous administration of the anti-IL-36R antibody as compared to a second Pain Visual Analog Scale (VAS) score calculated at D29 after intravenous administration of the anti-IL-36R antibody; or
  (e) a percentage change from a first baseline Psoriasis Symptom Scale (PSS) score calculated before intravenous administration of the anti-IL-36R antibody as compared to a second Psoriasis Symptom Scale (PSS) score calculated at D29 after intravenous administration of the anti-IL-36R antibody; or
  (f) a percentage change from a first baseline Functional Assessment of Chronic Illness Therapy (FACIT) Fatigue score calculated before intravenous administration of the anti-IL-36R antibody as compared to a second Functional Assessment of Chronic Illness Therapy (FACIT) Fatigue score calculated at D29 after intravenous administration of the anti-IL-36R antibody; or
  (g) a GPPGA pustulation subscore of 0 or 1 at D29 after intravenous administration of the anti-IL-36R antibody; or
  (h) a GPPGA pustulation subscore of 0 indicating no visible pustules at D29 after intravenous administration of the anti-IL-36R antibody; or
  (i) a GPPASI total score of 50 at D8 and D29 after intravenous administration of the anti-IL-36R antibody; or
  (j) a percentage change in GPPASI pustule, erythema or scaling severity subscore from a first baseline subscore calculated before intravenous administration of the anti-IL36R antibody as compared to a second GPPASI pustule, erythema or scaling severity subscore calculated at D8 and D29 after intravenous administration of the anti-IL-36R antibody.

* * * * *

SEQUENCE LISTING

```
<160> NUMBER OF SEQ ID NOS: 140

<210> SEQ ID NO 1
<211> LENGTH: 108
<212> TYPE: PRT
<213> ORGANISM: Mus sp.

<400> SEQUENCE: 1

Gln Ile Val Leu Thr Gln Ser Pro Ala Ile Met Ser Ala Ser Leu Gly
1               5                   10                  15

Glu Arg Val Thr Met Thr Cys Thr Ala Ser Ser Ser Val Ser Ser Ser
            20                  25                  30

Tyr Leu His Trp Tyr Gln Lys Lys Pro Gly Ser Ser Pro Lys Leu Trp
        35                  40                  45

Val Tyr Ser Thr Ser Asn Leu Ala Ser Gly Val Pro Val Arg Phe Ser
    50                  55                  60

Gly Ser Gly Ser Gly Thr Ser Tyr Ser Leu Thr Ile Ser Ser Met Glu
65                  70                  75                  80

Ala Glu Asp Ala Ala Thr Tyr Tyr Cys His Gln His His Arg Ser Pro
                85                  90                  95

Val Thr Phe Gly Ser Gly Thr Lys Leu Glu Met Lys
            100                 105

<210> SEQ ID NO 2
<211> LENGTH: 107
<212> TYPE: PRT
<213> ORGANISM: Mus sp.

<400> SEQUENCE: 2

Asp Ile Gln Met Thr Gln Ser Pro Ala Ser Gln Ser Ala Ser Leu Gly
1               5                   10                  15

Glu Ser Val Thr Phe Thr Cys Leu Ala Ser Gln Thr Ile Gly Thr Trp
            20                  25                  30

Leu Ala Trp Tyr Gln Gln Arg Pro Gly Lys Ser Pro Gln Leu Leu Ile
        35                  40                  45
```

```
Tyr Ala Ala Thr Ser Leu Ala Asp Gly Val Pro Ser Arg Phe Ser Gly
        50                  55                  60

Ser Gly Ser Gly Thr Gln Phe Ser Phe Asn Ile Arg Ser Leu Gln Ala
 65                  70                  75                  80

Glu Asp Phe Ala Ser Tyr Tyr Cys Gln Gln Val Tyr Thr Thr Pro Leu
                 85                  90                  95

Thr Phe Gly Gly Gly Thr Lys Leu Glu Ile Lys
                100                 105

<210> SEQ ID NO 3
<211> LENGTH: 107
<212> TYPE: PRT
<213> ORGANISM: Mus sp.

<400> SEQUENCE: 3

Asp Ile Gln Met Thr Gln Ser Pro Ala Ser Gln Ser Ala Ser Leu Gly
1               5                   10                  15

Glu Ser Val Thr Phe Thr Cys Leu Ala Ser Gln Thr Ile Gly Thr Trp
                20                  25                  30

Leu Gly Trp Tyr Gln Gln Lys Pro Gly Lys Ser Pro Gln Leu Leu Ile
            35                  40                  45

Tyr Arg Ser Thr Thr Leu Ala Asp Gly Val Pro Ser Arg Phe Ser Gly
        50                  55                  60

Ser Gly Ser Gly Thr Lys Phe Ser Phe Lys Ile Ser Ser Leu Gln Ala
 65                  70                  75                  80

Ala Asp Phe Ala Ser Tyr Tyr Cys Gln Gln Leu Tyr Ser Ala Pro Tyr
                 85                  90                  95

Thr Phe Gly Gly Gly Thr Lys Leu Glu Ile Arg
                100                 105

<210> SEQ ID NO 4
<211> LENGTH: 112
<212> TYPE: PRT
<213> ORGANISM: Mus sp.

<400> SEQUENCE: 4

Asp Val Leu Leu Thr Gln Thr Pro Leu Ser Leu Pro Val Ser Leu Gly
1               5                   10                  15

Asp Gln Ala Ser Ile Ser Cys Arg Ser Ser Gln Asn Ile Val His Ser
                20                  25                  30

Asn Gly Asn Thr Tyr Leu Gln Trp Tyr Leu Gln Lys Pro Gly Gln Ser
            35                  40                  45

Pro Lys Leu Leu Ile Tyr Lys Val Ser Asn Arg Phe Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Phe Gln Gly
                 85                  90                  95

Ser His Val Pro Phe Thr Phe Gly Ala Gly Thr Lys Leu Glu Leu Lys
                100                 105                 110

<210> SEQ ID NO 5
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 5

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Tyr Lys Tyr
            20                  25                  30

Leu Asn Trp Tyr Gln Gln Lys Pro Asp Gly Thr Leu Lys Leu Leu Ile
        35                  40                  45

Tyr Tyr Thr Ser Gly Leu His Ser Gly Val Pro Ser Arg Phe Ser Gly
    50                  55                  60

Ser Gly Ser Gly Thr Asp Phe Ser Leu Thr Ile Ser Asn Leu Glu Pro
65                  70                  75                  80

Glu Asp Ile Ala Thr Tyr Phe Cys Gln Gln Asp Ser Lys Phe Pro Trp
                85                  90                  95

Thr Phe Gly Gly Asp Thr Lys Leu Glu Ile Lys
            100                 105

<210> SEQ ID NO 6
<211> LENGTH: 108
<212> TYPE: PRT
<213> ORGANISM: Mus sp.

<400> SEQUENCE: 6

Gln Ile Val Leu Thr Gln Ser Pro Ala Ile Met Ser Ala Ser Leu Gly
1               5                   10                  15

Glu Arg Val Thr Met Thr Cys Thr Ala Ser Ser Ser Val Ser Ser Ser
            20                  25                  30

Tyr Phe His Trp Tyr Gln Gln Lys Pro Gly Ser Ser Pro Lys Leu Trp
        35                  40                  45

Ile Tyr Arg Thr Ser Asn Leu Ala Ser Gly Val Pro Gly Arg Phe Ser
    50                  55                  60

Gly Ser Gly Ser Gly Thr Ser Tyr Ser Leu Thr Ile Ser Ser Met Glu
65                  70                  75                  80

Ala Glu Asp Ala Ala Thr Tyr Tyr Cys His Gln Phe His Arg Ser Pro
                85                  90                  95

Leu Thr Phe Gly Ala Gly Thr Lys Leu Glu Leu Lys
            100                 105

<210> SEQ ID NO 7
<211> LENGTH: 107
<212> TYPE: PRT
<213> ORGANISM: Mus sp.

<400> SEQUENCE: 7

Asp Ile Val Met Thr Gln Ser Gln Lys Phe Leu Ser Thr Ser Val Gly
1               5                   10                  15

Val Arg Val Ser Val Thr Cys Lys Ala Ser Gln Asp Val Gly Thr Asn
            20                  25                  30

Val Leu Trp Tyr Gln Gln Lys Ile Gly Gln Ser Pro Lys Pro Leu Ile
        35                  40                  45

Tyr Ser Ala Ser Tyr Arg His Ser Gly Val Pro Asp Arg Phe Thr Gly
    50                  55                  60

Ser Gly Ser Gly Thr Asp Phe Thr Leu Ile Ile Ser Asn Val Gln Ser
65                  70                  75                  80

Glu Asp Leu Ala Glu Tyr Phe Cys Gln Gln Tyr Ser Arg Tyr Pro Leu
                85                  90                  95

```
Thr Phe Gly Pro Gly Thr Lys Leu Glu Leu Lys
            100                 105

<210> SEQ ID NO 8
<211> LENGTH: 107
<212> TYPE: PRT
<213> ORGANISM: Mus sp.

<400> SEQUENCE: 8

Asp Ile Val Met Thr Gln Ser Gln Lys Phe Leu Ser Thr Ser Val Gly
1               5                   10                  15
Val Arg Val Ser Val Thr Cys Lys Ala Ser Gln Asp Val Gly Thr Asn
            20                  25                  30
Val Leu Trp Tyr Gln Gln Lys Ile Gly Gln Ser Pro Lys Ala Leu Ile
        35                  40                  45
Tyr Ser Ala Ser Tyr Arg His Ser Gly Val Pro Asp Arg Phe Thr Gly
    50                  55                  60
Ser Gly Ser Gly Thr Asp Phe Thr Leu Ile Ile Thr Asn Val Gln Ser
65                  70                  75                  80
Glu Asp Leu Ala Glu Tyr Phe Cys Gln Gln Tyr Ser Arg Tyr Pro Leu
                85                  90                  95
Thr Phe Gly Pro Gly Thr Lys Leu Glu Leu Lys
            100                 105

<210> SEQ ID NO 9
<211> LENGTH: 107
<212> TYPE: PRT
<213> ORGANISM: Mus sp.

<400> SEQUENCE: 9

Asp Ile Val Met Thr Gln Ser Gln Lys Phe Met Ser Ala Thr Val Gly
1               5                   10                  15
Gly Arg Val Asn Ile Thr Cys Lys Ala Ser Gln Asn Val Gly Arg Ala
            20                  25                  30
Val Ala Trp Tyr Gln Gln Lys Pro Gly Gln Ser Pro Lys Leu Leu Thr
        35                  40                  45
His Ser Ala Ser Asn Arg Tyr Thr Gly Val Pro Asp Arg Phe Thr Gly
    50                  55                  60
Ser Gly Ser Gly Thr Asp Phe Thr Leu Thr Ile Thr Asn Met Gln Ser
65                  70                  75                  80
Glu Asp Leu Ala Asp Tyr Phe Cys Gln Gln Tyr Ser Ser Tyr Pro Leu
                85                  90                  95
Thr Phe Gly Ala Gly Thr Lys Leu Asp Leu Lys
            100                 105

<210> SEQ ID NO 10
<211> LENGTH: 107
<212> TYPE: PRT
<213> ORGANISM: Mus sp.

<400> SEQUENCE: 10

Asp Ile Gln Met Thr Gln Ser Pro Ala Ser Gln Ser Ala Ser Leu Gly
1               5                   10                  15
Glu Ser Val Thr Phe Ser Cys Leu Ala Ser Gln Thr Ile Gly Thr Trp
            20                  25                  30
Leu Gly Trp Tyr Gln Gln Lys Pro Gly Lys Ser Pro Gln Leu Leu Ile
        35                  40                  45
```

```
Tyr Arg Ala Thr Ser Leu Ala Asp Gly Val Pro Ser Arg Phe Ser Gly
         50                  55                  60

Ser Gly Ser Gly Thr Asn Phe Ser Phe Lys Ile Ser Ser Leu Gln Ala
 65                  70                  75                  80

Glu Asp Leu Ala Ser Tyr Tyr Cys Gln Gln Leu Tyr Ser Gly Pro Tyr
                 85                  90                  95

Thr Phe Gly Gly Gly Thr Lys Leu Glu Ile Arg
            100                 105

<210> SEQ ID NO 11
<211> LENGTH: 119
<212> TYPE: PRT
<213> ORGANISM: Mus sp.

<400> SEQUENCE: 11

Gln Val Gln Leu Gln Gln Ser Gly Thr Glu Leu Leu Lys Pro Gly Ala
 1               5                  10                  15

Ser Val Lys Leu Ser Cys Lys Ala Ser Gly Asn Thr Val Thr Ser Tyr
                 20                  25                  30

Trp Met His Trp Val Lys Gln Arg Pro Gly Gln Gly Leu Glu Trp Ile
             35                  40                  45

Gly Glu Ile Leu Pro Ser Thr Gly Arg Thr Asn Tyr Asn Glu Asn Phe
 50                  55                  60

Lys Gly Lys Ala Met Leu Thr Val Asp Lys Ser Ser Thr Ala Tyr
 65                  70                  75                  80

Met Gln Leu Ser Ser Leu Ala Ser Glu Asp Ser Ala Val Tyr Tyr Cys
                 85                  90                  95

Thr Ile Val Tyr Phe Gly Asn Pro Trp Phe Ala Tyr Trp Gly Gln Gly
            100                 105                 110

Thr Leu Val Thr Val Ser Ala
            115

<210> SEQ ID NO 12
<211> LENGTH: 125
<212> TYPE: PRT
<213> ORGANISM: Mus sp.

<400> SEQUENCE: 12

Glu Val Gln Leu Gln Gln Ser Gly Pro Glu Leu Val Lys Pro Gly Ala
 1               5                  10                  15

Ser Val Lys Leu Ser Cys Lys Ala Ser Gly Tyr Thr Phe Thr Asp Asn
                 20                  25                  30

Tyr Met Asn Trp Val Arg Gln Ser His Gly Lys Ser Leu Glu Trp Ile
             35                  40                  45

Gly Arg Val Asn Pro Ser Asn Gly Asp Thr Lys Tyr Asn Gln Asn Phe
 50                  55                  60

Lys Gly Lys Ala Thr Leu Thr Val Asp Lys Ser Leu Ser Thr Ala Tyr
 65                  70                  75                  80

Met Gln Leu Asn Gly Leu Thr Ser Glu Asp Ser Ala Val Tyr Tyr Cys
                 85                  90                  95

Gly Arg Thr Lys Asn Phe Tyr Ser Ser Tyr Ser Tyr Asp Asp Ala Met
            100                 105                 110

Asp Tyr Trp Gly Gln Gly Thr Ser Val Thr Val Ser Ser
            115                 120                 125

<210> SEQ ID NO 13
<211> LENGTH: 124
```

```
<212> TYPE: PRT
<213> ORGANISM: Mus sp.

<400> SEQUENCE: 13

Glu Val Gln Leu Gln Gln Ser Gly Ala Glu Phe Val Arg Pro Gly Ala
1               5                   10                  15

Ser Val Lys Phe Ser Cys Thr Ala Ser Gly Phe Asn Ile Lys Asp Asp
            20                  25                  30

Tyr Ile His Trp Val Arg Gln Arg Pro Glu Gln Gly Leu Glu Trp Val
        35                  40                  45

Gly Arg Ile Asp Pro Ala Asn Gly Asn Thr Lys Tyr Ala Pro Lys Phe
    50                  55                  60

Gln Asp Lys Ala Thr Ile Thr Ala Asp Thr Ser Ser Asn Thr Ala Tyr
65                  70                  75                  80

Leu Gln Leu Ser Ser Leu Thr Ser Glu Asp Thr Ala Val Tyr Tyr Cys
                85                  90                  95

Ala Lys Ser Phe Pro Asn Asn Tyr Tyr Ser Tyr Asp Asp Ala Phe Ala
            100                 105                 110

Tyr Trp Gly Gln Gly Thr Leu Val Thr Val Ser Ala
        115                 120

<210> SEQ ID NO 14
<211> LENGTH: 118
<212> TYPE: PRT
<213> ORGANISM: Mus sp.

<400> SEQUENCE: 14

Gln Val Gln Leu Lys Glu Ser Gly Pro Val Leu Val Ala Pro Ser Gln
1               5                   10                  15

Ser Leu Ser Ile Thr Cys Thr Val Ser Gly Phe Ser Leu Thr Lys Phe
            20                  25                  30

Gly Val His Trp Ile Arg Gln Thr Pro Gly Lys Gly Leu Glu Trp Leu
        35                  40                  45

Gly Val Ile Trp Ala Gly Gly Pro Thr Asn Tyr Asn Ser Ala Leu Met
    50                  55                  60

Ser Arg Leu Thr Ile Ser Lys Asp Ile Ser Gln Ser Gln Val Phe Leu
65                  70                  75                  80

Arg Ile Asp Ser Leu Gln Thr Asp Asp Thr Ala Met Tyr Tyr Cys Ala
                85                  90                  95

Lys Gln Ile Tyr Tyr Ser Thr Leu Val Asp Tyr Trp Gly Gln Gly Thr
            100                 105                 110

Ser Val Thr Val Ser Ser
        115

<210> SEQ ID NO 15
<211> LENGTH: 120
<212> TYPE: PRT
<213> ORGANISM: Mus sp.

<400> SEQUENCE: 15

Gln Val Gln Leu Lys Glu Ser Gly Pro Gly Leu Val Ala Pro Ser Gln
1               5                   10                  15

Ser Leu Phe Ile Thr Cys Thr Val Ser Gly Phe Ser Leu Ser Ser Tyr
            20                  25                  30

Glu Ile Asn Trp Val Arg Gln Val Pro Gly Lys Gly Leu Glu Trp Leu
        35                  40                  45
```

```
Gly Val Ile Trp Thr Gly Ile Thr Thr Asn Tyr Asn Ser Ala Leu Ile
            50                  55                  60

Ser Arg Leu Ser Ile Ser Lys Asp Asn Ser Lys Ser Leu Val Phe Leu
 65                  70                  75                  80

Lys Met Asn Ser Leu Gln Thr Asp Asp Thr Ala Ile Tyr Tyr Cys Ala
                    85                  90                  95

Arg Gly Thr Gly Thr Gly Phe Tyr Tyr Ala Met Asp Tyr Trp Gly Gln
                100                 105                 110

Gly Thr Ser Val Thr Val Ser Ser
            115                 120
```

<210> SEQ ID NO 16
<211> LENGTH: 119
<212> TYPE: PRT
<213> ORGANISM: Mus sp.

<400> SEQUENCE: 16

```
Gln Val Gln Leu Gln Gln Pro Gly Ala Asp Phe Val Arg Pro Gly Ala
 1               5                   10                  15

Ser Met Arg Leu Ser Cys Lys Ala Ser Gly Tyr Ser Phe Thr Ser Ser
                20                  25                  30

Trp Ile His Trp Val Lys Gln Arg Pro Gly Gln Gly Leu Glu Trp Ile
            35                  40                  45

Gly Glu Ile Asn Pro Gly Asn Val Arg Thr Asn Tyr Asn Glu Asn Phe
        50                  55                  60

Arg Asn Lys Ala Thr Leu Thr Val Asp Lys Ser Ser Thr Thr Ala Tyr
 65                  70                  75                  80

Met Gln Leu Arg Ser Leu Thr Ser Ala Asp Ser Ala Val Tyr Tyr Cys
                    85                  90                  95

Thr Val Val Phe Tyr Gly Glu Pro Tyr Phe Pro Tyr Trp Gly Gln Gly
                100                 105                 110

Thr Leu Val Thr Val Ser Ala
            115
```

<210> SEQ ID NO 17
<211> LENGTH: 119
<212> TYPE: PRT
<213> ORGANISM: Mus sp.

<400> SEQUENCE: 17

```
Gln Val Gln Leu Lys Glu Ser Gly Pro Gly Leu Val Ala Pro Ser Gln
 1               5                   10                  15

Ser Leu Ser Ile Thr Cys Thr Val Ser Gly Phe Ser Leu Thr Asn Tyr
                20                  25                  30

Ala Val His Trp Val Arg Gln Phe Pro Gly Lys Gly Leu Glu Trp Leu
            35                  40                  45

Gly Val Ile Trp Ser Asp Gly Ser Thr Asp Phe Asn Ala Pro Phe Lys
        50                  55                  60

Ser Arg Leu Ser Ile Asn Lys Asp Asn Ser Lys Ser Gln Val Phe Phe
 65                  70                  75                  80

Lys Met Asn Ser Leu Gln Ile Asp Asp Thr Ala Ile Tyr Tyr Cys Ala
                    85                  90                  95

Arg Lys Gly Gly Tyr Ser Gly Ser Trp Phe Ala Tyr Trp Gly Gln Gly
                100                 105                 110

Thr Leu Val Thr Val Ser Ala
            115
```

```
<210> SEQ ID NO 18
<211> LENGTH: 119
<212> TYPE: PRT
<213> ORGANISM: Mus sp.

<400> SEQUENCE: 18

Gln Val Gln Leu Lys Glu Ser Gly Pro Gly Leu Val Ala Pro Ser Gln
1               5                   10                  15

Ser Leu Ser Ile Thr Cys Thr Val Ser Gly Phe Ser Leu Thr Asn Tyr
            20                  25                  30

Ala Val His Trp Val Arg Gln Phe Pro Gly Lys Gly Leu Glu Trp Leu
        35                  40                  45

Gly Val Ile Trp Ser Asp Gly Ser Thr Asp Tyr Asn Ala Pro Phe Lys
    50                  55                  60

Ser Arg Leu Ser Ile Asn Lys Asp Asn Ser Lys Ser Gln Val Phe Phe
65                  70                  75                  80

Lys Met Asn Ser Leu Gln Thr Asp Asp Thr Ala Ile Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ala
        115

<210> SEQ ID NO 19
<211> LENGTH: 117
<212> TYPE: PRT
<213> ORGANISM: Mus sp.

<400> SEQUENCE: 19

Gln Val Gln Leu Lys Glu Ser Gly Pro Val Leu Val Ala Pro Ser Gln
1               5                   10                  15

Ser Leu Ser Ile Thr Cys Thr Val Ser Gly Phe Ser Leu Thr Asn Tyr
            20                  25                  30

Gly Val His Trp Val Arg Gln Pro Pro Gly Lys Gly Leu Glu Trp Leu
        35                  40                  45

Gly Val Ile Trp Pro Val Gly Ser Thr Asn Tyr Asn Ser Ala Leu Met
    50                  55                  60

Ser Arg Leu Ser Ile His Lys Asp Asn Ser Lys Ser Gln Val Phe Leu
65                  70                  75                  80

Arg Met Asn Ser Leu Gln Thr Asp Asp Thr Ala Ile Tyr Tyr Cys Ala
                85                  90                  95

Lys Met Asp Trp Asp Asp Phe Phe Asp Tyr Trp Gly Gln Gly Thr Thr
            100                 105                 110

Leu Thr Val Ser Ser
        115

<210> SEQ ID NO 20
<211> LENGTH: 124
<212> TYPE: PRT
<213> ORGANISM: Mus sp.

<400> SEQUENCE: 20

Glu Val Gln Leu Gln Gln Ser Gly Ala Glu Leu Val Arg Pro Gly Ala
1               5                   10                  15

Ser Val Arg Leu Ser Cys Thr Ala Ser Gly Phe Asn Ile Lys Asp Asp
            20                  25                  30
```

```
Tyr Ile His Trp Val Arg Gln Arg Pro Lys Gln Gly Leu Glu Trp Leu
             35                  40                  45

Gly Arg Ile Asp Pro Ala Asn Gly Asn Thr Lys Tyr Asp Pro Arg Phe
         50                  55                  60

Gln Asp Lys Ala Thr Ile Thr Ala Asp Thr Ser Ser Asn Thr Ala Tyr
 65                  70                  75                  80

Leu His Leu Ser Ser Leu Thr Ser Glu Asp Thr Ala Val Tyr Tyr Cys
             85                  90                  95

Ala Lys Ser Phe Pro Asp Asn Tyr Tyr Ser Tyr Asp Asp Ala Phe Ala
            100                 105                 110

Tyr Trp Gly Gln Gly Thr Leu Val Thr Val Ser Ala
            115                 120

<210> SEQ ID NO 21
<211> LENGTH: 12
<212> TYPE: PRT
<213> ORGANISM: Mus sp.

<400> SEQUENCE: 21

Thr Ala Ser Ser Ser Val Ser Ser Ser Tyr Leu His
 1               5                  10

<210> SEQ ID NO 22
<211> LENGTH: 11
<212> TYPE: PRT
<213> ORGANISM: Mus sp.

<400> SEQUENCE: 22

Leu Ala Ser Gln Thr Ile Gly Thr Trp Leu Ala
 1               5                  10

<210> SEQ ID NO 23
<211> LENGTH: 11
<212> TYPE: PRT
<213> ORGANISM: Mus sp.

<400> SEQUENCE: 23

Leu Ala Ser Gln Thr Ile Gly Thr Trp Leu Gly
 1               5                  10

<210> SEQ ID NO 24
<211> LENGTH: 16
<212> TYPE: PRT
<213> ORGANISM: Mus sp.

<400> SEQUENCE: 24

Arg Ser Ser Gln Asn Ile Val His Ser Asn Gly Asn Thr Tyr Leu Gln
 1               5                  10                  15

<210> SEQ ID NO 25
<211> LENGTH: 11
<212> TYPE: PRT
<213> ORGANISM: Mus sp.

<400> SEQUENCE: 25

Arg Ala Ser Gln Asp Ile Tyr Lys Tyr Leu Asn
 1               5                  10

<210> SEQ ID NO 26
<211> LENGTH: 12
<212> TYPE: PRT
<213> ORGANISM: Mus sp.
```

```
<400> SEQUENCE: 26

Thr Ala Ser Ser Val Ser Ser Ser Tyr Phe His
1               5                   10

<210> SEQ ID NO 27
<211> LENGTH: 11
<212> TYPE: PRT
<213> ORGANISM: Mus sp.

<400> SEQUENCE: 27

Lys Ala Ser Gln Asp Val Gly Thr Asn Val Leu
1               5                   10

<210> SEQ ID NO 28
<211> LENGTH: 11
<212> TYPE: PRT
<213> ORGANISM: Mus sp.

<400> SEQUENCE: 28

Lys Ala Ser Gln Asn Val Gly Arg Ala Val Ala
1               5                   10

<210> SEQ ID NO 29
<211> LENGTH: 11
<212> TYPE: PRT
<213> ORGANISM: Mus sp.

<400> SEQUENCE: 29

Leu Ala Ser Gln Thr Ile Gly Thr Trp Leu Gly
1               5                   10

<210> SEQ ID NO 30
<211> LENGTH: 7
<212> TYPE: PRT
<213> ORGANISM: Mus sp.

<400> SEQUENCE: 30

Ser Thr Ser Asn Leu Ala Ser
1               5

<210> SEQ ID NO 31
<211> LENGTH: 7
<212> TYPE: PRT
<213> ORGANISM: Mus sp.

<400> SEQUENCE: 31

Ala Ala Thr Ser Leu Ala Asp
1               5

<210> SEQ ID NO 32
<211> LENGTH: 7
<212> TYPE: PRT
<213> ORGANISM: Mus sp.

<400> SEQUENCE: 32

Arg Ser Thr Thr Leu Ala Asp
1               5

<210> SEQ ID NO 33
<211> LENGTH: 7
<212> TYPE: PRT
<213> ORGANISM: Mus sp.
```

```
<400> SEQUENCE: 33

Lys Val Ser Asn Arg Phe Ser
1               5

<210> SEQ ID NO 34
<211> LENGTH: 7
<212> TYPE: PRT
<213> ORGANISM: Mus sp.

<400> SEQUENCE: 34

Tyr Thr Ser Gly Leu His Ser
1               5

<210> SEQ ID NO 35
<211> LENGTH: 7
<212> TYPE: PRT
<213> ORGANISM: Mus sp.

<400> SEQUENCE: 35

Arg Thr Ser Asn Leu Ala Ser
1               5

<210> SEQ ID NO 36
<211> LENGTH: 7
<212> TYPE: PRT
<213> ORGANISM: Mus sp.

<400> SEQUENCE: 36

Ser Ala Ser Tyr Arg His Ser
1               5

<210> SEQ ID NO 37
<211> LENGTH: 7
<212> TYPE: PRT
<213> ORGANISM: Mus sp.

<400> SEQUENCE: 37

Ser Ala Ser Asn Arg Tyr Thr
1               5

<210> SEQ ID NO 38
<211> LENGTH: 7
<212> TYPE: PRT
<213> ORGANISM: Mus sp.

<400> SEQUENCE: 38

Arg Ala Thr Ser Leu Ala Asp
1               5

<210> SEQ ID NO 39
<211> LENGTH: 9
<212> TYPE: PRT
<213> ORGANISM: Mus sp.

<400> SEQUENCE: 39

His Gln His His Arg Ser Pro Val Thr
1               5

<210> SEQ ID NO 40
<211> LENGTH: 9
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 40

Gln Gln Val Tyr Thr Thr Pro Leu Thr
1               5

<210> SEQ ID NO 41
<211> LENGTH: 9
<212> TYPE: PRT
<213> ORGANISM: Mus sp.

<400> SEQUENCE: 41

Gln Gln Leu Tyr Ser Ala Pro Tyr Thr
1               5

<210> SEQ ID NO 42
<211> LENGTH: 9
<212> TYPE: PRT
<213> ORGANISM: Mus sp.

<400> SEQUENCE: 42

Phe Gln Gly Ser His Val Pro Phe Thr
1               5

<210> SEQ ID NO 43
<211> LENGTH: 9
<212> TYPE: PRT
<213> ORGANISM: Mus sp.

<400> SEQUENCE: 43

Gln Gln Asp Ser Lys Phe Pro Trp Thr
1               5

<210> SEQ ID NO 44
<211> LENGTH: 9
<212> TYPE: PRT
<213> ORGANISM: Mus sp.

<400> SEQUENCE: 44

His Gln Phe His Arg Ser Pro Leu Thr
1               5

<210> SEQ ID NO 45
<211> LENGTH: 9
<212> TYPE: PRT
<213> ORGANISM: Mus sp.

<400> SEQUENCE: 45

Gln Gln Tyr Ser Arg Tyr Pro Leu Thr
1               5

<210> SEQ ID NO 46
<211> LENGTH: 9
<212> TYPE: PRT
<213> ORGANISM: Mus sp.

<400> SEQUENCE: 46

Gln Gln Tyr Ser Ser Tyr Pro Leu Thr
1               5

<210> SEQ ID NO 47
<211> LENGTH: 9
<212> TYPE: PRT
<213> ORGANISM: Mus sp.
```

```
<400> SEQUENCE: 47

Gln Gln Leu Tyr Ser Gly Pro Tyr Thr
1               5

<210> SEQ ID NO 48
<211> LENGTH: 10
<212> TYPE: PRT
<213> ORGANISM: Mus sp.

<400> SEQUENCE: 48

Gly Asn Thr Val Thr Ser Tyr Trp Met His
1               5                   10

<210> SEQ ID NO 49
<211> LENGTH: 10
<212> TYPE: PRT
<213> ORGANISM: Mus sp.

<400> SEQUENCE: 49

Gly Tyr Thr Phe Thr Asp Asn Tyr Met Asn
1               5                   10

<210> SEQ ID NO 50
<211> LENGTH: 10
<212> TYPE: PRT
<213> ORGANISM: Mus sp.

<400> SEQUENCE: 50

Gly Phe Asn Ile Lys Asp Asp Tyr Ile His
1               5                   10

<210> SEQ ID NO 51
<211> LENGTH: 10
<212> TYPE: PRT
<213> ORGANISM: Mus sp.

<400> SEQUENCE: 51

Gly Phe Ser Leu Thr Lys Phe Gly Val His
1               5                   10

<210> SEQ ID NO 52
<211> LENGTH: 10
<212> TYPE: PRT
<213> ORGANISM: Mus sp.

<400> SEQUENCE: 52

Gly Phe Ser Leu Ser Ser Tyr Glu Ile Asn
1               5                   10

<210> SEQ ID NO 53
<211> LENGTH: 10
<212> TYPE: PRT
<213> ORGANISM: Mus sp.

<400> SEQUENCE: 53

Gly Tyr Ser Phe Thr Ser Ser Trp Ile His
1               5                   10

<210> SEQ ID NO 54
<211> LENGTH: 10
<212> TYPE: PRT
<213> ORGANISM: Mus sp.
```

<400> SEQUENCE: 54

Gly Phe Ser Leu Thr Asn Tyr Ala Val His
1               5                   10

<210> SEQ ID NO 55
<211> LENGTH: 10
<212> TYPE: PRT
<213> ORGANISM: Mus sp.

<400> SEQUENCE: 55

Gly Phe Ser Leu Thr Asn Tyr Gly Val His
1               5                   10

<210> SEQ ID NO 56
<211> LENGTH: 10
<212> TYPE: PRT
<213> ORGANISM: Mus sp.

<400> SEQUENCE: 56

Gly Phe Asn Ile Lys Asp Asp Tyr Ile His
1               5                   10

<210> SEQ ID NO 57
<211> LENGTH: 17
<212> TYPE: PRT
<213> ORGANISM: Mus sp.

<400> SEQUENCE: 57

Glu Ile Leu Pro Ser Thr Gly Arg Thr Asn Tyr Asn Glu Asn Phe Lys
1               5                   10                  15

Gly

<210> SEQ ID NO 58
<211> LENGTH: 17
<212> TYPE: PRT
<213> ORGANISM: Mus sp.

<400> SEQUENCE: 58

Arg Val Asn Pro Ser Asn Gly Asp Thr Lys Tyr Asn Gln Asn Phe Lys
1               5                   10                  15

Gly

<210> SEQ ID NO 59
<211> LENGTH: 17
<212> TYPE: PRT
<213> ORGANISM: Mus sp.

<400> SEQUENCE: 59

Arg Ile Asp Pro Ala Asn Gly Asn Thr Lys Tyr Ala Pro Lys Phe Gln
1               5                   10                  15

Asp

<210> SEQ ID NO 60
<211> LENGTH: 16
<212> TYPE: PRT
<213> ORGANISM: Mus sp.

<400> SEQUENCE: 60

Val Ile Trp Ala Gly Gly Pro Thr Asn Tyr Asn Ser Ala Leu Met Ser
1               5                   10                  15

```
<210> SEQ ID NO 61
<211> LENGTH: 16
<212> TYPE: PRT
<213> ORGANISM: Mus sp.

<400> SEQUENCE: 61

Val Ile Trp Thr Gly Ile Thr Thr Asn Tyr Asn Ser Ala Leu Ile Ser
1               5                   10                  15

<210> SEQ ID NO 62
<211> LENGTH: 15
<212> TYPE: PRT
<213> ORGANISM: Mus sp.

<400> SEQUENCE: 62

Glu Ile Asn Pro Gly Asn Val Arg Thr Asn Tyr Asn Glu Asn Phe
1               5                   10                  15

<210> SEQ ID NO 63
<211> LENGTH: 16
<212> TYPE: PRT
<213> ORGANISM: Mus sp.

<400> SEQUENCE: 63

Val Ile Trp Ser Asp Gly Ser Thr Asp Phe Asn Ala Pro Phe Lys Ser
1               5                   10                  15

<210> SEQ ID NO 64
<211> LENGTH: 16
<212> TYPE: PRT
<213> ORGANISM: Mus sp.

<400> SEQUENCE: 64

Val Ile Trp Ser Asp Gly Ser Thr Asp Tyr Asn Ala Pro Phe Lys Ser
1               5                   10                  15

<210> SEQ ID NO 65
<211> LENGTH: 16
<212> TYPE: PRT
<213> ORGANISM: Mus sp.

<400> SEQUENCE: 65

Val Ile Trp Pro Val Gly Ser Thr Asn Tyr Asn Ser Ala Leu Met Ser
1               5                   10                  15

<210> SEQ ID NO 66
<211> LENGTH: 17
<212> TYPE: PRT
<213> ORGANISM: Mus sp.

<400> SEQUENCE: 66

Arg Ile Asp Pro Ala Asn Gly Asn Thr Lys Tyr Asp Pro Arg Phe Gln
1               5                   10                  15

Asp

<210> SEQ ID NO 67
<211> LENGTH: 10
<212> TYPE: PRT
<213> ORGANISM: Mus sp.

<400> SEQUENCE: 67

Val Tyr Phe Gly Asn Pro Trp Phe Ala Tyr
1               5                   10
```

```
<210> SEQ ID NO 68
<211> LENGTH: 16
<212> TYPE: PRT
<213> ORGANISM: Mus sp.

<400> SEQUENCE: 68

Thr Lys Asn Phe Tyr Ser Ser Tyr Ser Tyr Asp Asp Ala Met Asp Tyr
1               5                   10                  15

<210> SEQ ID NO 69
<211> LENGTH: 15
<212> TYPE: PRT
<213> ORGANISM: Mus sp.

<400> SEQUENCE: 69

Ser Phe Pro Asn Asn Tyr Tyr Ser Tyr Asp Asp Ala Phe Ala Tyr
1               5                   10                  15

<210> SEQ ID NO 70
<211> LENGTH: 10
<212> TYPE: PRT
<213> ORGANISM: Mus sp.

<400> SEQUENCE: 70

Gln Ile Tyr Tyr Ser Thr Leu Val Asp Tyr
1               5                   10

<210> SEQ ID NO 71
<211> LENGTH: 12
<212> TYPE: PRT
<213> ORGANISM: Mus sp.

<400> SEQUENCE: 71

Gly Thr Gly Thr Gly Phe Tyr Tyr Ala Met Asp Tyr
1               5                   10

<210> SEQ ID NO 72
<211> LENGTH: 10
<212> TYPE: PRT
<213> ORGANISM: Mus sp.

<400> SEQUENCE: 72

Val Phe Tyr Gly Glu Pro Tyr Phe Pro Tyr
1               5                   10

<210> SEQ ID NO 73
<211> LENGTH: 11
<212> TYPE: PRT
<213> ORGANISM: Mus sp.

<400> SEQUENCE: 73

Lys Gly Gly Tyr Ser Gly Ser Trp Phe Ala Tyr
1               5                   10

<210> SEQ ID NO 74
<211> LENGTH: 9
<212> TYPE: PRT
<213> ORGANISM: Mus sp.

<400> SEQUENCE: 74

Met Asp Trp Asp Asp Phe Phe Asp Tyr
1               5

<210> SEQ ID NO 75
<211> LENGTH: 15
```

```
<212> TYPE: PRT
<213> ORGANISM: Mus sp.

<400> SEQUENCE: 75

Ser Phe Pro Asp Asn Tyr Tyr Ser Tyr Asp Asp Ala Phe Ala Tyr
1               5                   10                  15

<210> SEQ ID NO 76
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 76

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Val Ser Ser Ser
                20                  25                  30

Tyr Phe His Trp Tyr Gln Gln Lys Pro Gly Gln Ala Pro Arg Leu Leu
            35                  40                  45

Ile Tyr Arg Thr Ser Thr Leu Ala Ser Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Gln Gly Thr Lys Leu Glu Ile Lys
            100                 105

<210> SEQ ID NO 77
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 77

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Val Ser Ser Ser
                20                  25                  30

Tyr Phe His Trp Tyr Gln Gln Lys Pro Gly Gln Ala Pro Arg Leu Leu
            35                  40                  45

Ile Tyr Arg Thr Ser Ile Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Thr Tyr Tyr Cys His Gln Phe His Arg Ser Pro
                85                  90                  95

Leu Thr Phe Gly Gln Gly Thr Lys Leu Glu Ile Lys
            100                 105

<210> SEQ ID NO 78
<211> LENGTH: 108
<212> TYPE: PRT
<213> ORGANISM: Artificial Sequence
<220> FEATURE:
```

<223> OTHER INFORMATION: Description of Artificial Sequence: Synthetic
      polypeptide

<400> SEQUENCE: 78

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Val Ser Ser Ser
            20                  25                  30

Tyr Phe His Trp Tyr Gln Gln Lys Pro Gly Gln Ala Pro Arg Leu Trp
            35                  40                  45

Ile Tyr Arg Thr Ser Arg Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Gln Gly Thr Lys Leu Glu Ile Lys
            100                 105

<210> SEQ ID NO 79
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 79

Glu Ile Val Leu Thr Gln Ser Pro Gly Thr Leu Ser Leu Ser Pro Gly
1               5                   10                  15

Glu Arg Ala Thr Met Thr Cys Thr Ala Ser Ser Val Ser Ser Ser
            20                  25                  30

Tyr Phe His Trp Tyr Gln Gln Lys Pro Gly Gln Ala Pro Arg Leu Leu
            35                  40                  45

Ile Tyr Arg Thr Ser Arg Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys His Gln Phe His Arg Ser Pro
                85                  90                  95

Leu Thr Phe Gly Gln Gly Thr Lys Leu Glu Ile Lys
            100                 105

<210> SEQ ID NO 80
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 80

Gln Ile Val Leu Thr Gln Ser Pro Gly Thr Leu Ser Leu Ser Pro Gly
1               5                   10                  15

Glu Arg Ala Thr Met Thr Cys Thr Ala Ser Ser Val Ser Ser Ser
            20                  25                  30

Tyr Phe His Trp Tyr Gln Gln Lys Pro Gly Gln Ala Pro Arg Leu Trp
            35                  40                  45

Ile Tyr Arg Thr Ser Arg Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Ala Gly Thr Lys Leu Glu Ile Lys
                100                 105

<210> SEQ ID NO 81
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Gln Ile Val Leu Thr Gln Ser Pro Gly Thr Leu Ser Leu Ser Pro Gly
1               5                   10                  15

Glu Arg Val Thr Met Ser Cys Thr Ala Ser Ser Ser Val Ser Ser Ser
                20                  25                  30

Tyr Phe His Trp Tyr Gln Gln Lys Pro Gly Gln Ala Pro Arg Leu Leu
            35                  40                  45

Ile Tyr Arg Thr Ser Gln Leu Ala Ser Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Gln Gly Thr Lys Leu Glu Ile Lys
                100                 105

<210> SEQ ID NO 82
<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 82

Gln Ile Val Leu Thr Gln Ser Pro Gly Thr Leu Ser Leu Ser Pro Gly
1               5                   10                  15

Glu Arg Ala Thr Met Thr Cys Thr Ala Ser Ser Ser Val Ser Ser Ser
                20                  25                  30

Tyr Phe His Trp Tyr Gln Gln Lys Pro Gly Gln Ala Pro Arg Leu Leu
            35                  40                  45

Ile Tyr Arg Thr Ser Lys Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Thr Tyr Tyr Cys His Gln Phe His Arg Ser Pro
                85                  90                  95

Leu Thr Phe Gly Gln Gly Thr Lys Leu Glu Ile Lys
                100                 105

<210> SEQ ID NO 83

<211> LENGTH: 108
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 83

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Val Ser Ser Ser
            20                  25                  30

Tyr Phe His Trp Tyr Gln Gln Lys Pro Gly Gln Ala Pro Arg Leu Leu
        35                  40                  45

Ile Tyr Arg Thr Ser His Leu Ala Ser Gly Ile Pro Gly Arg Phe Ser
50                  55                  60

Gly Ser Gly Ser Gly Thr Asp Phe Thr Leu Thr Ile Ser Arg Leu Glu
65                  70                  75                  80

Pro Glu Asp Ala Ala Val Tyr Tyr Cys His Gln Phe His Arg Ser Pro
                85                  90                  95

Leu Thr Phe Gly Gln Gly Thr Lys Leu Glu Ile Lys
            100                 105

<210> SEQ ID NO 84
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 84

Glu Ile Val Met Thr Gln Ser Pro Ala Thr Leu Ser Val Ser Pro Gly
1               5                   10                  15

Val Arg Ala Thr Leu Ser Cys Lys Ala Ser Gln Asp Val Gly Thr Asn
            20                  25                  30

Val Leu Trp Tyr Gln Gln Lys Pro Gly Gln Ala Pro Arg Pro Leu Ile
        35                  40                  45

Tyr Ser Ala Ser Tyr Arg His Ser Gly Ile Pro Asp Arg Phe Ser Gly
50                  55                  60

Ser Gly Ser Gly Thr Glu Phe Thr Leu Thr Ile Ser Ser Leu Gln Ser
65                  70                  75                  80

Glu Asp Phe Ala Glu Tyr Phe Cys Gln Gln Tyr Ser Arg Tyr Pro Leu
                85                  90                  95

Thr Phe Gly Gln Gly Thr Lys Leu Glu Ile Lys
            100                 105

<210> SEQ ID NO 85
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 85

Glu Ile Val Met Thr Gln Ser Pro Ala Thr Leu Ser Val Ser Pro Gly
1               5                   10                  15

Val Arg Ala Thr Leu Ser Cys Lys Ala Ser Gln Asp Val Gly Thr Asn
            20                  25                  30

Val Leu Trp Tyr Gln Gln Lys Pro Gly Gln Ala Pro Arg Pro Leu Ile
            35                  40                  45

Tyr Ser Ala Ser Tyr Arg His Ser Gly Ile Pro Asp Arg Phe Ser Gly
 50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Ser Arg Tyr Pro Leu
                85                  90                  95

Thr Phe Gly Gln Gly Thr Lys Leu Glu Ile Lys
            100                 105

<210> SEQ ID NO 86
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 86

Glu Ile Val Met Thr Gln Ser Pro Ala Thr Leu Ser Val Ser Pro Gly
1               5                   10                  15

Val Arg Ala Thr Leu Ser Cys Lys Ala Ser Gln Asp Val Gly Thr Asn
            20                  25                  30

Val Leu Trp Tyr Gln Gln Lys Pro Gly Gln Ala Pro Arg Pro Leu Ile
            35                  40                  45

Tyr Ser Ala Ser Tyr Arg His Ser Gly Ile Pro Ala Arg Phe Ser Gly
 50                  55                  60

Ser Gly Ser Gly Thr Glu Phe Thr Leu Thr Ile Ser Ser Leu Gln Ser
65                  70                  75                  80

Glu Asp Phe Ala Glu Tyr Tyr Cys Gln Gln Tyr Ser Arg Tyr Pro Leu
                85                  90                  95

Thr Phe Gly Gln Gly Thr Lys Leu Glu Ile Lys
            100                 105

<210> SEQ ID NO 87
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 87

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
            35                  40                  45

Gly Glu Ile Asn Pro Gly Asn Val Arg Thr Asn Tyr Asn Glu Asn Phe
 50                  55                  60

Arg Asn Lys Ala Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser
         115

<210> SEQ ID NO 88
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Ile
        35                  40                  45

Gly Glu Ile Asn Pro Gly Asn Val Arg Thr Asn Tyr Asn Glu Asn Phe
    50                  55                  60

Arg Asn Arg Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 89
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 89

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Lys Gln Ala Pro Gly Gln Gly Leu Glu Trp Met
        35                  40                  45

Gly Glu Ile Asn Pro Gly Asn Val Arg Thr Asn Tyr Asn Glu Asn Phe
    50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 90
<211> LENGTH: 119
<212> TYPE: PRT
<213> ORGANISM: Artificial Sequence
<220> FEATURE:

<223> OTHER INFORMATION: Description of Artificial Sequence: Synthetic
     polypeptide

<400> SEQUENCE: 90

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Met
        35                  40                  45

Gly Glu Ile Asn Pro Gly Asn Val Arg Thr Asn Tyr Asn Glu Asn Phe
    50                  55                  60

Arg Asn Arg Ala Thr Leu Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 91
<211> LENGTH: 119
<212> TYPE: PRT
<213> ORGANISM: Artificial Sequence
<220> FEATURE:
<223> OTHER INFORMATION: Description of Artificial Sequence: Synthetic
     polypeptide

<400> SEQUENCE: 91

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Met
        35                  40                  45

Gly Glu Ile Leu Pro Gly Val Val Arg Thr Asn Tyr Asn Glu Asn Phe
    50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 92
<211> LENGTH: 119
<212> TYPE: PRT
<213> ORGANISM: Artificial Sequence
<220> FEATURE:
<223> OTHER INFORMATION: Description of Artificial Sequence: Synthetic
     polypeptide

<400> SEQUENCE: 92

Gln Val Gln Leu Val Gln Ser Gly Ala Glu Val Lys Lys Pro Gly Ala
1               5                   10                  15

```
Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Ile
        35                  40                  45

Gly Glu Ile Asn Pro Gly Ala Val Arg Thr Asn Tyr Asn Glu Asn Phe
 50                  55                  60

Arg Asn Arg Val Thr Met Thr Val Asp Thr Ser Ile Ser Thr Ala Tyr
 65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
               100                 105                 110

Thr Leu Val Thr Val Ser Ser
           115
```

<210> SEQ ID NO 93
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

```
Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Leu Val Arg Thr Asn Tyr Asn Glu Asn Phe
 50                  55                  60

Arg Asn Lys Val Thr Met Thr Val Asp Thr Ser Ile Ser Thr Ala Tyr
 65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
               100                 105                 110

Thr Leu Val Thr Val Ser Ser
           115
```

<210> SEQ ID NO 94
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 94

```
Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Ala Val Arg Thr Asn Tyr Asn Glu Asn Phe
 50                  55                  60
```

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 95
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 95

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Ser Val Arg Thr Asn Tyr Asn Glu Asn Phe
    50                  55                  60

Arg Asn Lys Ala Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 96
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 96

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Asn Lys Asp Thr Ser Lys Ser Gln Val Ser Phe
65                  70                  75                  80

Lys Met Ser Ser Val Gln Ala Ala Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

```
Thr Leu Val Thr Val Ser Ser
        115

<210> SEQ ID NO 97
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 97

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Thr Ser Lys Asn Gln Val Ser Leu
65                  70                  75                  80

Lys Met Asn Ser Leu Thr Thr Asp Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser
        115

<210> SEQ ID NO 98
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 98

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Asn Ser Lys Ser Gln Val Ser Leu
65                  70                  75                  80

Lys Met Asn Ser Val Thr Val Ala Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser
        115

<210> SEQ ID NO 99
<211> LENGTH: 119
<212> TYPE: PRT
<213> ORGANISM: Artificial Sequence
```

<220> FEATURE:
<223> OTHER INFORMATION: Description of Artificial Sequence: Synthetic
      polypeptide

<400> SEQUENCE: 99

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Val Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Thr Ser Lys Asn Gln Val Ser Phe
65                  70                  75                  80

Lys Leu Ser Ser Val Thr Val Asp Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser
        115

<210> SEQ ID NO 100
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 100

Gln Val Gln Leu Gln Glu Ser Gly Pro Gly Leu Val Ala Pro Ser Glu
1               5                   10                  15

Thr Leu Ser Leu Thr Cys Thr Val Ser Gly Phe Ser Leu Thr Asp Tyr
            20                  25                  30

Ala Val His Trp Ile Arg Gln Phe Pro Gly Lys Gly Leu Glu Trp Ile
        35                  40                  45

Gly Val Ile Trp Ser Asp Gly Ser Thr Asp Phe Asn Ala Pro Phe Lys
    50                  55                  60

Ser Arg Val Thr Ile Ser Lys Asp Thr Ser Lys Asn Gln Val Ser Phe
65                  70                  75                  80

Lys Leu Ser Ser Val Thr Thr Asp Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser
        115

<210> SEQ ID NO 101
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 101

Gln Val Gln Leu Gln Glu Ser Gly Pro Gly Leu Val Lys Pro Ser Glu
1               5                   10                  15

-continued

```
Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Asn Ser Lys Ser Gln Val Ser Phe
65                  70                  75                  80

Lys Met Ser Ser Val Thr Ala Asp Asp Thr Ala Val Tyr Tyr Cys Ala
                85                  90                  95

Arg Lys Gly Gly Tyr Ser Gly Ser Trp Phe Ala Tyr Trp Gly Gln Gly
                100                 105                 110

Thr Leu Val Thr Val Ser Ser
        115
```

<210> SEQ ID NO 102
<211> LENGTH: 7
<212> TYPE: PRT
<213> ORGANISM: Mus sp.

<400> SEQUENCE: 102

Arg Thr Ser Thr Leu Ala Ser
1               5

<210> SEQ ID NO 103
<211> LENGTH: 7
<212> TYPE: PRT
<213> ORGANISM: Mus sp.

<400> SEQUENCE: 103

Arg Thr Ser Ile Leu Ala Ser
1               5

<210> SEQ ID NO 104
<211> LENGTH: 7
<212> TYPE: PRT
<213> ORGANISM: Mus sp.

<400> SEQUENCE: 104

Arg Thr Ser Arg Leu Ala Ser
1               5

<210> SEQ ID NO 105
<211> LENGTH: 7
<212> TYPE: PRT
<213> ORGANISM: Mus sp.

<400> SEQUENCE: 105

Arg Thr Ser Gln Leu Ala Ser
1               5

<210> SEQ ID NO 106
<211> LENGTH: 7
<212> TYPE: PRT
<213> ORGANISM: Mus sp.

<400> SEQUENCE: 106

Arg Thr Ser Lys Leu Ala Ser
1               5

<210> SEQ ID NO 107
<211> LENGTH: 10

```
<212> TYPE: PRT
<213> ORGANISM: Mus sp.

<400> SEQUENCE: 107

Gly Phe Ser Leu Thr Asp Tyr Ala Val His
1               5                   10

<210> SEQ ID NO 108
<211> LENGTH: 15
<212> TYPE: PRT
<213> ORGANISM: Mus sp.

<400> SEQUENCE: 108

Glu Ile Leu Pro Gly Val Val Arg Thr Asn Tyr Asn Glu Asn Phe
1               5                   10                  15

<210> SEQ ID NO 109
<211> LENGTH: 15
<212> TYPE: PRT
<213> ORGANISM: Mus sp.

<400> SEQUENCE: 109

Glu Ile Asn Pro Gly Ala Val Arg Thr Asn Tyr Asn Glu Asn Phe
1               5                   10                  15

<210> SEQ ID NO 110
<211> LENGTH: 15
<212> TYPE: PRT
<213> ORGANISM: Mus sp.

<400> SEQUENCE: 110

Glu Ile Asn Pro Gly Leu Val Arg Thr Asn Tyr Asn Glu Asn Phe
1               5                   10                  15

<210> SEQ ID NO 111
<211> LENGTH: 15
<212> TYPE: PRT
<213> ORGANISM: Mus sp.

<400> SEQUENCE: 111

Glu Ile Asn Pro Gly Ser Val Arg Thr Asn Tyr Asn Glu Asn Phe
1               5                   10                  15

<210> SEQ ID NO 112
<211> LENGTH: 330
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 112

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
65                  70                  75                  80
```

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Ala Ala Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
        210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 113
<211> LENGTH: 107
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 113

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

```
Pro Val Thr Lys Ser Phe Asn Arg Gly Glu Cys
            100                 105

<210> SEQ ID NO 114
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 114

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Val Ser Ser Ser
            20                  25                  30

Tyr Phe His Trp Tyr Gln Gln Lys Pro Gly Gln Ala Pro Arg Leu Leu
        35                  40                  45

Ile Tyr Arg Thr Ser Thr Leu Ala Ser Gly Ile Pro Asp Arg Phe Ser
50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 115
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 115

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Val Ser Ser Ser
            20                  25                  30

Tyr Phe His Trp Tyr Gln Gln Lys Pro Gly Gln Ala Pro Arg Leu Leu
        35                  40                  45

Ile Tyr Arg Thr Ser Ile Leu Ala Ser Gly Val Pro Asp Arg Phe Ser
50                  55                  60
```

Gly Ser Gly Ser Gly Thr Asp Phe Thr Leu Thr Ile Ser Arg Leu Glu
65                  70                  75                  80

Pro Glu Asp Phe Ala Thr Tyr Tyr Cys His Gln Phe His Arg Ser Pro
            85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
            165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
            195                 200                 205

Ser Phe Asn Arg Gly Glu Cys
210                 215

<210> SEQ ID NO 116
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 116

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Ser Val Ser Ser Ser
            20                  25                  30

Tyr Phe His Trp Tyr Gln Gln Lys Pro Gly Gln Ala Pro Arg Leu Trp
        35                  40                  45

Ile Tyr Arg Thr Ser Arg Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
            85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
            165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 117
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 117

Glu Ile Val Leu Thr Gln Ser Pro Gly Thr Leu Ser Leu Ser Pro Gly
1               5                   10                  15

Glu Arg Ala Thr Met Thr Cys Thr Ala Ser Ser Ser Val Ser Ser Ser
            20                  25                  30

Tyr Phe His Trp Tyr Gln Gln Lys Pro Gly Gln Ala Pro Arg Leu Leu
        35                  40                  45

Ile Tyr Arg Thr Ser Arg Leu Ala Ser Gly Val Pro Asp Arg Phe Ser
50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys His Gln Phe His Arg Ser Pro
                85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 118
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 118

Gln Ile Val Leu Thr Gln Ser Pro Gly Thr Leu Ser Leu Ser Pro Gly
1               5                   10                  15

Glu Arg Ala Thr Met Thr Cys Thr Ala Ser Ser Ser Val Ser Ser Ser
            20                  25                  30

Tyr Phe His Trp Tyr Gln Gln Lys Pro Gly Gln Ala Pro Arg Leu Trp
        35                  40                  45

Ile Tyr Arg Thr Ser Arg Leu Ala Ser Gly Val Pro Asp Arg Phe Ser
         50                  55                  60

Gly Ser Gly Ser Gly Thr Asp Phe Thr Leu Thr Ile Ser Arg Leu Glu
 65                  70                  75                  80

Pro Glu Asp Ala Ala Thr Tyr Tyr Cys His Gln Phe His Arg Ser Pro
                 85                  90                  95

Leu Thr Phe Gly Ala Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
        130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
        210                 215

<210> SEQ ID NO 119
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 119

Gln Ile Val Leu Thr Gln Ser Pro Gly Thr Leu Ser Leu Ser Pro Gly
 1               5                  10                  15

Glu Arg Val Thr Met Ser Cys Thr Ala Ser Ser Ser Val Ser Ser Ser
                 20                  25                  30

Tyr Phe His Trp Tyr Gln Gln Lys Pro Gly Gln Ala Pro Arg Leu Leu
            35                  40                  45

Ile Tyr Arg Thr Ser Gln Leu Ala Ser Gly Ile Pro Asp Arg Phe Ser
         50                  55                  60

Gly Ser Gly Ser Gly Thr Asp Phe Thr Leu Thr Ile Ser Arg Leu Glu
 65                  70                  75                  80

Pro Glu Asp Ala Ala Thr Tyr Tyr Cys His Gln Phe His Arg Ser Pro
                 85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
        130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 120
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 120

Gln Ile Val Leu Thr Gln Ser Pro Gly Thr Leu Ser Leu Ser Pro Gly
1               5                   10                  15

Glu Arg Ala Thr Met Thr Cys Thr Ala Ser Ser Ser Val Ser Ser Ser
            20                  25                  30

Tyr Phe His Trp Tyr Gln Gln Lys Pro Gly Gln Ala Pro Arg Leu Leu
        35                  40                  45

Ile Tyr Arg Thr Ser Lys Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Thr Tyr Tyr Cys His Gln Phe His Arg Ser Pro
                85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 121
<211> LENGTH: 215
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 121

Glu Ile Val Leu Thr Gln Ser Pro Gly Thr Leu Ser Leu Ser Pro Gly
1               5                   10                  15

Glu Arg Ala Thr Met Ser Cys Thr Ala Ser Ser Ser Val Ser Ser Ser
            20                  25                  30

-continued

```
Tyr Phe His Trp Tyr Gln Gln Lys Pro Gly Gln Ala Pro Arg Leu Leu
             35                  40                  45

Ile Tyr Arg Thr Ser His Leu Ala Ser Gly Ile Pro Gly Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Ala Ala Val Tyr Tyr Cys His Gln Phe His Arg Ser Pro
                 85                  90                  95

Leu Thr Phe Gly Gln Gly Thr Lys Leu Glu Ile Lys Arg Thr Val Ala
                100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
        130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 122
<211> LENGTH: 214
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 122

Glu Ile Val Met Thr Gln Ser Pro Ala Thr Leu Ser Val Ser Pro Gly
 1               5                  10                  15

Val Arg Ala Thr Leu Ser Cys Lys Ala Ser Gln Asp Val Gly Thr Asn
                20                  25                  30

Val Leu Trp Tyr Gln Gln Lys Pro Gly Gln Ala Pro Arg Pro Leu Ile
             35                  40                  45

Tyr Ser Ala Ser Tyr Arg His Ser Gly Ile Pro Asp Arg Phe Ser Gly
 50                  55                  60

Ser Gly Ser Gly Thr Glu Phe Thr Leu Thr Ile Ser Ser Leu Gln Ser
 65                  70                  75                  80

Glu Asp Phe Ala Glu Tyr Phe Cys Gln Gln Tyr Ser Arg Tyr Pro Leu
                 85                  90                  95

Thr Phe Gly Gln Gly Thr Lys Leu Glu Ile Lys Arg Thr Val Ala Ala
                100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140

Lys Val Gln Trp Lys Val Asp Asn Ala Leu Gln Ser Gly Asn Ser Gln
145                 150                 155                 160
```

```
Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 123
<211> LENGTH: 214
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 123

Glu Ile Val Met Thr Gln Ser Pro Ala Thr Leu Ser Val Ser Pro Gly
1               5                   10                  15

Val Arg Ala Thr Leu Ser Cys Lys Ala Ser Gln Asp Val Gly Thr Asn
            20                  25                  30

Val Leu Trp Tyr Gln Gln Lys Pro Gly Gln Ala Pro Arg Pro Leu Ile
        35                  40                  45

Tyr Ser Ala Ser Tyr Arg His Ser Gly Ile Pro Asp Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Ser Arg Tyr Pro Leu
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 124
<211> LENGTH: 214
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 124

Glu Ile Val Met Thr Gln Ser Pro Ala Thr Leu Ser Val Ser Pro Gly
1               5                   10                  15
```

Val Arg Ala Thr Leu Ser Cys Lys Ala Ser Gln Asp Val Gly Thr Asn
            20                  25                  30

Val Leu Trp Tyr Gln Lys Pro Gly Gln Ala Pro Arg Pro Leu Ile
        35                  40                  45

Tyr Ser Ala Ser Tyr Arg His Ser Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Glu Tyr Tyr Cys Gln Gln Tyr Ser Arg Tyr Pro Leu
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 125
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 125

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Asn Val Arg Thr Asn Tyr Asn Glu Asn Phe
    50                  55                  60

Arg Asn Lys Ala Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
            165                 170                 175

Gln Ser Ser Gly Leu Tyr Ser Leu Ser Ser Val Val Thr Val Pro Ser
        180                 185                 190

Ser Ser Leu Gly Thr Gln Thr Tyr Ile Cys Asn Val Asn His Lys Pro
    195                 200                 205

Ser Asn Thr Lys Val Asp Lys Arg Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
        370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
            435                 440                 445

Lys

<210> SEQ ID NO 126
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 126

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Ile
        35                  40                  45

```
Gly Glu Ile Asn Pro Gly Asn Val Arg Thr Asn Tyr Asn Glu Asn Phe
     50                  55                  60

Arg Asn Arg Val Thr Met Thr Val Asp Thr Ser Ile Ser Thr Ala Tyr
 65                  70                  75                  80

Met Glu Leu Ser Arg Leu Arg Ser Asp Asp Thr Ala Val Tyr Tyr Cys
                 85                  90                  95

Thr Val Val Phe Tyr Gly Glu Pro Tyr Phe Pro Tyr Trp Gly Gln Gly
                100                 105                 110

Thr Leu Val Thr Val Ser Ser Ala Ser Thr Lys Gly Pro Ser Val Phe
             115                 120                 125

Pro Leu Ala Pro Ser Ser Lys Ser Thr Ser Gly Gly Thr Ala Ala Leu
130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
            195                 200                 205

Ser Asn Thr Lys Val Asp Lys Arg Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys
```

```
<210> SEQ ID NO 127
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 127

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
                20                  25                  30

Trp Ile His Trp Val Lys Gln Ala Pro Gly Gln Gly Leu Glu Trp Met
            35                  40                  45

Gly Glu Ile Asn Pro Gly Asn Val Arg Thr Asn Tyr Asn Glu Asn Phe
        50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
                100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
        130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365
```

```
Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
                435                 440                 445

Lys

<210> SEQ ID NO 128
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 128

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Met
        35                  40                  45

Gly Glu Ile Asn Pro Gly Asn Val Arg Thr Asn Tyr Asn Glu Asn Phe
    50                  55                  60

Arg Asn Arg Ala Thr Leu Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270
```

```
Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
        290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 129
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 129

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Arg Pro Gly Gln Gly Leu Glu Trp Met
        35                  40                  45

Gly Glu Ile Leu Pro Gly Val Val Arg Thr Asn Tyr Asn Glu Asn Phe
    50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175
```

```
Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
            195                 200                 205

Ser Asn Thr Lys Val Asp Lys Arg Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 130
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 130

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
                20                  25                  30

Trp Ile His Trp Val Arg Gln Arg Pro Gly Gln Gly Leu Glu Trp Ile
            35                  40                  45

Gly Glu Ile Asn Pro Gly Ala Val Arg Thr Asn Tyr Asn Glu Asn Phe
        50                  55                  60

Arg Asn Arg Val Thr Met Thr Val Asp Thr Ser Ile Ser Thr Ala Tyr
65                  70                  75                  80
```

```
Met Glu Leu Ser Arg Leu Arg Ser Asp Asp Thr Ala Val Tyr Tyr Cys
             85                  90                  95

Thr Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
            130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
            195                 200                 205

Ser Asn Thr Lys Val Asp Lys Arg Val Glu Pro Lys Ser Cys Asp Lys
            210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
            290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
            370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 131
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide
```

<400> SEQUENCE: 131

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Leu Val Arg Thr Asn Tyr Asn Glu Asn Phe
    50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400
```

Asp Ser Asp Gly Ser Phe Phe Leu Tyr Ser Lys Leu Thr Val Asp Lys
            405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 132
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 132

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Ala Val Arg Thr Asn Tyr Asn Glu Asn Phe
    50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
        370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 133
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 133

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Arg Gln Ala Pro Gly Gln Gly Leu Glu Trp Ile
        35                  40                  45

Gly Glu Ile Asn Pro Gly Ser Val Arg Thr Asn Tyr Asn Glu Asn Phe
    50                  55                  60

Arg Asn Lys Ala Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Val Val Phe Tyr Gly Glu Pro Tyr Phe Pro Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

```
Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 134
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 134

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Asn Lys Asp Thr Ser Lys Ser Gln Val Ser Phe
65                  70                  75                  80

Lys Met Ser Ser Val Gln Ala Ala Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110
```

```
Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
        130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 135
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 135

Gln Val Gln Leu Gln Glu Ser Gly Pro Gly Leu Val Lys Pro Ser Glu
1               5                   10                  15
```

```
Thr Leu Ser Ile Thr Cys Thr Val Ser Gly Phe Ser Leu Thr Asp Tyr
            20                  25                  30

Ala Val His Trp Ile Arg Gln Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Thr Ser Lys Asn Gln Val Ser Leu
65                  70                  75                  80

Lys Met Asn Ser Leu Thr Thr Asp Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430
```

Ala Leu His Asn His Tyr Thr Gln Lys Ser Leu Ser Leu Ser Pro Gly
            435                 440                 445

Lys

<210> SEQ ID NO 136
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 136

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Asn Ser Lys Ser Gln Val Ser Leu
65                  70                  75                  80

Lys Met Asn Ser Val Thr Val Ala Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

-continued

```
Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 137
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 137

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Val Arg Gln Pro Pro Gly Lys Gly Leu Glu Trp Ile
        35                  40                  45

Gly Val Ile Trp Ser Asp Gly Ser Thr Asp Tyr Asn Ala Pro Phe Lys
    50                  55                  60

Ser Arg Val Thr Ile Ser Lys Asp Thr Ser Lys Asn Gln Val Ser Phe
65                  70                  75                  80

Lys Leu Ser Ser Val Thr Val Asp Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Arg Val Glu Pro Lys Ser Cys Asp Lys
    210                 215                 220

Thr His Thr Cys Pro Pro Cys Pro Ala Pro Glu Ala Ala Gly Gly Pro
225                 230                 235                 240
```

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys

<210> SEQ ID NO 138
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 138

Gln Val Gln Leu Gln Glu Ser Gly Pro Gly Leu Val Ala Pro Ser Glu
1               5                   10                  15

Thr Leu Ser Leu Thr Cys Thr Val Ser Gly Phe Ser Leu Thr Asp Tyr
            20                  25                  30

Ala Val His Trp Ile Arg Gln Phe Pro Gly Lys Gly Leu Glu Trp Ile
        35                  40                  45

Gly Val Ile Trp Ser Asp Gly Ser Thr Asp Phe Asn Ala Pro Phe Lys
    50                  55                  60

Ser Arg Val Thr Ile Ser Lys Asp Thr Ser Lys Asn Gln Val Ser Phe
65                  70                  75                  80

Lys Leu Ser Ser Val Thr Thr Asp Asp Thr Ala Val Tyr Tyr Cys Ala
                85                  90                  95

Arg Lys Gly Gly Tyr Ser Gly Ser Trp Phe Ala Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

```
Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
            165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
            195                 200                 205

Ser Asn Thr Lys Val Asp Lys Arg Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
            245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
            325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
            405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 139
<211> LENGTH: 449
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 139

Gln Val Gln Leu Gln Glu Ser Gly Pro Gly Leu Val Lys Pro Ser Glu
1               5                   10                  15

Thr Leu Ser Ile Thr Cys Thr Val Ser Gly Phe Ser Leu Thr Asp Tyr
            20                  25                  30

Ala Val His Trp Ile Arg Gln Pro Pro Gly Lys Gly Leu Glu Trp Ile
            35                  40                  45
```

```
Gly Val Ile Trp Ser Asp Gly Ser Thr Asp Tyr Asn Ala Pro Phe Lys
 50                  55                  60

Ser Arg Val Thr Ile Ser Lys Asp Asn Ser Lys Ser Gln Val Ser Phe
 65                  70                  75                  80

Lys Met Ser Ser Val Thr Ala Asp Asp Thr Ala Val Tyr Tyr Cys Ala
                 85                  90                  95

Arg Lys Gly Gly Tyr Ser Gly Ser Trp Phe Ala Tyr Trp Gly Gln Gly
            100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
            195                 200                 205

Ser Asn Thr Lys Val Asp Lys Arg Val Glu Pro Lys Ser Cys Asp Lys
210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
            355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 140
```

```
<211> LENGTH: 7
<212> TYPE: PRT
<213> ORGANISM: Mus sp.

<400> SEQUENCE: 140

Arg Thr Ser His Leu Ala Ser
1               5
```